(12) United States Patent
Pettinga

(10) Patent No.: US 12,330,886 B2
(45) Date of Patent: *Jun. 17, 2025

(54) CONVEYOR TRANSFER GUARDS

(71) Applicant: Flexible Steel Lacing Company, Downers Grove, IL (US)

(72) Inventor: Mark Steven Pettinga, Hudsonville, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,184

(22) Filed: Dec. 5, 2022

(65) Prior Publication Data

US 2023/0098268 A1 Mar. 30, 2023

Related U.S. Application Data

(63) Continuation of application No. 16/604,115, filed as application No. PCT/US2018/026505 on Apr. 6, (Continued)

(51) Int. Cl.
*B65G 47/66* (2006.01)
*B65G 47/68* (2006.01)

(52) U.S. Cl.
CPC ........ *B65G 47/66* (2013.01); *B65G 2047/685* (2013.01)

(58) Field of Classification Search
CPC ... B65G 47/66; B65G 2047/685; B65G 47/68
See application file for complete search history.

(56) References Cited

U.S. PATENT DOCUMENTS

| 2,232,081 A | 2/1941 | Sloane |
| 2,237,345 A | 4/1941 | Frentzel, Jr. et al. |
| (Continued) | | |

FOREIGN PATENT DOCUMENTS

| CN | 1135668 | 11/1996 |
| CN | 2420247 | 2/2001 |
| (Continued) | | |

OTHER PUBLICATIONS

Notification of Transmittal of the International Search Report and the Written Opinion of the International Searching Authority, or the Declaration from the International Bureau of WIPO for corresponding International Application No. PCT/US18/26505, dated Aug. 8, 2018, 13 pages.

(Continued)

*Primary Examiner* — Mark A Deuble
(74) *Attorney, Agent, or Firm* — Fitch, Even, Tabin & Flannery LLP

(57) ABSTRACT

In one aspect, a transfer guard member having a body for being positioned in a gap intermediate conveying surfaces, an upper portion of the body for spanning the gap and outer portions of the upper body for slidingly engaging the conveying surfaces, and a pair of spaced, resilient legs having distal end portions for resiliently and slidingly engaging the conveying surfaces. In another aspect, a transfer guard member having a body and at least one attachment member of the body configured for being detachably fixed to a mounting bar. The body has at least one recess adjacent the attachment member for receiving at least one attachment member of another transfer guard member fixed to the mounting bar so that upper transfer surfaces of the attachment members are adjacent one another.

17 Claims, 86 Drawing Sheets

Related U.S. Application Data 2018, now Pat. No. 11,597,608, which is a continuation of application No. 15/483,588, filed on Apr. 10, 2017, now Pat. No. 10,233,035.

(60) Provisional application No. 62/503,118, filed on May 8, 2017.

(56) References Cited

U.S. PATENT DOCUMENTS

| | | |
|---|---|---|
| 2,268,724 A | 1/1942 | Shackelford |
| 2,517,983 A | 8/1950 | Crosland |
| 2,536,961 A | 1/1951 | Smith |
| 2,624,444 A | 1/1953 | Casabona |
| 2,627,960 A | 2/1953 | Eberle |
| 2,862,599 A | 12/1958 | Sinden |
| 2,899,086 A | 8/1959 | Saint-Andre |
| D209,071 S | 10/1967 | Koch |
| 3,345,957 A | 10/1967 | Welch |
| D209,421 S | 11/1967 | Fabian |
| 3,465,489 A | 9/1969 | Monaghan |
| 3,548,996 A | 12/1970 | Ellis |
| 3,587,674 A | 6/1971 | Adkin |
| 3,623,598 A | 11/1971 | Anfossi |
| 3,738,650 A | 6/1973 | Ossenkop et al. |
| 3,878,735 A | 4/1975 | Preuss |
| 3,988,880 A | 11/1976 | Miyazaki et al. |
| 4,096,943 A | 6/1978 | Gentsch |
| 4,132,304 A | 1/1979 | Gent |
| 4,288,208 A | 9/1981 | Kusters |
| 4,579,219 A | 4/1986 | Burkhardt |
| 4,613,036 A | 9/1986 | Bourgeois |
| 4,718,543 A | 1/1988 | Leisner et al. |
| D303,974 S | 10/1989 | Karr |
| 4,901,845 A | 2/1990 | Zoergiebel |
| 4,989,723 A | 2/1991 | Bode et al. |
| 5,009,307 A | 4/1991 | Chance et al. |
| 5,044,485 A | 9/1991 | Loder |
| 5,065,222 A | 11/1991 | Ishii |
| 5,215,182 A | 6/1993 | Garbagnati |
| 5,311,982 A | 5/1994 | Clopton |
| 5,311,983 A | 5/1994 | Clopton |
| 5,320,478 A | 6/1994 | Gonsowski et al. |
| 5,324,582 A | 6/1994 | Goto |
| 5,344,001 A | 9/1994 | Kawaai et al. |
| 5,409,096 A | 4/1995 | Clopton |
| 5,584,373 A | 12/1996 | Layne |
| 5,597,062 A | 1/1997 | Biwer |
| 5,597,063 A | 1/1997 | Bogle et al. |
| 5,695,042 A | 12/1997 | van der Burgt |
| D407,174 S | 3/1999 | Baker |
| 5,957,265 A | 9/1999 | Clopton |
| 5,971,129 A | 10/1999 | Stawniak et al. |
| D419,742 S | 1/2000 | Abbestam |
| 6,138,819 A | 10/2000 | Bogle et al. |
| 6,164,435 A | 12/2000 | Coen et al. |
| 6,550,604 B2 | 4/2003 | Maclachlan |
| 6,589,631 B1 | 7/2003 | Suzuki |
| 6,630,633 B1 | 10/2003 | Uber et al. |
| D483,168 S | 12/2003 | McDaniel |
| D484,545 S | 12/2003 | McIlvaine, IV |
| D493,933 S | 8/2004 | Schwagermann |
| 6,848,583 B2 | 2/2005 | Largent |
| 6,896,122 B2 | 5/2005 | Gambrell et al. |
| 6,959,803 B1 | 11/2005 | Layne et al. |
| 7,137,505 B2 | 11/2006 | Stebnicki |
| 7,210,569 B1 | 5/2007 | Tarhan et al. |
| D547,523 S | 7/2007 | Swinderman |
| 7,258,225 B2 | 8/2007 | Hall |
| D553,824 S | 10/2007 | Rijksen |
| 7,287,640 B1 | 10/2007 | Schmutzler |
| 7,413,088 B2 | 8/2008 | Temler |
| 7,523,820 B1 | 4/2009 | Wu et al. |
| D611,673 S | 3/2010 | Andrews |
| 7,673,732 B2 | 3/2010 | Underberg |
| 7,721,874 B2 | 5/2010 | Chen |
| 7,882,944 B1 | 2/2011 | Eubanks |
| D635,847 S | 4/2011 | Olsson |
| D643,709 S | 8/2011 | Olsson |
| 8,042,682 B2 | 10/2011 | Ertel |
| D650,143 S | 12/2011 | Bhosale |
| 8,162,133 B2 | 4/2012 | Ruge |
| 8,196,736 B2 | 6/2012 | Wagner |
| 8,210,341 B2 | 7/2012 | Marshall et al. |
| 8,365,899 B2 | 2/2013 | McKee |
| 8,567,591 B2 | 10/2013 | Gonzalez Alemany |
| 9,022,207 B2 | 5/2015 | Tully et al. |
| 9,022,210 B2 | 5/2015 | Tully |
| 9,027,738 B2 | 5/2015 | Coen |
| 9,290,333 B2 | 3/2016 | Skanse |
| 9,452,896 B2 | 9/2016 | Lee |
| 9,550,625 B2 | 1/2017 | Specht |
| D780,399 S | 2/2017 | Pettinga |
| 9,643,784 B2 | 5/2017 | Guerra |
| 9,663,306 B2 | 5/2017 | Pettinga |
| D789,643 S | 6/2017 | Pettinga |
| 9,694,987 B1 | 7/2017 | Schroader |
| 9,758,317 B2 | 9/2017 | Sammauro |
| D819,921 S | 6/2018 | Pettinga |
| 10,092,122 B2 | 10/2018 | Bing |
| 10,112,131 B2 | 10/2018 | Yoon |
| 10,233,035 B2 | 3/2019 | Pettinga |
| 10,343,853 B2 | 7/2019 | Yasinski |
| 10,376,938 B2 | 8/2019 | Frauenhuber |
| 10,427,891 B2 | 10/2019 | McKee |
| 10,556,755 B2 | 2/2020 | Pettinga |
| 10,646,898 B2 | 5/2020 | Hillerich, Jr. |
| 10,654,652 B1 | 5/2020 | Folickman |
| 10,913,616 B2 | 2/2021 | Pettinga |
| 10,926,955 B1 | 2/2021 | Malina |
| 11,136,194 B2 | 10/2021 | K S |
| 11,186,448 B2 | 11/2021 | Pettinga |
| 11,597,604 B1 | 3/2023 | Simon |
| 11,597,608 B2 | 3/2023 | Pettinga |
| 11,629,010 B1 | 4/2023 | Defant |
| 11,661,283 B2 | 5/2023 | Pettinga |
| 11,713,199 B2 * | 8/2023 | Pettinga ............... B65G 47/66 |
| | | 198/600 |
| 2005/0173858 A1 | 8/2005 | Temler et al. |
| 2006/0070966 A1 | 4/2006 | Koudys et al. |
| 2006/0108204 A1 | 5/2006 | Marsetti |
| 2007/0023257 A1 | 2/2007 | Schiesser |
| 2008/0296129 A1 | 12/2008 | Yagi et al. |
| 2009/0084659 A1 | 4/2009 | Underberg |
| 2010/0108467 A1 | 5/2010 | Barreyre et al. |
| 2010/0230247 A1 | 9/2010 | McKee |
| 2011/0132725 A1 | 6/2011 | Marshall et al. |
| 2014/0182733 A1 | 7/2014 | Mettee, II |
| 2014/0183002 A1 | 7/2014 | Tully |
| 2014/0183006 A1 | 7/2014 | Tully |
| 2014/0262684 A1 | 9/2014 | Skanse |
| 2015/0291368 A1 | 10/2015 | Pettinga |
| 2016/0214154 A1 | 7/2016 | Frauenhuber |
| 2017/0008705 A1 | 1/2017 | Sammauro |
| 2017/0055749 A1 | 3/2017 | Bing |
| 2017/0174444 A1 | 6/2017 | Schroader |
| 2017/0246564 A1 | 8/2017 | Yoon |
| 2017/0275102 A1 | 9/2017 | Pettinga |
| 2018/0265309 A1 | 9/2018 | Yasinski |
| 2018/0345324 A1 | 12/2018 | Hillerich, Jr. |
| 2019/0002209 A1 | 1/2019 | McKee |
| 2020/0346868 A1 | 11/2020 | K S |
| 2021/0101757 A1 | 4/2021 | Pettinga |
| 2021/0179365 A1 | 6/2021 | Pettinga |
| 2022/0089374 A1 | 3/2022 | Pettinga |
| 2022/0162016 A1 | 5/2022 | Pettinga |
| 2023/0098268 A1 | 3/2023 | Pettinga |
| 2023/0102050 A1 | 3/2023 | Pettinga |
| 2023/0278808 A1 | 9/2023 | Pettinga |

(56) References Cited

U.S. PATENT DOCUMENTS

| | | | |
|---|---|---|---|
| 2023/0286754 A1 | 9/2023 | Pettinga | |
| 2023/0303339 A1 | 9/2023 | Drummond | |

FOREIGN PATENT DOCUMENTS

| | | | |
|---|---|---|---|
| CN | 101056807 | A | 10/2007 |
| CN | 101074070 | A | 11/2007 |
| CN | 101880126 | A | 11/2010 |
| CN | 102695662 | A | 9/2012 |
| CN | 102887423 | A | 1/2013 |
| CN | 203448352 | U | 2/2014 |
| CN | 104870340 | A | 8/2015 |
| CN | 110691744 | | 1/2020 |
| CN | 112010006 | A | 12/2020 |
| DE | 3014608 | | 10/1981 |
| DE | 3224557 | | 1/1984 |
| DE | 8700878 | | 3/1987 |
| DE | 9212012 | U1 | 12/1992 |
| DE | 19858521 | | 6/2000 |
| DE | 202006003116 | | 4/2006 |
| EP | 0156113 | | 10/1985 |
| EP | 0290255 | | 11/1988 |
| EP | 0778229 | | 6/1997 |
| EP | 0906879 | | 4/1999 |
| EP | 0919493 | | 6/1999 |
| EP | 2332865 | A1 | 6/2011 |
| FR | 1561799 | | 3/1969 |
| GB | 842230 | | 7/1960 |
| GB | 1116571 | | 6/1968 |
| GB | 1352993 | | 5/1974 |
| JP | H07248011 | | 9/1995 |
| JP | H08133459 | A | 5/1996 |
| JP | H115264 | | 1/1999 |
| JP | H11199038 | | 7/1999 |
| JP | 2000177836 | | 6/2000 |
| JP | 2001233447 | A | 8/2001 |
| JP | 2005261873 | | 9/2005 |
| JP | 2005261873 | A | 9/2005 |
| JP | 2007155007 | | 6/2007 |
| JP | 5181355 | | 4/2013 |
| JP | 2019210100 | | 12/2019 |
| KR | 1020120103680 | | 9/2012 |
| KR | 101299596 | | 8/2013 |
| NL | 2002344 | | 6/2010 |
| SU | 590213 | | 1/1978 |
| SU | 1159859 | | 6/1985 |
| SU | 1328266 | | 8/1987 |
| WO | 9856694 | A1 | 12/1998 |
| WO | 2011071743 | | 6/2011 |
| WO | 2014106062 | | 7/2014 |
| WO | 2017111976 | | 6/2017 |
| WO | 2018191122 | | 10/2018 |
| WO | 2020216783 | | 10/2020 |

OTHER PUBLICATIONS

Extended European search report issued in related European Application No. 18783966.7, issued Dec. 18, 2020, 11 pages.
Machine translation of "User and Maintenance Manual for Audi 100" cited in Office Action and Search Report in Chinese application No. 201880036374.5 (5 pages).
Translation of Office Action and Search Report mailed Nov. 4, 2020, issued in related Chinese application No. 201880036374.5, (20 pages).
Written Opinion and Search Report mailed Oct. 20, 2020, issued in corresponding Singapore Application No. 11201909461Y, 10 pages.
Translation of Office Action and Search Report mailed Jun. 7, 2021, issued in corresponding Indonesian Application No. P00201905414, 4 pages.
Examination Report mailed Aug. 23, 2021, issued in corresponding Indian Application No. 201917041332, 7 pages.
U.S. Appl. No. 16/604,115; Non-Final Rejection mailed May 5, 2022; (pp. 1-8).
U.S. Appl. No. 16/604,115; Notice of Allowance and Fees Due (PTOL-85) mailed Aug. 15, 2022; (pp. 1-7).
U.S. Appl. No. 16/604,115; Notice of Allowance and Fees Due (PTOL-85) mailed Nov. 15, 2022; (pp. 1-2).
English Translation of Office Action and Search Report mailed Dec. 21, 2022 in Chinese Application No. 2021113880669, 24 pages.
U.S. Appl. No. 16/604,115; Notice of Allowance and Fees Due (PTOL-85) mailed Jan. 17, 2023; (pp. 1-2).
English Translation of Office Action and Search Report mailed Jan. 9, 2023 in related Chinese Application No. 202111401429.1, 24 pages.
U.S. Appl. No. 16/604,115; Notice of Allowance and Fees Due (PTOL-85) mailed Feb. 3, 2023; (pp. 1-2).
U.S. Appl. No. 63/316,344, filed Mar. 3, 2022, 36 pages.
U.S. Appl. No. 63/323,960, filed Mar. 25, 2022, 50 pages.
U.S. Appl. No. 17/951,748, filed Sep. 23, 2022, 57 pages.
Design U.S. Appl. No. 29/829,490, filed Mar. 4, 2022, 24 pages.
U.S. Appl. No. 18/117,076, filed Mar. 3, 2023, 84 pages.
U.S. Appl. No. 18/125,417, fied Mar. 23, 2023, 45 pages.
Communication pursuant to Article 94(3) EPC issued in related European Application No. 18783966.7-1017 mailed Mar. 4, 2023.
Examination Report issued in related Singapore Application No. 11201909461Y dated Dec. 2, 2021, 4 pages.
Notification of Transmittal of the International Search Report and the Written Opinion of the International Searching Authority, or the Declaration issued in related International Application No. PCT/US2023/016011 on Jun. 26, 2023, 14 pages.
U.S. Appl. No. 18/213,678, filed Jun. 23, 2023.
U.S. Appl. No. 17/537,140; Notice of Allowance and Fees Due (PTOL-85) mailed May 16, 2023; (pp. 1-2).
Office Action with machine English translation issued in related Indonesian Application No. P00202107269 mailed Apr. 4, 2023, 6 pages.
Office Action with machine English translation issued in related Korean Application No. 1020197033129 mailed Apr. 4, 2023, 6 pages.
Office Action issued in related European Application No. 18783966.7 mailed Apr. 4, 2023, 4 pages.
Office Action with machine English translation issued in related Viatnamese Application No. 1-2019-06172 mailed Mar. 31, 2023, 3 pages.
U.S. Appl. No. 29/898,156, filed Jul. 24, 2023, 10 pages.
U.S. Appl. No. 63/528,572, filed Jul. 24, 2023, 25 pages.
U.S. Appl. No. 18/198,942, filed May 18, 2023, 39 pages.
Office Action with machine English translation issued in related Korean Application No. 1020197033129 mailed Nov. 13, 2023, 14 pages.

* cited by examiner

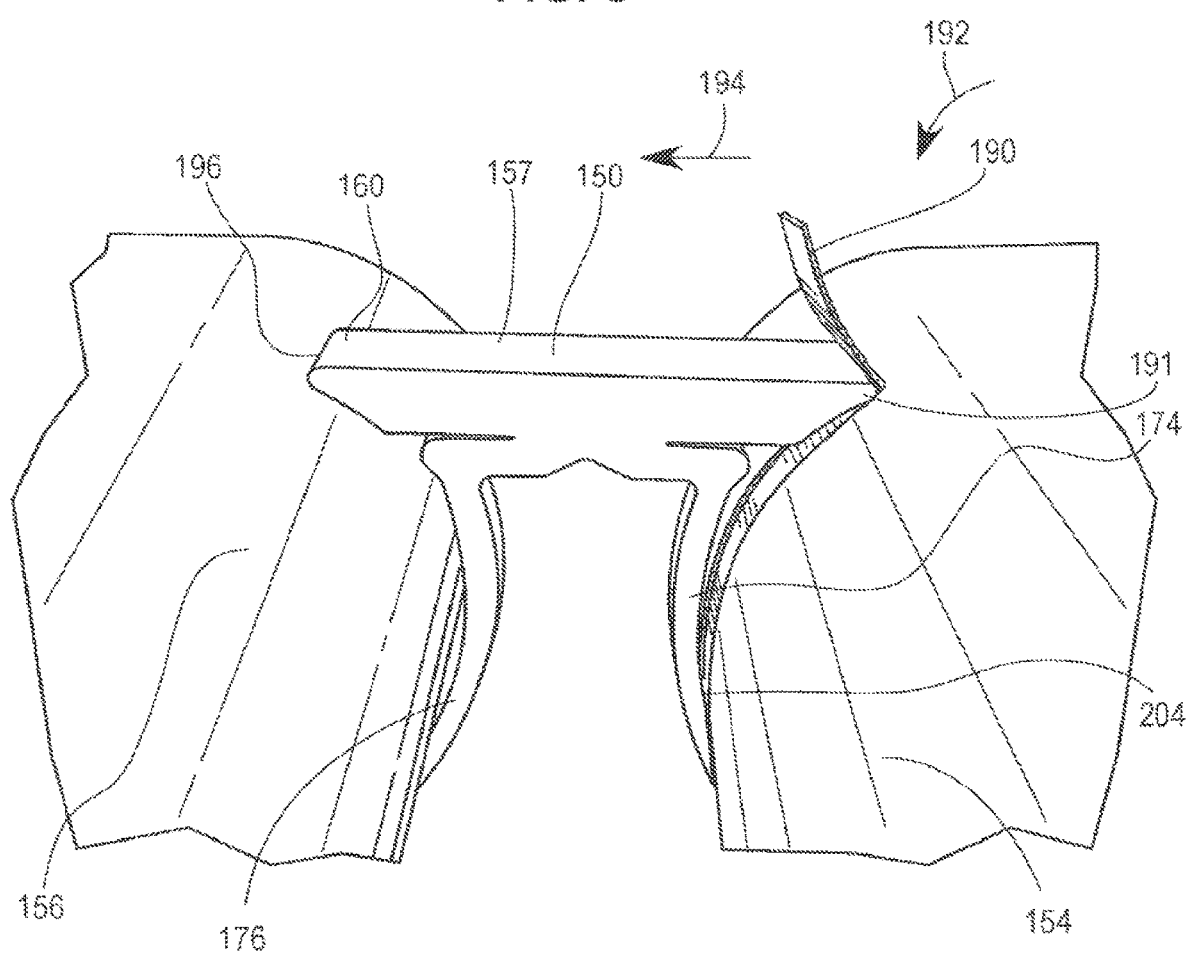

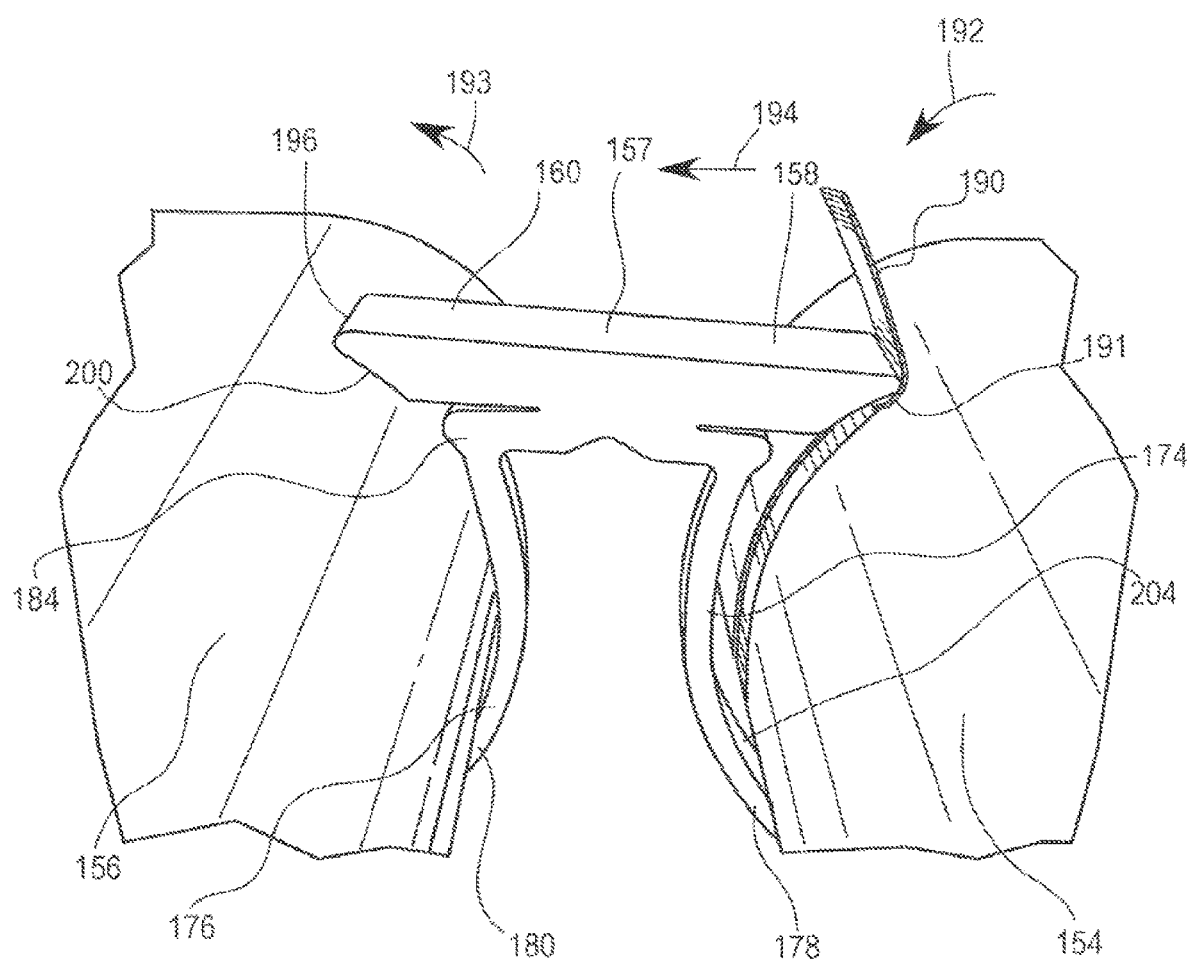

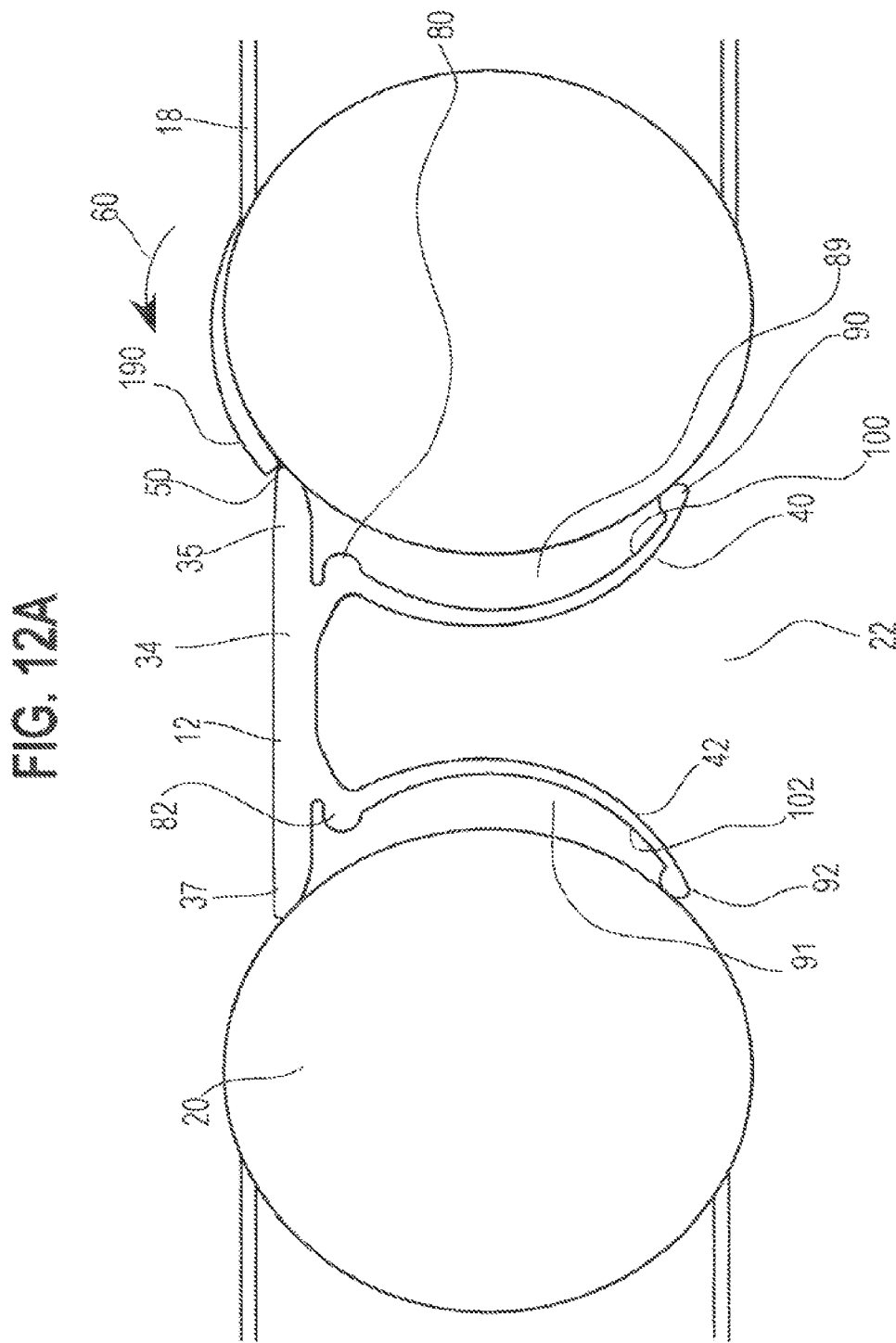

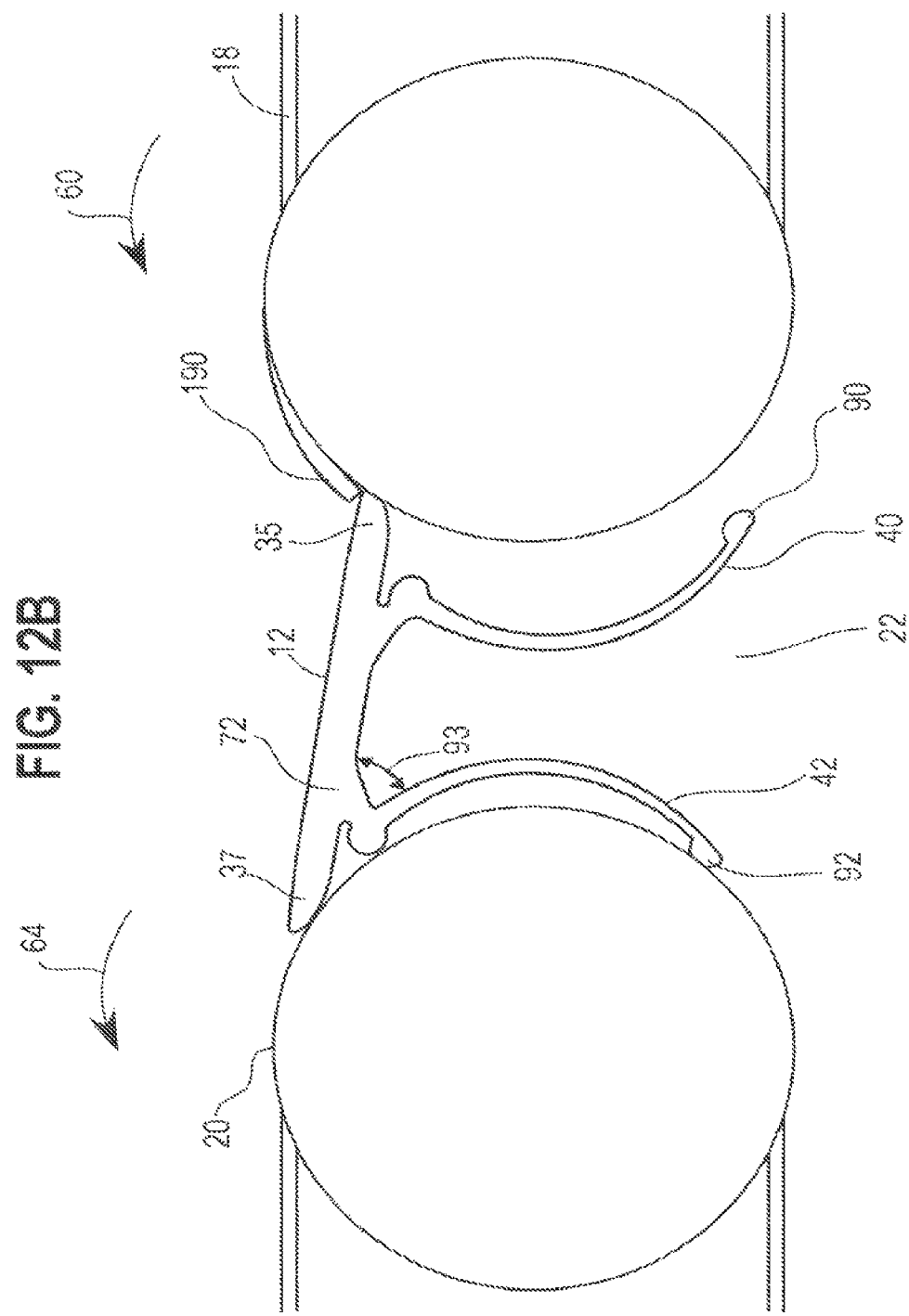

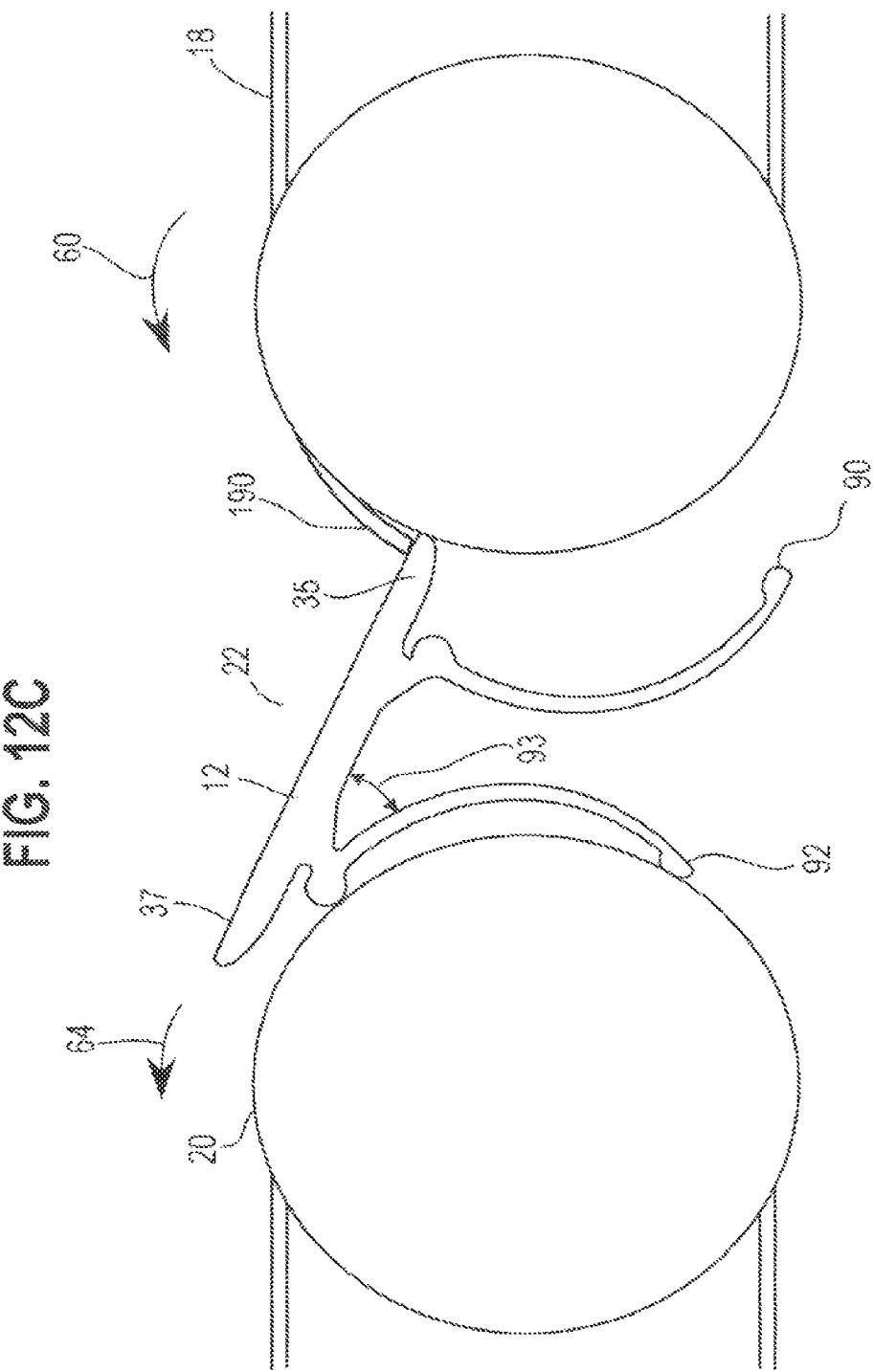

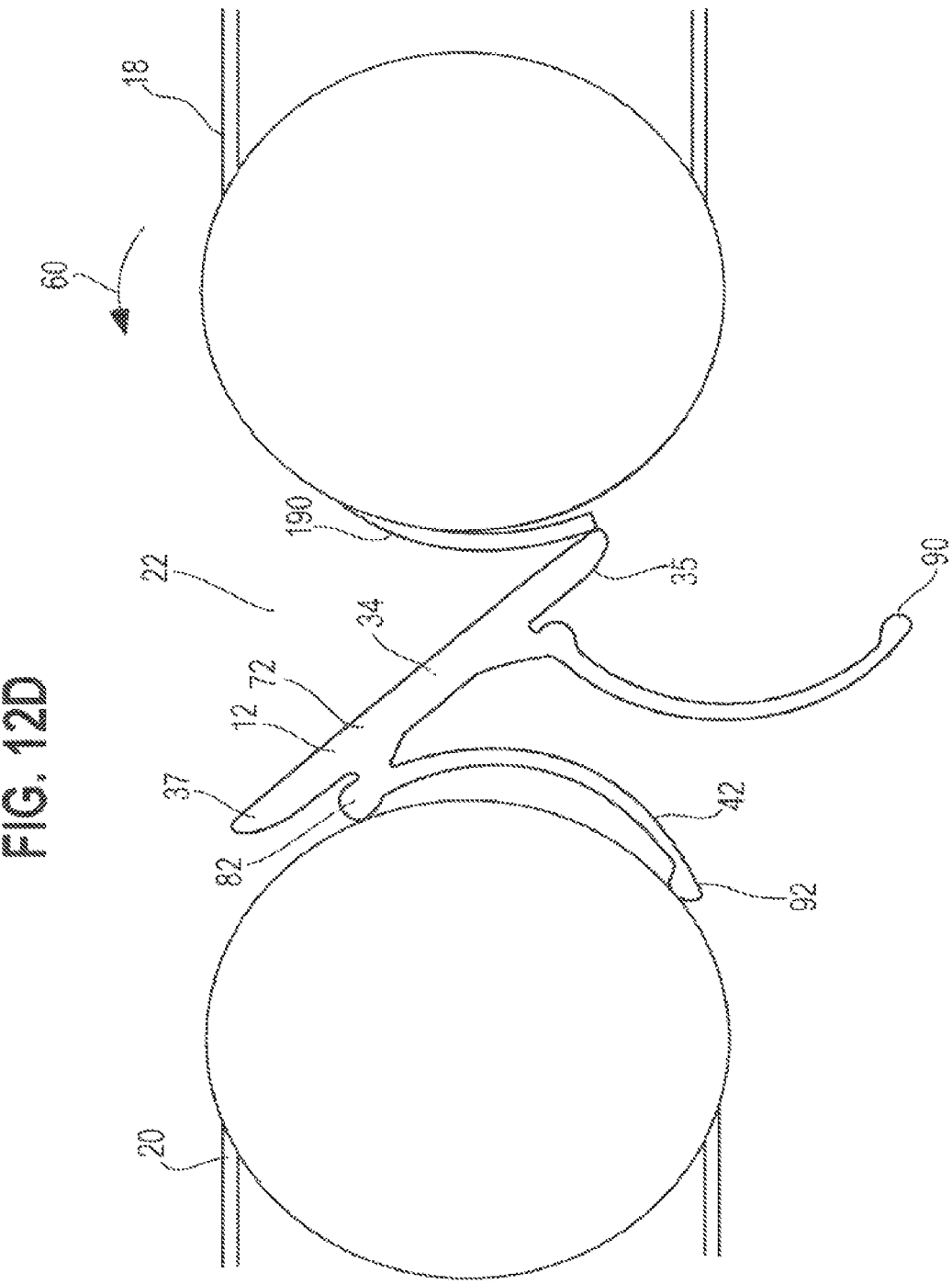

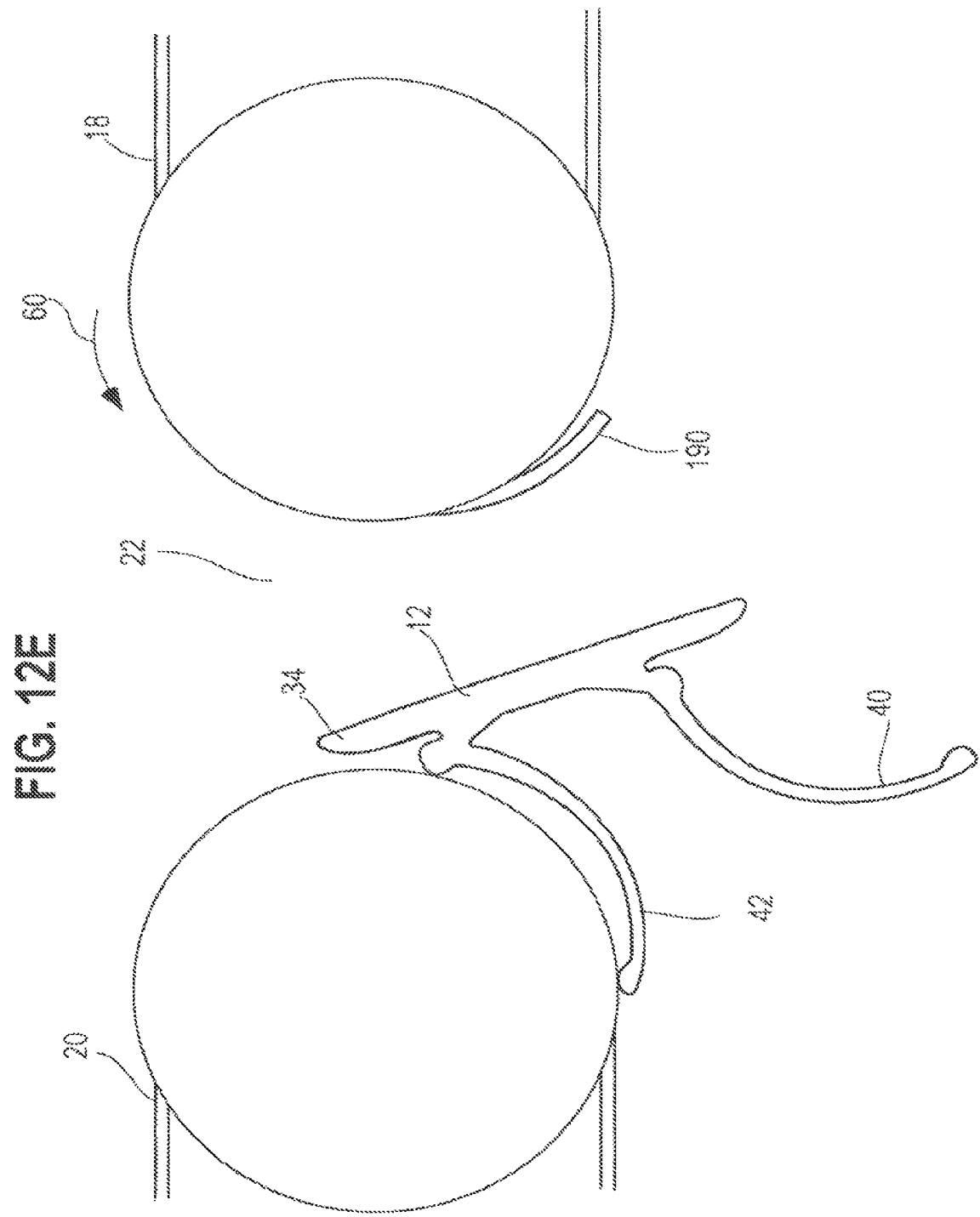

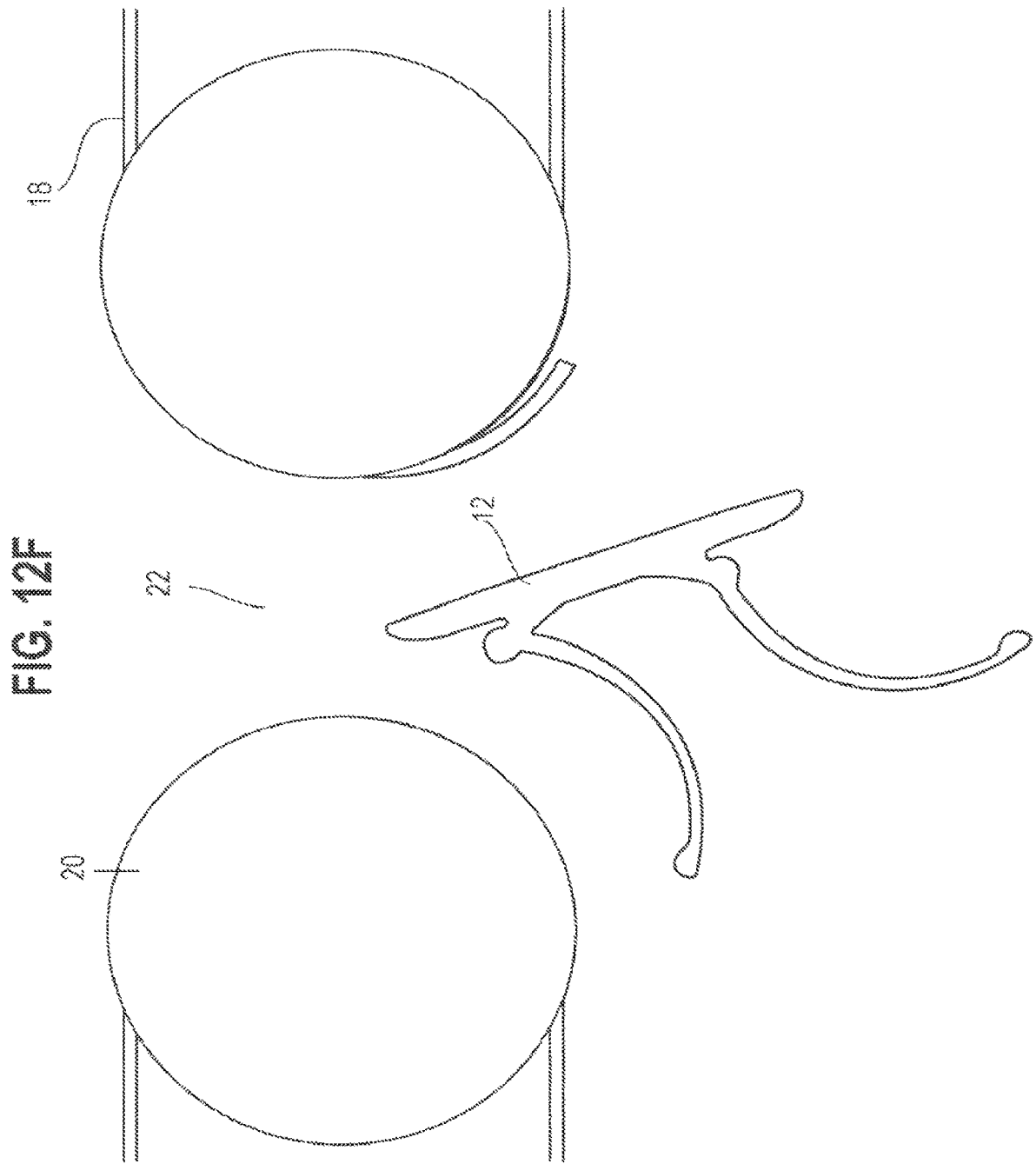

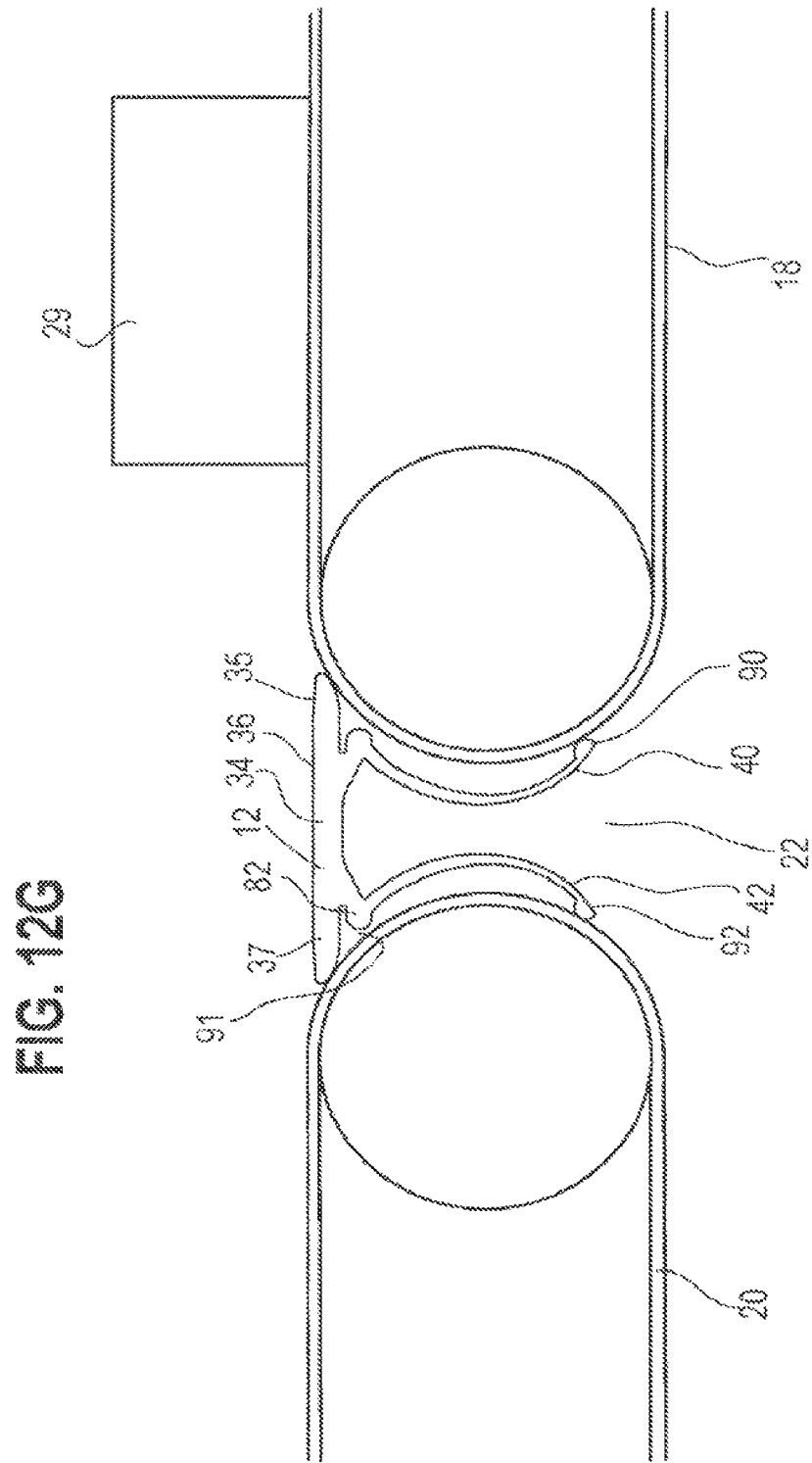

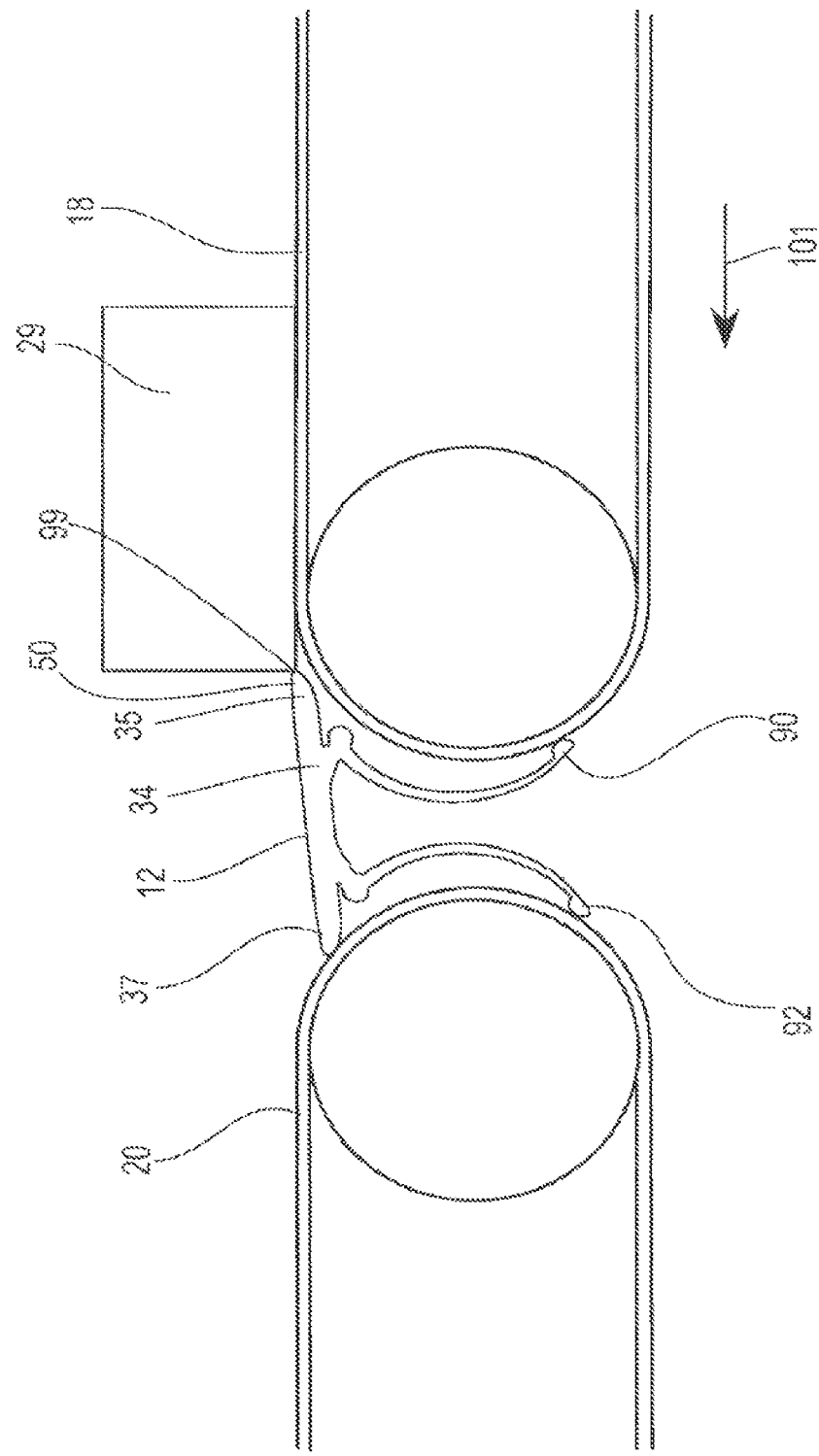

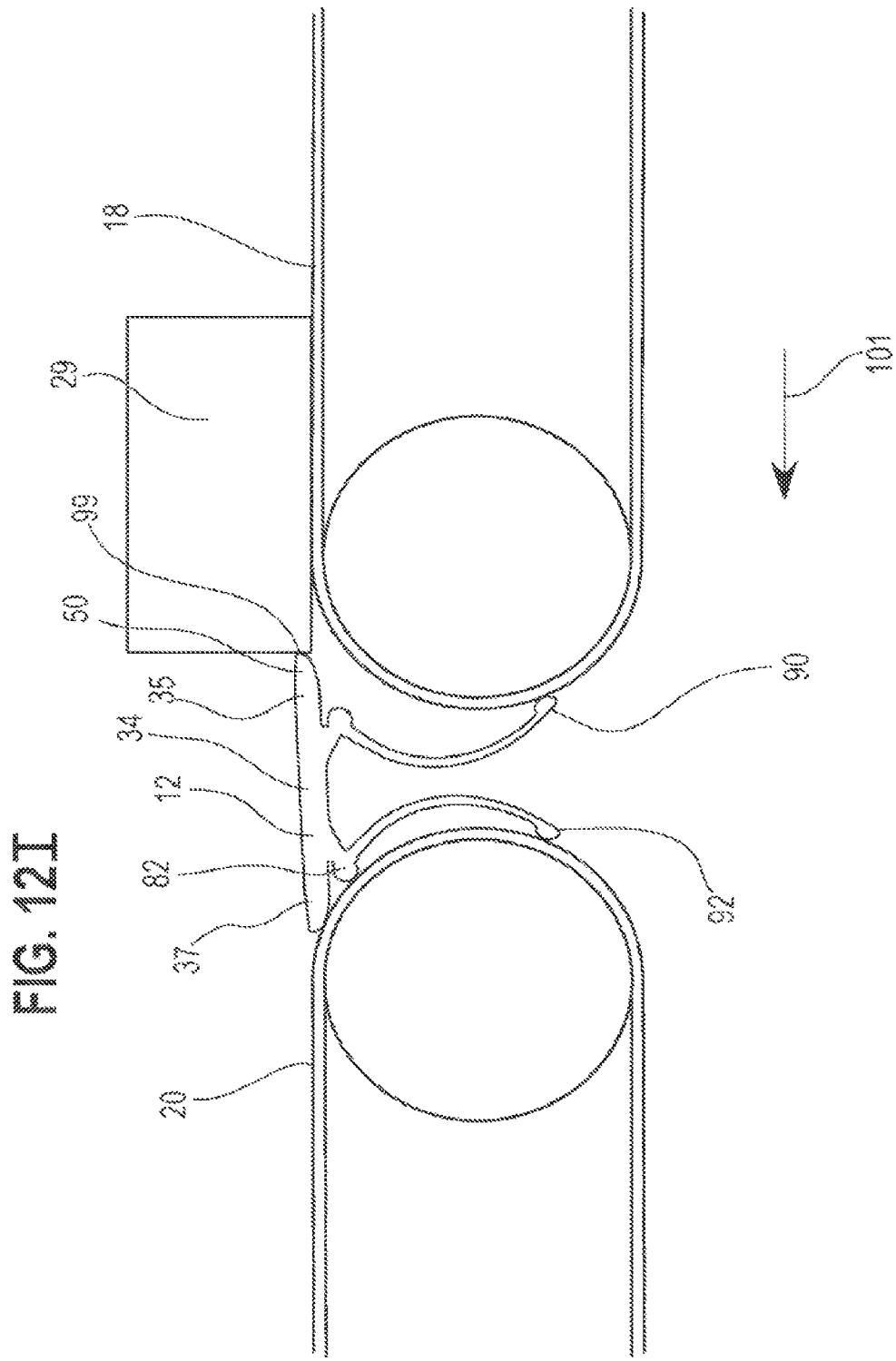

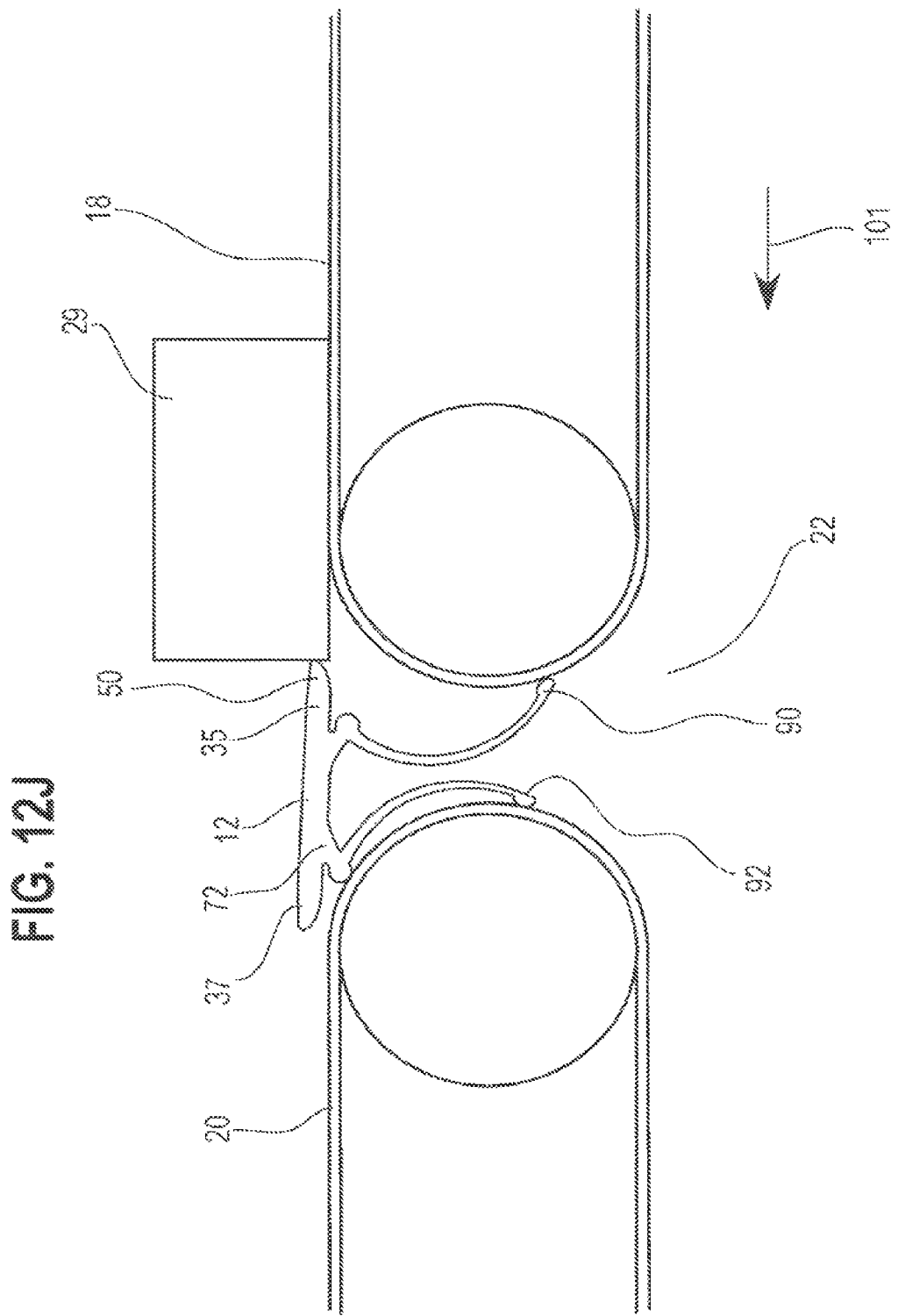

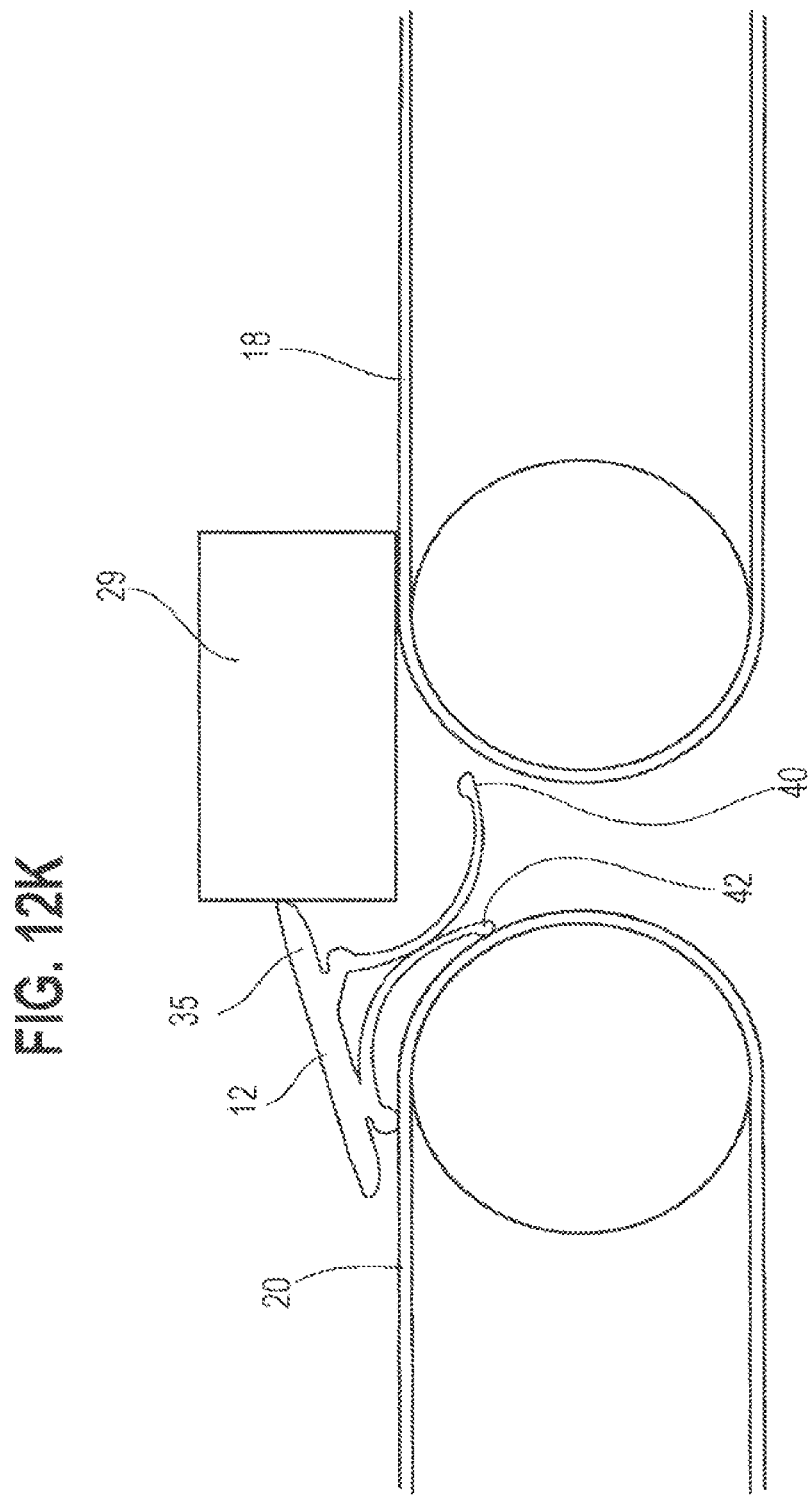

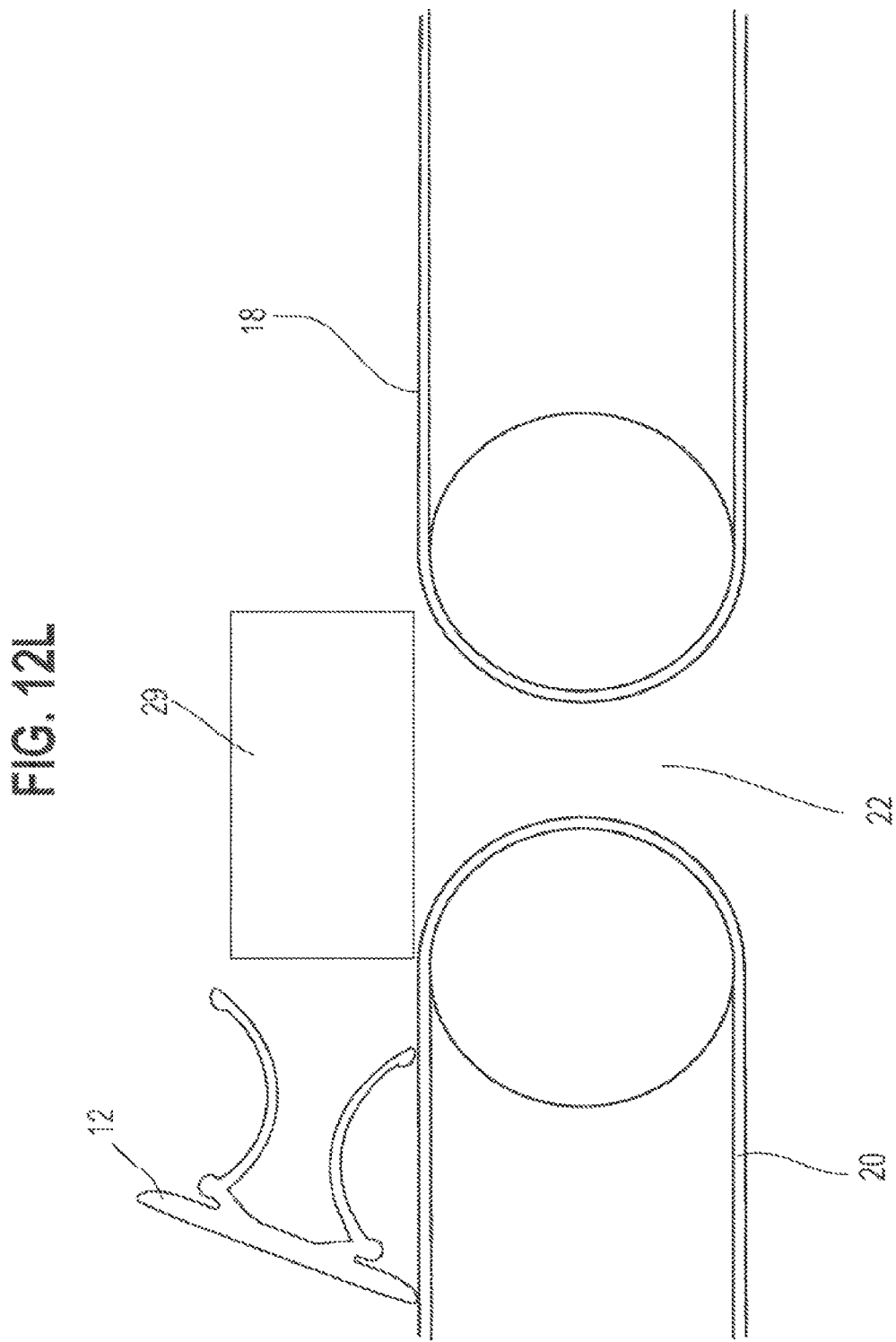

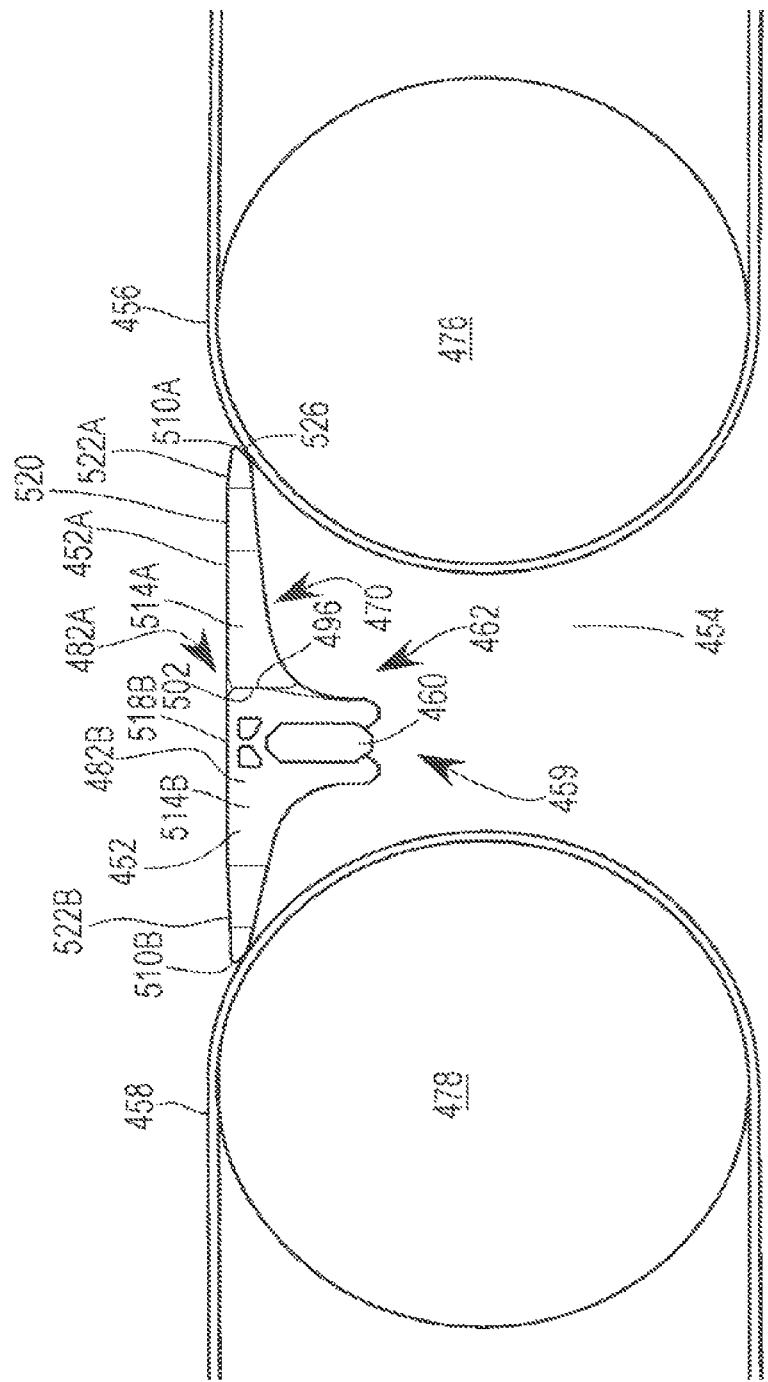

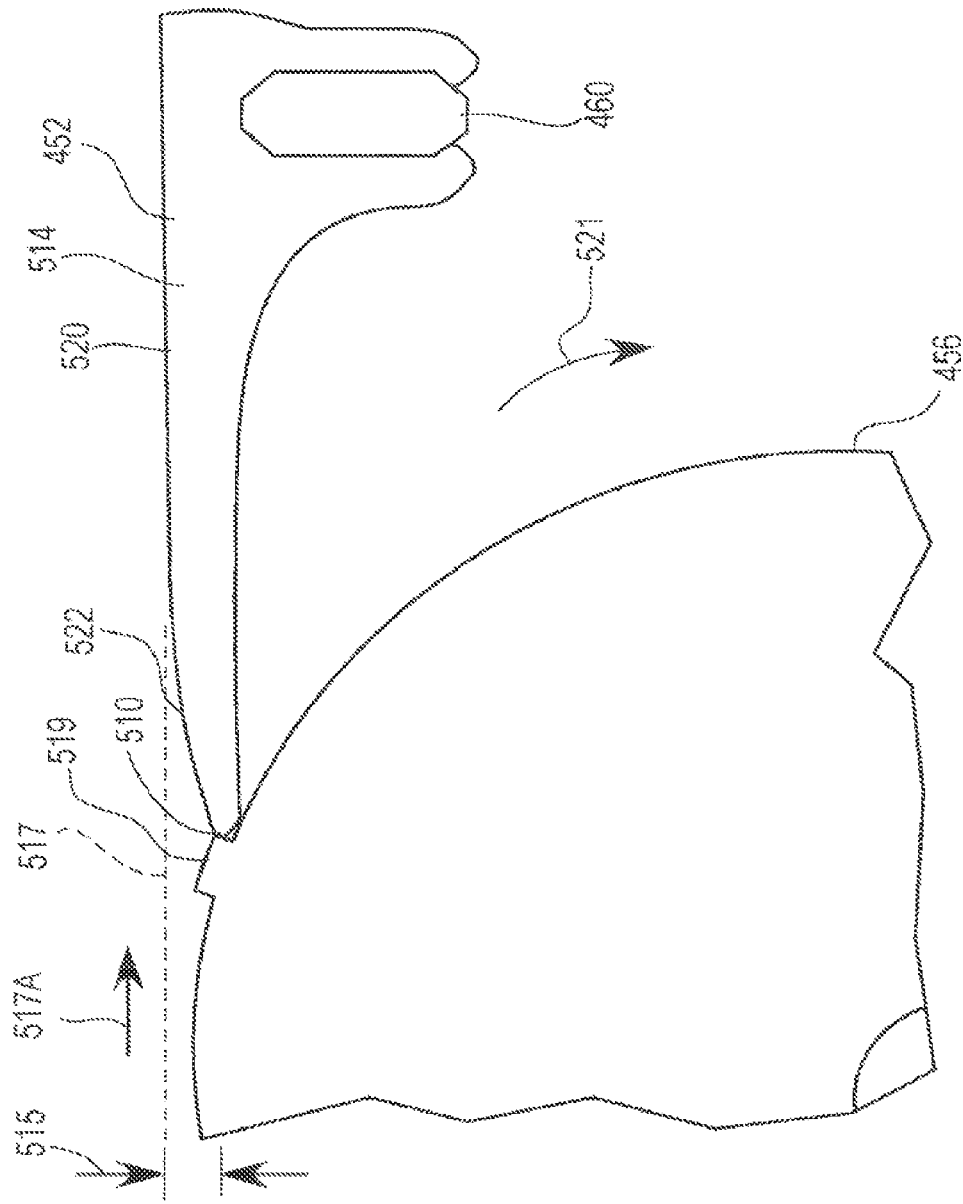

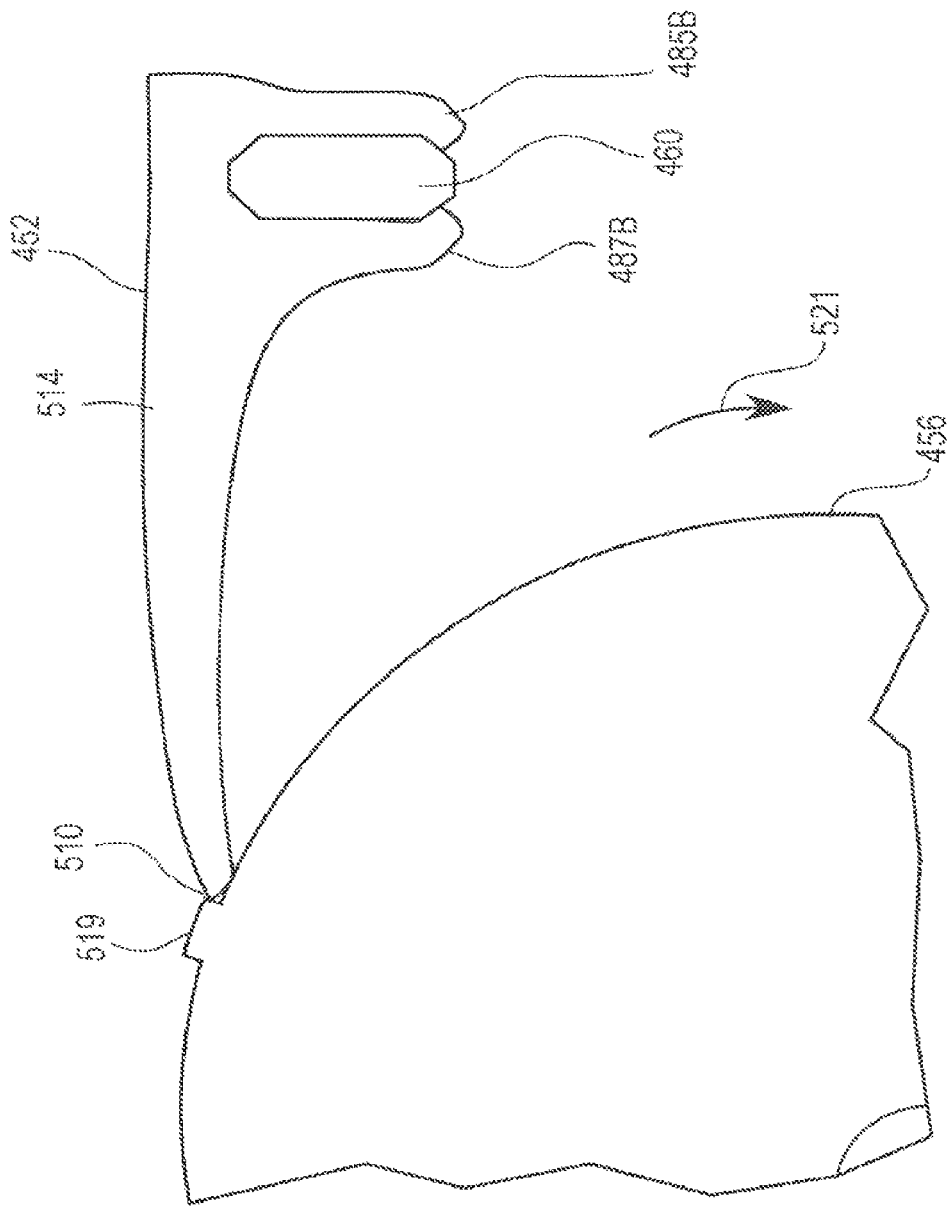

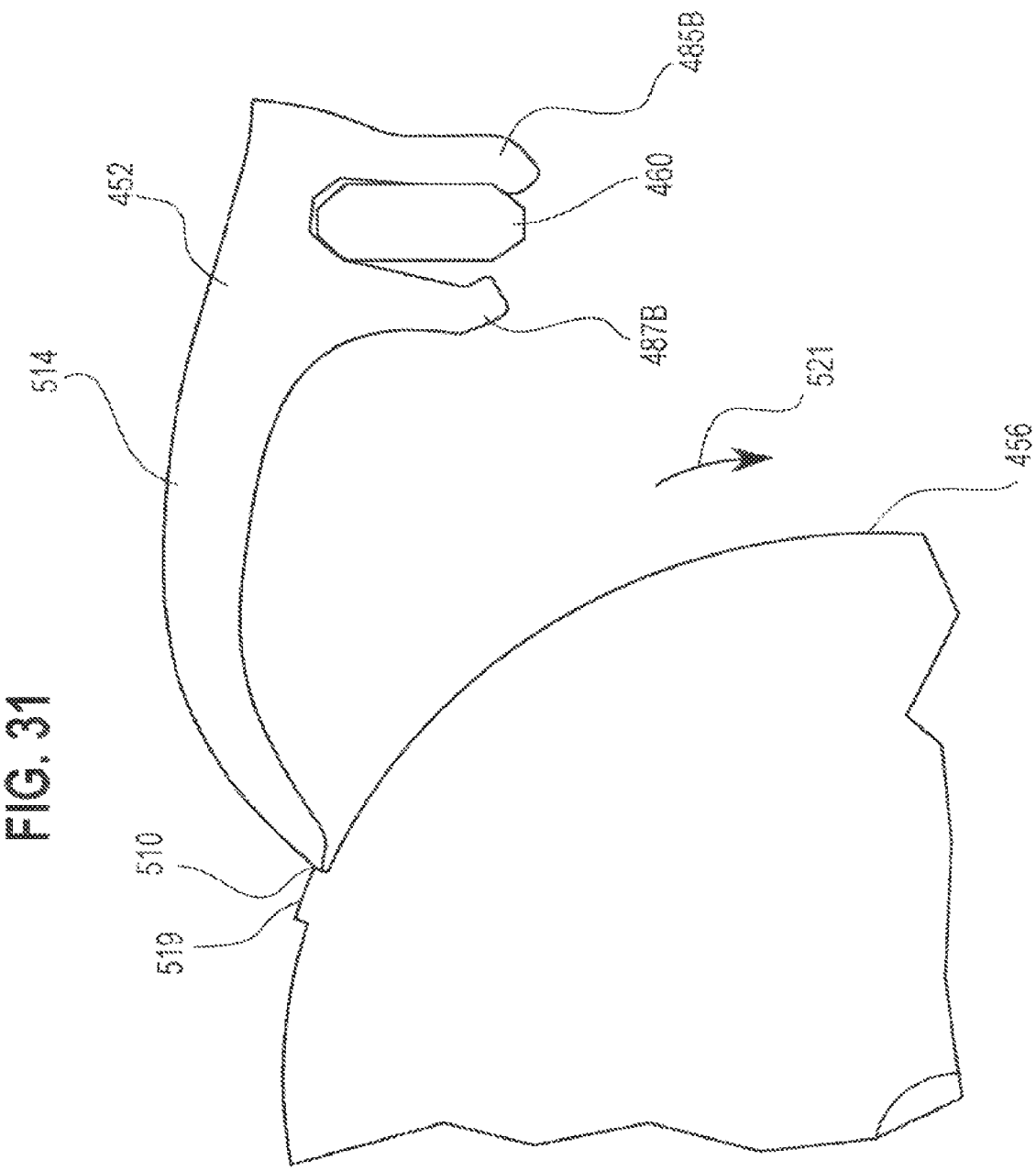

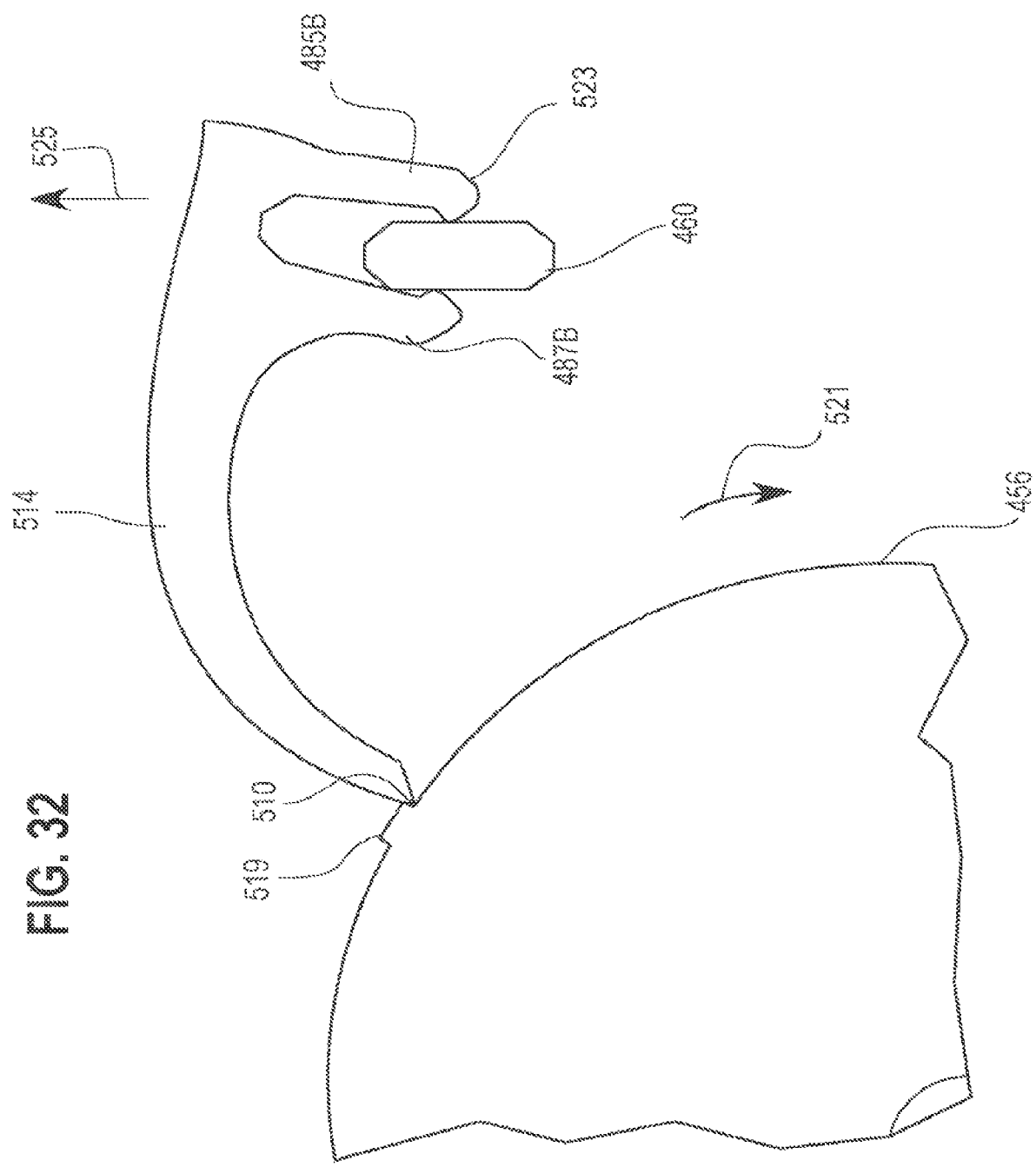

CONVEYOR TRANSFER GUARDS

CROSS-REFERENCE TO RELATED APPLICATIONS

This application is a continuation of U.S. patent application Ser. No. 16/604,115, filed Oct. 9, 2019, which is a U.S. national phase application filed under 35 U.S.C. § 371 of International Application No. PCT/US2018/026505, filed Apr. 6, 2018, which claims the benefit of U.S. patent application Ser. No. 15/483,588, filed Apr. 10, 2017, and U.S. Provisional Patent Application No. 62/503,118, filed May 8, 2017, which are all hereby incorporated by reference in their entireties.

FIELD OF THE INVENTION

This invention relates to an apparatus for bridging a gap in a conveyor system or between conveyor systems.

BACKGROUND

Transfer guards have been used to provide a smooth transition to support objects traveling across a gap between two conveyor surfaces, such as two pulleys of separate belts, and to prevent objects from falling into the gap. One known transfer guard was formed from a single sheet of UHMW (ultra high molecular weight) polyethylene material with a rectangular cross section having beveled edges that is rigidly attached to a bar support that is welded or fastened to the side of the conveyor structure and positioned in the gap. Because the length and width of a gap will vary depending on the width of the conveyor belt and the conveyor system configuration, the above described transfer guard generally had to be custom fabricated on site to ensure proper dimensions. In addition, because a single sheet of polyethylene material is used, if one portion of the sheet is damaged, the whole sheet must be replaced. In addition, because the guard is rigidly attached to the conveyor system, if an object becomes stuck between the guard and the conveyor system, there is no way to release the guard to prevent damage to the conveyor system.

Another known transfer guard takes the form of a transfer plate using one or more roller bars or wheels arranged in one or more successive laterally arranged rows. These systems require a rigid support structure at the sides or underneath the transfer plate to be mounted in the proper location. Such known roller systems are not configured break away or otherwise absorb impacts from objects or belt splices.

One problem resides in the tolerance provided between the above-described transfer guard and the adjacent moving belt surface, which can allow small debris to become lodged between the transfer guard and the belt surface causing damage to the belt as the moving belt surface continuously rubs against the trapped debris. To address this problem, break-away transfer devices are known. With the above-described device, lag bolts were utilized to releasably mount a bar transfer guard to the support plate members or stringers of the conveyor frame structure of the conveyor system. The lag bolts would shear under sufficient force so the transfer guard bar would break away to avoid belt damage.

One drawback of the above-described break-away transfer guard and other transfer devices, such as the device disclosed in U.S. Patent Application Publication No. 2007/0023257 to Schiesser, is the manner in which the devices are mounted to break away during conveyor operations. Transfer devices that have their break-away mountings at the side support plate members or stringers of the conveyor system require that the longitudinally directed forces on the transfer device be redirected and transmitted through the device laterally to the remote break-away mountings. One drawback with these break-away transfer guards is that in the event that the transfer guard breaks away, the transfer guard completely loses functionality requiring replacement of the entire transfer guard.

In one transfer device disclosed in U.S. Pat. No. 3,548,996 to Ellis, a complex series of narrow relief plates are individually removably attached by magnets to corresponding individual slidable mounting blocks having shafts that allow longitudinal movement in the direction of belt travel. The mounting blocks are mounted to a dead plate conveyor, which is stationary and relies upon vibration to move articles, such as glassware. Accordingly, the transfer device disclosed in Ellis appears to be limited to applications where a moving conveying surface is adjacent to a stationary conveying surface having sufficient support structure to which the transfer device may be fixedly mounted.

A transfer guard system comprised of multiple members positioned side-by-side and releasably attached to a support bar for spanning a gap between conveyor systems is disclosed in U.S. Pat. No. 8,365,899 to McKee. Each member is sized to span the entire longitudinal distance of the gap between the adjacent conveying surfaces in the product travel direction and include a pair of depending legs that are releasably mounted to a support bar. Because each member is sized to longitudinally span the entire gap, and gap sizes may vary considerably, different sized members must be made for each gap having a different size.

Another problem encountered in some conveyor applications is that the distance between conveying surfaces in the downstream, longitudinal direction is relatively small. It may be difficult to both position a transfer plate in the gap and secure the transfer plate to the frame of the conveyor or other structures due to the close proximity of the conveying surfaces.

SUMMARY

In accordance with one aspect of the present invention, a transfer guard member is provided having a body for being positioned in a gap intermediate conveying surfaces. The body has an upper portion for spanning a gap between adjacent conveying surfaces, such as a single conveyor belt or adjacent belts, pulleys, rollers, and the like. The body has outer portions of the upper body portion for slidingly engaging the conveying surfaces. The body has a pair of spaced, resilient legs having distal end portions for resiliently and slidingly engaging the conveying surfaces. The legs have outer curved surfaces spaced from the conveying surfaces and separating the outer portions of the upper body portion and the distal end portions of the legs along the conveying surfaces to permit movement of the legs in the gap. The resilient legs permit the upper body portion to have a controlled range of motion within the gap to accommodate variations in the conveying surfaces, contact from conveyed objects, and other loading while maintaining sliding engagement with the conveying surfaces during normal operations. Further, the outer portions of the upper body portion and the distal end portions of the spaced legs slidingly engage the conveying surfaces and maintain the transfer guard member in the gap such that the transfer guard member may be installed in the gap without requiring additional structure to maintain the transfer guard member in the gap. This enables a user to easily and quickly install one or more transfer guard members in the gap intermediate the conveying surfaces.

In one form, the body includes an intermediate stop portion spaced from one of the conveying surfaces for being shifted into engagement with the one conveying surface when the body upper portion shifts toward the one conveying surface. The upper body portion may shift toward the one conveying surface, for example, in response to a high wedge force being applied against an upstream one of the outer portions of the upper body portion. This permits the upstream outer portion to shift out of the path of an object, such as an imperfection in the upstream conveying surface, applying the high wedge force until the object can travel beyond the upstream outer portion. The intermediate stop portion controls the amount of movement of the upper body portion permitted within the gap that occurs when a high wedge force is applied to the upper body portion. If the amount of movement of the upper body portion required to compensate for the high wedge force is beyond a predetermined position, the stop portion may operate with one of the conveying surfaces to eject the transfer guard member from the gap.

In accordance with another aspect, a transfer guard member is provided having a body for being positioned in a laterally extending gap between conveying surfaces. The body has at least one attachment member configured for being detachably fixed to a mounting bar and having an upper transfer surface. An outboard portion of the body extends longitudinally outward from the attachment member has an edge for being positioned at one of the conveying surfaces. The body has at least one recess adjacent the attachment member for receiving at least one attachment member of another transfer guard member fixed to the mounting bar so that the upper transfer surfaces of the attachment members are adjacent one another. A lateral width of the outboard portion is greater than a lateral width of the attachment member due to the at least one recess adjacent the at least one attachment member. In this manner, the upper transfer surfaces can support an item traveling over the transfer guard members and keep the item away from a seam or gap between the transfer guard members.

In one form, the at least one recess of the body extends laterally from the at least one attachment member. This permits the upper transfer surfaces to be laterally aligned with the transfer guard members fixed to the mounting bar. The lateral alignment supports an item traveling longitudinally along the transfer guard members and keeps the item from becoming lodged in the gap between the transfer guard members.

The body may also include at least one protrusion extending longitudinally outward from the attachment member. The least one protrusion is configured to interfere with the other transfer guard member fixed to the mounting bar and tightly engage the transfer guard members together on the mounting bar. The interference between the transfer guard members creates a clash therebetween and urges the transfer guard members apart. This clash ensures that the transfer guard members have a tight fit on the mounting bar which minimizes the gap therebetween and reduces the likelihood of an item becoming caught in the interface between the transfer guard members. In one form, the at least one protrusion extends outward from the attachment member adjacent the upper transfer surface and interferes with the other transfer guard member adjacent the upper transfer surface thereof. In this manner, there is a tight fit between the transfer guard members at the upper transfer surfaces thereof which minimizes the gap between the transfer guard members adjacent the upper transfer surfaces which, in turn, reduces the likelihood of conveyed items becoming caught in the gap.

A transfer guard system is also provided having a mounting bar for extending laterally in a gap intermediate two conveying surfaces and a plurality of longitudinally aligned pairs of upstream and downstream transfer guard members for transferring objects in a longitudinal, downstream direction between the two conveying surfaces. Each pair of upstream and downstream transfer guard members have attachment members configured for detachably fixing the pair of upstream and downstream transfer guard members to the mounting bar. By utilizing longitudinally aligned pairs of upstream and downstream transfer guard members, a high-force impact that detaches an upstream transfer guard member may leave the downstream guard member in place and fixed to the mounting bar. In this manner, the downstream transfer guard member provides some transfer functionality despite the upstream transfer guard having been detached from the mounting bar.

The transfer guard system having pairs of upstream and downstream transfer guard members also provides improved flexibility for installing the transfer guard system. For example, at least one of the pairs of upstream and downstream transfer guard members may include upstream and downstream transfer guard members having different longitudinal lengths. This permits the mounting bar to be mounted off center between conveying surfaces which may be required by the surrounding structures, such as welds or supports of the conveyor system. Further, the plurality of aligned pairs of upstream and downstream transfer guard members may include a first pair of upstream and downstream members having a first longitudinal length and a second pair of upstream and downstream members having a second longitudinal length different than the first longitudinal length. By having pairs of upstream and downstream members with different longitudinal lengths, the transfer guard members may be individually tailored to a particular conveying system without needing to cut the transfer guard members to length as in some prior approaches. Further, the different length pairs of the upstream and downstream transfer guard members may permit the transfer guard system to transfer objects across gaps that vary in size such as due to turns in the conveyor belt system.

In accordance with yet another aspect of the present invention, a transfer guard system is provided for conveying objects across a gap intermediate two conveying surfaces and bounded by a pair of guide surfaces that extend longitudinally along opposite lateral sides of the conveying surfaces. The transfer guard system includes a mounting bar for extending laterally in the gap between the pair of guide surfaces and at least one transfer guard member for being detachably connected to the mounting bar. The system further includes at least one mount for supporting the mounting bar in the gap. The at least one mount includes a base portion for being fixed to one of the guide surfaces and a support portion disposed laterally inward from the base portion. The mount support portion permits the mounting bar to be lowered into the gap between the conveying surfaces and the guide surfaces and be connected to the support portion. This top-loading operability is advantageous in confined installation environments where the gap is bounded on its sides by the conveying surfaces and the guide surfaces and below by support structure of the conveying surfaces. For example, a conveyor may have skirts on opposite lateral sides of the conveyor surfaces and the skirts may have welds or thick reinforcement members their outer surfaces so that a user may be unable to drill holes in the skirts to mount a bracket for a mounting bar to the skirts. The transfer guard system overcomes this shortcoming and permits a user to fix the base portions of a pair of the mounts to the skirt guide surfaces, such as by welding, and then lower the mounting bar into the gap and connect the mounting bar to the mounts fixed to the skirt guide surfaces. Thus, the transfer guard system provides improved ease of installation despite space constrictions around the gap.

In another form, the transfer guard system includes multiple transfer guard segments or members having upper transfer surfaces for being positioned laterally side-by-side and longitudinally end-to-end along a gap in a belt conveying surface or between two conveying surfaces. One advantage of the end-to-end mounting of the transfer guard members is that it allows the user to customize the transfer guard system for use in various different size gaps between conveying surfaces, as well as to accommodate various types and configurations of conveying surfaces. For example, a large range of gap sizes between conveying surfaces may be spanned with only a few differently sized members. In addition, the transfer guard members may be mounted to an elongated mounting member in a plurality of different locations in the gap, particularly when two differently sized transfer guard members are used to span the gap on either side of the elongate mounting member. This allows for greater flexibility for mounting the transfer guard system in a wide range of conveyor system configurations.

The elongate mounting member extends laterally across the width of the conveyor system and has the transfer guard members releasably mounted thereto. The mounting member is positioned in the gap between conveying surfaces so that the mounting member is generally below the transfer guard members, and specifically the upper surfaces thereof. The transfer guard members and lower mounting member have lower detachable connections therebetween. In this manner, the transfer guard members can detach from the mounting member should debris get jammed between one of the transfer guard members and the conveying surface with enough force to dislodge the transfer guard member from the mounting member by releasing the detachable connection therebetween. If debris is jammed in between a transfer guard member and the adjacent conveying surface, other conveyed items may impact against the stuck debris or a lifted upstream edge of the transfer guard member with enough force to release the detachable connection and dislodge the transfer guard member. In the event of a sufficiently high impact wedge force that tends to generate an upward lifting force on the transfer guard member, the location of the detachable connection proximate to and generally immediately below the location of the impact will better ensure that the detachable connection is released so that the conveying surface is not damaged by jammed debris.

The upper surfaces of the transfer guard members are sized in a longitudinal conveyor or product travel direction to each span a portion of the gap so that when an appropriately sized pair of upstream and downstream transfer guard members are installed a receiving edge of the upstream transfer guard upper surface is closely positioned to the upstream conveying surface and a discharge edge of a downstream transfer guard member is closely positioned to the downstream conveying surface. To this end, the detachable connections provided between the transfer guard members and lower mounting member are configured to fix the upper surfaces, including the upstream receiving and downstream discharge edges thereof, against longitudinal shifting in the conveyor or product travel direction prior to the detachment of the transfer guard members so that debris does not accumulate in the gap under the transfer guard members during normal conveyor operations.

Each transfer guard member may include two pairs of spaced-apart legs generally projecting downward from a transfer guard upper bridge portion on which the upper transfer surface is formed. The pairs of opposing legs may be laterally offset so that the side surfaces of the transfer guard members are aligned when mounted on a mounting member end-to-end. This offset configuration allows the transfer guard members to be mounted on the same mounting member end-to-end with the one of the pairs of legs of one of the end-to-end transfer guard members disposed between the pairs of legs of the other transfer guard member in a configuration resembling the interlocking teeth of a zipper. Such an offset configuration allows the spaced-apart legs for each transfer guard member have an identical size and configuration. Alternatively, the pairs of opposing legs could be configured such that the side surfaces of the transfer guard members are not aligned when the members are mounted end-to-end. Further, the transfer guard member could alternatively have a single pair of opposing legs.

The pairs of opposing legs may be spaced apart such that one of the pairs of spaced-apart legs of a longitudinally adjacent transfer guard member may interdigitate or nest in between the two pairs of legs of the other longitudinally adjacent transfer guard member to provide a substantially uninterrupted upper transfer surface spanning the gap between upstream and downstream conveying surfaces. The legs are spaced apart from one another to tightly fit the mounting member therebetween, and the legs may be formed to be resiliently flexible for being snap fit onto the mounting member. The pairs of legs each include an upstream leg and a downstream leg. The upstream and downstream legs extend laterally and are spaced longitudinally from each other in the belt travel direction so that the upstream leg bears tightly against the mounting bar keeping the transfer guard members fixed against longitudinal shifting in the downstream direction as products are conveyed over the upper surfaces thereof. However, when debris gets lodged between the upstream, receiving edge of one of the transfer guard members and the conveying surface, the resilient legs can resiliently deform to allow the transfer guard member to detach from the mounting bar before the conveying surface is damaged by the stuck debris.

The transfer guard members may be formed from a material presenting a surface with good abrasion resistance and a low coefficient of friction such as UHMW polyethylene, or the like. For transfer guard members that use a mounting member, the mounting member may be formed of a metal or like material providing high strength and durability.

In accordance with another aspect of the present invention, a transfer guard member is provided that includes a unitary, one-piece body for being positioned in a gap longitudinally between conveying surfaces. The body includes an upper transfer surface and a pair of lower resilient legs adapted to be directly detachably fixed to a mounting member. The upper transfer surface includes a plurality of protrusions arranged to contact an object being transferred across the upper transfer surface. Because the object contacts the protrusions, the object contacts a smaller surface area of the transfer guard member than if the object were contacting a large planar upper surface of a transfer guard member. This reduces dynamic friction between the transfer guard member and the object. Reducing the dynamic friction reduces the frequency of objects getting slowed by the upper surface of the transfer guard member which can adversely affect object flow and spacing throughout an entire conveyor system.

In one form, the upper transfer surface includes an outer periphery and portions of protrusions at or adjacent the outer periphery. The portions of protrusions form protrusions with portions of protrusions of other transfer guard members when the transfer guard members are fixed to the mounting member. In this manner, the portions of the protrusions cooperate to form protrusions at a seam between the transfer guard members that keep an object from becoming caught in the seam between the transfer guard members.

The present invention also provides a transfer guard system for transferring objects across a gap intermediate two conveying surfaces. The transfer guard system includes a mounting member having a channel and a plurality of transfer guard members having upper transfer surfaces for transferring objects in a longitudinal, downstream direction between the two conveying surfaces. The transfer guard members further include lower legs configured to fit in the channel and detachably mount the transfer guard members to the mounting member. Because the transfer guard member lower legs fit in the channel of the mounting member, the connection between the transfer guard members and the mounting member fits within a compact envelope between the conveying surfaces. This makes the transfer guard system suitable for transferring objects across small gaps between conveying surfaces.

The mounting member may include outer upstream and downstream surfaces and the transfer guard members each include a brace member spaced from the lower legs of the transfer guard member. The brace member is configured to contact one of the outer upstream and downstream surfaces of the mounting member. In response to a heavy object transferring onto the upper transfer surface of one of the transfer guard members, the brace member of the transfer guard member can contact the one of the outer upstream and downstream surfaces of the mounting member to resist deflection of the transfer guard member.

In accordance with another aspect of the present invention, a transfer system is provided for transferring objects in a longitudinal direction across a gap between conveying surfaces. The transfer system includes a mounting member, a plurality of transfer members adapted to be connected to the mounting member, and at least one mount configured to be secured to a mounting surface adjacent the conveying surfaces for supporting the mounting member. The mounting member and the at least one mount are configured to form a snap-fit connection therebetween when moved in a first predetermined direction relative to each other. In this manner, even if the distance between the conveying surfaces is relatively small, the mounting member can be connected to the at least one mount. Further, the user may not need to take any further steps to secure the mounting member to the at least one mount after engaging the snap-fit connection, such as using bolts and nuts, which may be difficult given the small distance between the conveying surfaces.

A method is also provided of installing a transfer system for transferring objects in a longitudinal direction across a gap between conveying surfaces. The method includes securing at least one mount to a mounting surface adjacent the conveying surfaces. The method further includes engaging at least one detent and at least one recess of a mounting member and the at least one mount to connect the mounting member to the at least one mount. The mounting member is associated with a plurality of transfer members adapted to transfer the object across the gap. By connecting the mounting member and the at least one mount using detent(s) and recess(es) thereof, the mounting member may be rapidly secured to the at least one mount which shortens installation time and reduces conveyor downtime. The method may also include connecting the plurality of transfer members to the mounting member. In one form, the transfer members are transfer guard members having upper transfer surfaces. The transfer members may take other forms, such as bristles of a brush or rollers.

While the transfer guard members are illustrated bridging a gap formed between two adjacent conveyor belt surfaces, they may also be used to bridge a gap between various other types of conveying surfaces, such as, without limitation, between the rollers of two roller conveyor systems that do not use a belt, between one roller conveyor system and another conveyor belt system, between a moving conveying surface and a stationary conveying surface, such as a chute, or in a gap in a conveyor belt, e.g., as a hitch guard. In addition, although the adjacent pulleys shown in the drawings have the same or a similar diameter, the transfer guards may be implemented or be modified to bridge the gap formed between pulleys having different diameters, or to bridge the gap between conveying surfaces that are inclined with respect to one another.

BRIEF DESCRIPTION OF THE DRAWINGS

FIG. 8 is a perspective view similar to FIG. 7A showing the flap of the conveyor belt contacting a leading edge of the upstream outboard portion;

FIG. 9 is a perspective view similar to FIG. 8 showing the upper bridge portion of the transfer guard member shifting toward the downstream conveyor belt in response to the flap driving the upper bridge portion downstream;

FIGS. 12A-12F are a series of schematic views of one of the transfer guard members of FIG. 1 showing an imperfection of the upstream conveyor belt applying a sufficiently large force against the transfer guard member to eject the transfer guard member downwardly from the gap between the conveyor belts;

FIGS. 12G-12L are a series of schematic views of one of the transfer guard members of FIG. 1 showing a package becoming caught on the transfer guard member and ejecting the transfer guard member upwardly from the gap between the conveyor belts;

FIG. 24A is an elevational view of transfer guard members and a mounting bar of the transfer guard system of FIG. 24 showing different lengths of the transfer guard members;

FIG. 29 is a schematic view of one of the transfer guard members of the transfer guard system of FIG. 24 showing an attachment member of the transfer guard member fixed to a mounting bar and an outboard edge of the transfer guard member contacting a damaged splice of the conveyor belt;

FIG. 30 is a schematic view similar to FIG. 29 showing the damaged splice moving with the conveying surface and bending the tip of the transfer guard member downwardly;

FIG. 31 is a schematic view similar to FIG. 30 showing further bending of the outboard portion of the transfer guard member which causes a leg of the attachment member to disengage from the mounting bar;

FIG. 32 is a schematic view similar to FIG. 31 showing the outboard portion bent to a configuration that causes the another leg of the attachment member to disengage from the mounting bar and permits the transfer guard member to detach from the mounting bar;

DETAILED DESCRIPTION

Figure 1:
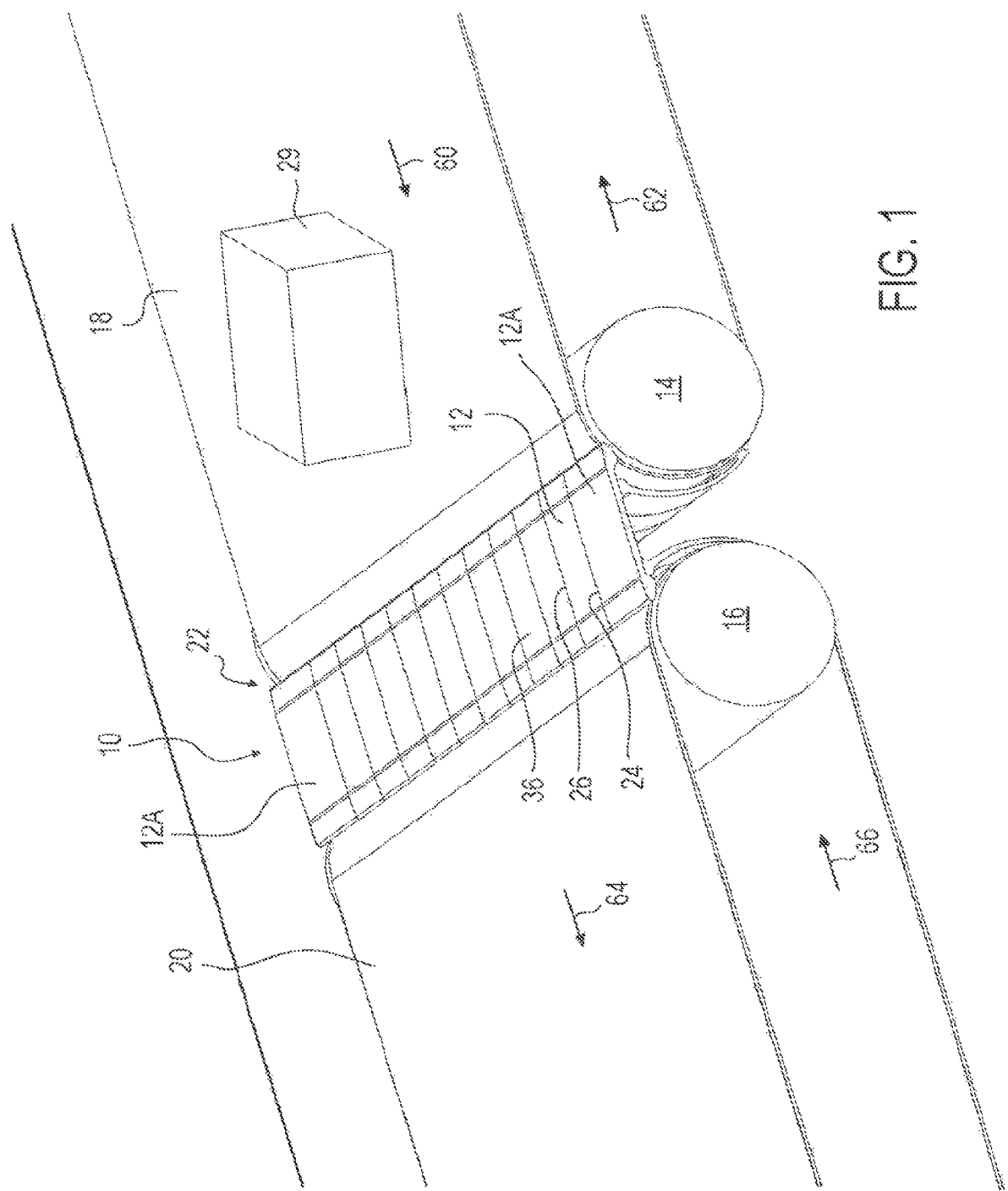
FIG. 1 is a perspective view of a transfer guard system showing a plurality of transfer guard members positioned side by side to bridge a gap between conveyor belts.
Figure 2:
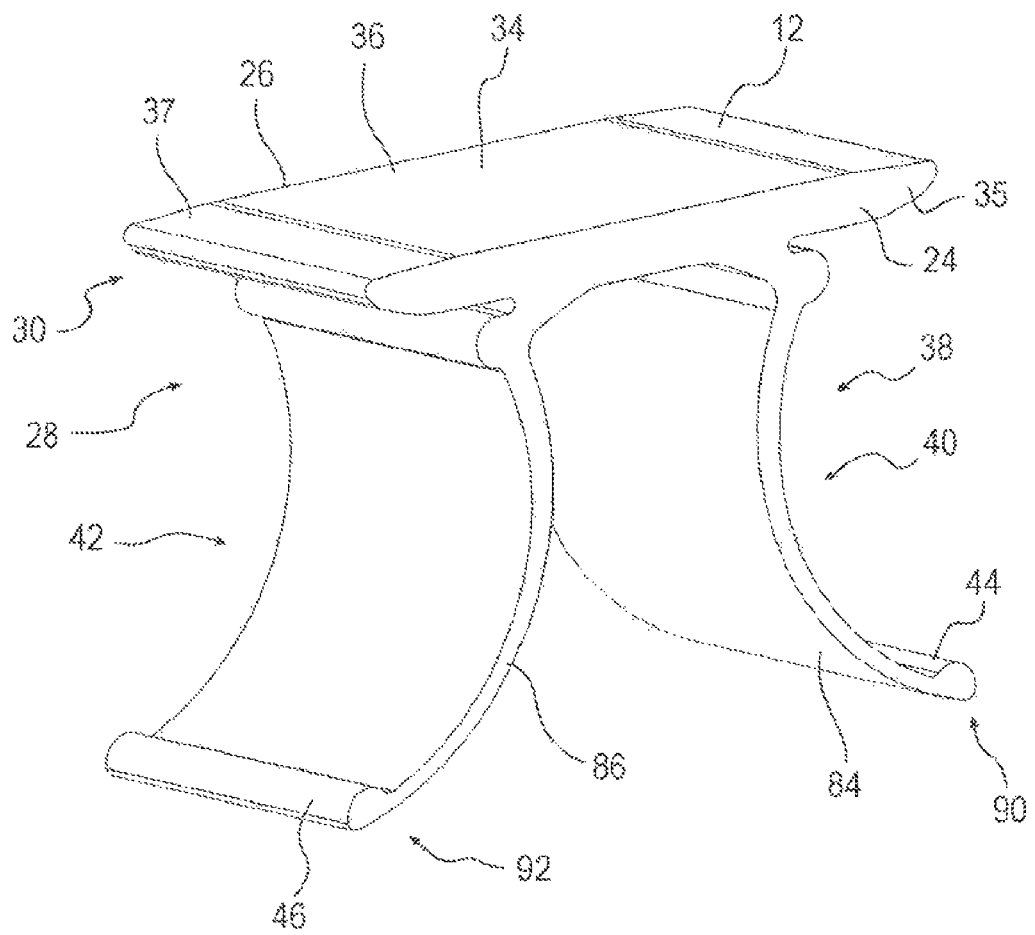
FIG. 2 is a perspective view of one of the transfer guard members of the transfer guard system of FIG. 1 showing an upper bridge portion and a pair of depending resilient legs.

In FIGS. 1 and 2, a transfer guard system 10 is provided having several transfer guard segments or members 12 (see FIGS. 2 and 3) that extend between pulleys 14, 16 of adjacent upstream and downstream conveyor belts 18, 20 in a laterally extending gap 22. The transfer guard members 12 are free-floating in that they are supported only by the adjacent belts 18, 20 and pulleys 14, 16, and not a separate support structure, such as a support bar that spans the lateral gap 22. In addition, the transfer guard members 12 shown are not attached to one another, but merely abut one another along lateral sides 24, 26 thereof. However, the transfer guard members 12 may include fixation structures for attaching the guard members to one another if desired. With respect to FIG. 2, the transfer guard members 12 each include a body 28 having an upper portion 30 and a pair of lower, resilient legs 40, 42 separated by a gap. The body upper portion 30 has a bridge portion 34 with a generally flat upper surface 36 for providing support to objects, such as a box 29 being conveyed between the upstream and downstream belts 18, 20, as well as keeping materials from falling or getting trapped between the belts 18, 20. The bridge portion 34 has upstream and downstream outboard portions 35, 37 configured to slidingly engage the conveyor belts 18, 20 and facilitate movement of objects onto and off of the flat upper surface 36. The spaced, resilient legs 40, 42 slidingly engaging the conveyor belts 18, 20 and support the body 28 in the gap 22 between the conveyor belts 18, 20. In one form, the resilient legs 40, 42 below the bridge portion 34 and includes contact portions 44, 46 for slidingly engaging with the adjacent belts 18, 20 to keep the bridge portion 34 in place. As used herein, the term resilient is intended to refer to the ability of a material or component to elastically deform in response to loading during ordinary use of the material or component.

Figure 3:
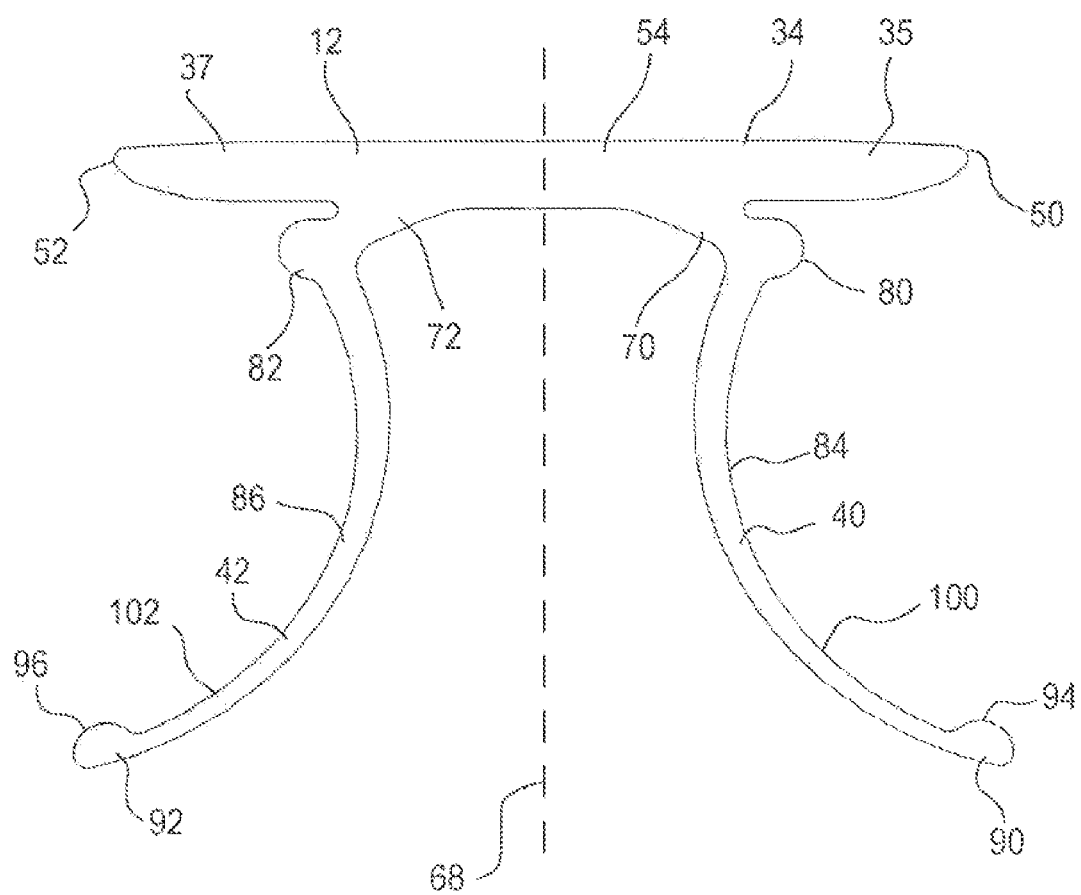
FIG. 3 is an elevational view of the transfer guard member of FIG. 2 showing the legs in an expanded, initial configuration.

With respect to FIG. 3, the spaced, resilient legs 40, 42 are configured to hold the bridge portion 34 in place while allowing for a resilient response to impacts from conveyed objects, debris, or belt splices, as well as non-catastrophic failure modes that are designed not to damage the belts 18, 20 or pulleys 14, 16. For example, should an object or a damaged belt splice impact an upstream edge 50 of the upstream outboard portion 35 with sufficient force, the transfer guard member 12 has a tendency to lift up or eject upwardly from the gap 22 between the belts 18, 20. In the case of an object, such as debris, a metal fastener, or the like, the object will cause the transfer guard segment 12 to resiliently shift upwardly temporarily, or in the extreme case, completely eject from the gap 22, allowing the object to fall in the gap 22, rather than get wedged between the edge 50 and the belt 18 and cause damage to the belt 18. In the case of a damaged belt splice, the resilient anchoring of the bridge portion 30 within the gap 22 limits the likelihood of causing further damage to the splice, as the transfer guard member 12 uses its resiliency to absorb the impact and then settles back into place after the impact. In addition, in some cases due to excessive wear at the bridge portions 34 or the legs 40, 42, the transfer guard member 12 may simply fall downward through the gap between the belts 18, 20, and may easily be replaced with a new transfer guard member 12.

If sufficient upward force is applied to the transfer guard member 12, such as by impact, the transfer guard member 12 becoming caught on a conveyed item, or as a result of friction with the moving conveyor belts 18, 20, the transfer guard member 12 may be ejected upwardly from the gap 22 no matter where the transfer guard member 12 is laterally positioned along the gap 22 across the entire width of the belts 18, 20. If sufficient downward force is applied to the transfer guard member 12, such as the edge 50 of the upstream outboard portion 35 getting stuck on a severely damaged belt splice, the transfer guard member 12 may fall downwardly from the gap 22 no matter where the transfer guard member 12 is laterally positioned along the gap 22. By configuring the spaced legs 40, 42 to keep the transfer guard members 12 in place during normal conveyor belt operations (see FIG. 1) and eject upwardly or downwardly from the gap 22 should a significantly high wedge impact force be applied thereto, the transfer guard members 12 allow the items that are intended to be conveyed to pass smoothly over the gap 22, but can dislodge when objects or damaged belt splices strongly impact an edge of the transfer guard member 12 to help avoid belt or splice damage.

As shown in FIGS. 1 and 2, the transfer guard members 12 have their upper surfaces 36 sized so as to longitudinally span the gap 22 between belts 18, 20 and adjacent pulleys 14, 16. In addition, the transfer guard members 12 can be positioned so that there are no lateral gaps between adjacent transfer guard members 12, with adjacent sides 24, 26 thereof abutting one another. Although the embodiments herein are described with relation to a gap between two separate conveyor belts, the transfer guard members may also be used in a gap in a single conveyor belt such as between adjacent hitch rollers. The discussion herein may also refer to conveying surfaces for convenience, and it is intended that conveying surfaces may encompass two portions of a single surface, e.g., portions of a conveyor belt surface on opposite sides of a gap formed by a hitch in the conveyor belt. In addition, the transfer guard system 10 could be implemented or be modified to be used with conveyor systems having rollers or pulleys with different diameters, to span different sized gaps, to span gaps between belts or rollers having different elevations or angular orientations, to span between roller type conveyors without a belt, between a belt or roller conveyor and a chute, or other known conveyor systems, as would be apparent to one of ordinary skill in the art.

The transfer guard member 12 has a generally H-shaped configuration, as shown in FIGS. 2 and 3. The transfer guard member body 28 may be made of a resilient, low friction material such as polymer, for example, ultra-high-molecular-weight (UHMW) polyethylene. The body 28 includes the upper bridge portion 34 and the pair of depending legs 40, 42 that can resiliently flex to engage with the adjacent belts 18, 20 as they travel around a lower portion of the adjacent pulleys 14, 16 to releasably anchor the bridge portion 34 in the gap 22. As shown in FIG. 3, the legs 40, 42 may extend beyond the upstream and downstream edges 50, 52 of the bridge portion 10 when the legs 40, 42 are in an unbiased configuration prior to insertion between adjacent pulleys 14, 16.

The transfer guard bridge portion 34 includes the opposing upstream and downstream outboard portions 35, 37 extending from a central portion 54 of the bridge portion 34. The outboard portions 35, 37 extend onto the conveyor belts 18, 20 and are configured to slidingly engage the surfaces of the conveyor belts 18, 20. The outboard portion 35 positions the receiving, upstream edge 50 in close proximity to the conveyor belt 18 traveling in direction 60 and returning in direction 62 about the upstream pulley 14 and the discharge, downstream edge 52 of the downstream outboard portion 37 in close proximity to the belt 20 traveling in direction 64 and returning in direction 66 about the downstream pulley 16.

In one form, the transfer guard members 12 are symmetrical about a central, vertical axis 68 as shown in FIG. 3 so as to allow the transfer guard members 12 to be installed with either outboard portion 35, 37 projecting upstream or downstream. This improves the ease of installation of the transfer guard members 12 in the gap 22 and reduces the likelihood of user error in the installation process. Additionally, the conveyor belts 18, 20 may convey items in two opposite directions such that the belt 18 is an upstream belt with the belts 18, 20 operating in a first direction and the belt 20 is the upstream belt with the belts 18, 20 operating in a second, opposite direction. The symmetry about the vertical axis 68 permits the transfer guard member 12 to be bi-directional and transfer items across the gap 22 regardless of the direction of the belts 18, 20. Further, an operator does not have to change the orientation of the transfer guard members 12 before changing the direction of the conveyor belts 18, 20 since the transfer guard members 12 are functional in both directions.

The legs 40, 42 are configured to provide contact portions 44, 46 that are biased against the belts 18, 20 with sufficient force to resist the tendency of the bridge portion 34 to rotate due to forces caused by the adjacent belts 18, 20 moving past the transfer guard member 12 (including a downward frictional force component on the upstream outboard portion 35 from the upstream belt 18 and an upward frictional force component on the downstream outboard portion 37 from the downstream belt 20) and to keep the transfer guard member 12 from being dislodged from the gap 22 between the pulleys 14, 16 during operation of the conveyor belts 18, 20. At the same time, the legs 40, 42 are configured to limit the size of the contact portions 44, 46 and the force with which the contact portions 44, 46 are urged against the belts 18, 20 to minimize wear on the legs 40, 42 and belts 18, 20 and avoid chattering of the legs 40, 42 with the belts 18, 20.

As shown in FIG. 3, the transfer guard member body 28 includes one or more transition portions 70, 72 extending from the bridge portion 34 that provide rigidity to the legs 40, 42 and urge the legs 40, 42 against the conveyor belts 18, 20. The transfer guard member body 28 includes at least one stop, such as a stop portions 80, 82, for limiting movement of the transfer guard member 12 in the gap 22 during operation of the conveyor belts 18, 20, as discussed in greater detail below.

The legs 40, 42 extend downwardly from the transition portions 70, 72 and form extended arcuate portions 84, 86 that initially curve inwardly toward each other and then extend downward and away from each other. Each leg 40, 42 includes a distal end portion 90, 92 with contact surfaces 94, 96 for contacting the adjacent belt 18, 20 during normal operation. In one form, the distal end portions 90, 92 have rounded protrusions with the contact surfaces 94, 96 thereon.

The arcuate portions 84, 86 may be sized and configured such that outer facing surfaces 100, 102 of the arcuate portions 84, 86 do not engage with belts 18, 20 during normal operation, but upon impact of an object with the bridge portion 34, the outer facing surfaces 100, 102 may be urged into engagement with the belts 18, 20 and provide anchoring support to the bridge portion 34 to help absorb the impact and prevent ejection of the transfer guard member 12 from the gap 22. Although the transition portions 70, 72 connect the legs 40, 42 to the bridge portion 34, the legs 40, 42 may be directly connected to the bridge portion 34 in other forms. Further, the shape, size, and orientation of the transition portions 70, 72 and legs 40, 42 may be selected to provide a desired amount of sliding engagement with the conveying surfaces in a particular application.

Figure 4:
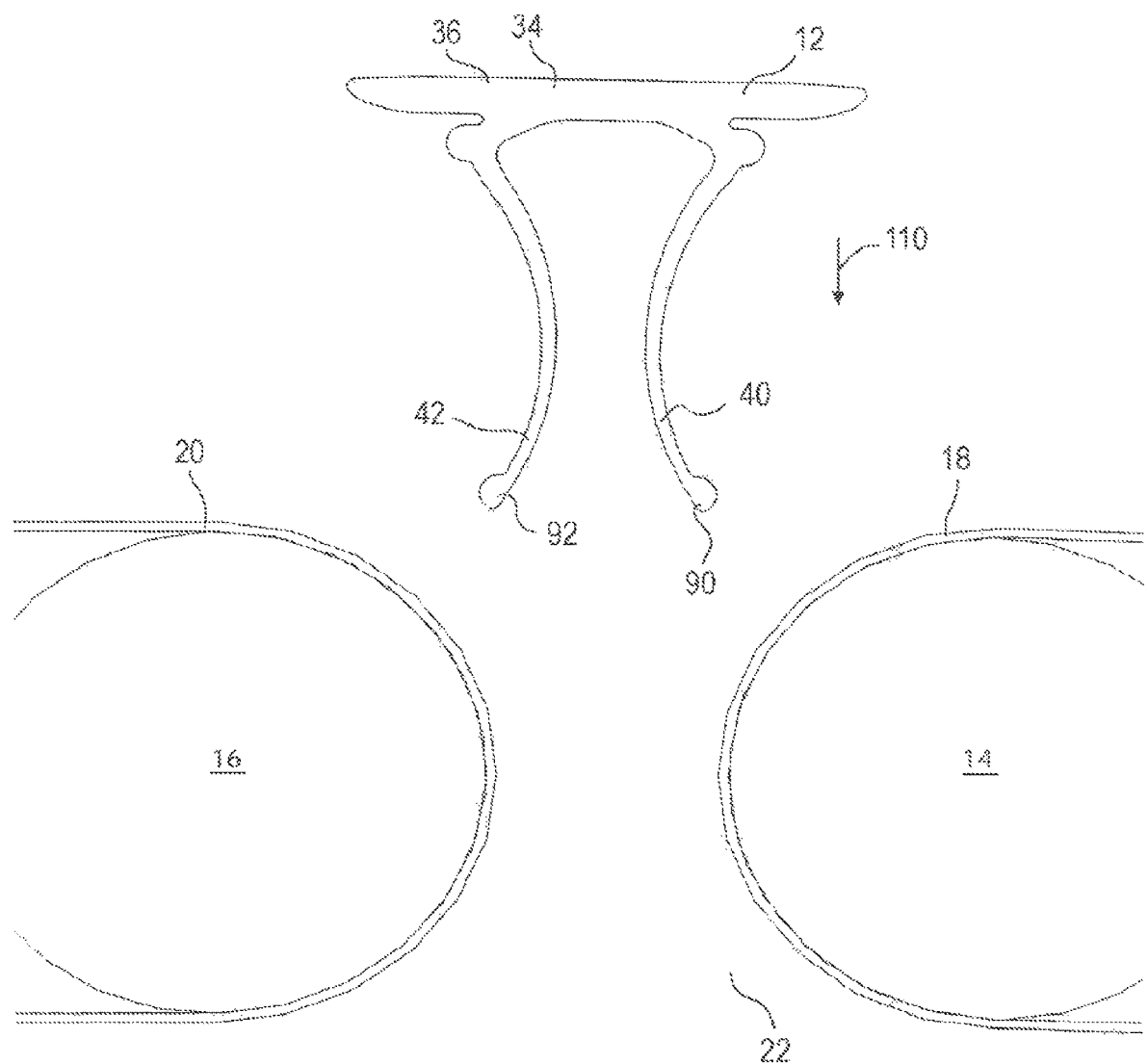
FIG. 4 is an elevational view of the transfer guard member of FIG. 3 prior to installation in the gap between the two conveyor belts with the legs in a deflected, insertion configuration.
Figure 5:
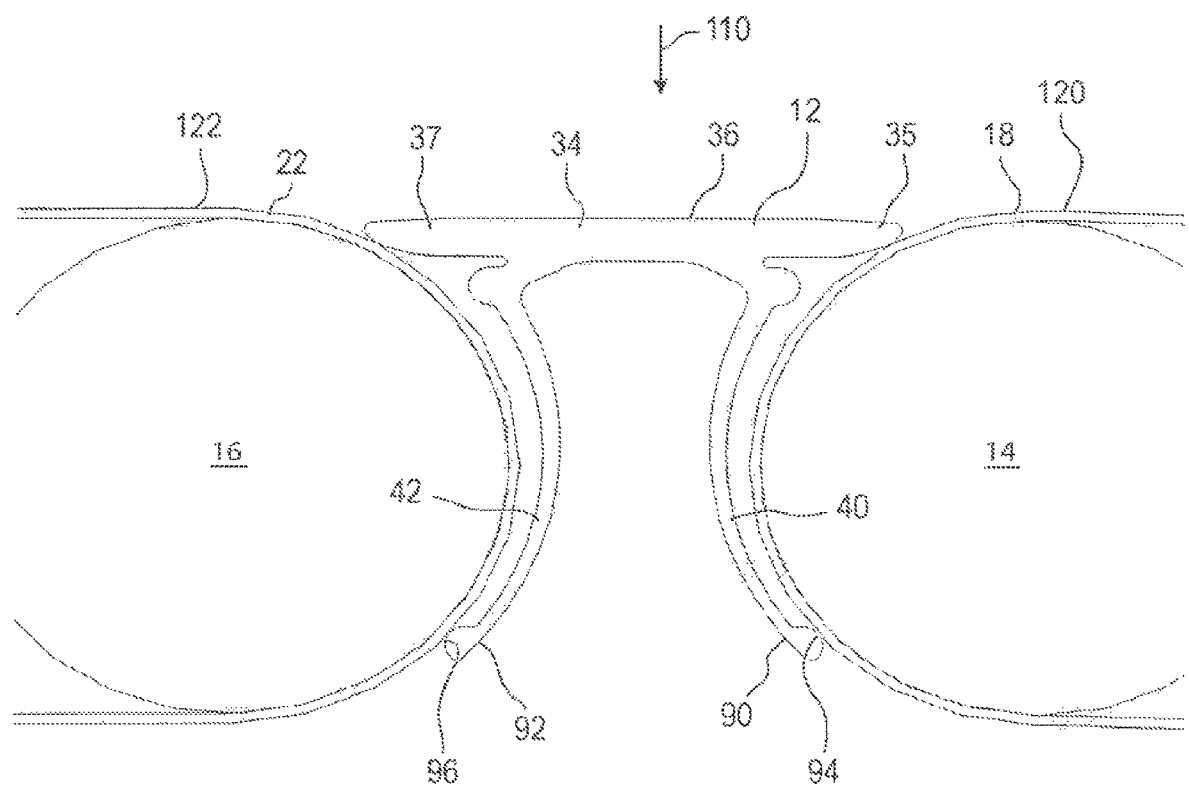
FIG. 5 is an elevational view similar to FIG. 4 showing the transfer guard member positioned in the gap between the conveyor belts and the legs in an expanded, installation configuration with ends of the legs being urged against the conveyor belt surfaces.

With reference to FIGS. 3-5, a method of installing the transfer guard member 12 into the gap 22 between the belts 18, 20 is shown. Initially, the legs 40, 42 have an unbiased, expanded configuration with the legs 40, 42 splayed apart as shown in FIG. 3. The legs 40, 42 are urged together to a deflected, insertion configuration as shown in FIG. 4. In the insertion configuration, the distal end portions 90, 92 are biased inwardly toward one another to provide clearance for the distal end portions 90, 92 to fit into the gap 22 between the conveyor belts 18, 20. The legs 40, 42 are spaced apart in the deflected, insertion configuration and do not overlap laterally across the transfer guard member 12.

The user then advances the transfer guard member 12 in direction 110 and inserts the distal end portions 90, 92 of the legs 40, 42 into the gap 22. The user may press downwardly in direction 110 on the upper surface 36 of the bridge portion 34 to seat the transfer guard member 12 in the gap 22 and position the upstream and downstream outboard portions 35, 37 near or against the conveyor belts 18, 20 as shown in FIG. 5. With the distal end portions 90, 92 advanced below centerlines of the pulleys 14, 16, the legs 40, 42 shift apart toward an expanded, installation configuration and resiliently bias the contact surfaces 94, 96 against the conveyor belts 18, 20. The bridge portion 31 may contact the belts 18, 20 below the upper surfaces 120, 122 of the belts 18, 20 to provide for smooth transfer of objects from the belt 18 to the upper transfer surface 36 and subsequently to the downstream belt 20. In addition, the contact surfaces 94, 96 may engage the adjacent belts 18, 20 below the centerlines of the pulleys 14, 16, and may engage the adjacent belts 18, 20 closer to the lower extent of the pulleys 14, 16 so that the legs 40, 42 must be flexed significantly in order to expel the transfer guard member 12 from the gap 22.

In an alternative form, the transfer guard member 12 may have only a single downstream leg 42 to engage the conveyor belt 20. The single downstream leg 42 would provide sufficient engagement with conveyor belt 20 to resist the upwardly directed forces on the downstream outboard portion 37 from the conveyor belt 20 and the downwardly directed forces on the upstream outboard portion 35. In other forms, the transfer guard member 12 may have three, four, or another number of members or devices for engaging one or both of the conveying surfaces.

The sliding engagement between the transfer guard member 12 and the conveyor belts 18, 20 may take a variety of forms. For example, one or more of the outboard portions 35, 37 and legs 40, 42 may employ rolling contact with the conveyor belts 18, 20, such as wheels or rollers that rotate as the conveyor belts 18, 20 travel past the transfer guard member 12.

The transfer guard member 12 may be integrally formed from a single piece of material, such as UHMW polyethylene. The term integral is intended to refer to a single, one-piece construction. In one approach, the transfer guard member 12 is formed by extruding UMHW polyethylene through a die having the desired cross sectional shape of the transfer guard member 12. The transfer guard member 12 could alternatively be formed by casting, injection moulding, machining, or three dimensional printing, for example. In one form, the transfer guard member 12 could be formed from a plurality of components connected together. For example, the transfer guard member 12 could have a two-part construction including the bridge portion 34 formed of a first material and the legs 40, 42 formed of a second material that is secured to the bridge portion 34 using welding or fasteners, for example.

Figure 6:
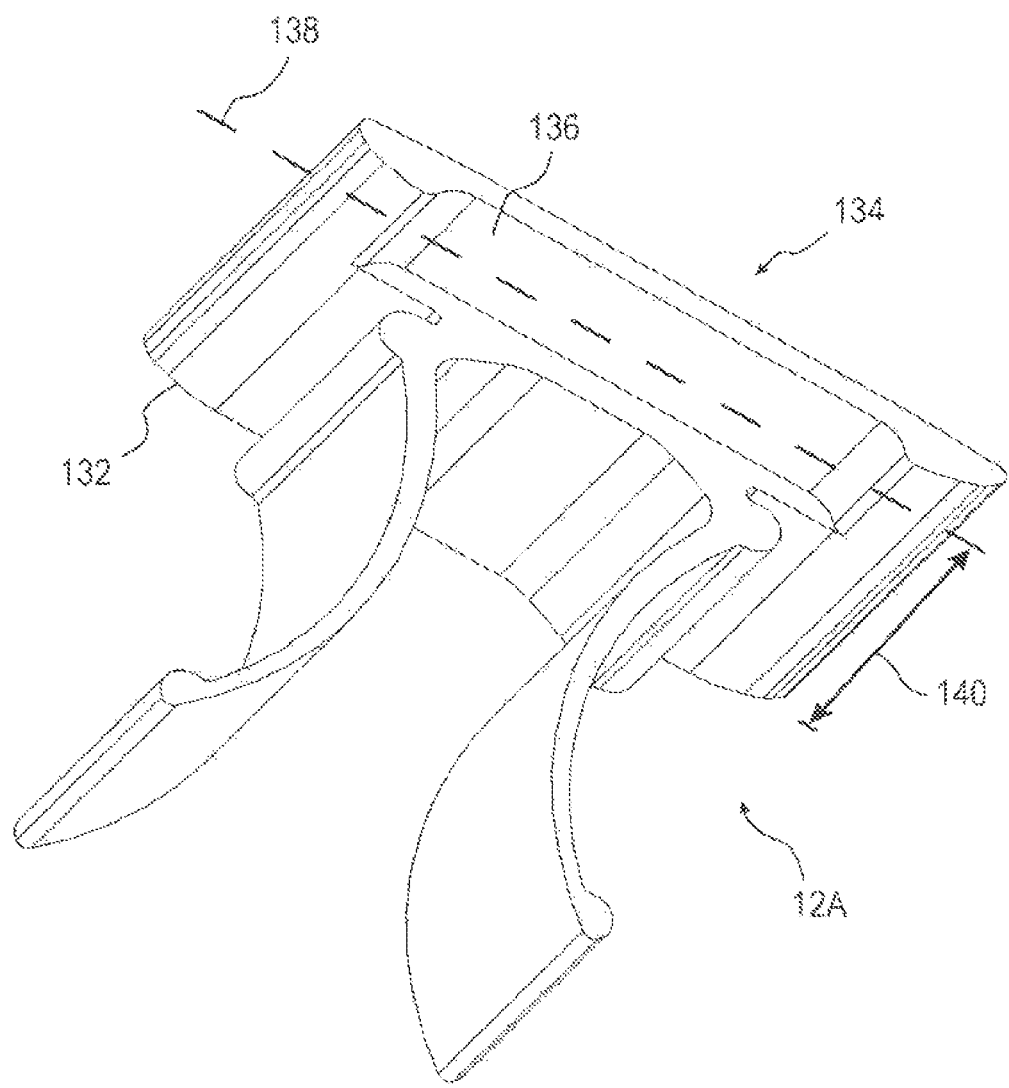
FIG. 6 is a bottom perspective view of an end transfer guard member of the transfer guard system of FIG. 1 showing a lateral extension of the transfer guard member that may be cut longitudinally to customize the width of the plurality of transfer guard members for a particular installation.

With reference to FIGS. 1 and 6, the transfer guard members 12 include one or two end transfer guard members 12A that are similar to the transfer guard member 12 discussed above. The end transfer guard members 12A, however, include a bridge portion 132 with an installation portion 134 that can be adjusted to customize the overall lateral width of the plurality of transfer guard members 12 within the gap 22 and ensure that the transfer guard members 12, 12A completely fill the gap 22 and avoid any openings between the conveyor belts 18, 20 which could catch conveyed items or debris. For example, the installation portion 134 may include a lateral extension 136 with a reduced thickness. To customize the width of the transfer guard member 12A, and the resulting overall width of the transfer guard members 12 within the gap 22, a user may cut the lateral extension 136 of the transfer guard member 12A along an axis 138 to obtain a desired width 140 of the transfer guard 12A. Because the lateral extension 136 is positioned laterally from legs 142 of the transfer guard member 12A, a user does not need to cut through the legs 142 in order to obtain a desired width 140 of the transfer guard 12A, which makes customization easier.

Figure 7:
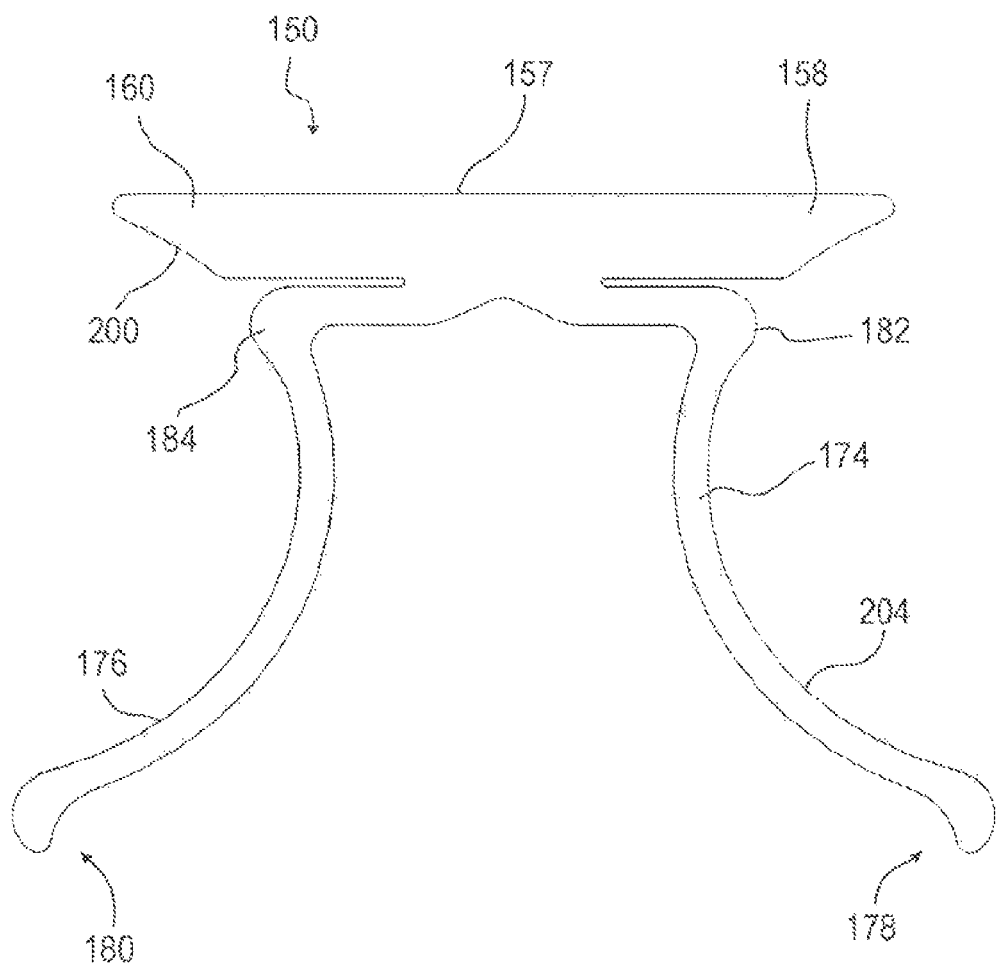
FIG. 7 is an elevational view of another transfer guard member showing resilient legs of the transfer guard member in an expanded, initial configuration.
Figure 7A:
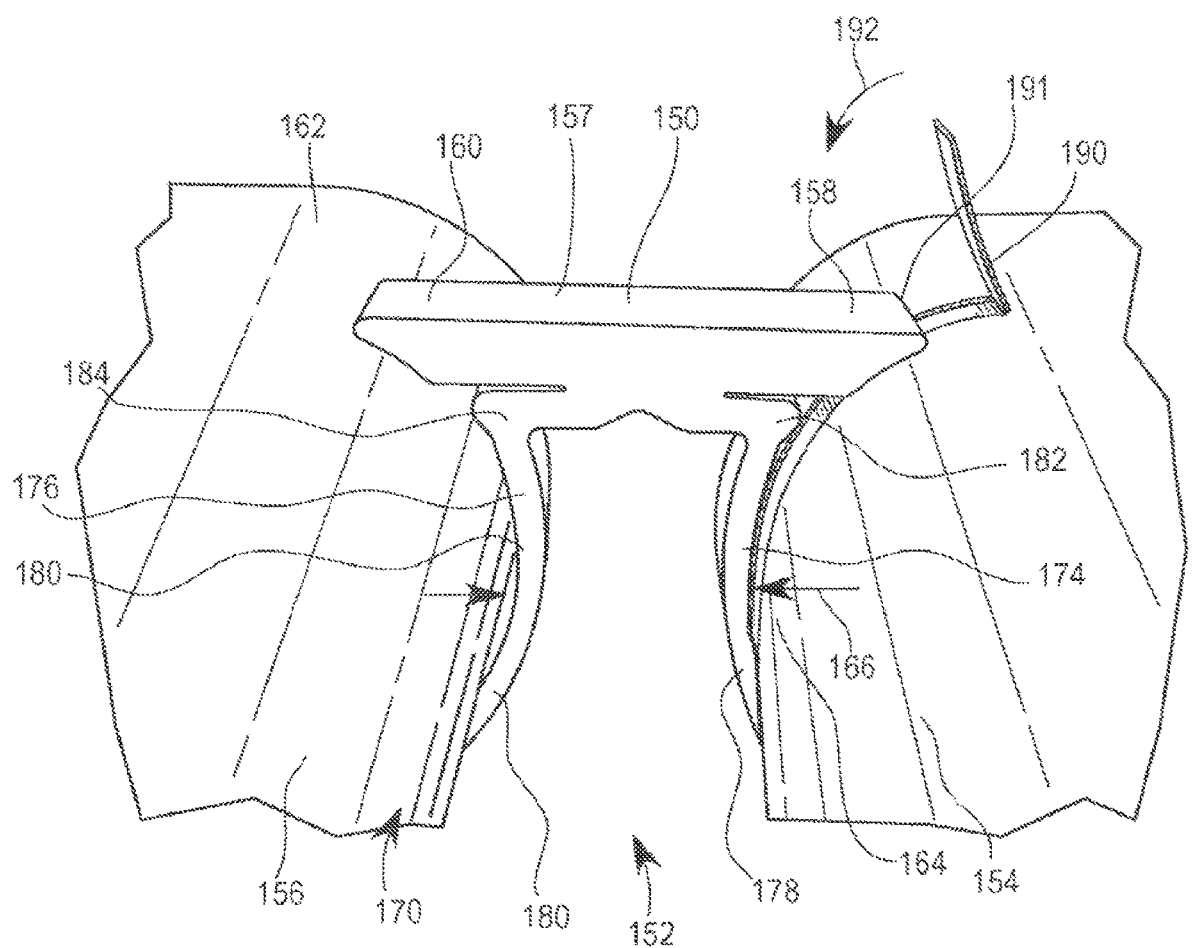
FIG. 7A is a perspective view of the transfer guard member of FIG. 7 positioned in a gap between two moving conveyor belts with the upstream conveyor belt having been torn so that there is a flap of the conveyor belt spaced from an upstream, outboard portion of the bridge portion of the transfer guard member.

With reference to FIGS. 7 and 7A, another transfer guard member 150 is provided that is similar in many respects to the transfer guard member 12. The transfer guard member 150 is shown installed in a gap 152 between two moving conveyor belts 154, 156. The transfer guard member 150 has a bridge portion 157 with upstream and downstream outboard portions 158, 160 slidingly engaged with the conveyor belts 154, 156 in an upper, enlarged area 162 of the gap 152. The conveyor belts 154, 156 have a narrowed area 164 that defines a minimum distance 166 between the conveyor belts 154, 156 and a lower, enlarged area 170 below the narrowed area 164. The transfer guard member 150 has lower, resilient legs 174, 176 with distal end portions 178, 180 slidingly engaged with the belts 154, 156 in the lower, enlarged area 170 of the gap 152. Intermediate the outboard portions 158, 160 and the legs 174, 176, the transfer guard member 150 has stop portions 182, 184 spaced from the conveyor belts 154, 156 as shown in FIG. 6. During normal operation, the outboard portions 158, 160 rest on the moving conveyor belts 154, 156 in the upper area 162 of the gap 152 and the legs 174, 176 bias the distal end portions 178, 180 against the moving conveyor belts 154, 156 in the lower area 170 of the gap 152 which holds the transfer guard member 150 within the gap 152.

With reference to FIGS. 7A-12, the transfer guard member 150 has freedom to shift within the gap 152 and navigate significantly damaged conveying surfaces without causing further damage to the conveying surfaces. As an example, the conveyor belt 154 is shown having been cut and a large flap 190 is upstanding from the conveyor belt 154. The conveyor belt 154 moves in direction 192 and advances the flap 190 into contact with an upstream edge 191 of the upstream outboard portion 158.

With reference to FIG. 8, the flap 190 moving in direction 192 engages the upstream edge 191 of the transfer guard member 150 and shifts the bridge portion 157 in direction 194. This presses a downstream edge 196 of the outboard portion 160 against the conveyor belt 156.

With reference to FIG. 9, the flap 190 continues to move in direction 192 around the pulley associated with the conveyor belt 154 and shifts the bridge portion 157 farther in direction 194 which engages a lower surface 200 of the outboard portion 160 with the conveyor belt 156. Further, the shifting of the bridge portion 157 in direction 194 engages the stop portion 184 with the conveyor belt 156. At this juncture, the transfer guard member 150 is engaged with the conveyor belt 156 at three areas—the outboard portion edge 196 and lower surface 200, the stop portion 184, and the leg distal end portion 180. These three engagement areas temporarily couple the transfer guard member 150 to the conveyor belt 156. The conveyor belt 156, however, continues to rotate in direction 193 about its associated pulley.

Figure 10:
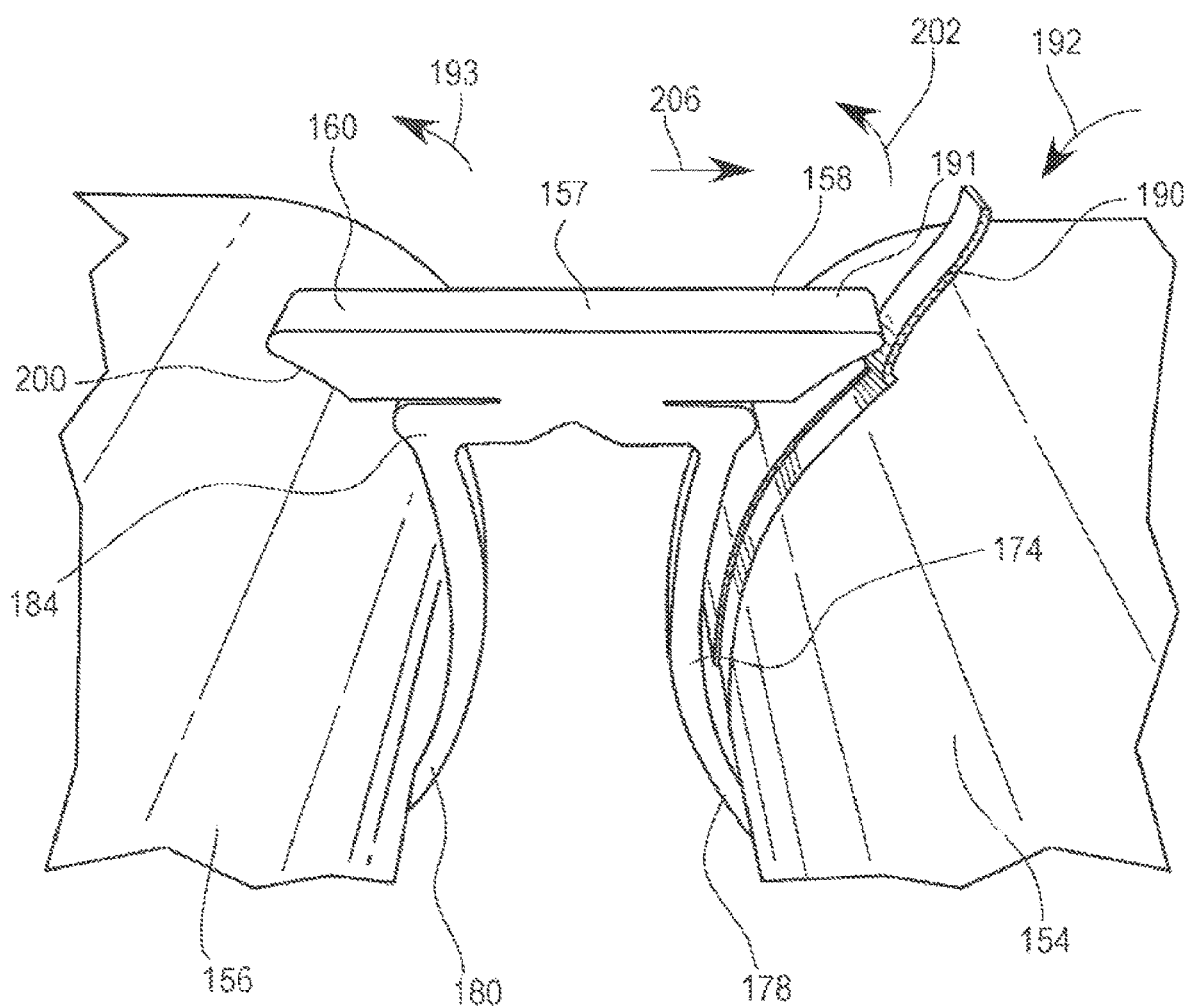
FIG. 10 is a perspective view similar to FIG. 9 showing a stop portion of the transfer guard member contacting the downstream conveyor belt and the upstream outboard portion shifting generally upward over the flap of the upstream conveyor belt.

Turning to FIG. 10, because the transfer guard member 150 is temporarily coupled to the conveyor belt 156, the rotation of the conveyor belt 156 in direction 193 causes the bridge portion 157 to tilt and raise the upstream edge 191 upward in direction 202, over the flap 190 of the conveyor belt 154. Comparing FIGS. 8 and 9, the upstream leg 174 is resiliently tensioned in response to the flap 190 urging the bridge portion 157 downstream in direction 194 and moved an arcuate outer surface 204 of the upstream leg 174 away from the conveyor belt 154, as shown in FIG. 10. Once the upstream edge 191 starts to travel upward in direction 202 over the flap 190, the leg 174 springs back and draws the bridge portion 157 upstream in direction 206. Further, the sliding engagement of the leg distal end portion 178 and the conveyor belt 154 traveling in direction 192 causes the leg 174 to pull downward on the outboard portion 158 and direct the upstream edge 191 downward behind the flap 190.

Figure 11:
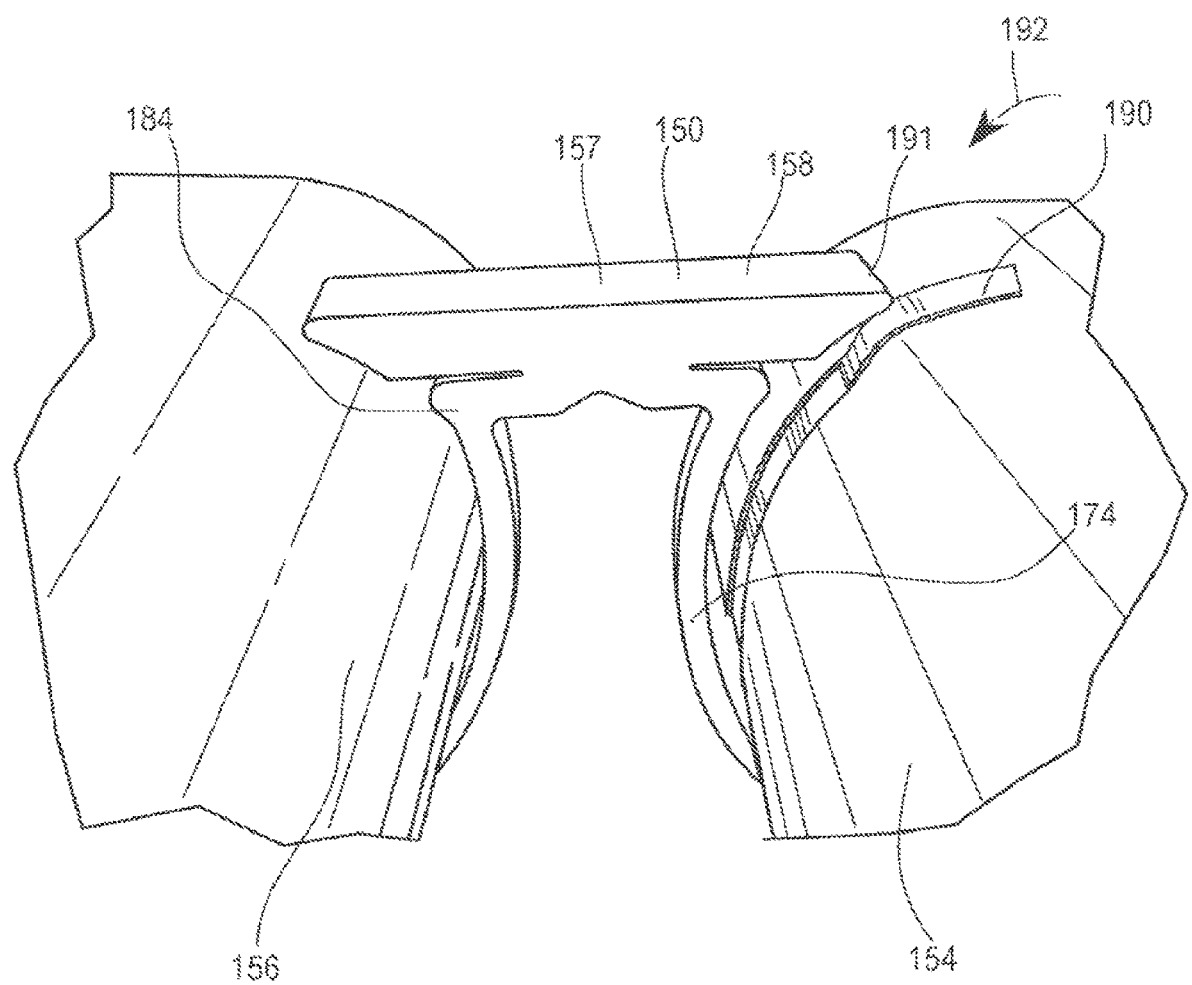
FIG. 11 is a perspective view similar to FIG. 10 showing the upper bridge portion springing forward once the upstream outboard portion has traveled upward over the flap of the upstream conveyor belt.

With reference to FIGS. 10 and 11, the movement of the bridge portion 157 in direction 206 disengages the stop portion 184 from the conveyor belt 156 and permits the stop portion 184 to move in direction 206 away from the conveyor belt 156. In this manner, the transfer guard member 157 is now engaged with the conveyor belt 156 at only two areas—the downstream outboard portion edge 196 and lower surface 200 and the leg distal end portion 180. The fewer points of contact between the transfer guard member 150 and the conveyor belt 154 effectively de-couples the transfer guard member 150 from the conveyor belt 154 moving in direction 193 such that the outboard portion 160 and distal end portion 180 return to normal, sliding engagement with the conveyor belt 156.

Figure 12:
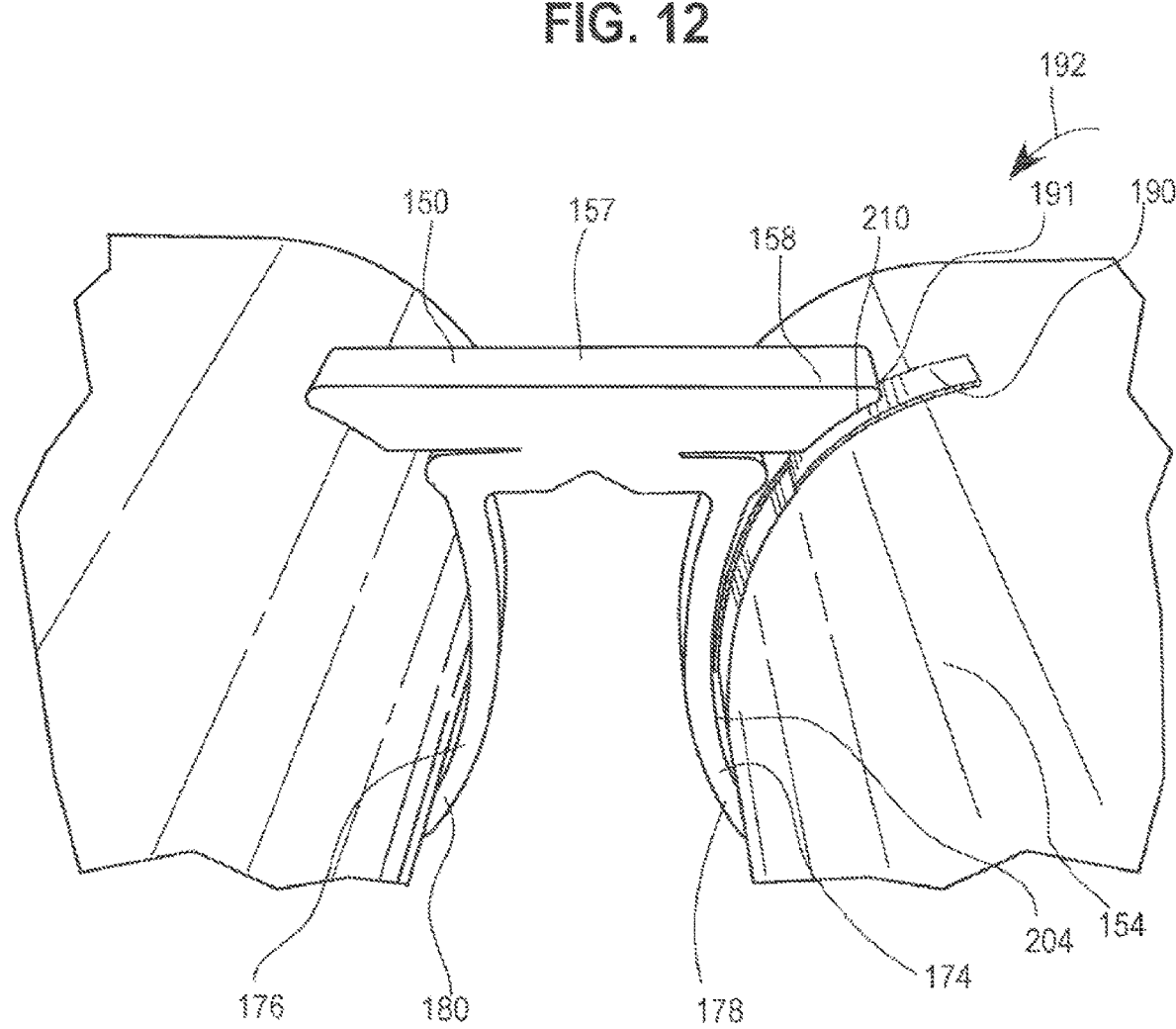
FIG. 12 is a perspective view similar to FIG. 11 showing the flap of the conveyor belt having traveled beyond the upstream outboard portion of the transfer guard member.
Figure 13:
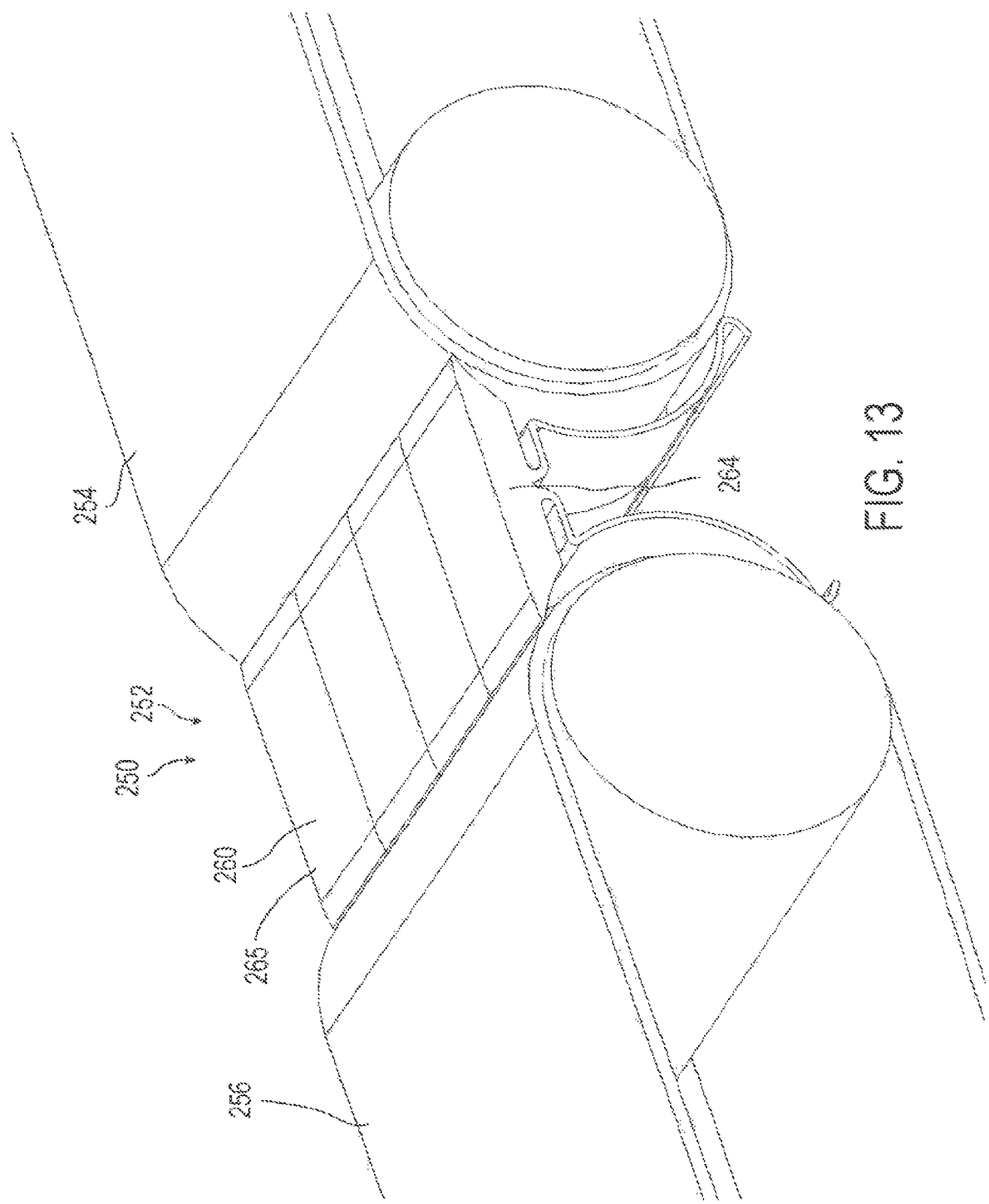
FIG. 13 is a perspective view of a transfer guard system in accordance with the present invention showing a plurality of transfer guard members positioned side-by-side to bridge a gap between conveyor belts.

With reference to FIG. 12, the upstream edge 191 of the transfer guard member 150 has successfully navigated up and over the flap 190. The flap 190 has started to travel along a lower surface 210 of the upstream outboard portion 158 and toward the leg 174. The flap 190 may travel along the outer arcuate surface 204 of the leg 174, the distal end portion 178, and away from the transfer guard member 150 in direction 192.

As shown in FIGS. 7A-12, the transfer guard member 150 may navigate upward over large irregularities in a conveyor belt 154 without further damaging the conveyor belt 154. In the event that the upstream edge 191 is unable to disengage from the irregularity, such as a severely damaged splice, the irregularity will pull the upstream outboard portion 158 in direction 192 with the irregularity. The bridge portion 157 would fold toward the downstream leg 180 in order to permit the upstream outboard portion 158 to move in direction 192 with the irregularity. The irregularity would continue to pull the transfer guard member 150 with it in direction 192 until the transfer guard member 150 falls downwardly out of the gap 152. Because the transfer guard member 150 slidingly engages the conveyor belts 154, 156 and holds itself in the gap 152, the transfer guard member 150 can fall downwardly out of the gap 152 without interference from any rigid mounting structures. This further reduces the likelihood that the transfer guard member 150 could become lodged against the conveyor belt 154 and damage the conveyor belt 154 due to the irregularity. It will be appreciated that the transfer guard member 12 may operate in a manner similar to the foregoing description of the transfer guard member 150.

With reference to FIGS. 12A-12L, the transfer guard member 12 may be ejected upwardly or downwardly from the gap 22 in response to a substantial force being applied to the bridge portion 34. By ejecting from the gap 22, the transfer guard member 12 avoids damaging the conveyor belts 18, 20 by not becoming lodged or wedged against the conveyor belts 18, 20. With reference to FIG. 12A, the transfer guard member 12 is shown in its normal operating configuration with upper body portion 34 in an operating orientation for conveying goods across the gap 22 and the upstream and downstream outboard portions 35, 37 and the leg distal end portions 90, 92 are slidingly engaged with the conveyor belts 18, 20. Further, the stop portions 80, 82 and outer, arcuate surfaces 100, 102 of the legs 40, 42 are spaced from the conveyor belts 18, 20 by air gaps 89, 91. The conveyor belt 18 travels in direction 60 and has a flap 190A traveling into contact against the upstream edge 50. With reference to FIG. 12B, the flap 190A engages the upstream outboard portion 34 and lifts and tilts the bridge portion 34 within the gap 22. The engagement of the flap 190A against the upstream outboard portion 35 shifts the bridge portion 34 downstream and engages the stop portion 82 against the conveyor belt 20. The flap 190A is distinguishable from the flap 190 discussed above with respect to FIGS. 7A-12 because the flap 190A becomes caught on the upstream outboard portion 35 whereas the upstream outboard portion 158 is able to deflect flap 190 out of the way of the transfer guard member 150. Thus, with reference to FIGS. 12B and 12C, the belt 18 and flap 190A caught on the upstream edge 50 continues to move in direction 60 which further tilts the upper bridge portion 34 and bends the leg 42 such that an angle 93 between the transition portion 72 and the leg 42 decreases as the leg 42 bends.

With reference to FIGS. 12D-12F, the flap 190A of the conveyor belt 18 has lifted the bridge portion 34 to an inclined, failure orientation wherein the bridge portion may fall through the gap 22. This movement of the bridge portion 34 further bends the leg 42 relative to the transition portion 72. With reference to FIGS. 12E and 12F, the flap portion 190A continues traveling in direction 160 away from the bridge portion 34 while the transfer guard member 12 falls downward from the gap 22. As shown in FIGS. 12A-12F, the transfer guard member 12 may eject downwardly from the gap rather than becoming wedged on the flap 190A and further damaging the conveyor belt 18.

With reference to FIGS. 12G-12L, the transfer guard member 12 may alternatively be ejected upwardly from the gap 22 in response to a horizontal or upward force moving the upper body portion 34 upward out of the gap 22. Specifically, the transfer guard member 12 is shown in FIG. 12G in a normal operating configuration with the upstream and downstream outboard portions 35, 37 and the leg distal end portions 90, 92 slidingly engaging the conveyor belts 18, 20. A heavy object, such as an oversize box 29, may in some rare instances become caught on the upstream outboard portion 35. With reference to FIG. 12H, the box 29 has a corner 99 that may be shaped and positioned in such a way that it becomes lodged under the upstream edge 50. With reference to FIG. 12I, the box 29 travels along the conveyor belt 18 in a conveying direction 101 and, due to the engagement of the corner 99 with the edge 50, shifts the bridge portion 34 downstream and engages the stop portion 82 against the conveyor belt 20. As shown in FIG. 12J, the continued movement of the box 29 in direction 101 applies sufficient force to cam a curved lower surface of the outboard portion 37 up and out of engagement with the conveyor belt 20. In contrast to the flap 190 of FIGS. 7A-12, the heavy box 29 does not deflect in response to contact or engagement with the upstream outboard portion 35 and applies sufficiently high force against the bridge portion 34 to dislodge the bridge portion 34 from the gap 22.

With reference to FIGS. 12J and 12K, the movement of the box 29 in downstream direction 101 shifts the bridge portion 34 downstream which bends the leg 92 relative to the transition portion 72 by a greater and greater amount as the bridge portion 34 is removed from the gap 22. With reference to FIG. 12L, the transfer guard member 12 has been fully ejected from the gap 22 by the block 29. Although the transfer guard member 12 has been ejected from the gap 22, the laterally adjacent transfer guard members 12 of the transfer guard system 10 may support the box 29 as it travels across the gap 22. Further, the transfer guard member 12 is able to eject upwardly from the gap 22 without becoming wedged against the conveyor belt 12 and damaging the conveyor belt 20. Thus, the transfer guard member may eject upwardly or downwardly from the gap 22 to accommodate out-of-the ordinary forces being applied to the transfer guard member 12 without causing damage to the conveyor belts 18, 20. It will be appreciated at the loading required to dislodge the transfer guard member 12 may be rarely, if ever, encountered by a transfer guard system 10 in normal use. But, when it does occur, the transfer guard system 10 provides improved ability to handle the loading without damaging the conveyor belts 18, 20.

As shown in FIGS. 13-18, another transfer guard system 250 is provided that is similar in many respects to the transfer guard system 10, the transfer guard system 250 is configured for bridging a gap 252 between conveying surfaces such as conveyor belts 254, 256. The transfer guard system 250 includes a plurality of transfer guard members 260 that are similar to the transfer guard members 12 such that differences between the transfer guard members 12, 260 will be highlighted.

Figure 14:
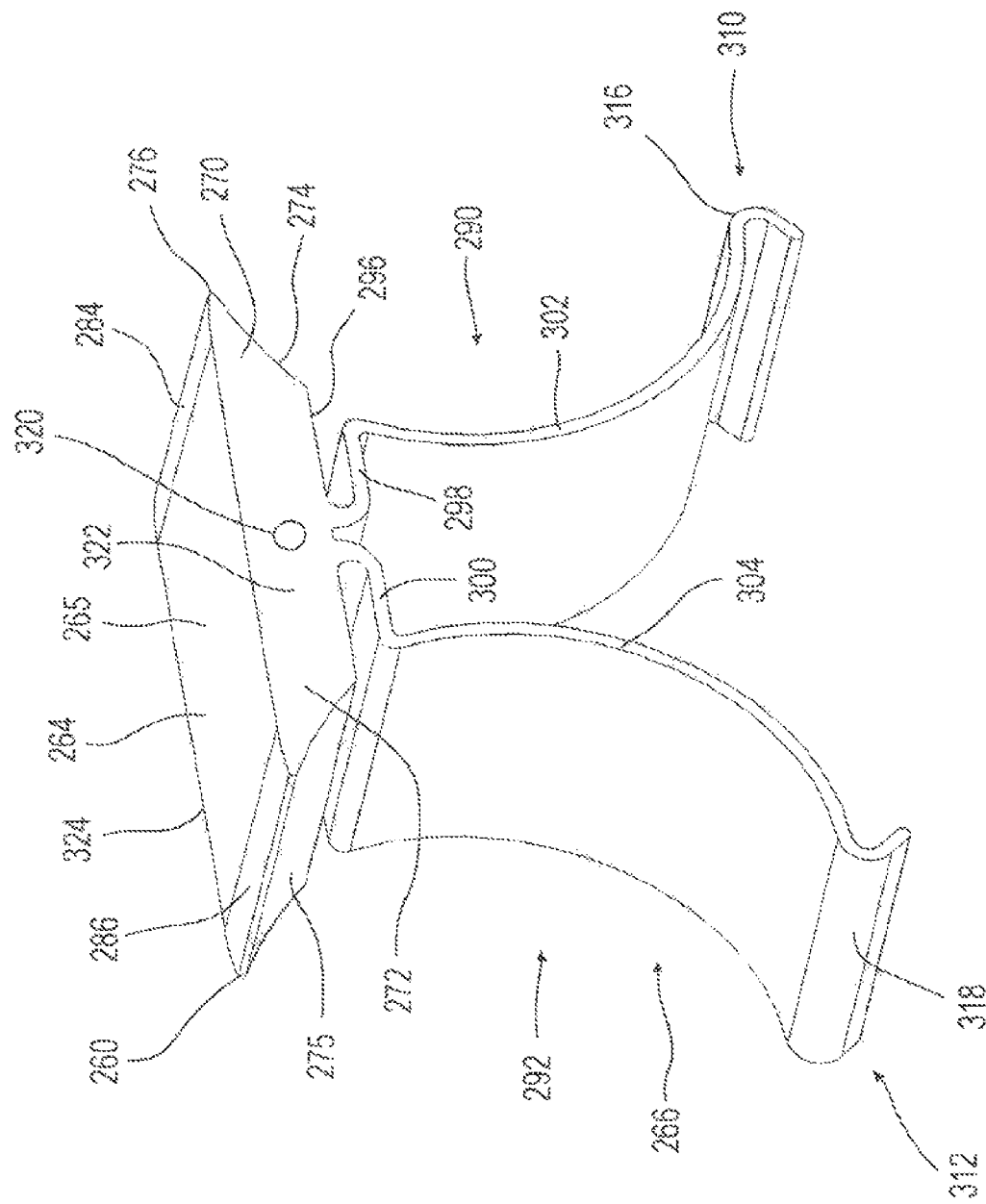
FIG. 14 is a perspective view of a single transfer guard member of the transfer guard system of FIG. 13 showing an upper bridge portion and a pair of depending resilient legs.
Figure 18:
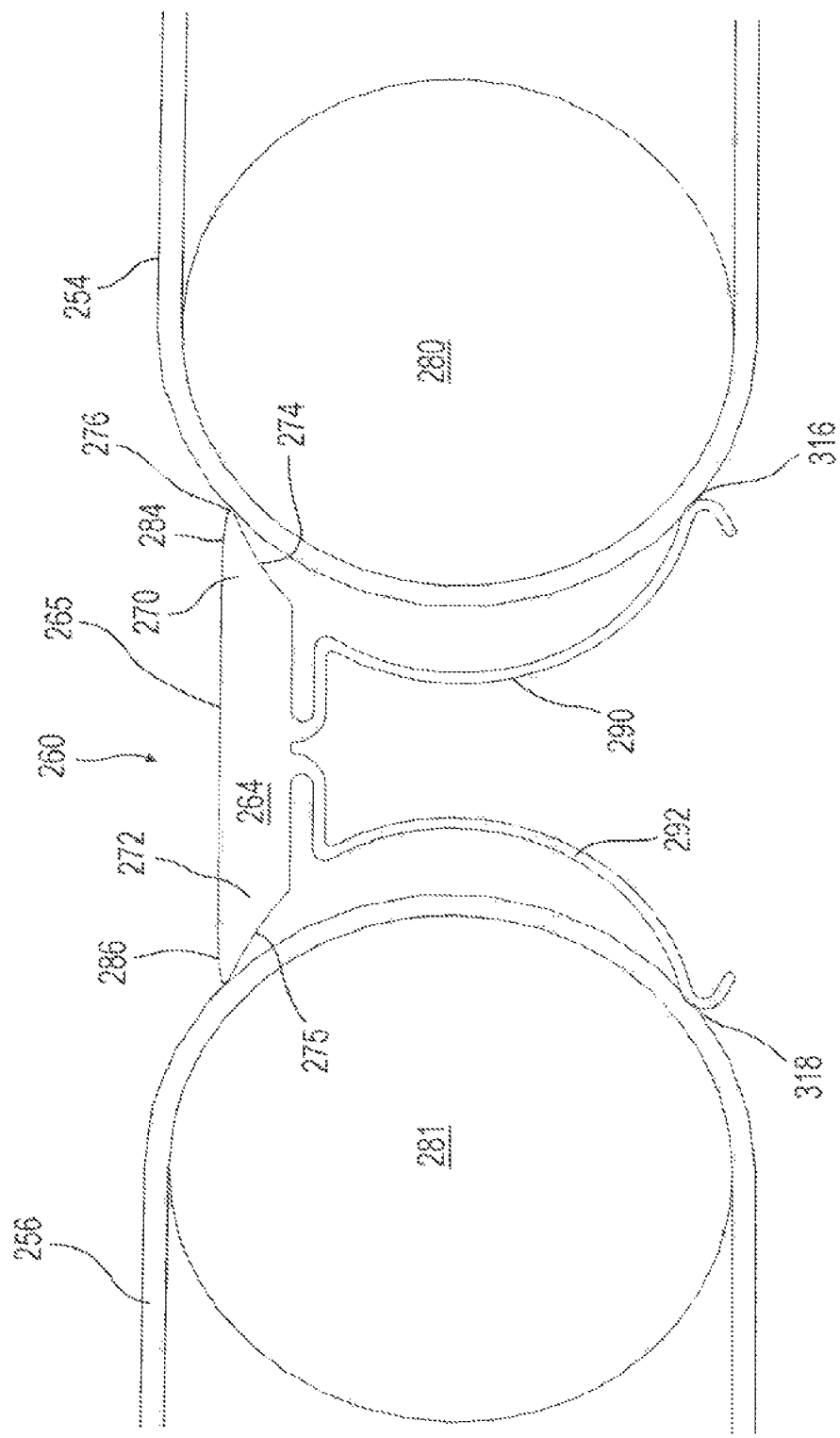
FIG. 18 is an elevational view of the transfer guard member of FIG. 17 in an installed configuration between two conveyor belts with the resilient legs biasing against the adjacent belts.
Figure 19:
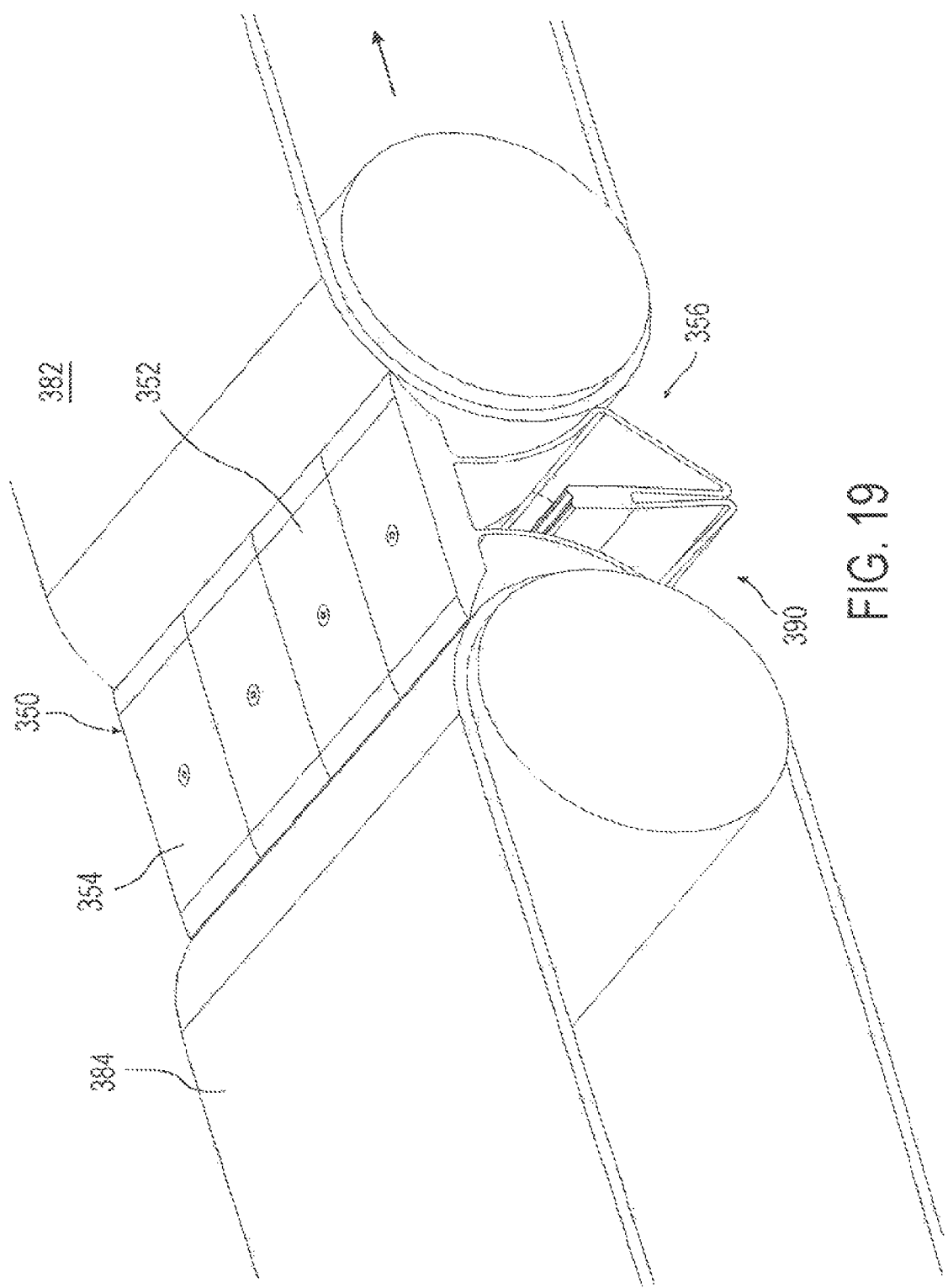
FIG. 19 is a perspective view of alternate transfer guard system in accordance with the present invention showing a plurality of transfer guard members positioned side-by-side to bridge a gap between the two conveyor belts.

The transfer guard member 260 has a body 262 with an upper bridge portion 264, as shown in FIG. 14. The bridge portion 264 has a substantially flat upper surface 265 and upstream and downstream outboard portions 270, 272 with different configurations than the upstream and downstream outboard portions 35, 37 of the transfer guard member 12. With reference to FIGS. 14 and 18, the upstream outboard portion 270 has a lower inclined surface 274 that tapers downstream away and down from an upstream edge 276. The lower inclined surface 274 has a smaller radius of curvature than an upstream pulley 280 so as to minimize the contact surface between the bridge portion 264 and the belt 254 to reduce the amount of friction therebetween and to avoid chattering, i.e. undesirable vibration caused by the contact surfaces repeatedly sticking and slipping against the belts 254, 256. A similar lower inclined surface 275 is provided on the downstream outboard portion 272. The outboard portions 270, 272 also include upper inclined surface portions 284, 286 to facilitate a smooth transfer of conveyed objects from the belt 254 to the upper surface 265 of the bridge portion 264 and likewise from the upper surface 264 to the downstream belt 256. Alternatively, the upper and lower surfaces 284, 286 and 274, 275 could have other constructions, such as an arcuate configuration that matches the contour of the adjacent pulley or other conveying surface, or a non-arcuate or flat configuration so as to give the outboard portions 270, 272 a wedge-shaped configuration. Advantageously, the lower inclined surfaces 274, 275 can act as abutment surfaces against the adjacent belts 254, 256 when the bridge portion 264 experiences an impact from a belt splice or an object traveling on the conveyor surface.

Figure 15:
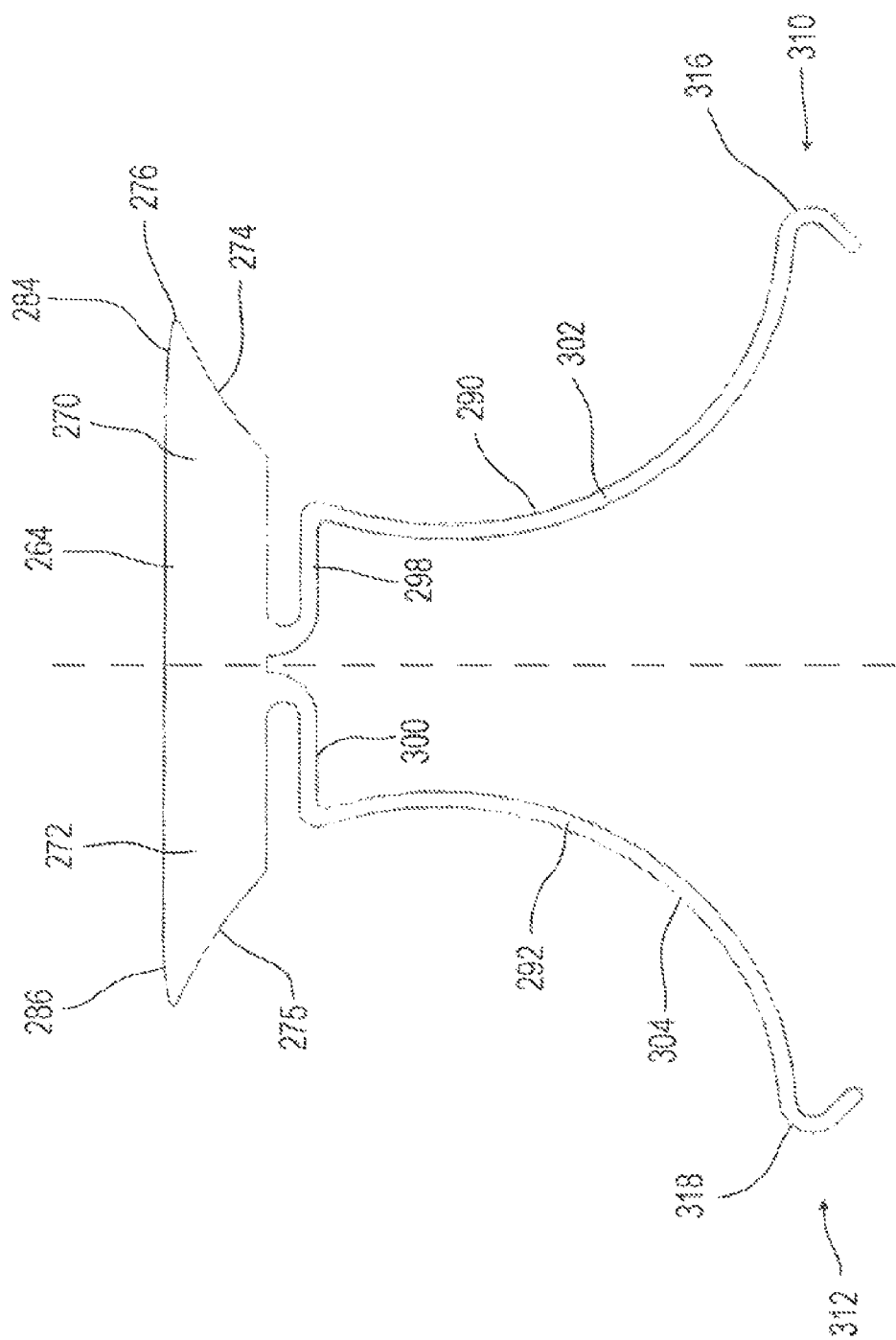
FIG. 15 is an elevational view of the transfer guard member of FIG. 14.

As shown in FIGS. 14 and 15, the body 260 has a pair of resilient legs 290, 292 that are connected to and extend initially downwardly from a central portion of an underside 296 of the bridge portion 264. Each leg 290, 292 then includes a longitudinally extending portion 298, 300 that is offset from the underside 296 of bridge portion 264 and extends towards the outboard portions 270, 272. These portions 298, 300 are generally parallel to the upper surface 265.

Although the legs 290, 292 are connected to the bridge portion 264 near the center, they could be connected at other portions of underside 296 of the bridge portion 264. Further, the longitudinally extending portions 298, 300 could be omitted such that extended arcuate portions 302, 304 of the legs 290, 292 could be directly connected to the bridge portion 264, similarly to the embodiment shown in FIGS. 19-23. However, the configuration shown provides additional flexibility to the legs 290, 292 that may be desirable for many applications.

Figure 16:
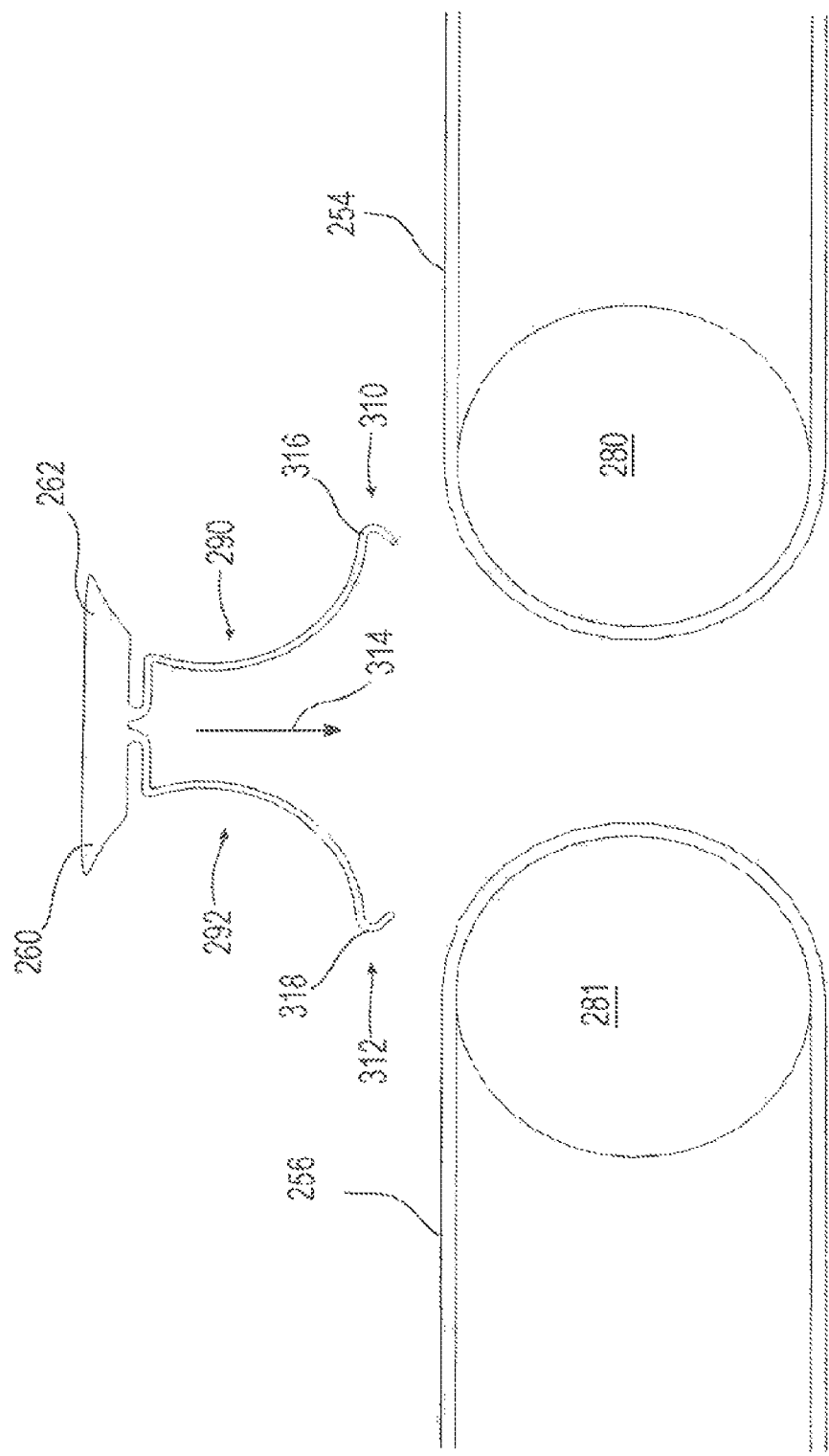
FIG. 16 is an elevational view of the transfer guard member of FIG. 14 prior to installation between two conveyor belts with the resilient legs in an expanded configuration.
Figure 17:
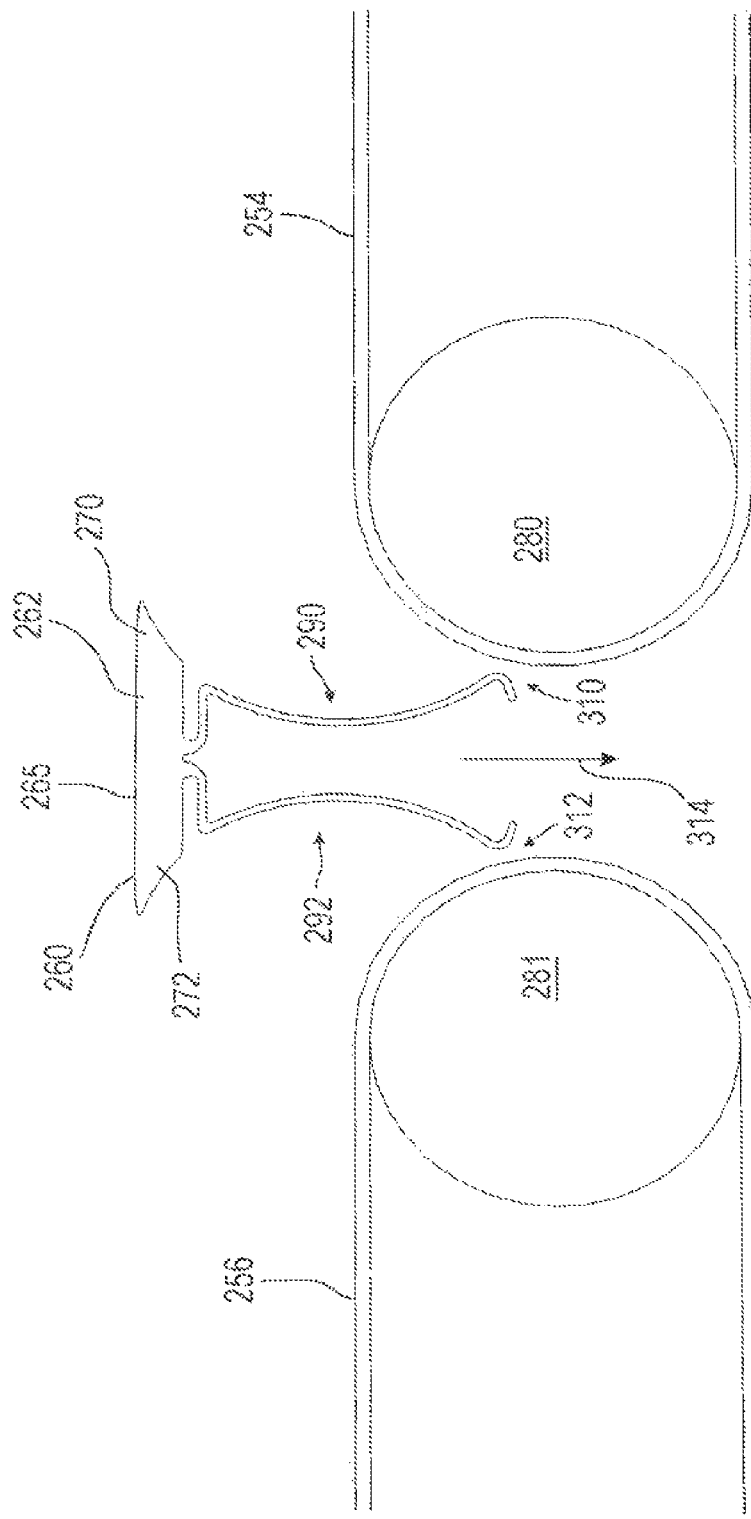
FIG. 17 is an elevational view of the transfer guard member of FIG. 16 with the resilient legs being compressed for being inserted between the two conveyor belts.

With reference to FIGS. 16-18, a process of installing the transfer guard member 260 into the gap 252 between the conveyor belts 254, 256 is shown. In FIG. 16, the legs 290, 292 have an initial, undeflected configuration with distal end portions 310, 312 thereof spaced apart from each other. A user urges the legs 290, 292 together to shift the legs 290, 292 into an insertion configuration and then advances the transfer guard member 260 in direction 314 into the gap 252, as shown in FIG. 17. The user presses downward on the upper surface 265 and seats the upstream and downstream outboard portions 270, 272 against the conveyor belts 254, 256. The legs 290, 292 expand apart and resilient bias contact portions 316, 318 thereof against the conveyor belts 254, 256 below the equators of the pulleys 280, 281, as shown in FIG. 18.

As shown in FIG. 14, the bridge portion 264 may include a laterally extending throughbore 320 that extends between opposite lateral sides 322, 324 for use with one or more sensors for detecting when one of the transfer guard members 260 is out of alignment or has been ejected from the gap 252. Sensors could include, without limitation, a wire, contact, or a photo eye. It will be appreciated that the other transfer guard members described herein could include a throughbore or other structure for being sensed sensors to detect misalignment or removal of the transfer guard members.

With reference to FIGS. 19-23, a transfer guard system 350 is provided that includes one or more transfer guard members 352 with a bridge portion 354 and a pair of resilient legs 362, 364. The transfer guard members 352 are similar to the transfer guard members 260 discussed above such that difference between the two will be highlighted. For example, the bridge portion 354 is identical to the bridge portion 264, except for an actuator such as a threaded fastener 358 (see FIG. 22) that extends through an opening 360 in the bridge portion 354 for adjusting the shape or size of the legs 362, 364. Description of various identical portions of the bridge portions 264, 354 are omitted for the sake of brevity.

Figure 20:
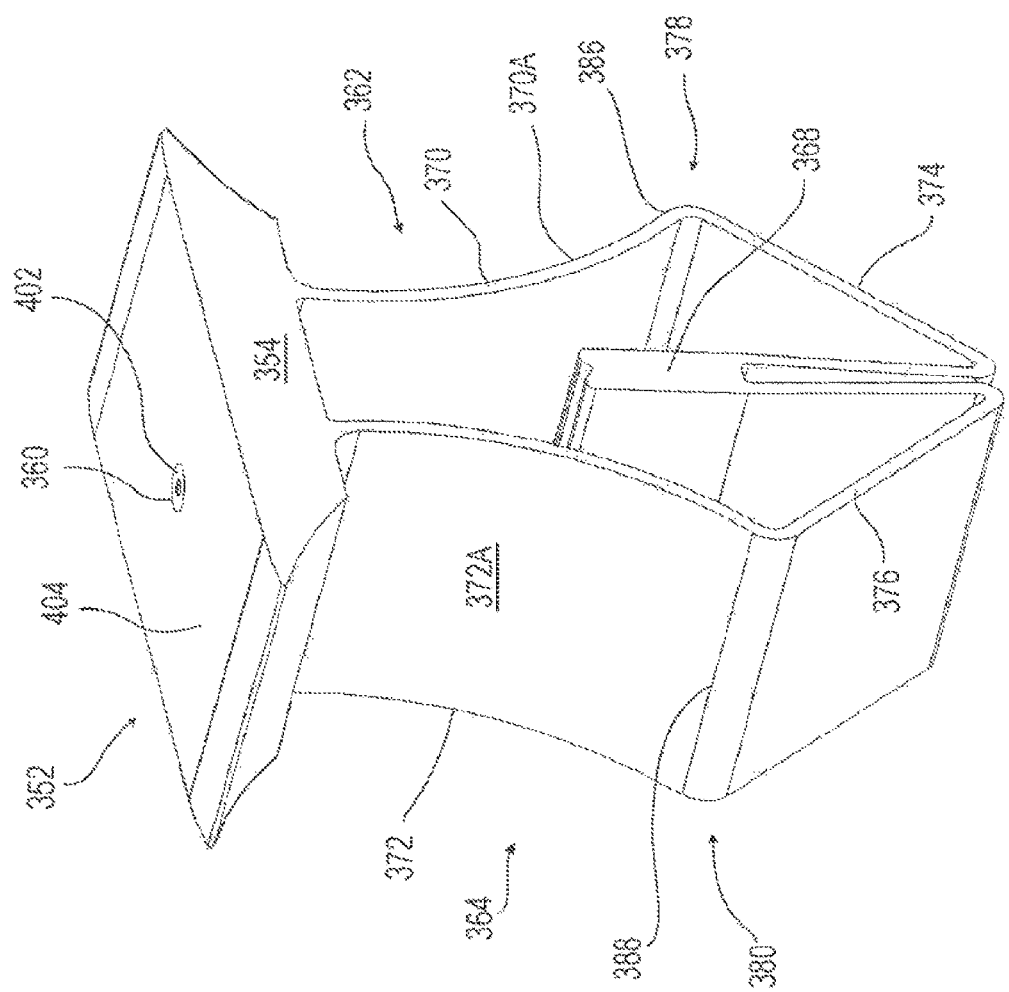
FIG. 20 is a perspective view of a single transfer guard member of the transfer guard system of FIG. 19 showing an upper bridge portion and an expandable anchor member.
Figure 21:
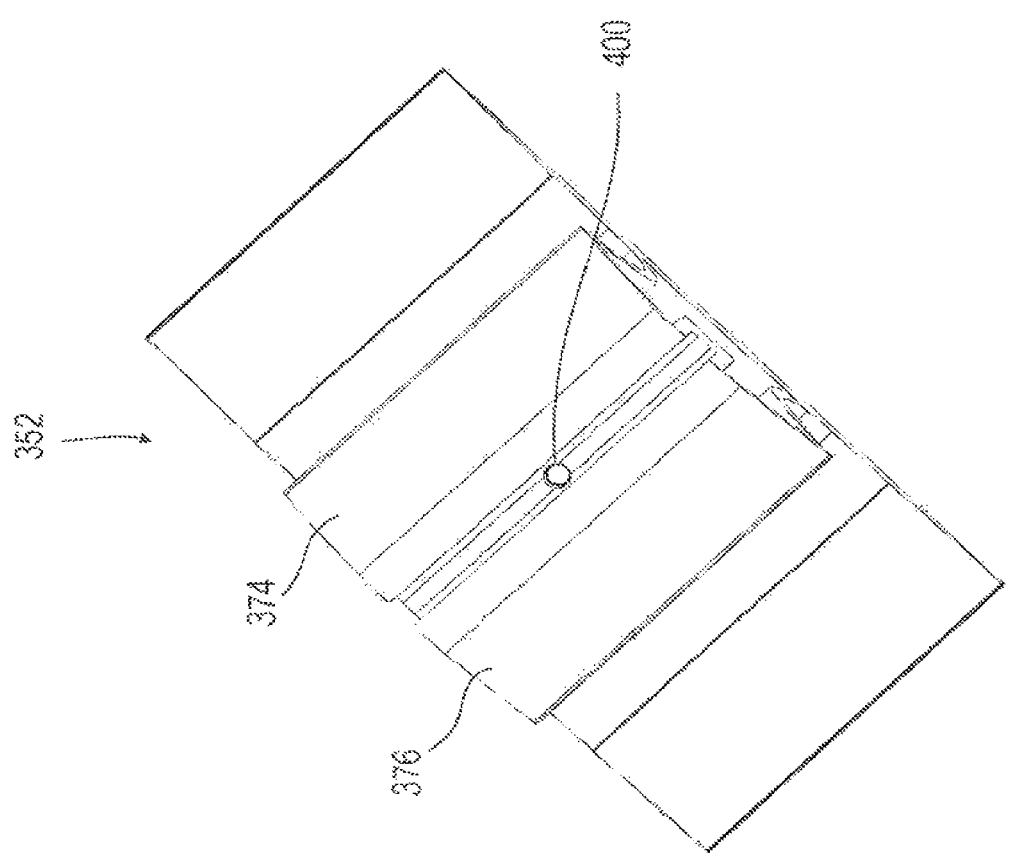
FIG. 21 is a perspective view of the underside of the transfer guard of FIG. 20.
Figure 22:
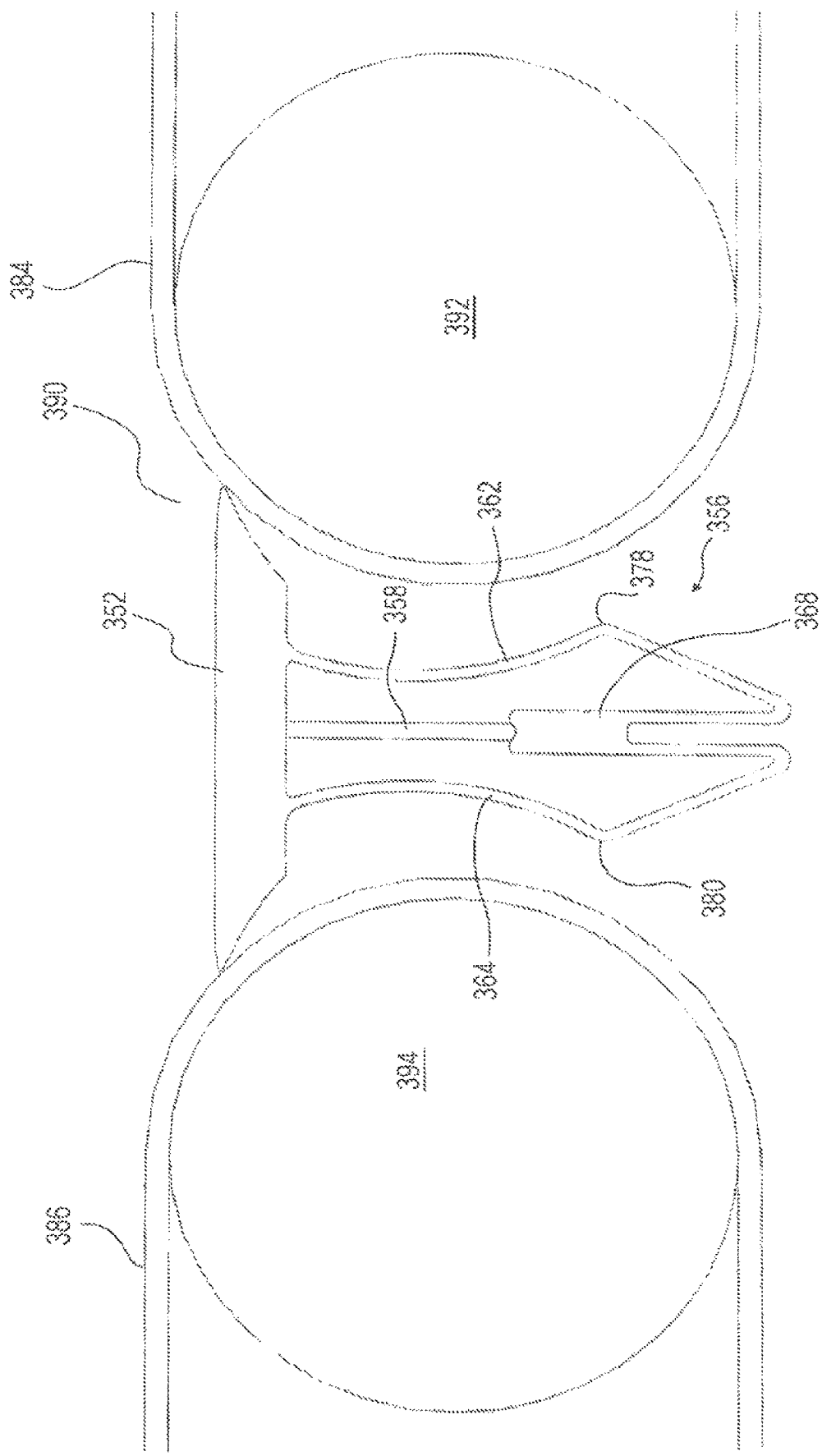
FIG. 22 is an elevational view of the transfer guard member of FIG. 20 installed between two conveyor belts with the expandable anchor member in an unexpanded configuration.

As shown in FIGS. 20 and 22, the legs 362, 364 are interconnected at their ends with an actuator engagement portion 368. The resilient legs 362, 364 include arcuate portions 370, 372 that extend generally downward and away from each other. The legs 362, 364 then turn back inwards toward one another along inwardly extending portions 374, 376. The intersection between the arcuate portions 370, 372 and inwardly extending portions 374, 376 form protruding abutment portions 378, 380 that are configured to engage with the adjacent belts 382, 384 at contact surfaces 386, 388 during normal operation. The arcuate portions 370, 372 may be sized and configured such that the outer facing surfaces 370A, 372A do not engage with belts 382, 384 during normal operation, but upon impact of an object with the bridge portion 354, the outer facing surfaces 370A, 372A may be urged into engagement with the adjacent belt 382, 384 and provide support to the bridge portion 354 to help absorb the impact and prevent expulsion of the transfer guard member 352.

The legs 362, 364 are configured to provide the small contact surfaces 386, 388 that are biased against adjacent belts 382, 384 with sufficient force to resist the tendency of the bridge portion 354 to rotate due to engagement with the forces exerted by the adjacent belts 382, 384 and to keep the transfer guard member 352 from unnecessarily being dislodged from a gap 390 between pulleys 392, 394. At the same time, if the contact surfaces 386, 388 of the legs 362, 364 are too large or are biased against the adjacent belts 382, 384 with too much force, the friction generated can cause premature wear on the legs 362, 364 and the belts 382, 384, and may also cause undesirable chattering.

At the distal extent of the inwardly extending portions 374, 376, the legs 362, 364 turn upwardly towards the bridge portion 354 and extend in between the arcuate portions 370, 372 and inwardly extending portions 374, 376, and then terminate in a single actuator engagement portion 368, such that the legs 362, 364 are interconnected. The actuator engagement portion 368 includes a vertically oriented throughbore 400 (shown in FIG. 21) into which the threaded fastener 358 extends. The throughbore 400 may be sized to receive a nut for threadingly engaging with the threaded fastener 358, or the throughbore 400 itself may be threaded. The threaded fastener 358 includes a head portion 402 with a flat top that is rotatably disposed in the opening 360 that extends through the bridge portion 354 and is coaxial with throughbore 400. The fastener head portion 402 lies flush with or recessed below an upper surface 404 of the bridge portion 354 so as to not interfere with objects being conveyed across the bridge surface 404.

Figure 23:
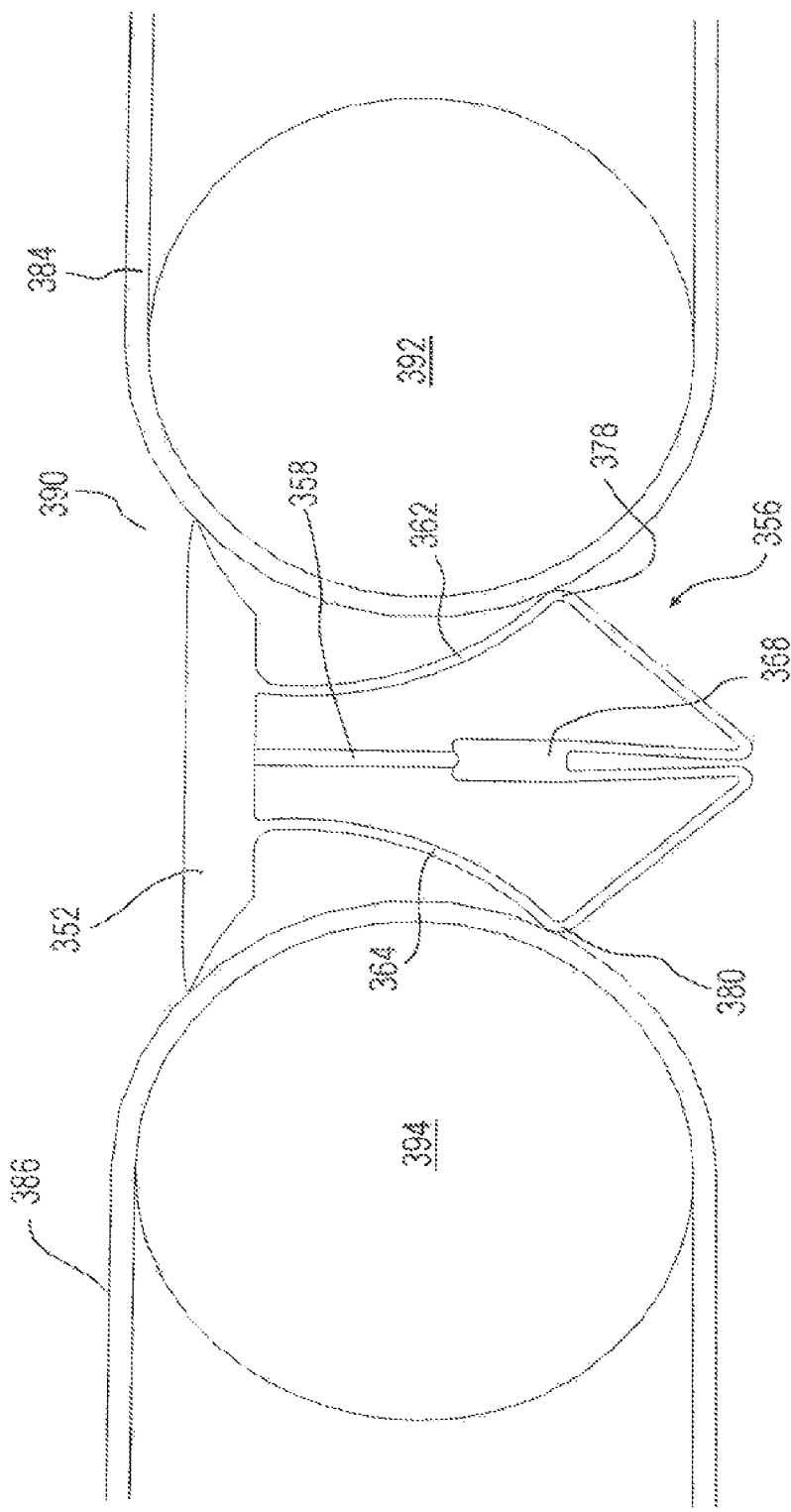
FIG. 23 is an elevational view of the transfer guard member of FIG. 22 with the expandable anchor member in an expanded configuration.

When the fastener 358 is rotated clockwise by a driver, the actuator engagement portion 368 is drawn upwards due to the threaded engagement with the fastener. Due to the resilient nature of the material of the legs 362, 364, pulling the actuator engagement portion 368 upwardly causes the protruding abutment portions 378, 380 to be projected outwardly to expand the size of the legs 362, 364 along the longitudinal dimension of the bridge portion 354. FIGS. 22 and 23 demonstrate the legs 362, 364 in a first unexpanded orientation (FIG. 22) and an expanded orientation (FIG. 23), wherein the protruding abutment portions 378, 380 have been expanded until they are in engagement with the adjacent belts 384, 386. With this configuration, the user may choose the amount biasing force applied by the protruding abutment portions 378, 380 on the belts 384, 386. This adjustability is advantageous for fine tuning the transfer guard 352 to its environment. For example, if more stability is required, the user may expand the legs 362, 364 to exert more force on the adjacent belts 384, 386. If stability is less of a concern, the user may adjust the legs 362, 364 to exert a relatively small amount of pressure on the adjacent belts to reduce wear on the abutment portions 378, 380.

The transfer guard member 352 may be configured to interact with a position sensor to provide a signal when one or more of the members 352 are out of position. For example, a throughbore may be provided through the body of the bridge portion 354 similar to the one shown in FIG. 14 for interacting with a sensor. However, the throughbore may be positioned off-center to accommodate the fastener 358. Known sensors, such as contactors, wires, photoelectric eyes, etc., may be used for this purpose.

The transfer guard members 12, 150, 260, and 352 advantageously are modular and therefore may be used in combination to span the gap along the entire lateral width of a conveyor system or adjacent conveyor systems. In addition, if one of the plurality of the transfer guard members becomes damaged or worn, it may be replaced without needing to replace or disturb the other transfer guard members. In another form, a transfer guard system utilizing the transfer guard members 12, 150, 260, 352 may have a single, elongated transfer guard member 12, 150, 260, 352 bridging the gap between the conveying surfaces rather than a plurality of transfer guard members.

Another advantage of the free-floating transfer guard members 12, 150, 260, 352 is their ease of installment. The floating transfer guard members are self-supporting, and need no additional structural supports to be bought or fabricated for their installment. Further, no tools (other than a driver for the embodiment shown in FIGS. 19-23) are needed for installation. In addition, if the adjacent pulleys are crowned, no modification of the transfer guard members may be required, as the transfer guard members simply will follow the curvature of the pulleys. This eliminates the need for a curved support bar or a custom-made curved bridge portion.

Another transfer guard system 450 in accordance with the present invention is disclosed in FIGS. 24-36. The transfer guard system 450 includes several transfer guard members 452 (FIGS. 25-28) that extend across a laterally extending gap 454 between conveying surfaces, such as adjacent belts 456, 458. The transfer guard members 452 have attachment members 459 for forming detachable connections 462 with an elongate mounting member, such as a mounting bar 460, which is disposed in the gap 454. The detachable connections 462 and mounting bar 460 are similar to those described in U.S. Pat. No. 8,365,899, which is hereby incorporated by reference in its entirety. In this manner, should debris get stuck under one of the transfer guard members 452 and against the moving belt 456 and either hit the transfer guard member 452 or later be impacted by a conveyed item to generate a sufficient upward force, the transfer guard member 452 can detach from the mounting bar 460 via the detachable connection 462 therebetween immediately below an upper, transfer surface 464 of the transfer guard member 102.

Figure 24:
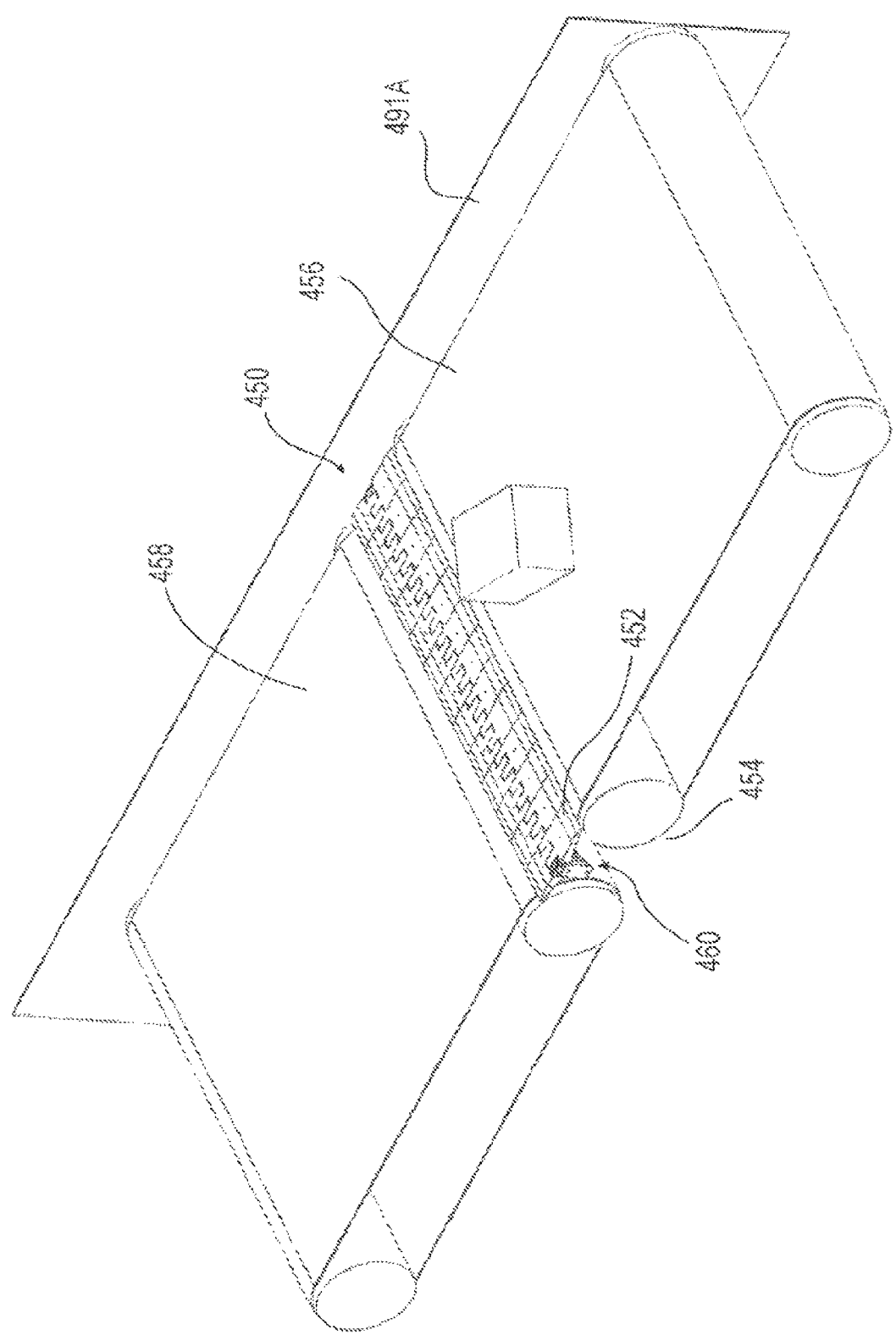
FIG. 24 is a perspective view of another transfer guard system showing a plurality of transfer guard members mounted in a gap between two conveyor belts.
Figure 25:
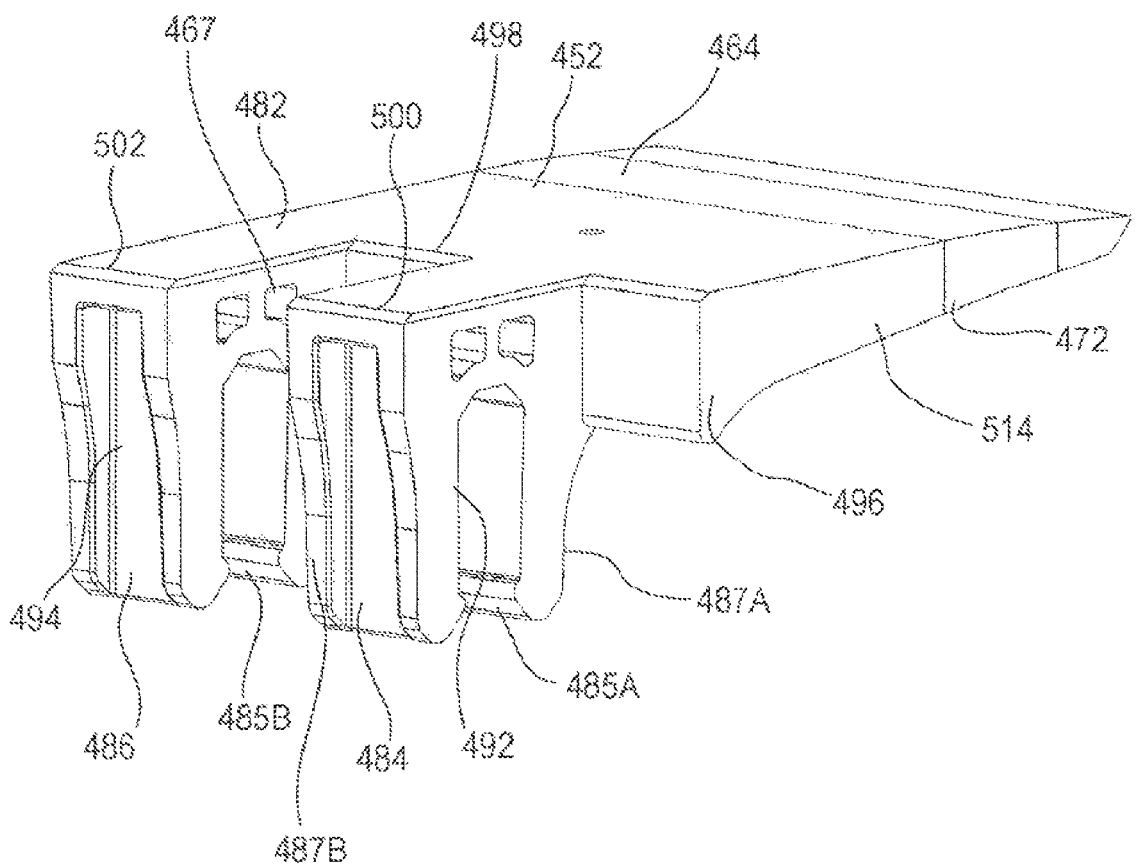
FIG. 25 is a perspective view of one of the transfer guard members of the transfer guard system of FIG. 24 showing spaced attachment members of the transfer guard member each having a pair of spaced legs for engaging a mounting bar.
Figure 27:
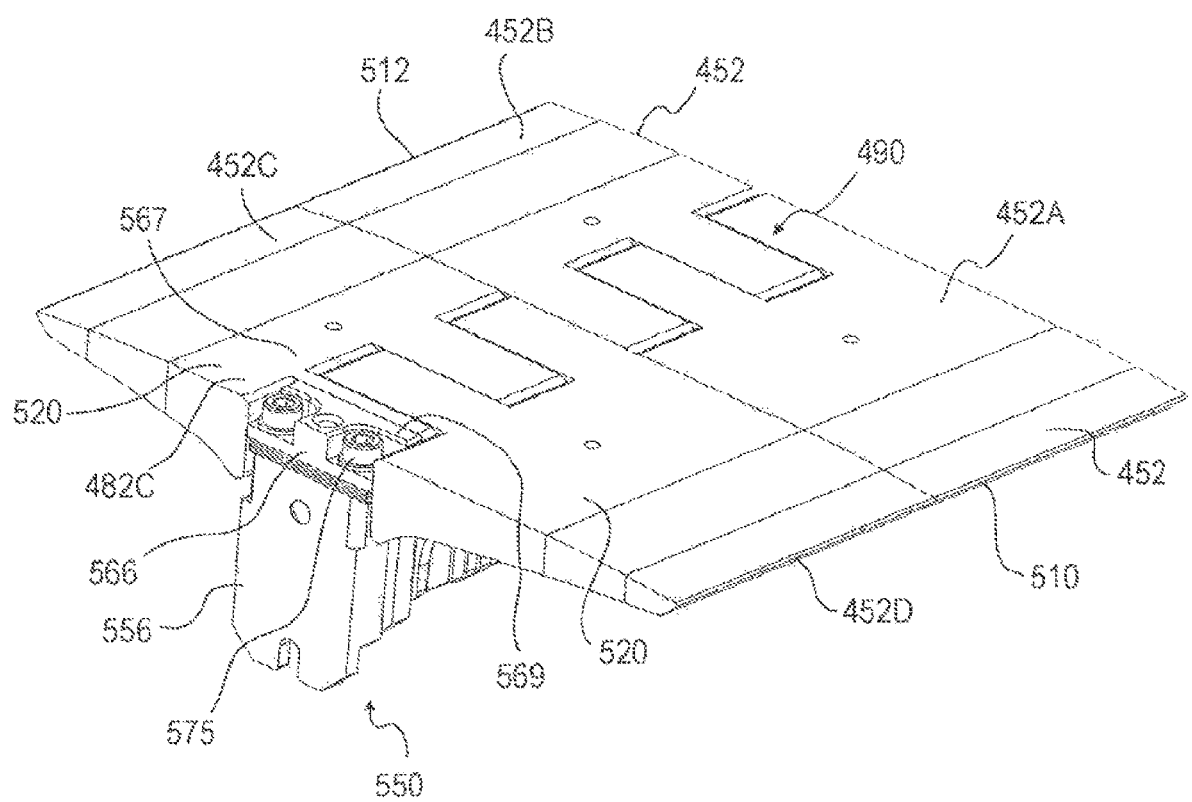
FIG. 27 is an enlarged, perspective view of a portion of the transfer guard system of FIG. 24 showing longitudinally aligned pairs of upstream and downstream transfer guard members with attachment members of each of the pairs of upstream and downstream transfer guard members having an interdigitated configuration.

As shown in FIGS. 24 and 25, the transfer guard members 452 each extend from the bar 460 to one of the belts 456, 458, such that two transfer guard members 452 are required to extend across the entire longitudinal gap. Each pair of transfer guard members 452 are longitudinally aligned, which as used herein refers to an alignment where at least a portion of the upstream and downstream transfer guard members 452 overlap along a longitudinal axis. For example, the entirety of the transfer guard members 452 are longitudinally aligned as shown in FIG. 27. As another example, FIG. 28A shows another embodiment of transfer guard members 431 that include upstream and downstream transfer guard members 431A, 431B that have less than the entire upstream transfer guard member 431A longitudinally aligned with the downstream transfer guard member 431B when the transfer guard members 431A, 431B are mounted to a mounting bar. Each transfer guard member 431 has an attachment member 433 with a single recess 435 and a pair of bridge portions 437 extending along opposite lateral sides of the recess 435. When the transfer guard members 431 are mounted to a mounting bar, the recess 435 of each transfer guard member 431 receives one bridge portion 437 of two adjacent transfer guard members 431. Further, lateral sides 439A, 439B of the upstream and downstream transfer guard members 431A, 431B are laterally offset from one another. With reference to FIG. 28B, another embodiment of transfer guard members 441 are provided including upstream and downstream transfer guard members 441A, 441B that have less than the entire upstream transfer guard member 441A longitudinally aligned with the downstream transfer guard member 441B. Each transfer guard member 441 has an attachment member 443 with a single bridge portion 445 and a pair of recesses 445, 447. When the transfer guard members 441 are mounted to a mounting bar, the bridge portion 445 of each transfer guard member 441 is positioned in the recesses 445, 447 of two adjacent transfer guard members 441. As shown in FIGS. 27, 28A, and 28B, the transfer guard members 452, 431, and 441 are all configured to mounted end-to-end on a mounting bar and form a non-linear gap or seam therebetween. Further, it will be appreciated that the upstream and downstream transfer guard members 452, 431, and 441 should be considered to be longitudinally aligned within the context of this application.

Returning to FIGS. 24 and 25, each transfer guard member 452 has a body 470 including the upper surface 464 for longitudinally spanning a portion of the gap 454. The bodies 470 of the transfer guard members 452 may be produced in various standard sizes and used in combinations to span various different size gaps. For example and with reference to FIG. 40, four different sized transfer guard members 610A, 610B, 610C, and 610D, of an alternative embodiment are shown mounted on a single bar member 608. Accordingly, nine different sized gaps between conveyors can be spanned with four different sized transfer guard members 610A, 610B, 610C, and 610D. For example, to span a gap of six inches, two three-inch (nominal) members 610B would be used. To span a gap of eight inches, a three-inch member 610B and a five-inch member 610C would be used or, alternatively, a two-inch member 610A and a six-inch member 610D could be used. It will be appreciated that the transfer guard members 452 may be provided in the two, three, five, and six inch lengths as in FIG. 40 or other lengths.

The modularity provided by the transfer guard member 452 allows for variation in the position where the mounting bar 460 can be placed, as shown in FIGS. 24 and 24A, which show a 9-inch gap with a three-inch member 452B and a six-inch member 452A. Specifically, the bar 460 will be placed closer to the conveyer belt 458 than the conveyor belt 456. In addition, given that a small number of different size members may be used to span a variety of gap sizes and configurations, production costs are lower than if a unique sized member was made for each gap size. In addition, it becomes more cost-effective for a user to keep stock of various transfer guard member sizes to quickly replace members that wear out or become damaged. Regardless of longitudinal length, the transfer guard members 452 can be positioned on the mounting bar 460 so that there are no lateral gaps between adjacent transfer guard members 452, with adjacent lateral side 472 thereof abutting one another.

One of ordinary skill would understand that the sizes described are merely examples, and other size members could be used to span different size gaps. In addition, the transfer guard members 452 are configured to be easily modified to span gaps that fall in between the sizes of the transfer guard members, i.e. a 7.5-inch gap could be spanned by a five-inch member and a three-inch member by shortening the length of one or both of the members as necessary. However, such modification may not be necessary in many cases, as the gap sizes between conveyor surfaces may vary at different elevations between the conveyor surfaces. For example, as shown in FIG. 24A, the space between the pulleys 476, 478 varies due to their arcuate profile, i.e., the gap is larger near the tops of the pulleys 476, 478 than it is at the middle between their centers. Accordingly, if the transfer guard members 452, are slightly too short, they may be mounted slightly lower in the gap 454 where the pulleys 476, 478 are closer together, and vice versa.

Turning to FIG. 25, the attachment member 459 of the transfer guard member includes an upper bridge portion 482 and two pairs of depending, resilient legs 484, 486 that can resiliently flex to form the detachable connection 462 with the mounting bar 460. The bridge portion 482 may have one or more through openings that increase the flexibility of the legs 484, 486. Further, the bridge portion 482, legs 484, 486, and the underside of the outboard portion 514 may have a webbed configuration that provides substantially uniform wall thickness of the body 470 which may be advantageous for certain manufacturing techniques, such as injection molding.

The pairs of legs 484, 486 includes outer legs 485A, 485B and inner legs 487A, 487B. The pairs of legs 484, 486 are spaced apart by the lateral width of one of the pairs of legs 484, 486, and the pair of legs 484 is offset from one side 472 of the transfer guard member 452 such that the pairs of legs 484, 486 of a second (i.e. downstream) transfer guard member 452B can be interdigitated in a zipper-like fashion with the legs pairs 484, 486 of the first (i.e. upstream) transfer guard member 452A, as shown in FIGS. 24 and 27. The interdigitated leg 484, 486 pairs of the end-to-end transfer guard members 452A, 452B provide a discontinuous transverse gap or seam 490 between the members 452A, 452B that is less likely to interfere with conveyed product than a continuous transverse seam between each pair of end-to-end transfer guard member 452. In particular, any laterally-oriented gaps that might form between outer facing surfaces 492, 494 of the leg pairs 484, 486 of one of the end-to-end transfer guard members 452 and corresponding flat surface portions 496, 498 adjacent the leg pairs 484, 486 of the other of the end-to-end transfer guard member 452 would be longitudinally spaced apart from one another so as to not result in a single gap that spans across the lateral width of the transfer guard system 450 that might snag small products or collect debris.

Another advantage of the offset pairs of legs 484, 486 is that the two transfer guard members 452A, 452B may be mounted to the bar 460 end-to-end such that the lateral sides 472 are aligned. Other configurations of legs 484, 486 may be used, including using a single pair legs offset on one side of the transfer guard member 452, or spaced apart leg pairs located at both sides 472 such that the mating transfer guard members 452 would have a centrally located pair of legs to be located between the spaced-apart legs of the other transfer guard member 452. Alternatively, the transfer guard member 102 could have more than two pairs of spaced-apart legs 484, 486.

Each leg pair 484, 486 includes a protrusion 500, 502 on the outer facing surface 492, 494 of the outer legs 485A, 485B as shown in FIG. 25. The protrusions 500, 502 engage with corresponding flat surface portions 496, 498 adjacent the pairs of legs 484, 486 of the opposite transfer guard member 452 with an interference fit. The interference fit creates a clash between the transfer guard members 452A, 452B that keeps gaps from forming between the outer facing surfaces 492, 494 of the outer legs 485A, 485B and the flat surface portions 496, 498. In addition, the interference fit also helps to bias outer edges 510, 512 of the transfer guard members 452A, 452B toward the conveying surfaces and helps to keep the edges 510, 512 from being knocked upwardly and away from the conveying surfaces when the edges 510, 512 experience impacts.

As shown in FIG. 24A, when the transfer guard members 452 are releasably secured to the mounting bar 460, the upstream transfer guard member 452A has an upstream outboard portion 514A extending outward from the bridge portion 482A thereof and the downstream transfer guard member 452B has a downstream outboard portion 514B extending outward from the bridge portion 482B thereof. With respect to FIG. 26, the transfer surfaces of each of the transfer guard members 452A, 452B include a flat surface portion 518 of the bridge portion 482, a substantially flat surface portion 520 of the outboard portion 514, and a downwardly inclined tapered surface portion 522 of the outboard portion 514 tapering toward the outer edge 510. In this manner, the outboard portions 514A, 514B extend into close proximity with the adjacent belts 456, 458 so the edge 510A of the transfer guard member 452A is an upstream receiving edge closely adjacent the moving belt 456 and the edge 510B is a downstream discharge edge closely adjacent the moving belt 458, as shown in FIG. 24A.

Figure 26:
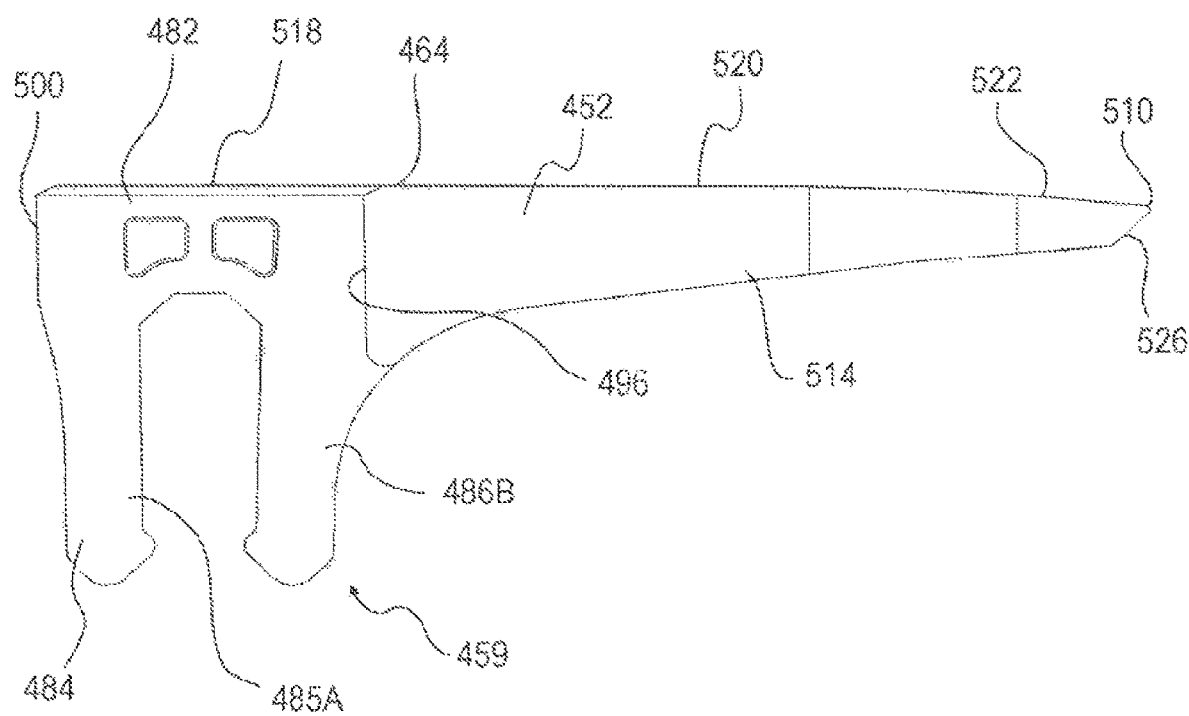
FIG. 26 is a side elevational view of the transfer guard member of FIG. 25 showing an outboard portion having a downwardly tapering upper surface extending toward a tip of the outboard portion.

As best seen in FIGS. 24A and 26, the outboard portions 514 of the transfer guard members 452A, 452B have a lower inclined surface 526 that tapers downstream away and down from the thin upstream edge 510 so as to generally follow the belt 456, 458 as it travels down about the corresponding pulley 476, 478. Debris that gets stuck may get caught between the belt 456, 458 extending about the pulley 476, 478 and the lower inclined surface 526. Alternatively, the lower inclined surface 526 could have other constructions, such as an arcuate configuration so as to even more closely follow the path of the belts 456, 458 about the pulleys 476, 478. So configured, the outboard portions 514 have a generally wedge-shaped configuration. Naturally, other configurations of the outboard portions are possible, and may be adapted for spanning gaps between various different types and orientations of adjacent conveying surfaces.

Figure 28:
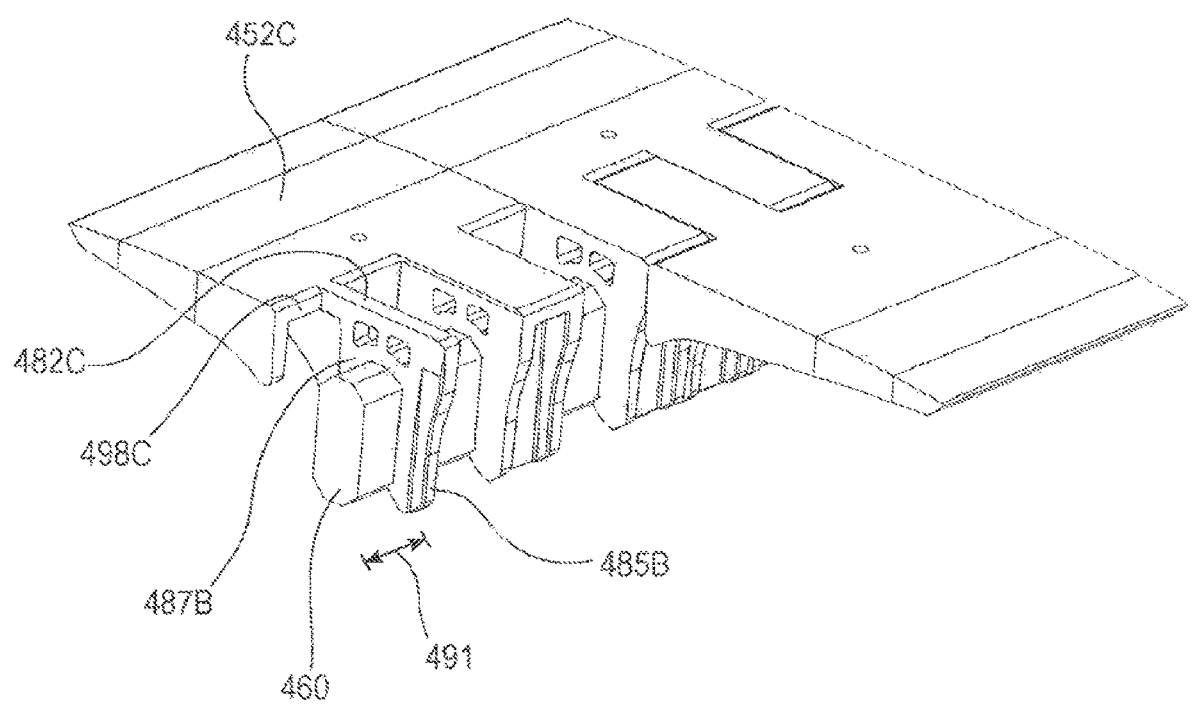
FIG. 28 is a perspective view similar to FIG. 27 showing a mount of the transfer guard system and one of the transfer guard members removed to show a narrowed attachment member of the end transfer guard member.
Figure 28A:
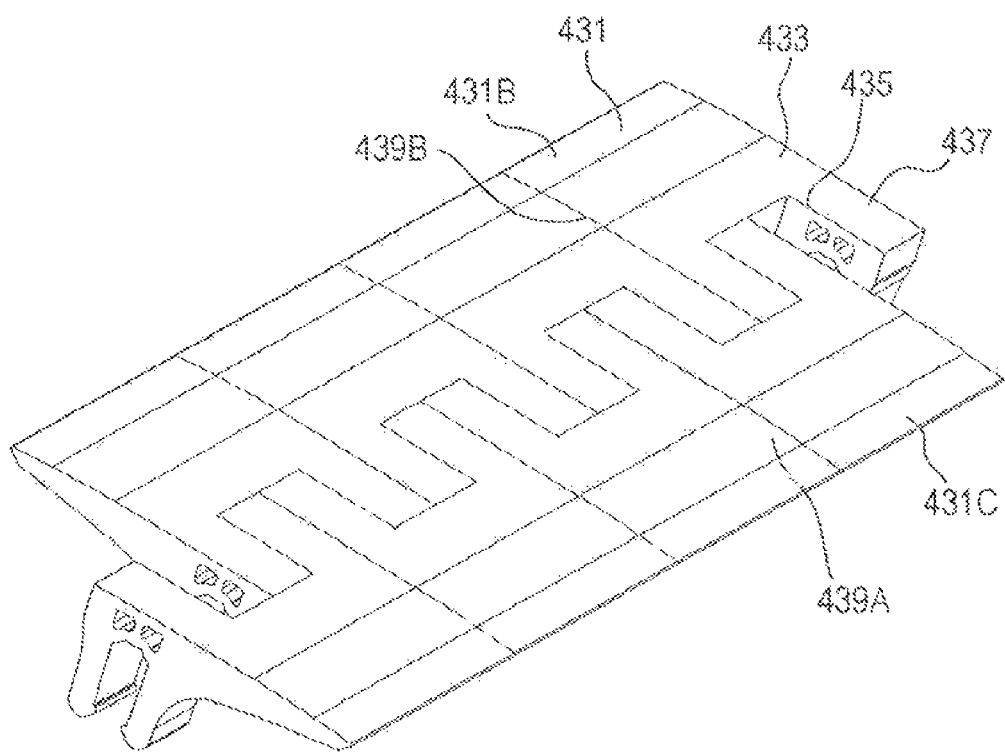
FIG. 28A is a perspective view of transfer guard members having alternative attachment members.
Figure 28B:
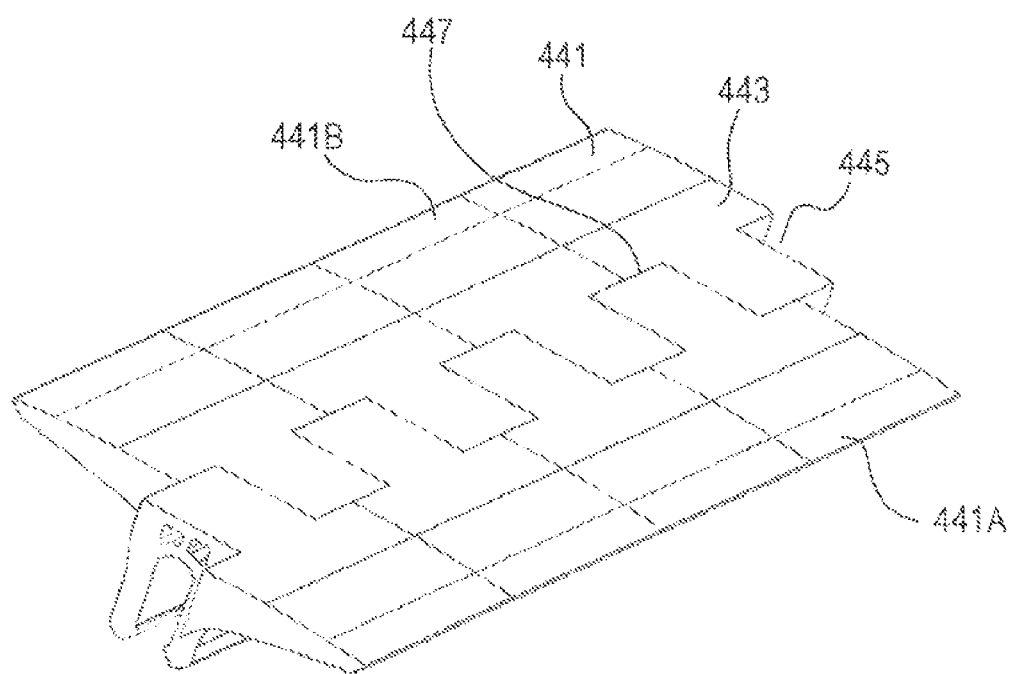
FIG. 28B is a perspective view of transfer guard members having alternative attachment members.
Figure 33:
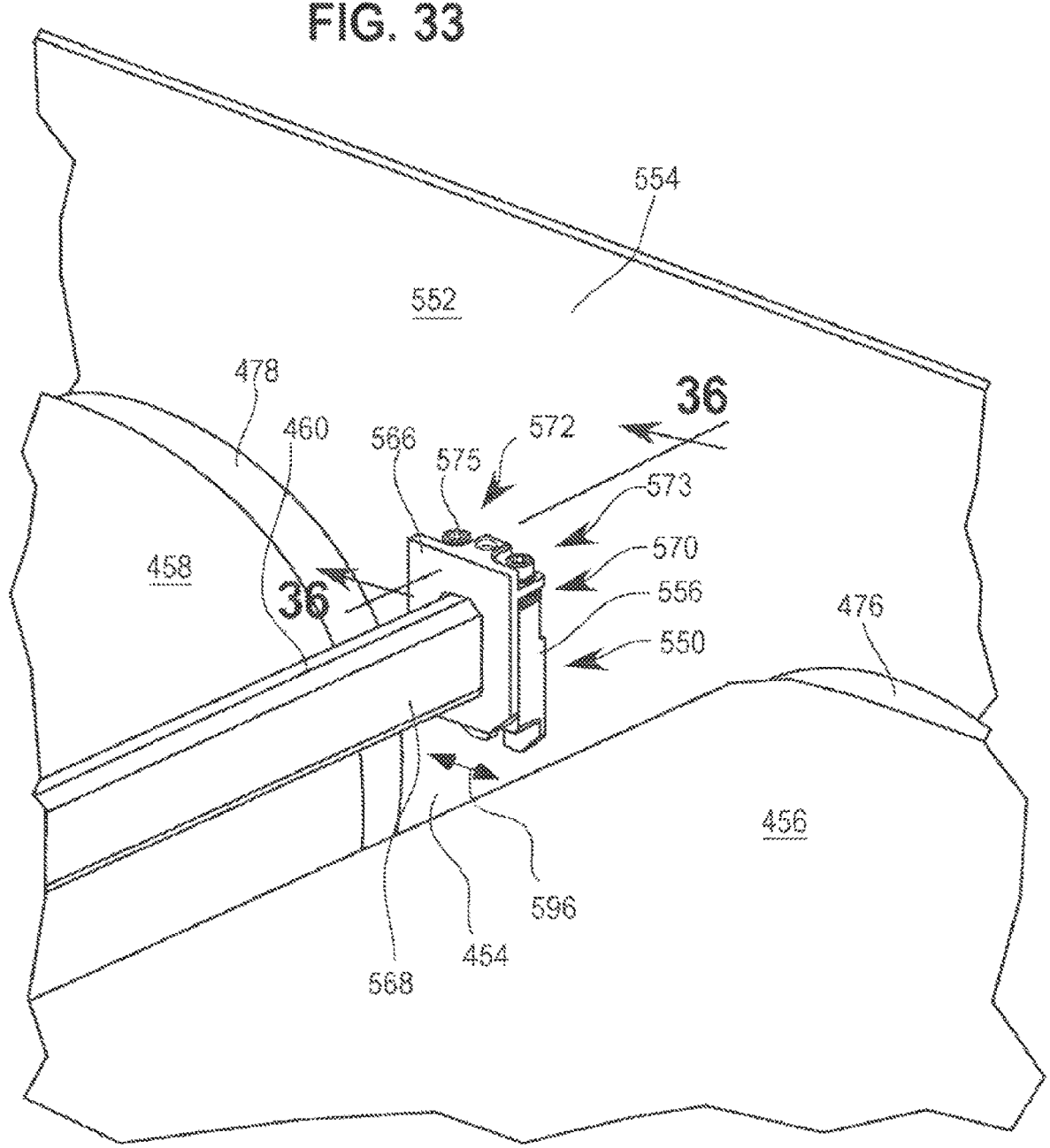
FIG. 33 is a perspective view of the mounting bar and one of the mounts of the transfer guard system of FIG. 24 showing the mount securing the mounting bar to a skirt adjacent the conveyor belts.

With reference to FIGS. 27 and 28, the transfer guard system 450 includes a pair of mounts 550 each having a front plate 566, which are discussed in greater detail below, for installing the mounting bar 460 in the gap 454 and the transfer guard members 452 includes an end transfer guard member 452C that receives the mount 550 and maintains the mount 550 within the profile of the transfer guard members 452. With reference to FIG. 28, the end transfer guard member 452C has a narrowed bridge portion 482C with correspondingly narrowed legs 485B, 487B. The narrowed bridge portion 482C and legs 485B, 487B provide a third recess 498C of the end transfer guard member 452C. The third recess 498C provides a lateral space 491 along the mounting bar 460 for the mount 550 which permits the mounts 550 of the transfer guard system 450 to generally be laterally positioned inward from the outer lateral sides 472 of the outermost transfer guard members 452C, 452D. Because the mounts 550 are positioned laterally inward from the outer lateral sides 472 of the outermost transfer guard members 452C, 452D, the outer lateral sides 472 of the outermost transfer guard members 452C, 452D can be butted up against or adjacent to skirts 491A (see FIG. 24) or other structures on opposite sides of the conveyor belts 456, 458 to minimize the longitudinal gaps between the outer lateral sides of the conveyor belts 456, 458 and the skirts 491A which could catch debris or conveyed goods.

As shown in FIG. 27, the mount front plate 566 has a raised portion 567 with an upper transfer surface 569 slightly below the flat surface portions 520 of the outermost transfer guard members 452C, 452D with the transfer guard members 452C, 452D fixed to the mounting bar 460. Conveyed objects therefore have an uninterrupted travel path along the flat surface portions 520 and the upper transfer surface 569 therebetween, which reduces catching of objects on the transfer guard system 450. Further, each mount 550 has fasteners, such as bolts 575, for releasably securing the front plate 566 to a rear plate 556 of the mount 550. The recess 482C of the end transfer guard member 452C permits the bolts 575 to be readily accessed by a user to release the front plates 566 from the rear plates 556 and remove the mounting bar 460, transfer guard members 452, and front plates 466 from the gap 455 such as for replacing one of the transfer guard members 452.

Turning to FIG. 29, the outboard portions 514 of the transfer guard members 452 are configured to encourage deflection of outboard portion 514 and avoid straight-on loading that could result in very little deflection of the outboard portion 514 and cause the edge 510 to damage the conveyor belt 456. The tapered surface portion 522 extends downwardly from the flat surface portion 520 and vertically offsets the edge 510 a distance 515 from an axis 517 extending along the flat surface portion 520. By vertically offsetting the edge 510 below the axis 517, the outboard portion 514 is more likely to bend downwardly in response to loading in direction 517A at the edge 510.

The process of one of the transfer guard members 452 contacting an imperfection, such as a damaged splice 519, of the conveyor belt 456 and being snapped off of the mounting bar 460 is discussed in greater detail with reference to FIGS. 29-32. Initially, the conveyor belt 456 is moving in direction 521 and brings the damaged fastener 519 into engagement with the edge 510 below the axis 530 as shown in FIG. 29. The damaged splice 519 continues to travel in direction 521 and begins to bend the outboard portion 514, as shown in FIG. 30. Continued bending of the outboard portion 514 causes the leg 487B to pull away from the mounting bar 460 although the leg 485B remains firmly engaged with the mounting bar 460, as shown in FIG. 31. The damaged splice 519 continues to move in direction 521 and pull the edge 510 downwardly, further bending the outboard portion 514 until a distal end 523 of the leg 485B disengages from the mounting bar 460. The released transfer guard member 452 may eject upward generally in direction 525 from the gap 454 or may fall downward through the gap 454 clear of the conveyor belt 456 rather than the edge 510 becoming wedged against the conveyor belt 456.

The transfer guard member 452 is made of a material that is sufficiently strong to resist loading from conveying surfaces and conveyed goods during normal operation. The transfer guard members 452 are also sufficiently resilient to permit the legs 484, 486 to deflect apart to snap onto the mounting bar 460 and snap off of the mounting bar 460 if a sufficiently high force is applied at the edge 510 without damaging the conveyor belt 456.

The transfer guard member 452 may be made of, for example, a polymer such as UHMW polyethylene or high-density polyethylene. The mounting bar 460 may be made of a material sufficiently rigid to withstand loading during conveyor operations, such as polymer or a metal, such a steel, fiberglass, and carbon fiber. The transfer guard member 452 may be integrally formed from a single material, or may be formed from separate components. For example, the attachment and outboard portions 459, 514 of the transfer guard member 452 may be made of separate materials and connected together using welding or fasteners.

With reference to FIGS. 33-36, the transfer guard system 450 includes one or more mounts 550 as mentioned above that permit easier installation of the mounting bar 460 in constrained environments, such as when the conveyor belts 456, 458 have skirts 552 with guide surfaces 554 thereof extending longitudinally along opposite lateral sides of the conveyor belts 456, 458 to direct conveyed objects. These constrained environments may be further limited by welds or structural members on outer surfaces of the skirts 552 that inhibit drilling through the skirts 552 to install the mounting bar 460. Further, the conveyor belts 456, 458 may have conveyor structure positioned below the gap that prevent access to the bottom of the gap 454. The mount 550 may be used to easily and quickly install the mounting bar 460 in the gap 454 despite these environment constraints.

Figure 34:
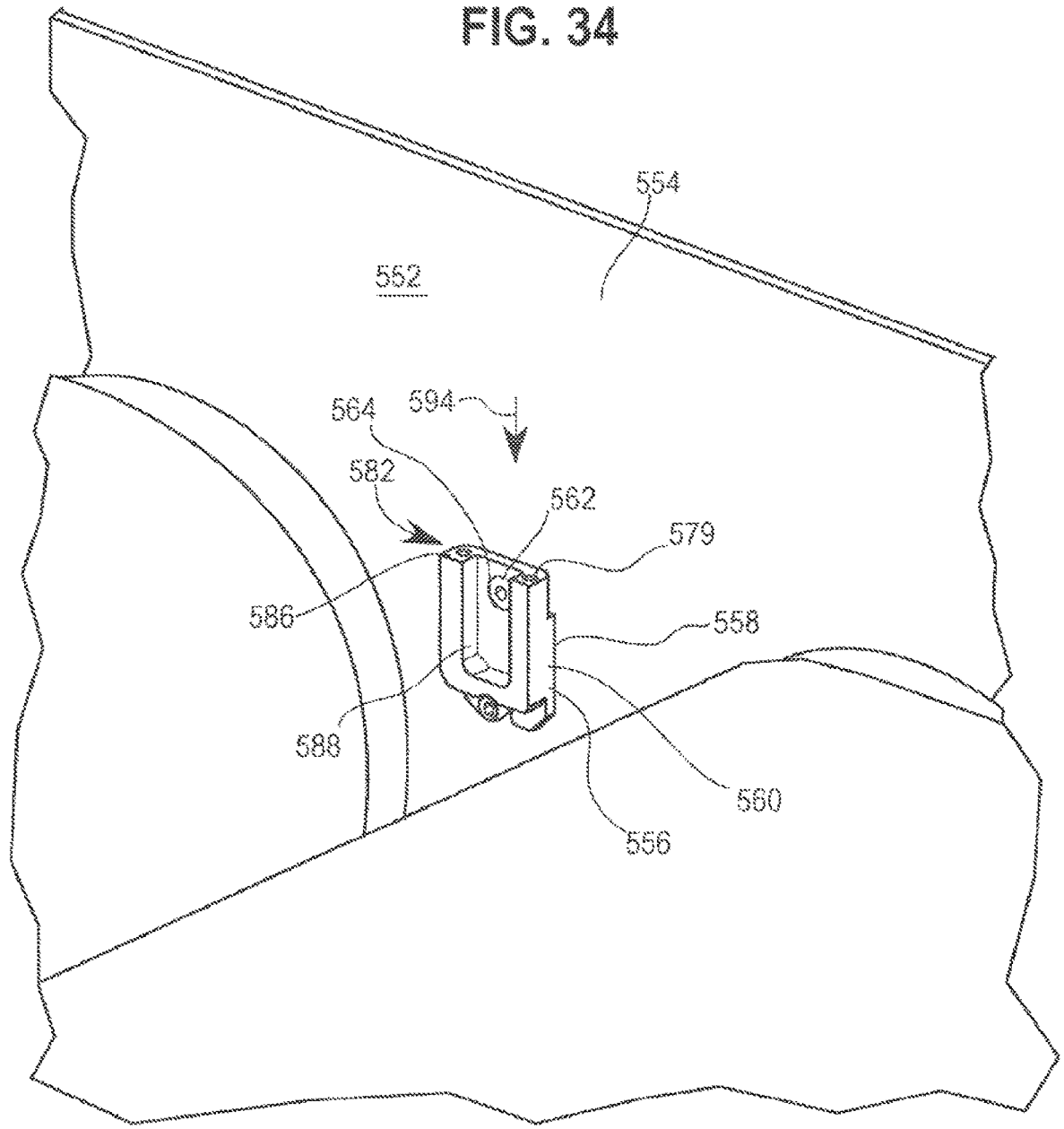
FIG. 34 is a perspective view similar to FIG. 33 showing a rear plate of the mount secured to the skirt.
Figure 36:
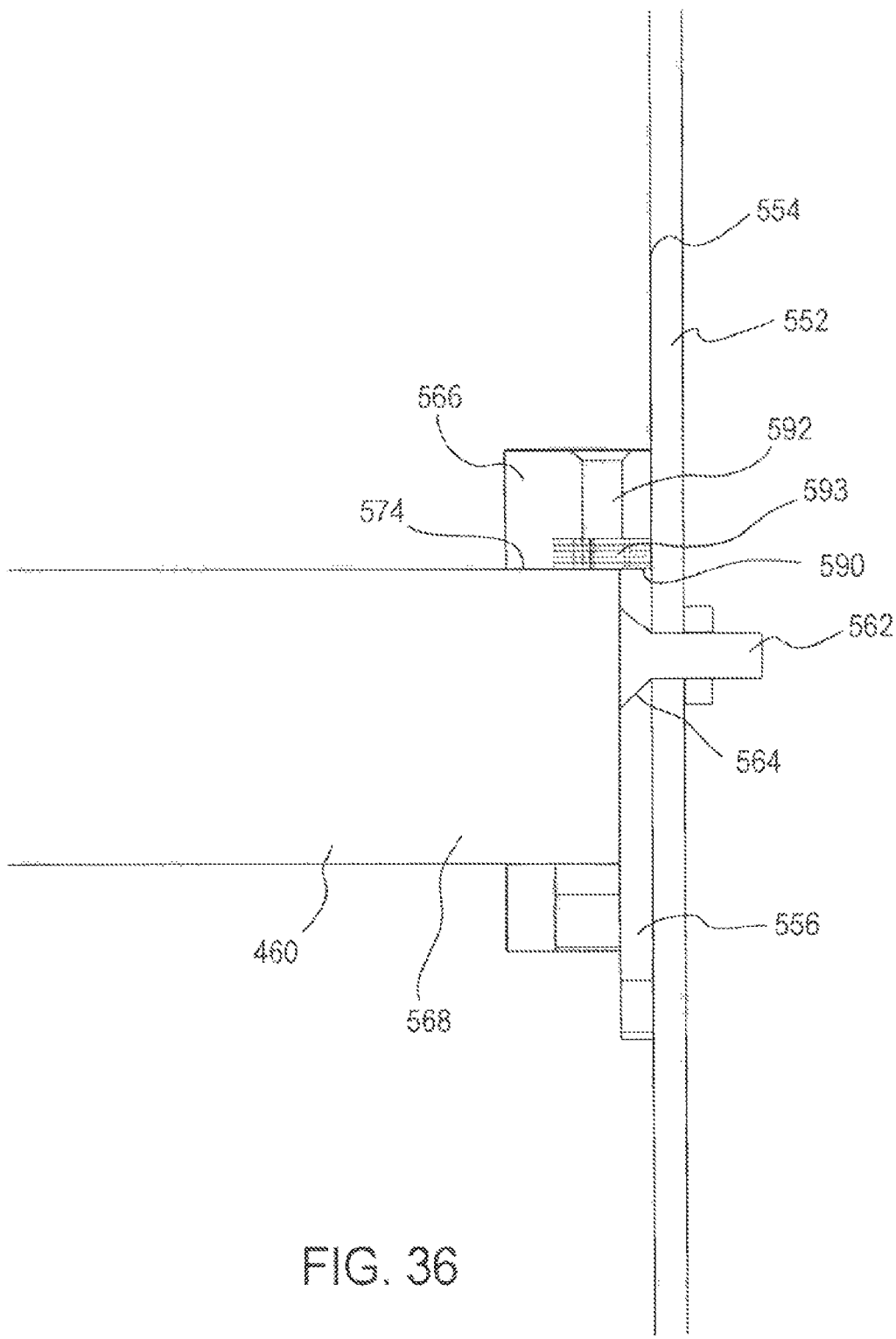
FIG. 36 is a cross-sectional view taken across line 36-36 in FIG. 33 showing the front plate securing the mounting bar to the rear plate, which is in turn fixed to the skirt.

The mount 550 includes a base portion, such as the rear plate 556, which can be fixed to the surface 554 such as by applying welds 558 at upstream and downstream sides 560 of the rear plate 556 and/or driving one or more fasteners 562 through one or more holes 564 in the rear plate 556 and into the skirt 552, as shown in FIGS. 34 and 36. The mount 550 also includes an end support portion, such as the front plate 566, for being connected to an end portion 568 of the mounting bar 460. The mount 550 has a height adjustment mechanism 570 for adjusting the vertical position of the mounting bar 460 in the gap 454 and a longitudinal adjustment mechanism 572 to adjust the longitudinal position of the mounting bar 460 in the gap 454. These mechanisms 570, 572 provide improved flexibility to customize the position of the mounting bar 460 and transfer guard members 452 within the gap 454, as discussed in greater detail below. The mount 550 also has a lock device 573 for securing the front plate 566 and mounting bar 460 supported therein to the rear plate 556 once the mounting bar 460 has been positioned in the desired location in the gap 454. In one form, the lock device 573 includes fasteners such as the bolts 575 that extend through elongated openings 577 of the front plate 566 and engage threaded bores 579 of the rear plate 556.

Figure 35:
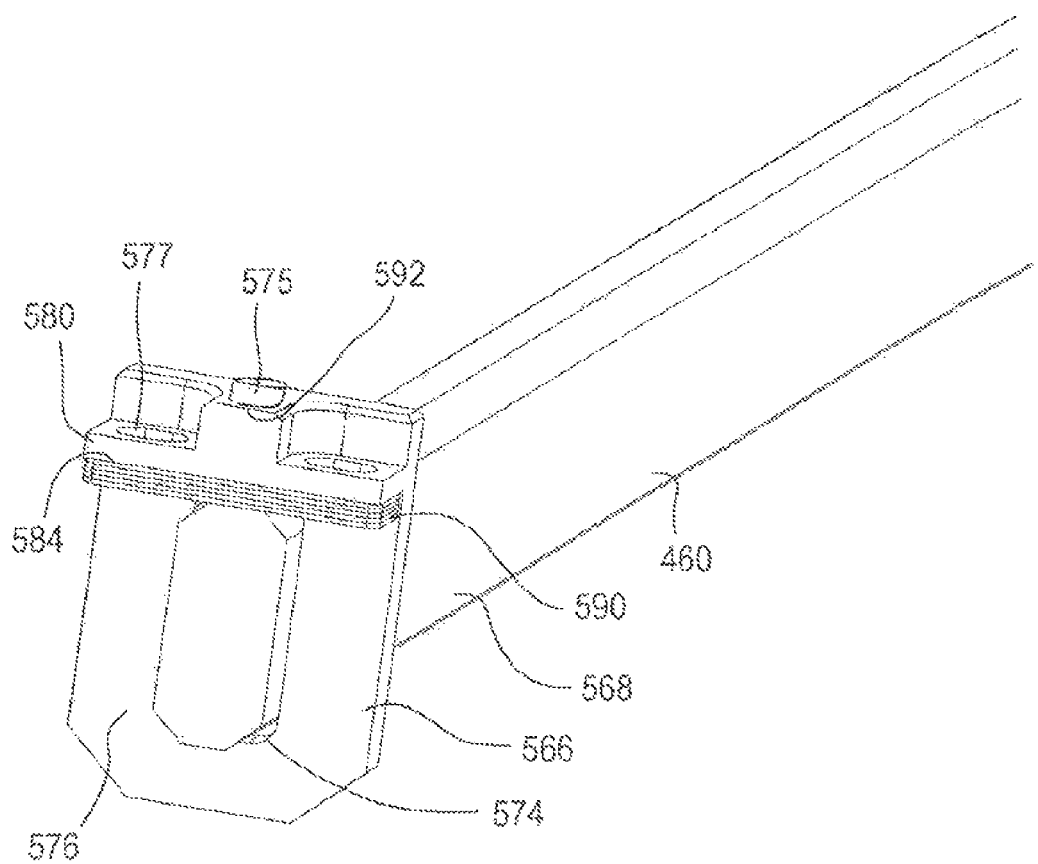
FIG. 35 is a perspective view of a front plate of the mount of FIG. 33 connected to an end of the mounting bar and fastener retaining shims of the mount temporarily connected to the support for ease of handling.

With reference to FIG. 35, the front plate 566 has an opening 574 sized to receive the end portion 568 of the mounting bar 460, such as after a user has cut the mounting bar 460 to a desired length. The front plate 566 has a collar portion 576 extending about the opening 574 that contacts the outer surfaces of the mounting bar 460 and resists loading from the mounting bar 460 during operation of the conveyor belts 456, 458. The front plate 556 has a lip portion 580 configured to extend laterally over a seat 582 of the rear plate 556, as shown in FIGS. 34 and 36. In one form, the lip portion 580 and seat 582 include flat surfaces 584, 586 that face each other with the front plate 566 positioned on or adjacent to the rear plate 556. Further, the rear plate 556 has a recess 588 extending downwardly from the seat surface 586 that provides clearance for the mounting bar end portion 568 to be received therein.

To install the mounting bar 460 in the gap 454, a user fits the opening 574 of the front plate 566 onto the mounting bar end portion 568, as shown in FIG. 35. The height adjustment mechanism 572 may include a plurality of height adjustment members, such as shims 590. A user may select one or more shims 590 as desired to set the distance between the front plate lip portion 580 and the rear plate seat 582 once the plates 556, 566 have been connected together. To temporarily hold the shims 590 to the front plate 566, one of the bolts 575 is advanced into a center through opening 592 of the front plate 566 and threaded into apertures 593 of the shims 590 aligned with the opening 592. The user may then advance the mounting bar 460, and front plate 566 and shims 590 connected thereto, generally in direction 594 (see FIG. 34) to position the mounting bar end portion 568 in the recess 588 of the rear plate 556 and seat the lowermost shim 590 against the seat surface 586 of the rear plate 556 (see FIG. 36).

Next, the user threads the second bolt 575 through one of the elongated openings 577 of the front plate 566, through corresponding elongated openings in the shims 590, and into the corresponding threaded bore 579 of the rear plate 556. The user removes the first bolt 575 from the center opening 592 of the front plate 566 and apertures 593 of the shims 590, then threads the first bolt 575 through the other of the elongated openings 577 of the front plate 566, through corresponding elongated openings in the shims 590, and into the corresponding threaded bore 579 of the rear plate 556. In one form, the longitudinal position adjustment mechanism 572 includes the elongated openings 577 in the front plate 566 and corresponding elongated holes in the shims 590 which permit the front plate 566 to be shifted in directions 596 after the mounting bar 460 has been lowered into the gap 454. Once the desired vertical position of the mounting bar 460 has been set using the desired number of shims 590, and the desired longitudinal position of the mounting bar 460 has been set by shifting the front plate 566 in directions 596, the user may fully tighten the bolts 575 to fix the front plate 566 and mounting bar 460 to the rear plate 556 mounted to the skirt 552.

Figure 36A:
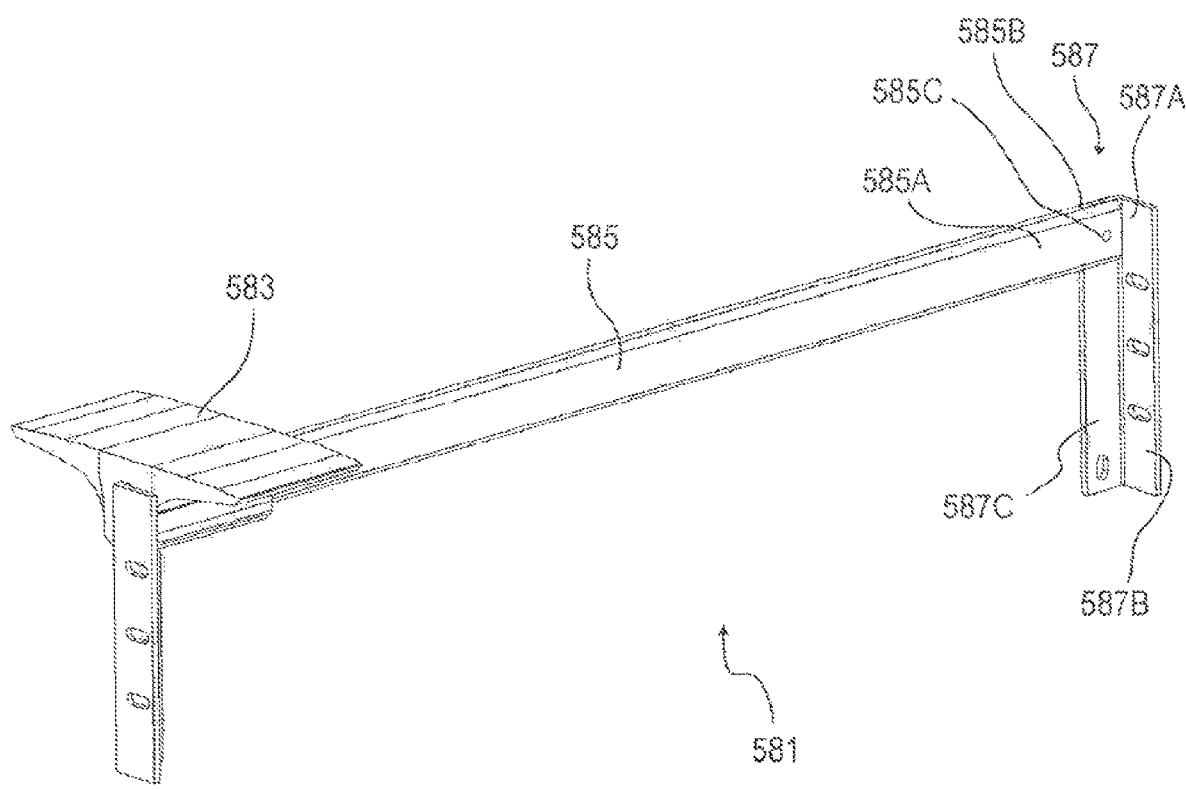
FIG. 36A is a perspective view of another transfer guard system showing mounts of the system.
Figure 37:
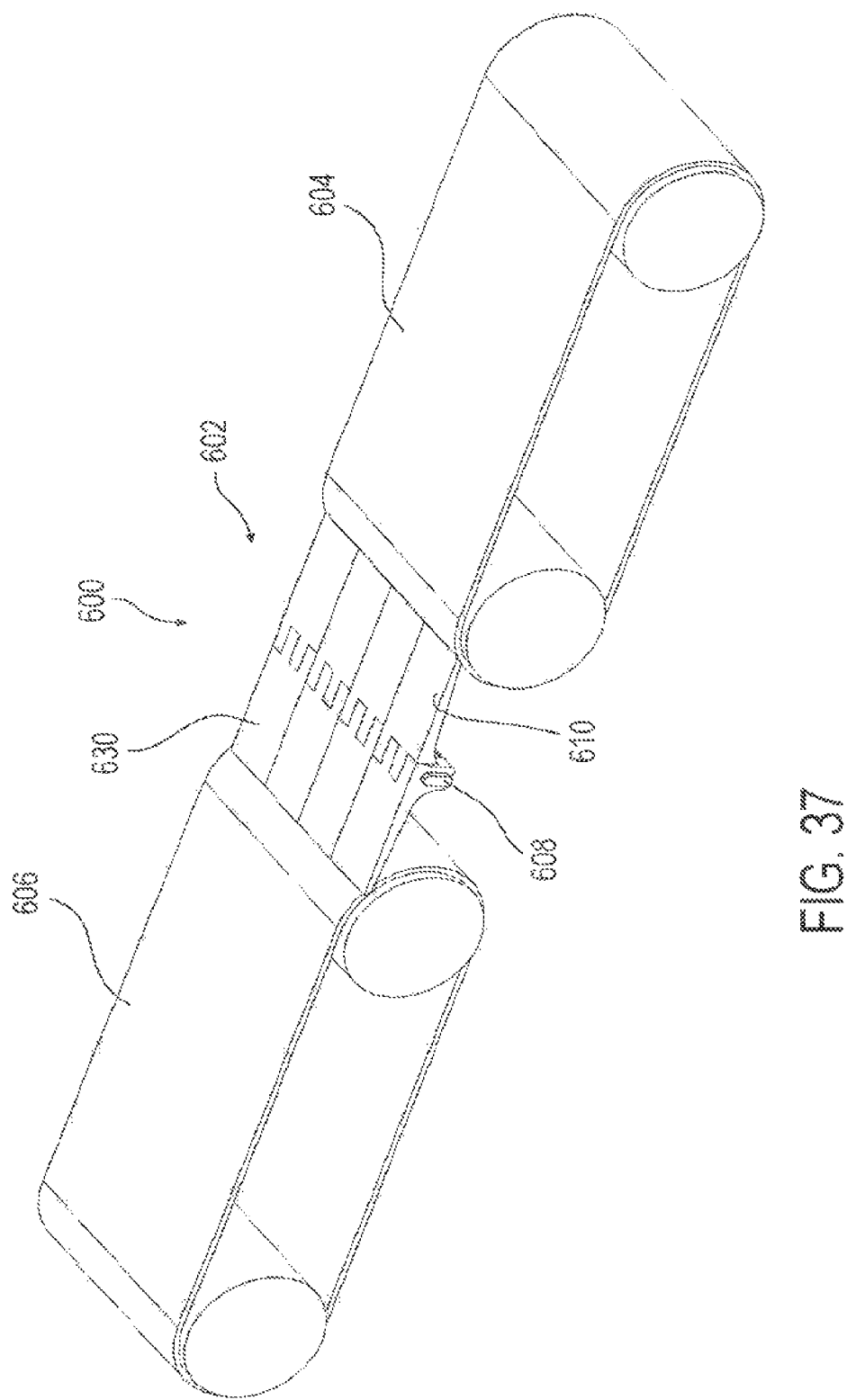
FIG. 37 is a perspective view of another transfer guard system showing aligned pairs of transfer guard members spanning a gap between conveyor belts.

With reference to FIG. 36A, another transfer guard system 581 is provided that can be easily installed in a confined environment. The transfer guard system 581 includes a plurality of transfer guard members 583 (only one is shown for clarity) connected to a mounting bar 585. The transfer guard system 581 has a pair of mounts 587 for securing the mounting bar 585 to a pair of skirts adjacent conveyor belts, for example. In one form, the mount 587 includes an angle bar 587A having a base portion, e.g. section 587B, for being fixed to one of the skirts and a support portion, e.g., section 587C, for supporting the mounting bar 585. The mounting bar 585 has an end portion 585A with a slot 585B sized to receive the section 587C of the angle bar 587A. The slot 585B and angle bar section 587C cooperate to permit the mounting bar 585 to be lowered into a gap where the angle bar 587A is mounted and slid onto the angle bar 587A. The mounting bar end portion 585A has a hole 585C that aligns with an opening of the angle bar section 587C and permits a fastener to extend through the hole 585C and opening of the angle bar section 587C to fix the mounting bar 585 to the angle bar 587A, such as with a nut threaded onto an end of the fastener. The opening of the angle bar section 587C may be vertically elongated to permit vertical adjustment of the mounting bar 585.

With reference to FIGS. 37-42, another transfer guard system 600 is provided for bridging a gap between conveying surfaces, such as a gap 602 between conveyors 604, 606. The transfer guard system 600 is similar in many respects to the transfer guard system 450 discussed above such that differences between the two will be highlighted.

The transfer guard system 600 includes a mounting bar 608 extending laterally across the gap 602 and a pairs of longitudinally aligned transfer guard members 610 releasably fixed to the mounting bar 608. The transfer guard members 610 each have a body 612 with an attachment member 614 and an outboard portion 616. The attachment member 614 includes bridge portions 618, 620 and pairs of resilient legs 622, 624 depending from the bridge portions 618, 620 for resiliently engaging the mounting bar 608.

Figure 38:
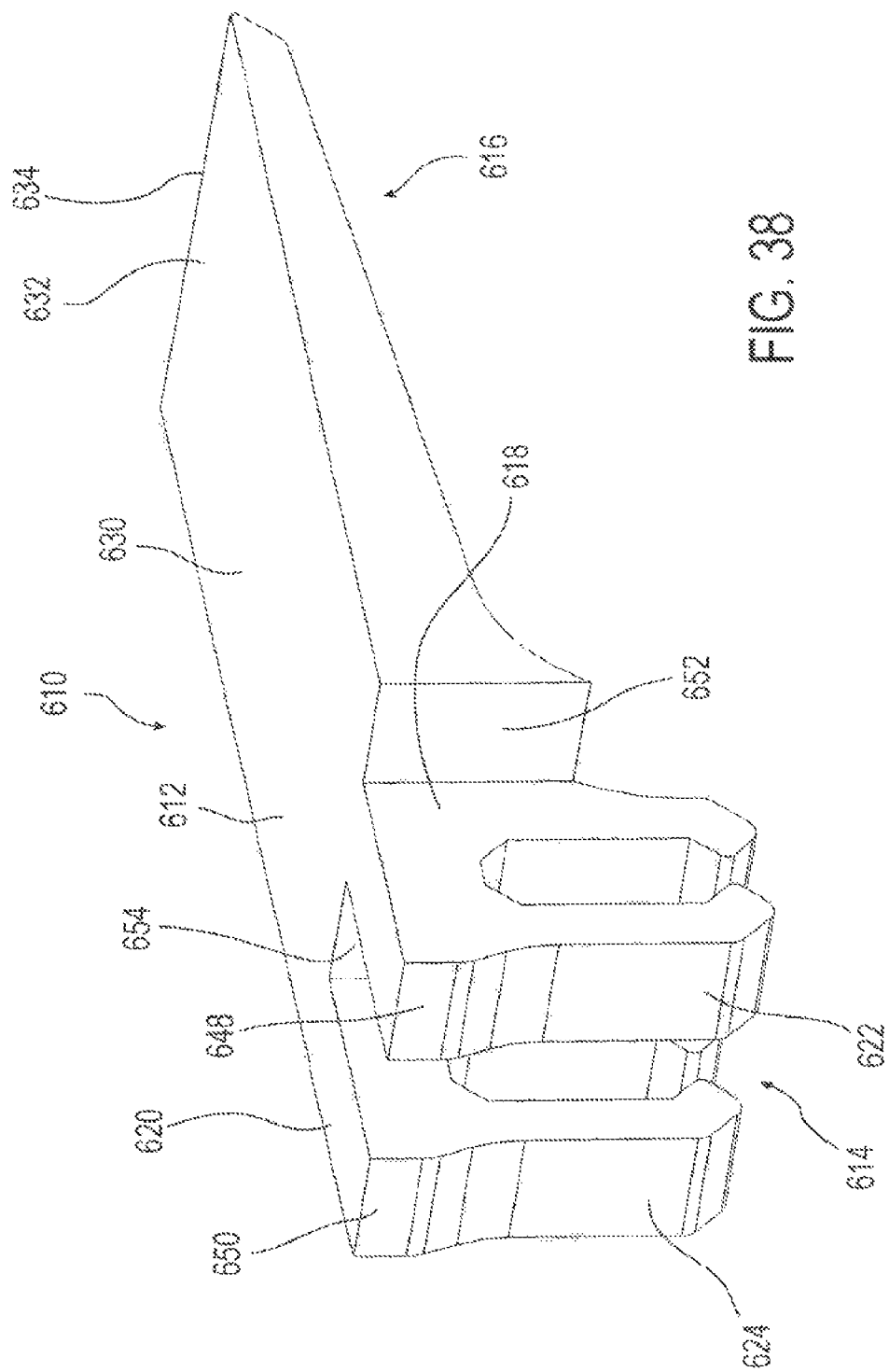
FIG. 38 is a perspective view of a single transfer guard member of the system of FIG. 37.
Figure 39:
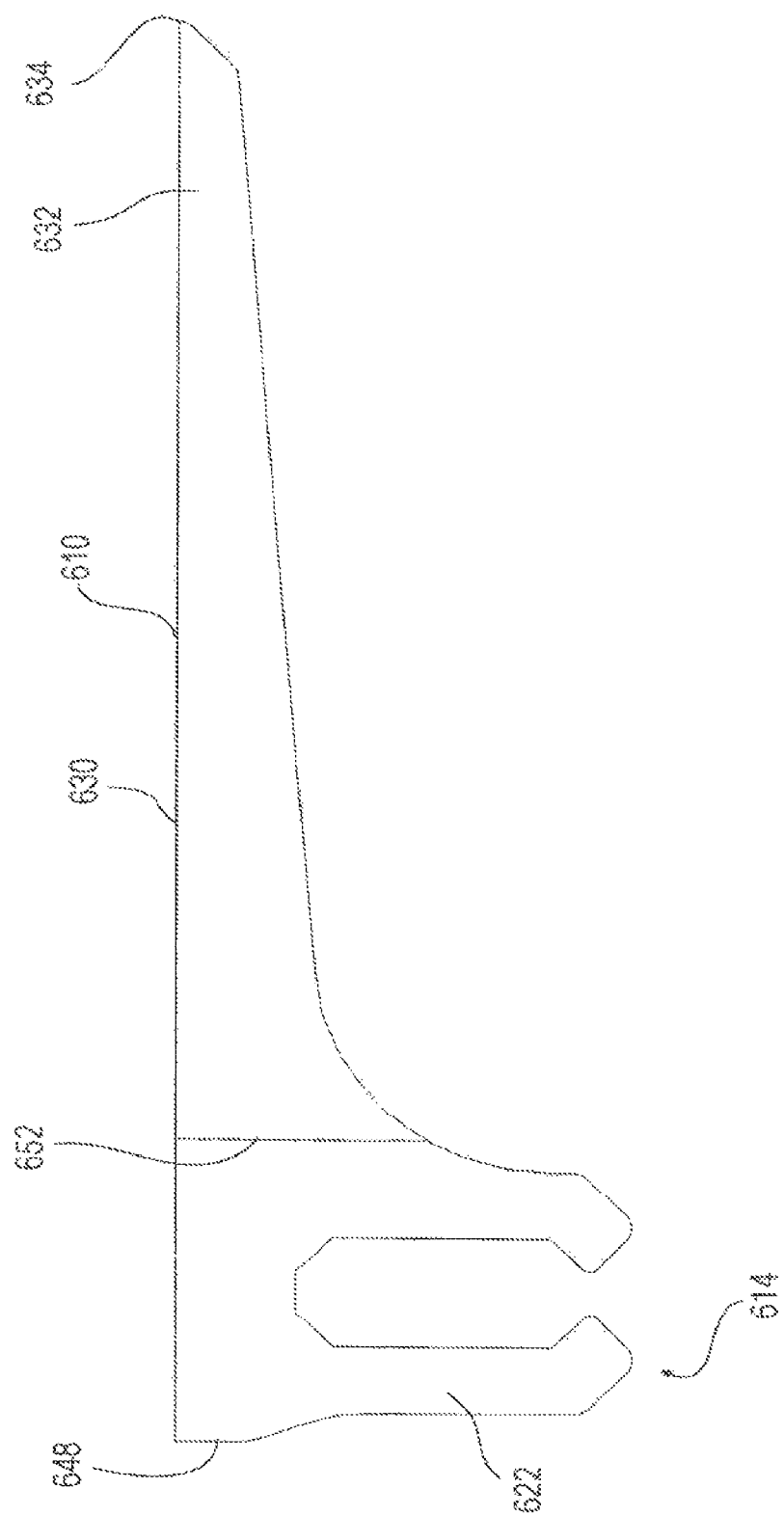
FIG. 39 is an elevational view of the transfer guard member of FIG. 38.

One difference between the transfer guard members 452, 610 is that the transfer guard member 610 has a substantially flat upper surface 630 including an outer surface portion 632 of the outboard portion 616, as shown in FIGS. 38 and 39. The outer surface portion 632 extends straight out to an outer edge 634, rather than having an inclined surface like the tapered surface portion 522 of the transfer guard member 452.

Figure 40:
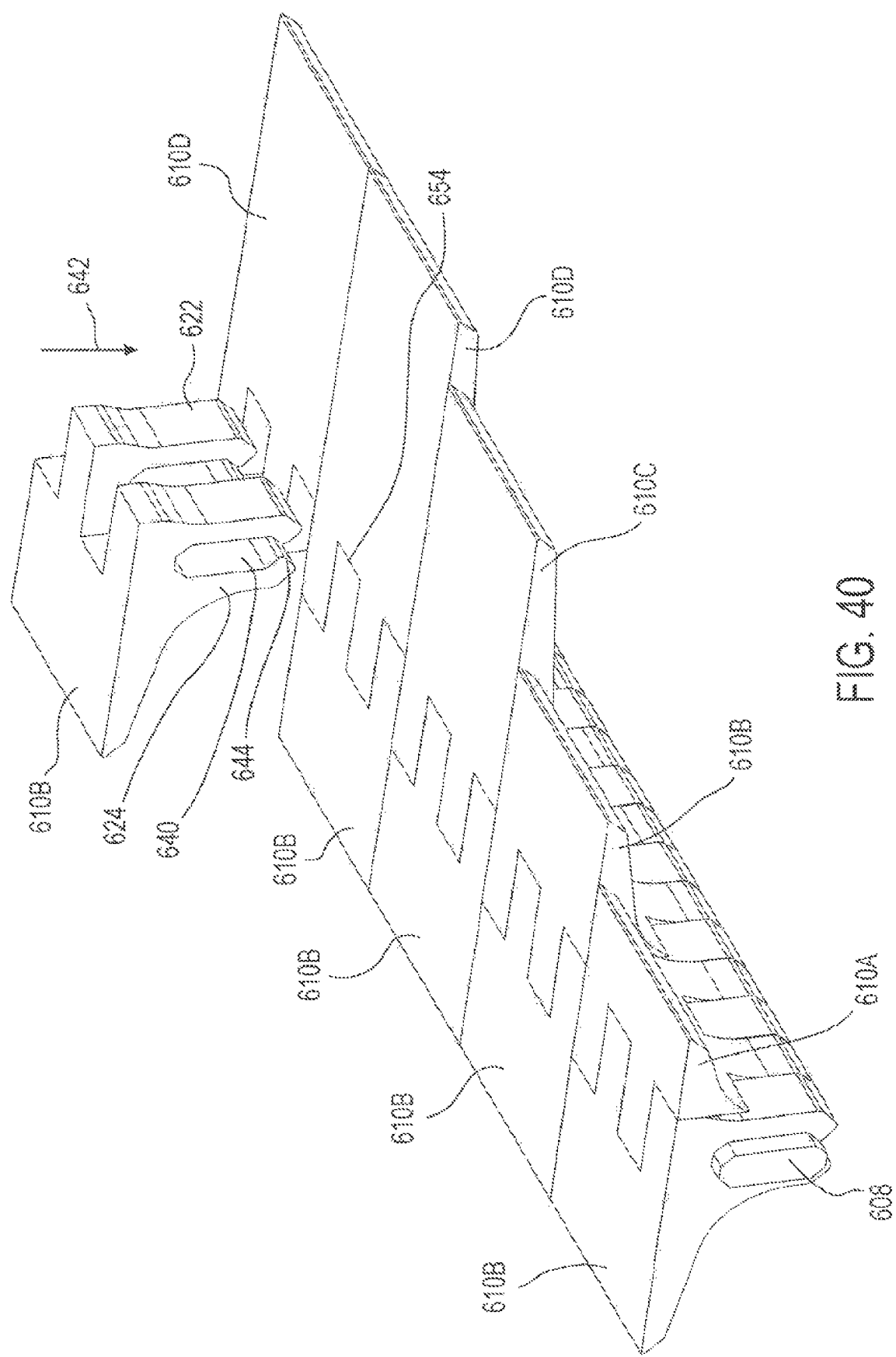
FIG. 40 is a perspective view of various different sizes of transfer guard members demonstrating the modularity and customizability of the transfer guard system.
Figure 41:
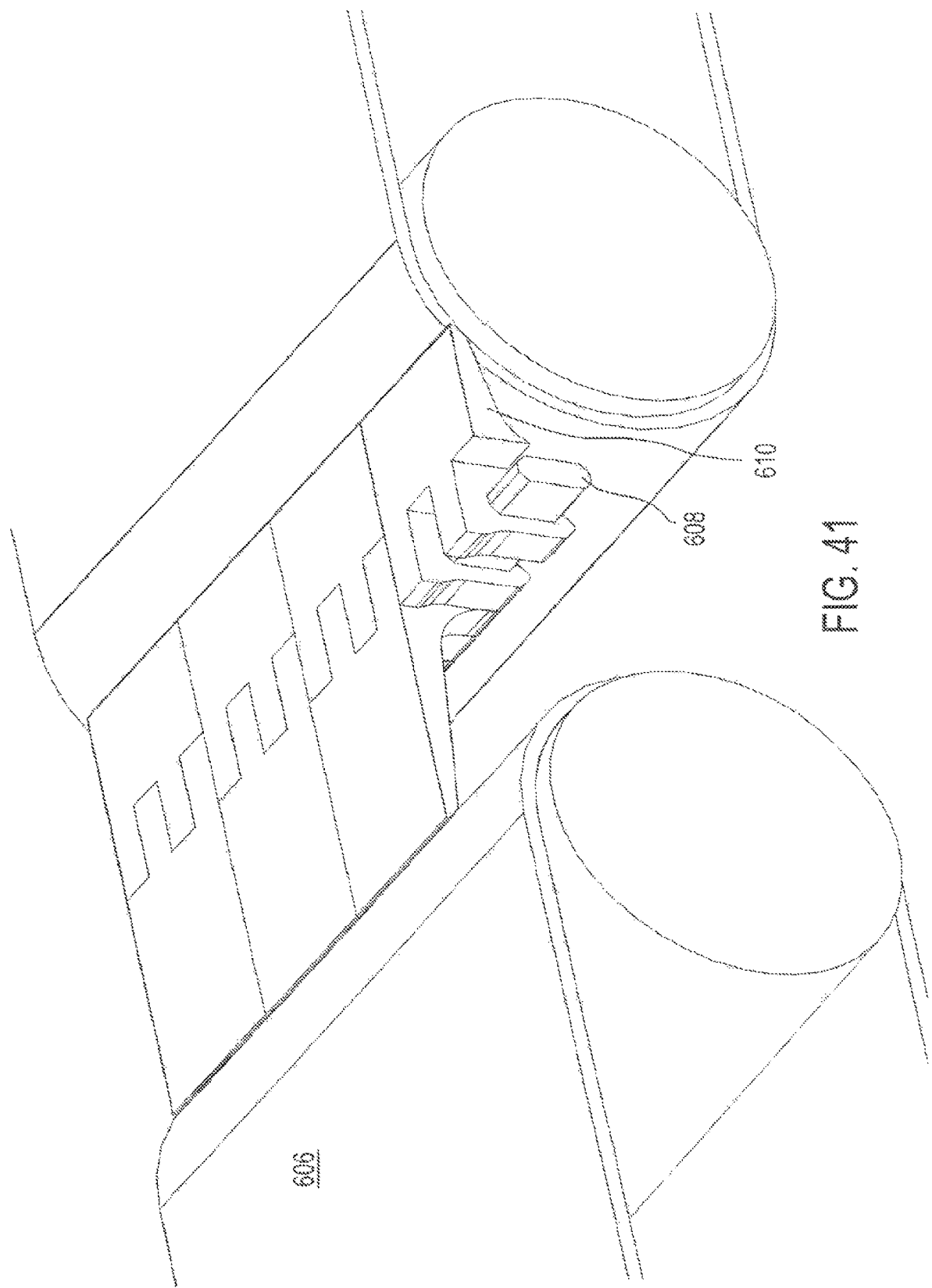
FIG. 41 is a perspective view of an alternative configuration of the transfer guard system of FIG. 37 showing one transfer guard member removed for illustrative purposes.
Figure 42:
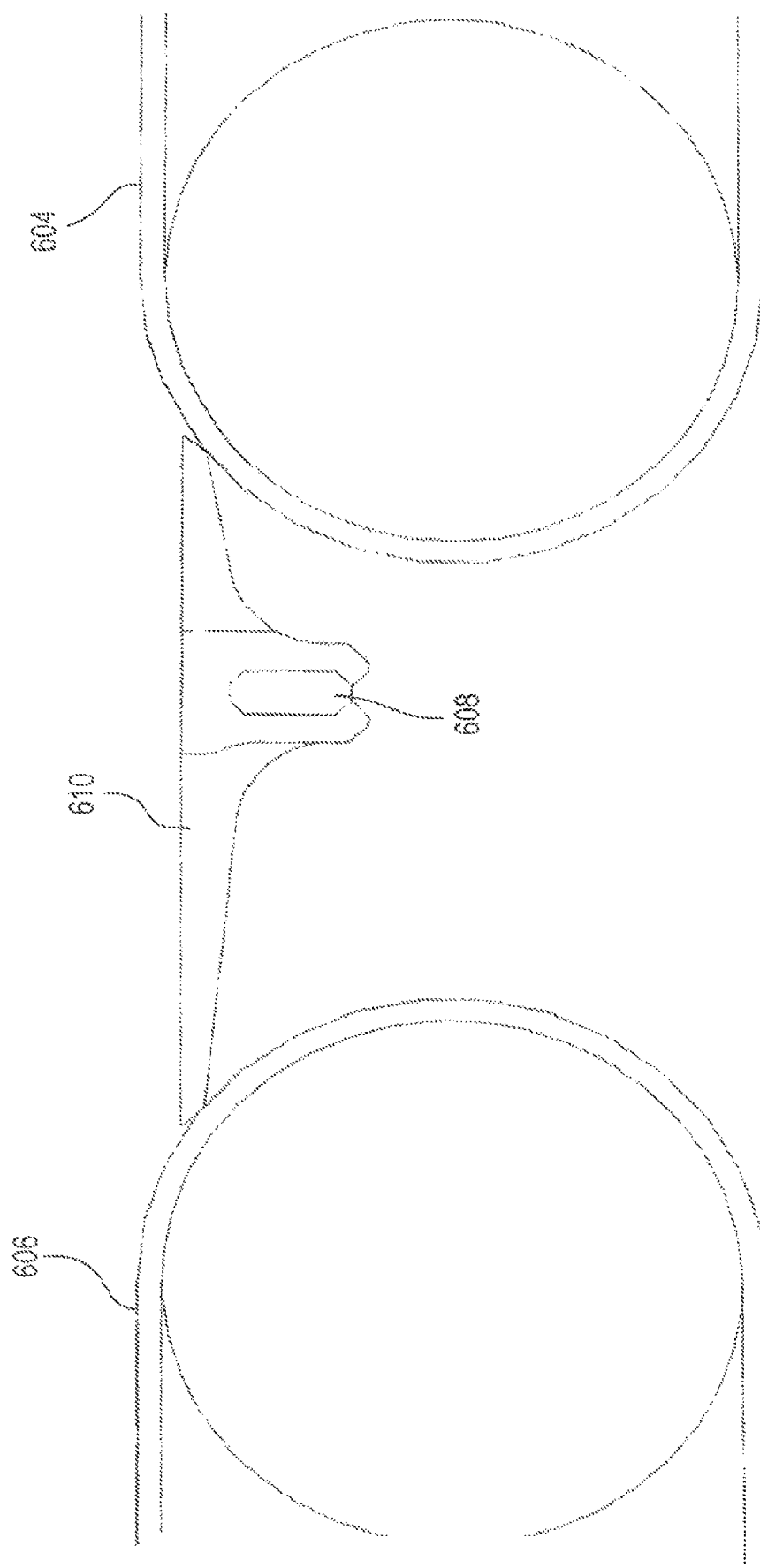
FIG. 42 is an elevational view of the transfer guard system of FIG. 41.

With reference to FIG. 40, the transfer guard system 600 may have differently sized transfer guard members 610 detachably fixed to the mounting bar 608. The transfer guard members may include a two-inch transfer guard member 610A, a three-inch transfer guard member 610B, a five-inch transfer guard member 610C, and a pair of six-inch transfer guard members 610D on an upstream side of the mounting bar 608 and three-inch transfer guard members 610B on a downstream side of the mounting bar 608.

With reference to FIG. 40, the transfer guard members 610 may be connected to the mounting bar 608 in a number of different approaches. For example, the transfer guard members 610 may be positioned above the mounting bar 608 to align openings 640 of the pairs of legs 622, 624 with the mounting bar 608. The transfer guard member 610 is then advanced in direction 642 onto the mounting bar 608. The legs 622, 624 have distal end portions with cam surfaces 644 that engage the mounting bar 608 and cause the legs 622, 624 to flex outwardly as the transfer guard member 610 is advanced in direction 642, such as by hammering the transfer guard member 610 onto the mounting bar 608. Once the transfer guard member 610 has been seated on the mounting bar 608, the distal ends of the legs 622, 624 resiliently engage a lower portion of the mounting bar 608 and fix the transfer guard member 610 onto the mounting bar 608.

With reference to FIG. 38, the body 612 of transfer guard member 610 includes protrusions 648, 650 that engage flat surface portions 652, 654 of the adjacent transfer guard member 610 to create interference in a manner similar to the protrusions 500, 502 discussed above with respect to transfer guard member 452. In the event that one or more of the legs 622, 624 of a transfer guard member, e.g., transfer guard member 610B (see FIG. 40), are damaged during installation on the mounting bar 608, which could make the transfer guard member 610B fit loosely on the mounting bar 608, the interference caused by the protrusions 648, 650 on the transfer guard member 610B and the aligned transfer guard member 610D takes up the play between the transfer guard member 610B and the mounting bar 608 and decreases the size of the seam 654 between the transfer guard members 610B, 610D. It will be appreciated that the protrusions 500, 502 may operate in a similar manner to take up play of the transfer guard members 452 in the event that one or more of the legs 485A, 485B, 487A, 487B are damaged during installation.

In another approach for connecting the transfer guard members 610 to the mounting bar 608, the transfer guard members 610 may be paired up and positioned so that the pairs of legs 622, 624 of transfer guard members 610 are interdigitated and the openings 640 formed by the legs 622, 624 of the guard members 610 are aligned. The mounting bar 608 is then fit into the openings 640 and the pair of transfer guard members 610 are slid along the mounting bar 608 into a desired location therealong.

Figure 43:
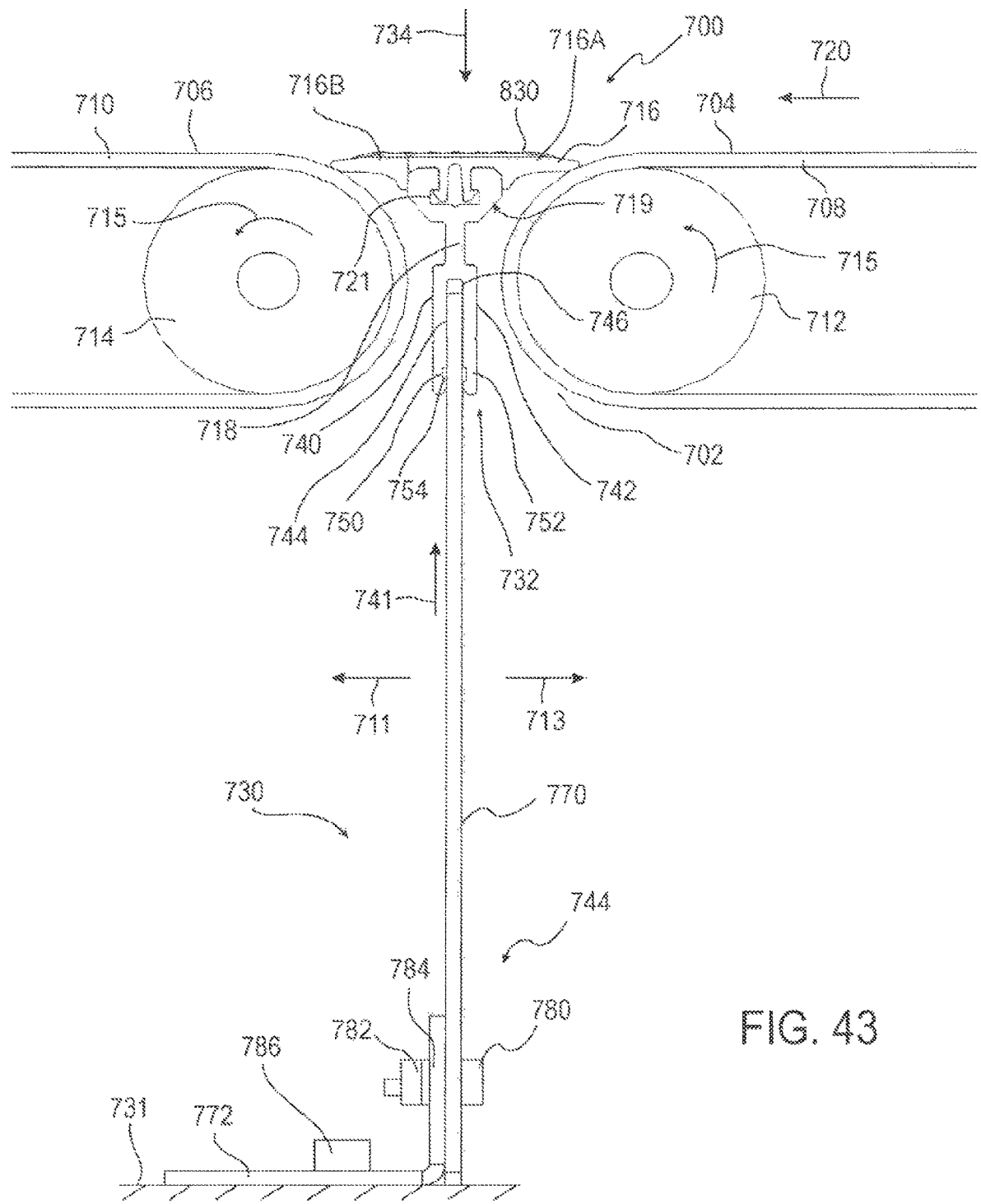
FIG. 43 is a side elevational view of another transfer guard system showing transfer guard members of the system bridging a gap between conveyor belts.

With reference to FIG. 43, a transfer guard system 700 is provided that is similar in many respects to the transfer guard systems discussed above and may be readily installed in confined spaces. The transfer guard system 700 is shown installed to transfer objects across a gap 702 between conveying surfaces 704, 706. The conveying surfaces 704, 706 may be, for example, surfaces of conveyor belts 708, 710 that travel around rollers 712, 714. The rollers 712, 714 may turn in direction 715 and the conveyor belts 708, 710 convey objects in a downstream, longitudinal travel direction 720. In other approaches, the conveying surfaces 704, 706 may be surfaces of roller conveyors, surfaces of chain conveyors, surfaces of a belt and a chute, surfaces of a belt and a slide, surfaces of a chute and a slide, or various combinations thereof as some examples. The roller conveyors, chain conveyors, belt, and chute may be made of plastic, metallic material(s), wood, etc. In another approach, the conveying surfaces 704, 706 may be portions of a single surface, such as if the transfer guard system 700 is used to bridge a gap in a hitch of a conveyor belt.

The transfer guard system 700 includes one or more transfer members, such as transfer guard members 716 each having an upper transfer surface 830 along which objects may travel. The transfer guard members 716 include aligned pairs of upstream and downstream transfer guard members 716A, 716B. The transfer guard members 716A, 716B include interdigitated attachment members 760, 762 (see FIG. 46) which form a non-linear seam 764 (see FIG. 44) between the transfer guard members 716 in a manner similar to the transfer guard members 452. Other transfer members could be used, such as brush bristles or rollers instead of or in addition to the transfer guard members 716. The transfer guard members 716 are detachably connected to a mounting member 718 and may detach from the mounting member 718 in response to significant loading in a manner similar to the transfer guard members discussed above (see, e.g., FIGS. 29-32).

Figure 44:
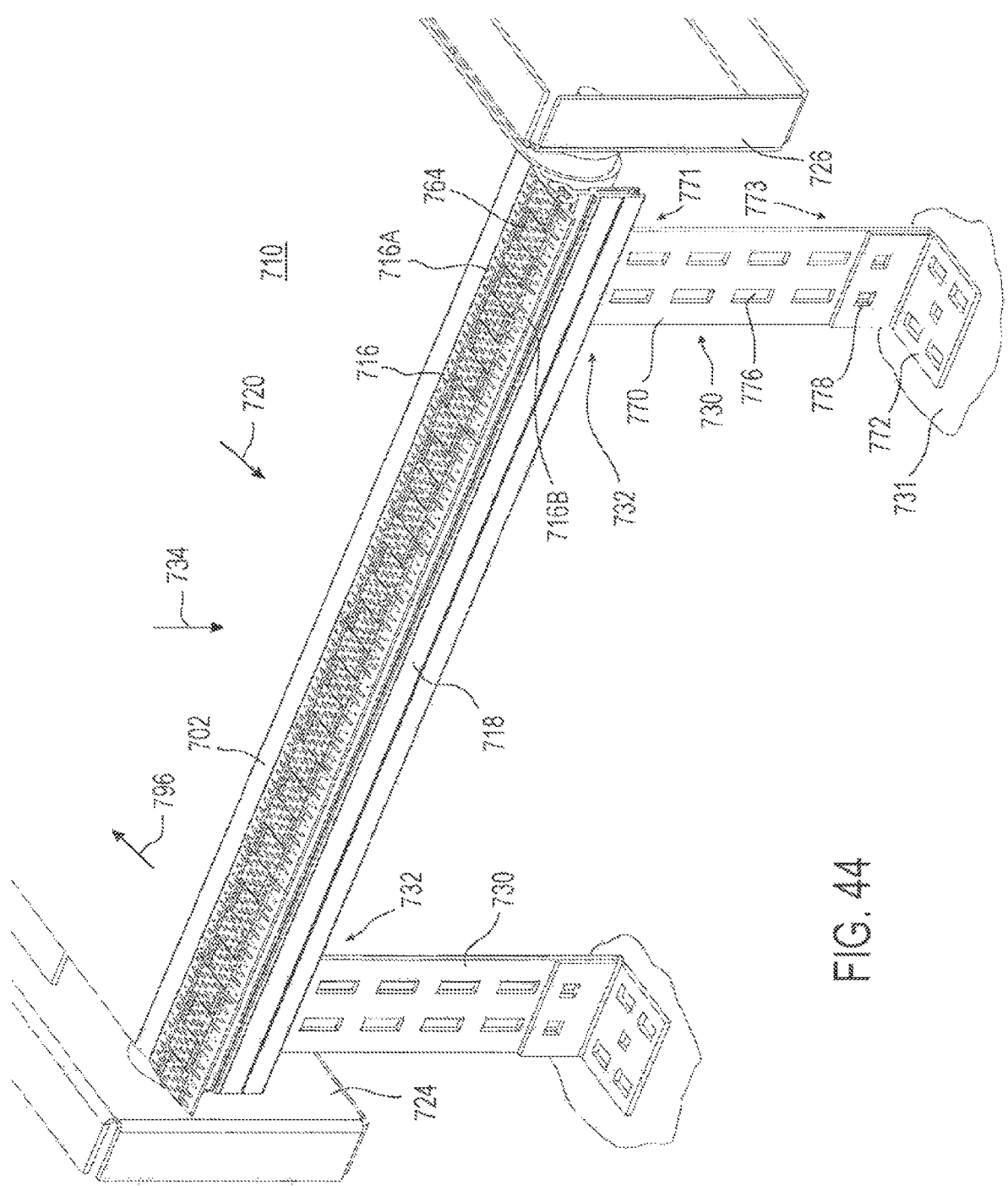
FIG. 44 is a perspective view of the transfer guard system and one of the conveyor belts of FIG. 43 showing the transfer guard members connected to an elongate mounting member and mounts of the system.

In FIG. 44, the conveyor belt 708 and roller 714 are hidden and skirts 724, 726 are shown to illustrate the ability of the transfer guard system 700 to fit into the confined space defined by the conveyor belts 708, 710 and skirts 724, 726. The conveyor belt 708 would likewise have skirts 724, 726 extending along opposite sides thereof. The transfer guard system 700 includes one or more mounts 730 for supporting the mounting member 718 and transfer guard members 716 in the gap 702. The mounts 730 may be secured to one or more mounting surfaces 731, such as portions of the conveyor frame, using fasteners such as bolts 786 (see FIG. 43).

To simplify the installation of the transfer guard system 700, the mounting member 718 and of the mounts 730 have one or more snap-fit connections 732 therebetween that permit the mounting member 718 to be lowered in direction 734 into the gap 702 to connect the mounting member 718 to the mounts 730. The snap-fit connections 732 permit the mounting member 718 to be quickly and securely positioned in the gap 702 after the mounts 730 have been secured to the mounting surfaces 731. In another form, the mounting member 718 may be positioned below the gap 702. For example, if the transfer members include long brush bristles, the bristles may extend in the gap 702 while the mounting member 718 is positioned below the gap 702.

The mounts 730 may be installed on the mounting surfaces 731 from below the conveyor belts 708, 710 where there may be adequate working space, and then the mounting member 718 can be lowered into the gap 702 and snap-fit with the mounts 730. This approach is particularly advantageous where the gap 702 is relatively narrow in the longitudinal direction 720, such the gap 702 having a minimum distance thereacross in the range of 0.5 inches to 2 inches, and/or when the rollers 712, 714 have a relatively small diameter, such as 1.75 inches to 8 inches. The snap-fit connections 732 make securing the mounting member 718 to the mount 730 easier because the installer does not have to secure the mounting member 718 to the mount 730 using, such as for example, fasteners or welds, which would be difficult to apply in the gap 702. Additionally, because the mounts 730 are secured to the mounting surfaces 731 below the gap 702, the mounting member 718 can extend for all or almost all of the lateral distance between the skirts 724, 726.

With reference to FIG. 43, the mounting member 718 includes a pair of arms 740, 742 defining a slot 744 therebetween that receives a projection, such as upper plate portions 746 of the mounts 730, as the mounting member 718 is advanced downwardly in direction 734. The slot 744 has a longitudinal width 745 (see FIG. 48) sized to permit the upper plate portion 746 to enter the slot 744 without deflecting apart the mounting member arms 740, 742, which allows an installer to lower the mounting member 718 onto the upper plate portions 746 to engage the mounting member 718 to the mounts 730 with minimal resistance. The upper plate portion 746 slides into the slot 744 as the mounting member 718 is lowered onto the mounts 730. This forms a slip-fit connection between the mounting member 718 and the mounts 730.

In one form, the snap-fit connection 732 includes at least one recess, such as channels 750, 752, of the arms 740, 742 and at least one engagement portion, such as detents 754 of the mounts 730. The detents 754 protrude outwardly a longitudinal distance 747 (see FIG. 49) from each side of the upper plate portion 746 so that the upper plate portion 746 has a longitudinal width at the detents 754 that is larger than the longitudinal width 745 of the slot 744 of the mounting member 718. The detents 754 deflect the arms 740, 742 apart as the mounting member 718 is advanced downward onto the mounts 730. The channels 750, 752 define a longitudinally enlarged portion of the slot 744 which allows the arms 740, 742 to resiliently snap back to their initial configuration once the channels 750, 752 receive the detents 754. The material of the mounting member 718 and the geometry of the arms 740, 742 may be selected to provide resiliency to the arms 740, 742 so that the arms 740, 742 can resiliently deflect over the detents 754 and snap back to their initial configuration once the channels 750, 752 are horizontally aligned with the detents 754. The mounting member 718 may be made of, for example, metallic, plastic, and/or composite materials. Examples include aluminum, steel, and brass.

In one form, the securing of the mounting member 718 to the mounts 730 is a two-step operation after the mounts 730 have been secured to the mounting surfaces 731. First, the mounting member 718 is lowered into the gap 702 so the upper plate portion 746 slides into the slot 744 and the arms 740, 742 contact the detents 754. Next, the mounting member 718 is urged farther downward in direction 734, such as by striking the mounting member 718 with a mallet, to cammingly engage the arms 740, 742 with the detents 754. This urging of the mounting member 718 farther in direction 734 causes the detents 754 to cam the arms 740, 742 apart and shift the mounting member 718 farther down along the upper plate portions 746. Once the channels 750, 752 align with the detents 754, the arms 740, 742 snap back to the initial configuration thereof. The engagement of the detents 754 and the channels 750, 752 quickly and easily secures the mounting member 718 to the mounts 730.

In another form, the securing of the mounting member 718 is a one-step operation wherein the mounting member 718 is lowered into the gap 702, the mounting member 718 is slid onto the upper plate portions 746, and the mounting member 718 is urged downward to engage the detents 754 and channels 750, 752 using a single continuous downward movement of the mounting member 718 as an example. The detents 754 may have more of a barb-shape with longer camming surfaces so that the user can more easily manually perform the lowering, engaging, and snap-fitting operations in one fluid movement.

Another advantage of the snap-fit connection 732 is that it permits the mounting member 718 and the transfer guard members 716 thereon to be easily detached from the mounts 730 for repair or replacement. For example and with reference to FIG. 43, the mounting member 718 may be detached from the mounts 730 by applying force against the mounting member 718 in direction 741 such as by using a mallet and an elongated impact tool to reach the lower end of the mounting member 718. In response to the force in direction 741, the detents 754 cam apart the arms 740, 742 and disengage the detents 754 from the channels 750, 752. This quickly and easily releases the mounting member 718 and the transfer guard members 716 from the mounts 330.

With reference to FIG. 44, the mounts 730 each include a support portion, such as a support member 770, and a base portion, such as a bracket 772. The support member 770 includes the upper plate portion 746 at an upper end portion 771 thereof and is connected to the bracket at a lower end portion 773 thereof. One or more of the mounts 730 may include a height adjustment mechanism 774 (see FIG. 43) that allows the vertical position of the mounting member 718 to be adjusted. In one approach, the height adjustment mechanism 774 includes a plurality of openings 776 of the support member 770 and openings 778 of the bracket 772. To adjust the position of the plate portions 746 relative to the gap 702, the support members 770 are each moved up or down to align one pair of the openings 776 with the openings 778 of the bracket 772. The height adjustment mechanism 774 includes one or more securement members, such as fasteners, for maintaining the relative positions of the support member 770 and bracket 772. The fasteners may include bolts 780 sized to extend through the aligned openings 776, 778 as well as nuts 782 and washers 784. The bolts 780, nuts 782, and washers 784 are not shown in FIG. 44 to illustrate the alignment of the openings 776, 778.

In one form, the support member 770 is resilient and permits the mounting member 718 to deflect slightly in upstream and downstream directions 711, 713 in response to impacts against the transfer guard members 716 or the mounting member 718 itself. The transfer guard members 716 may contact the conveyor belts 708, 710 to limit movement transfer guard members 716 and mounting member 718. As an example and with reference to FIG. 58, a splice 733 of the conveyor belt 708 has impacted the upstream transfer guard members 716A and the support members 770 bend to permit the transfer guard members 716 and mounting member 718 to deflect generally in direction 711 in the gap 702. Other examples of impacts that may cause the mounting member 718 to shift in the gap 702 include small tears in the conveyor belts 708, 710 and heavy packages with rough surfaces traveling over the transfer guard members 716.

The downstream transfer guard members 716B may contact the downstream conveyor belt 710 to limit movement of the transfer guard members 716 and mounting member 718 in direction 711. The downstream transfer guard members 716B may deflect against the downstream conveyor belt 710 to absorb part of the impact in addition to the bending of the support members 770.

The support members 770 then resiliently bias the mounting member 718 back in the opposite direction 713 to return the mounting member 718 to an initial position in the gap 702 (see FIG. 43). For larger impacts, one or more of the transfer guard members 716 may detach from the mounting member 718 as discussed above with respect to the other transfer guard system embodiments. For example, a screw that has fallen onto the conveyor belt 708 may become wedged between the belt 708 and one of the upstream transfer guard members 716A. The transfer guard member 716A detaches from the mounting member 718 and permits the screw to fall into the gap 702 rather than becoming caught and tearing the conveyor belt 708. As another example, a splice in one of the conveyor belts 708, 710 may be missing loops such that the conveyor belt ends joined by the splice start to separate as the splice travels over the rollers 712, 714. One or more of the transfer guard members 716 may detach from the mounting member 718 in response to the separated conveyor belt ends striking the transfer guard members rather than being a rigid construct that catches and further separates the belt ends.

Figure 45:
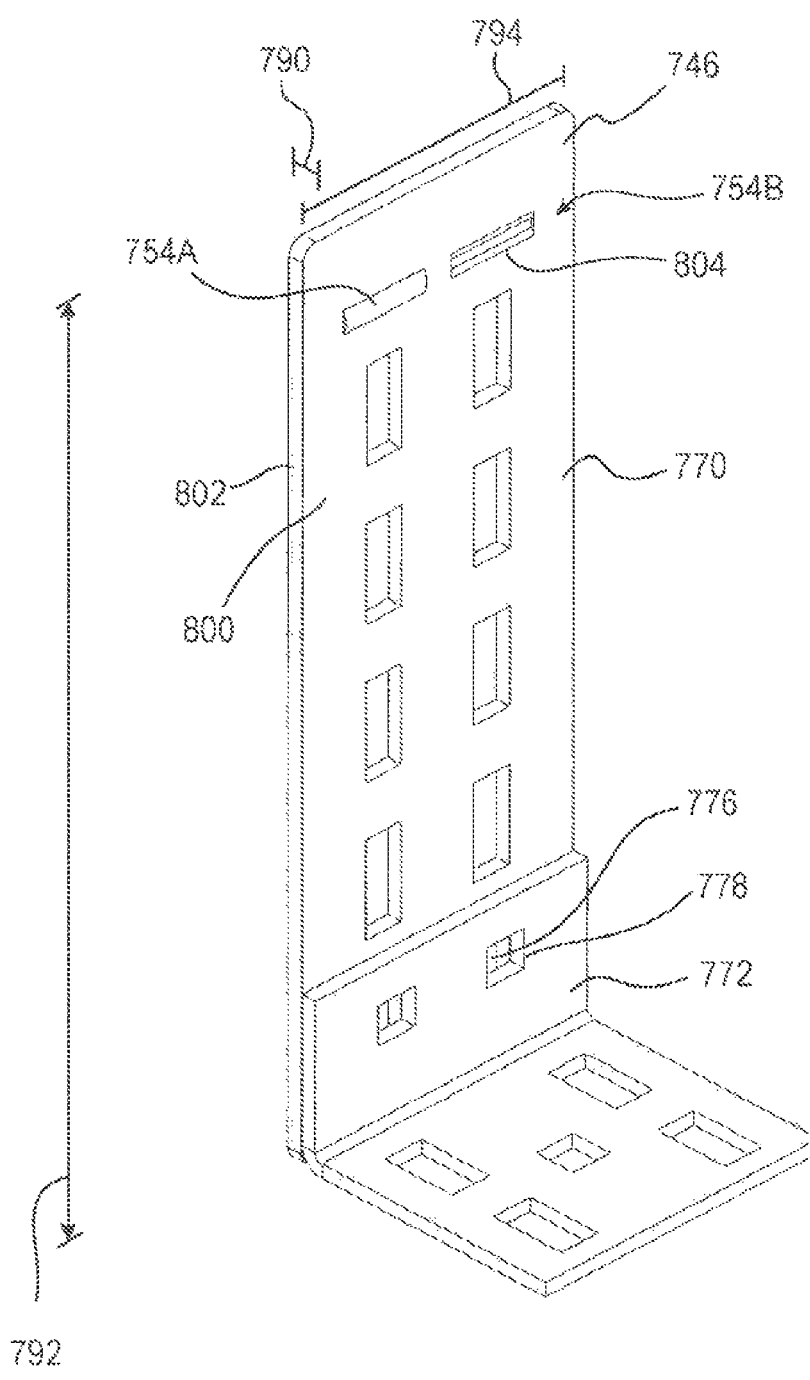
FIG. 45 is a perspective view of one of the mounts of the transfer guard system of FIG. 44 showing detents of the mount which form snap-fit connections with the mounting member.

The support member 770 may be made of a resilient material. As examples, the support member 770 may be made of spring steel, aluminum, brass, plastic, and/or composites. To contribute to the flexibility of the support member 770, the support member 770 may have a thickness 790 as shown in FIG. 45 that is significantly less than a height 792 and a width 794 of the support member 770. In one form, the support member 770 has a thickness 790 in the range of approximately 0.02 inches to approximately 0.25 inches, such as 0.125 inches; a height 792 in the range of approximately 1.5 inches to approximately 18 inches, such as 8 inches; and a width 794 in the range of approximately 0.5 inches to approximately 60 inches, such as 2.5 inches. The width 794 may extend for all or nearly all of the lateral width of the belts 708, 710, and there may be only one support member 770.

With reference to FIG. 45, the detents 754 include a pair of detents 754A, 754B extending outward from opposite sides of the resilient support member 770. The support member 770 has a downstream facing surface 800 and the detent 754A extends outward from the downstream facing surface 800. The support member 770 has an upstream facing surface 802 and the detent 754B extends outward from the upstream facing surface 802. To provide the outwardly extending profile of the detents 754A, 754B, the support member 770 may be deformed, such as by pressing material outward, which leaves a recess 804 opposite the detents 754A, 754B. In another form, the detents 754 include dowel pins fixed in openings of the upper plate portions 746. The support member 770 may have a detent 754 on only one of the surfaces 800, 802 and the mounting member 718 may have only one channel. Such a configuration may utilize only one arm of the mounting member 718 that deflects as the mounting member 718 is snap-fit to the support members 770. In yet another form, the support member 770 has a detent 754 on only one of the surfaces 800, 802 and the mounting member 718 has two arms each with a channel to permit the mounting member 718 to be attached to the support members 770 in different orientations of the mounting member 718. Only one of the two arms may deflect as the mounting member 718 is snap-fit to the support members 770.

Figure 46:
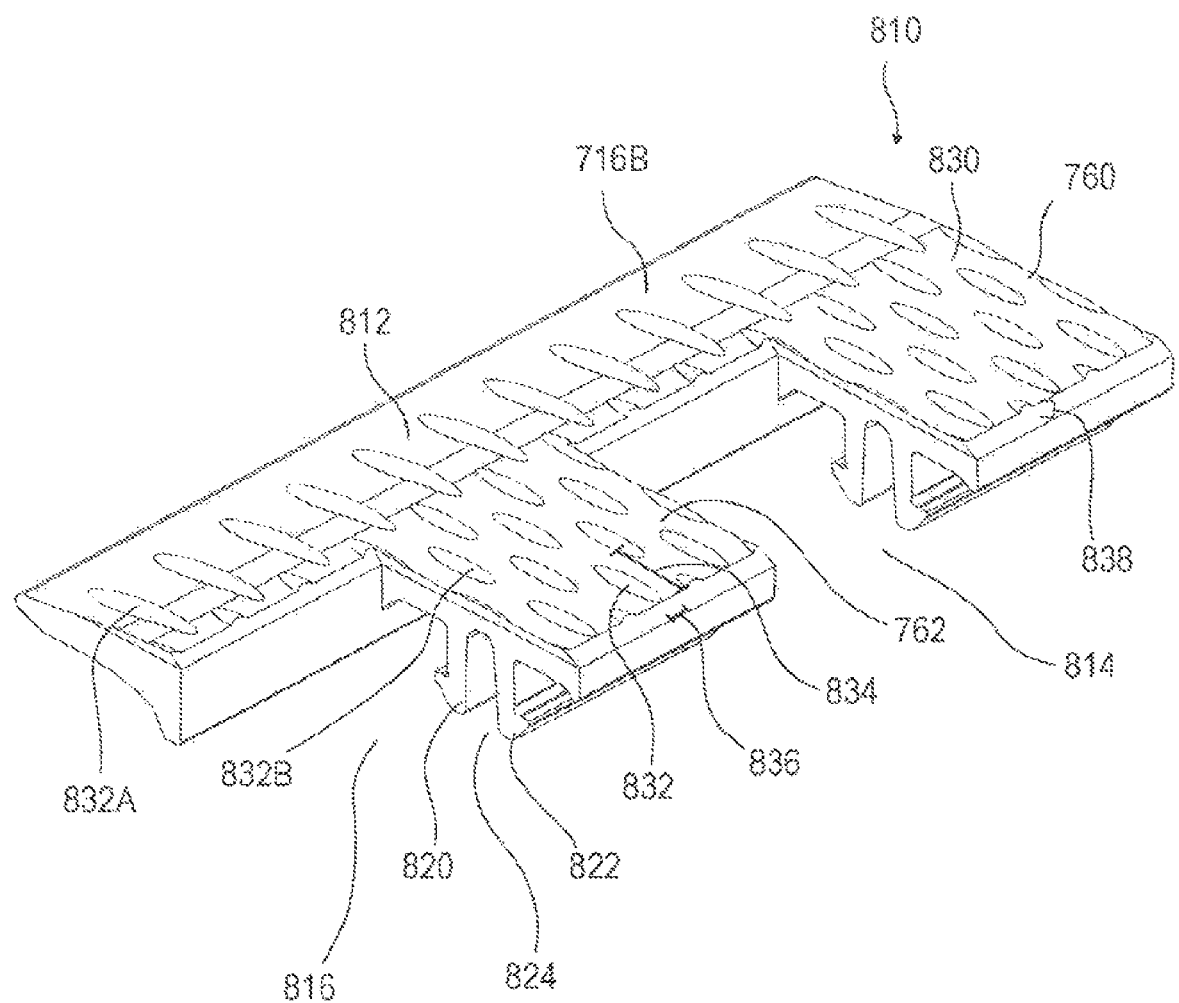
FIG. 46 is a perspective view of one of the transfer guard members of FIG. 43 showing pairs of spaced legs of the transfer guard member for detachably connecting to the mounting member.

Turning to FIG. 46, the transfer guard member 716B has been detached from the mounting member 718. The transfer guard member 716B includes a body 810 having an outboard portion 812 and a pair of attachment members 760, 762. The transfer guard member 716B includes recesses 814, 816 laterally disposed relative to the attachment members 760, 762. The recesses 814, 816 receive the attachment members 760, 762 of the upstream transfer guard member 716A. This forms an interdigitated pattern of the attachment members 760, 762 of the transfer guard member 716A, 716B and the associated non-linear seam 764. By utilizing the non-linear seam 764, the transfer guard system 700 lacks a long linear seam spanning across the lateral width of the transfer guard system 700 that could snag small objects or collect debris. The attachment members 760, 762 each include a pair of legs 820, 822 separated by a gap 824. In one form, the transfer guard member 716B has a unitary, one piece construction and the legs 820, 822 can resiliently deflect toward and away from each other.

The transfer guard member 716B includes an upper transfer surface 830 that includes protrusions, such as bumps 832. The bumps 832 are rounded and may be elongated in the longitudinal direction 720. The bumps 832 contact an object travelling across the transfer guard member 716B so that the object contacts a smaller surface area of the transfer guard member 716B. This reduces the dynamic friction between the transfer guard member 716B and the object. Reducing the dynamic friction reduces the frequency of objects getting slowed by the transfer surface which can adversely affect object flow and spacing throughout the entire conveyor system. Further, the bumps 832 may operate as wear indicators so that an operator can visually identify when the transfer guard members 716 need to be replaced when the bumps 832 appear worn down.

The bumps 832 may have a length 834, a width 836, and a maximum height 838. The length 834 may be longer than the width 836. Additionally, one or more of the length 834, the width 836, and height 838 of the bumps 832 may vary along the upper transfer surface 830. For example, the bumps 832A of the outboard portion 812 may have a longer length 834 than the bumps 832B of the attachment member 760. The bumps 832A have a longer length 834 because the bumps 832A extend downward toward the outboard edges of the transfer guard members 716 which presents a larger surface area of the bumps 832A to objects as the objects slide onto the transfer guard members 716. The other transfer guard members 716 may have a similar or different pattern of the bumps 832 as the transfer guard member 716B.

Figure 47:
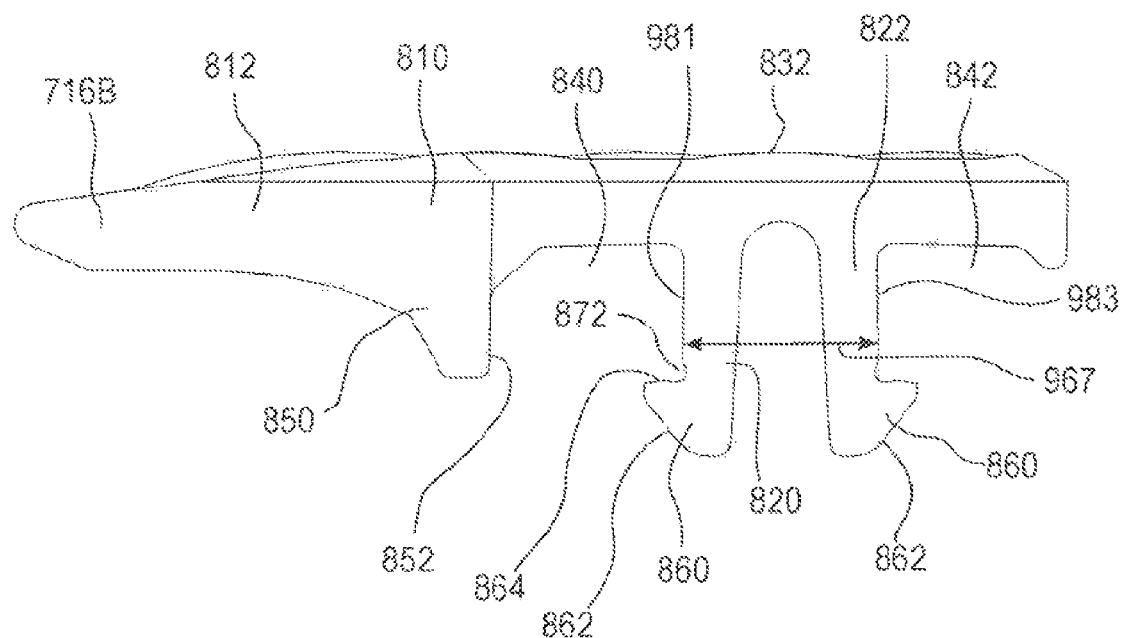
FIG. 47 is a side elevational view of the transfer guard member of FIG. 46 showing an outboard portion of the transfer guard member having a depending brace member for abutting the mounting member and resisting deflection of the outboard portion.

With reference to FIG. 47, the transfer guard member 716B includes features to permit the transfer guard member 716B to be securely attached to the mounting member 718. Although transfer guard member 716B will be discussed, the following discussion applies to the other transfer guard members 716 as well. In one approach, the transfer guard members 716 are identical. In another approach, the transfer guard members 716 can have outboard portions 812 with different lengths. For example, the upstream transfer guard members 716A may have outboard portions 812 with a longitudinal length of 1.5 inches and the downstream transfer guard members 716B may have outboard portions 812 with a longitudinal length of three inches.

Figure 57:
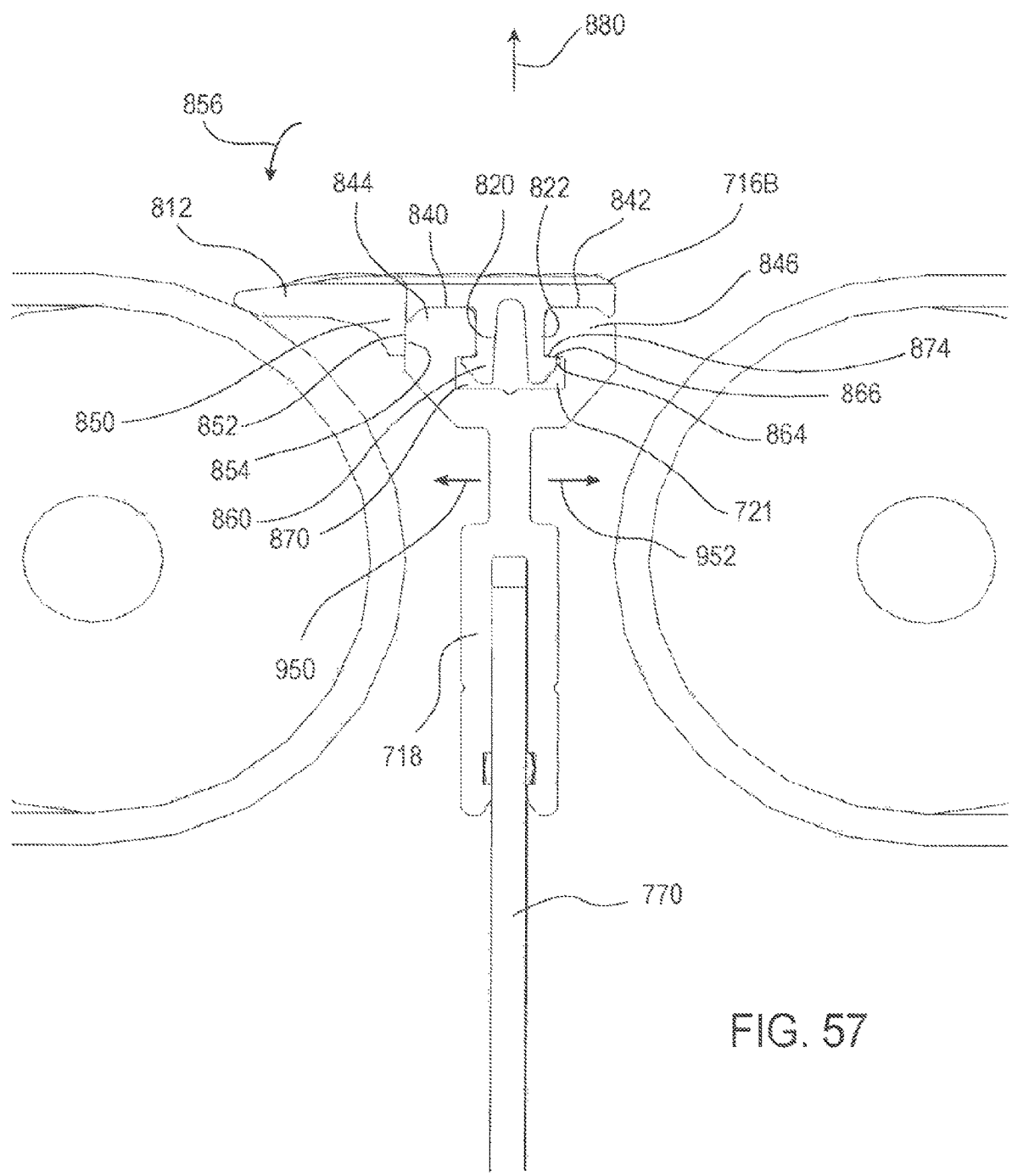
FIG. 57 is a view similar to FIG. 56 showing feet of the transfer guard member legs received within an enlarged portion of the channel of the mounting member to detachably fix the transfer guard member to the mounting member.

With reference to FIGS. 47 and 57, the body 710 of the transfer guard member 716B includes pockets 840, 842 on either side of the legs 820, 822 for receiving walls 844, 846 of the mounting member 718. The body 810 also includes a brace member 850 having a surface 852 that rests against an outer surface 854 of the wall 846. The brace member 850 abuts the outer surface 854 and resists deformation of the outboard portion 812 in direction 856, such as by the weight of a heavy package against the outboard portion 812. The legs 820, 822 include feet 860 having inclined surfaces 862 that deflect the legs 820, 822 together during installation of the transfer guard member 716B, as discussed below. The feet 860 include stop surfaces 864 that snap below stop surfaces 866 of the walls 844, 846 once the feet 860 have reached an enlarged lower portion 870 of the mounting member channel 721. Additionally, the legs 820, 822 include notches 872 that engage edges 874 of the walls 844, 846 to further secure the transfer guard member 716B in the channel 721.

Figure 54:
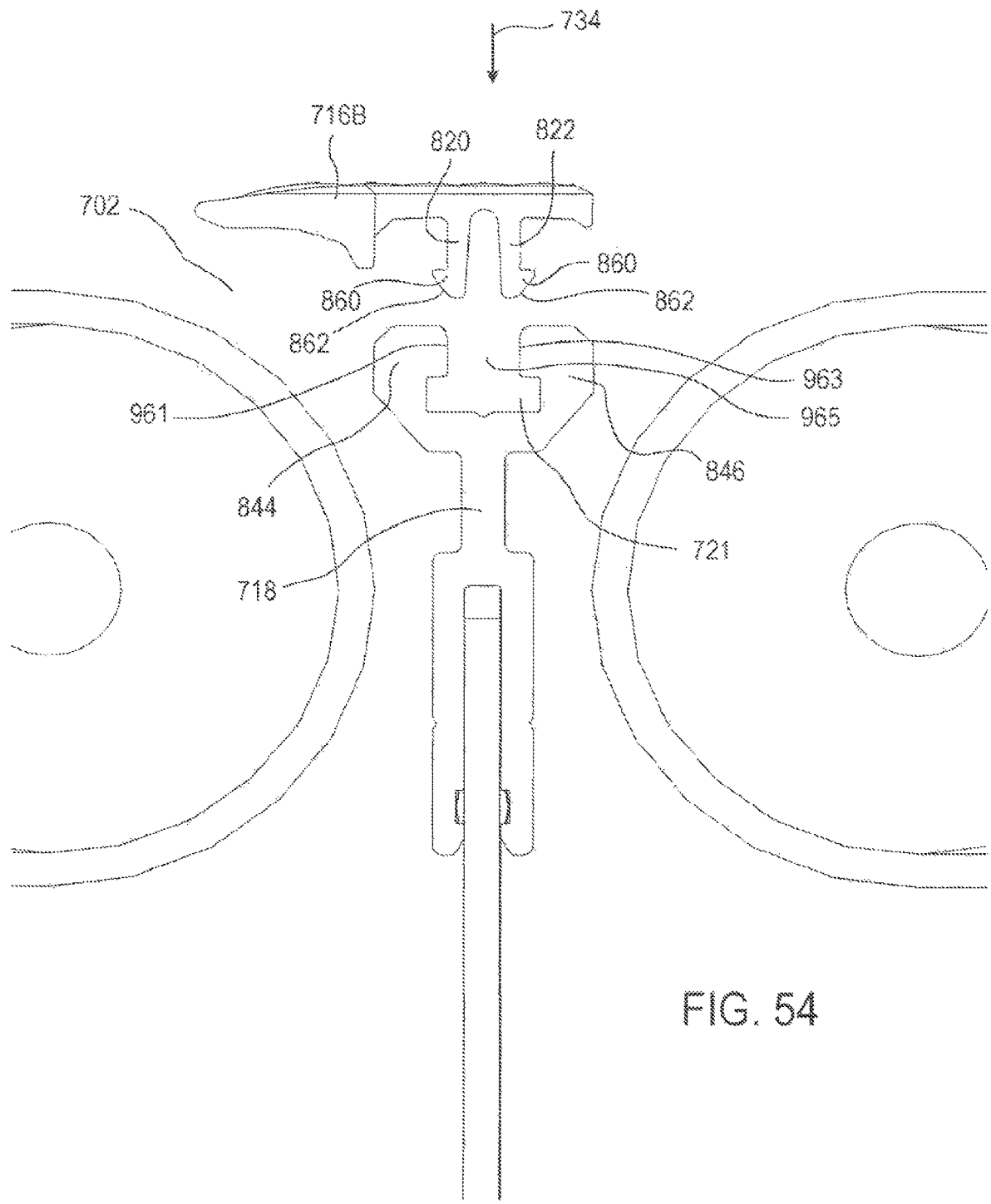
FIG. 54 is a view similar to FIG. 53 showing a transfer guard member positioned above a channel of the mounting member.

With reference to FIGS. 47 and 54, the legs 820, 822 have an initial, undeflected configuration prior to being connected to the mounting member 718. In this initial configuration, the legs 820, 822 have outer surfaces 981, 983 with a maximum distance 967 therebetween that is greater than a distance 965 between surfaces 961, 963 of a narrowed upper portion 871 of the channel 721 (see FIG. 56). This larger distance 967 causes the legs 820, 822 to be resiliently compressed when the legs 820, 822 are engaged in the channel 721. Thus, when the legs 820, 822 are engaged with the channel 721, the leg outer surfaces 981, 983 (see FIG. 47) are urged against the surfaces 961, 963 (see FIG. 56) of the mounting member channel 721. In this manner, the engagement of the feet 860, the legs 820, 822, and the walls 844, 846 fix the transfer guard member 716B to the mounting member 718. In response to a large force against the outboard portion 812, the outboard portion 812 may tilt upwardly or downwardly and the transfer guard member 716B can detach from the mounting member 718 by the feet 860 disengaging from the walls 844, 846 and the legs 820, 822 shifting together to exit the channel 721. In another form, the large force may fracture the upper part of the body 810 off of the legs 820, 820 which detaches the upper part of the body 810 from the mounting member 718 while the legs 820, 822 remain in the channel 721.

Figure 48:
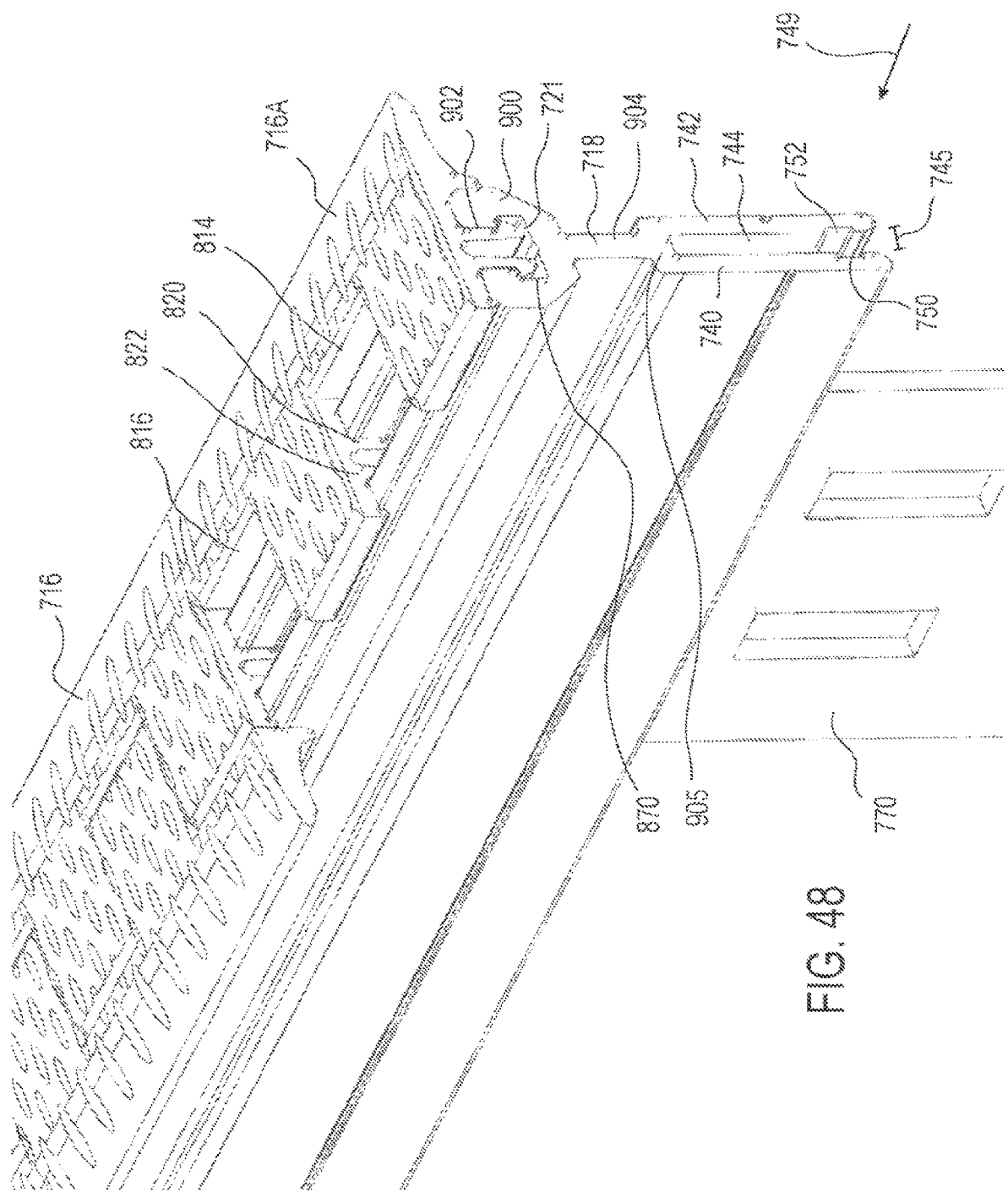
FIG. 48 is an enlarged, perspective view of a portion of the transfer guard system of FIG. 44 with a downstream one of the transfer guard members removed to show the associated upstream transfer guard member connected to the mounting member.

With reference to FIG. 48, the transfer guard member 716B is removed from the mounting member 718 to show the engagement of the legs 820, 822 of the transfer guard member 716A in the channel 721 of the mounting member 718. The mounting member 718 includes a head portion 900 that includes the walls 844, 846 and includes the generally T-shaped channel 721. The channel 721 includes a narrow upper portion 902 through which the legs 820, 822 are deflected together to travel through and the enlarged lower portion 870 that receives the feet 860. The mounting member 718 includes a reduced thickness neck portion 904 and a transverse portion 905 connecting the head portion 900 to the arms 740, 742. The neck portion 904 separates the walls 844, 846 from the arms 740, 742 and resists the walls 844, 846 collapsing together in response to expanding the arms 740, 742 when the mounting member 718 is connected to the support members 770. The neck portion 904 likewise resists the arms 740, 742 collapsing together in response to the transfer guard member legs 820, 822 being advanced into the channel 721 between the walls 844, 846.

In one approach, the mounting member 718 has a cross-section perpendicular to the length of the mounting member 718 that is uniform throughout the mounting member 718. The mounting member 718 may be manufactured by extruding material into the desired cross-section, machining, or 3D printing, as some examples. Because the mounting member 718 has a uniform cross section throughout, the support members 770 of the mounts 730 may be connected to the mounting member 718 at any lateral position along the mounting member 718. This provides additional flexibility for installing the mounting member 718 onto the support members 770. Further, the uniform cross section allows the mounting member 718 to be cut to length for a particular application and the number of transfer guard members 716 be selected to fill the cut length of the mounting member 718. For applications where the length of the mounting member 718 is not a multiple of the lateral width of the transfer guard members 716, the end pair of upstream and downstream transfer guard members 716A, 716B can be cut to provide the desired lateral width of the transfer guard members 716 along the mounting member 718. The transfer guard members 716 may have a unitary, one-piece construction and may be made of, for example, plastic materials such as high-density polyethylene. As other examples, plastics, urethanes, metal, and composites may be utilized for the transfer guard members 716. The material of the transfer guard members 716 may be selected to provide sufficient strength while permitting the transfer guard members 716 to be cut to size as needed for a particular application, such as using a saw.

Figure 49:
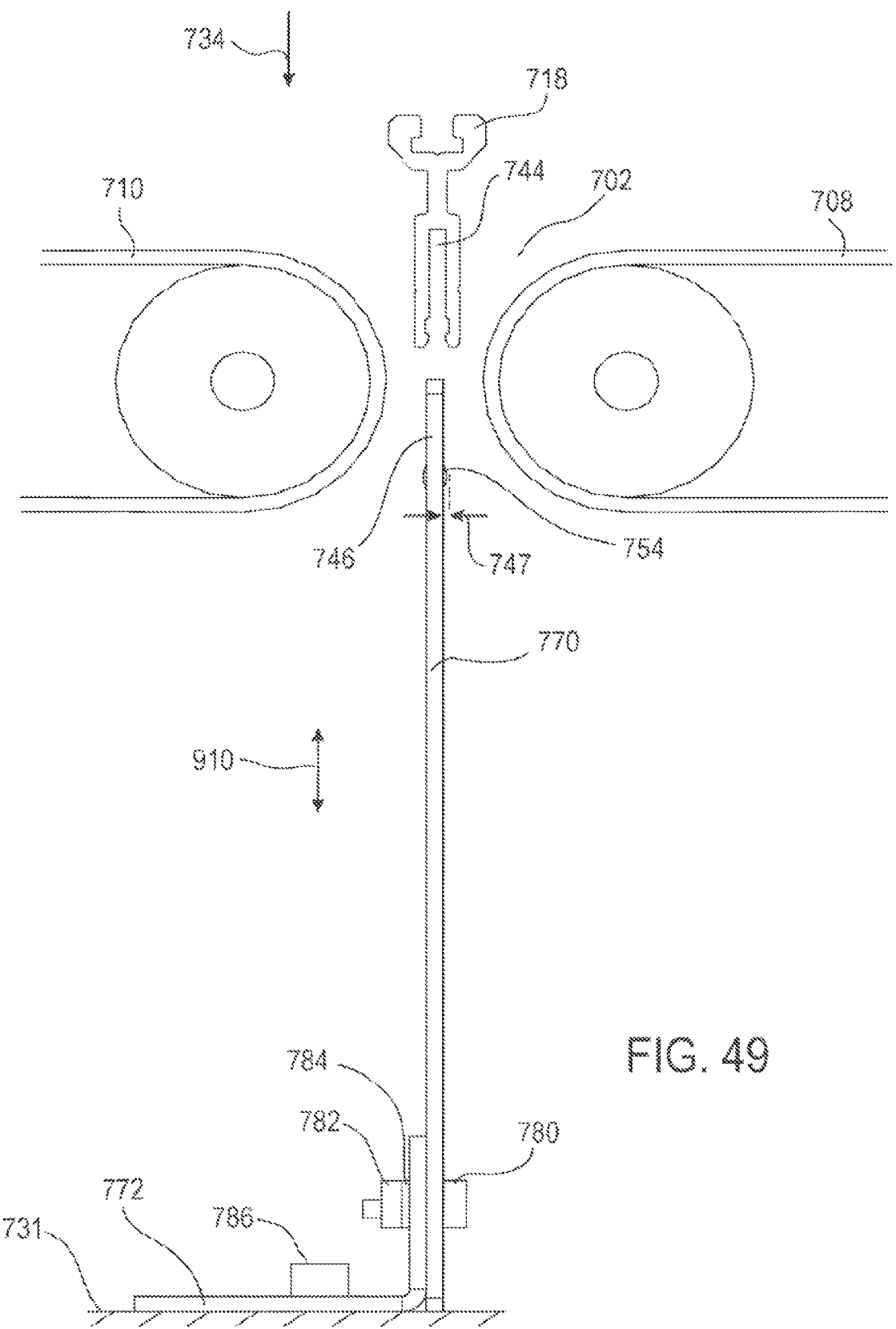
FIG. 49 is a side elevational view of a method of installing the system of FIG. 43 showing the mounting member being lowered into the gap above a support member of one of the mounts.

With reference to FIGS. 49-57, a method of installing the transfer guard system 700 in the gap 702 will be described with respect to one of the mounts 730, although a similar operation occurs at the other mount 730. In FIG. 49, the bracket 772 is secured to the mounting surface 731 by, for example, bolts 786. The support member 770 is positioned against the bracket 772 so that the upper plate portion 746 of the support member 770 is positioned at the desired position in or adjacent the gap 702 to provide the corresponding desired position of the mounting member 718 once the transfer guard member 718 has been connected to the support member 770. The adjustment of the positon of the upper plate portion 746 may be accomplished by moving the support members 770 in directions 910 to align the appropriate openings 776 of the support member 770 with the openings 778 of the brackets 772 (see FIG. 44). Once the upper plate portion 746 is at desired location, the bolts 780 are advanced through the openings 776, 778 and the nut 782 and washer 784 are connected thereto to secure the support member 770 to the bracket 772. In another form, the support members 770 may be connected directly to the support surface 731 using, for example, fasteners or welds.

Figure 50:
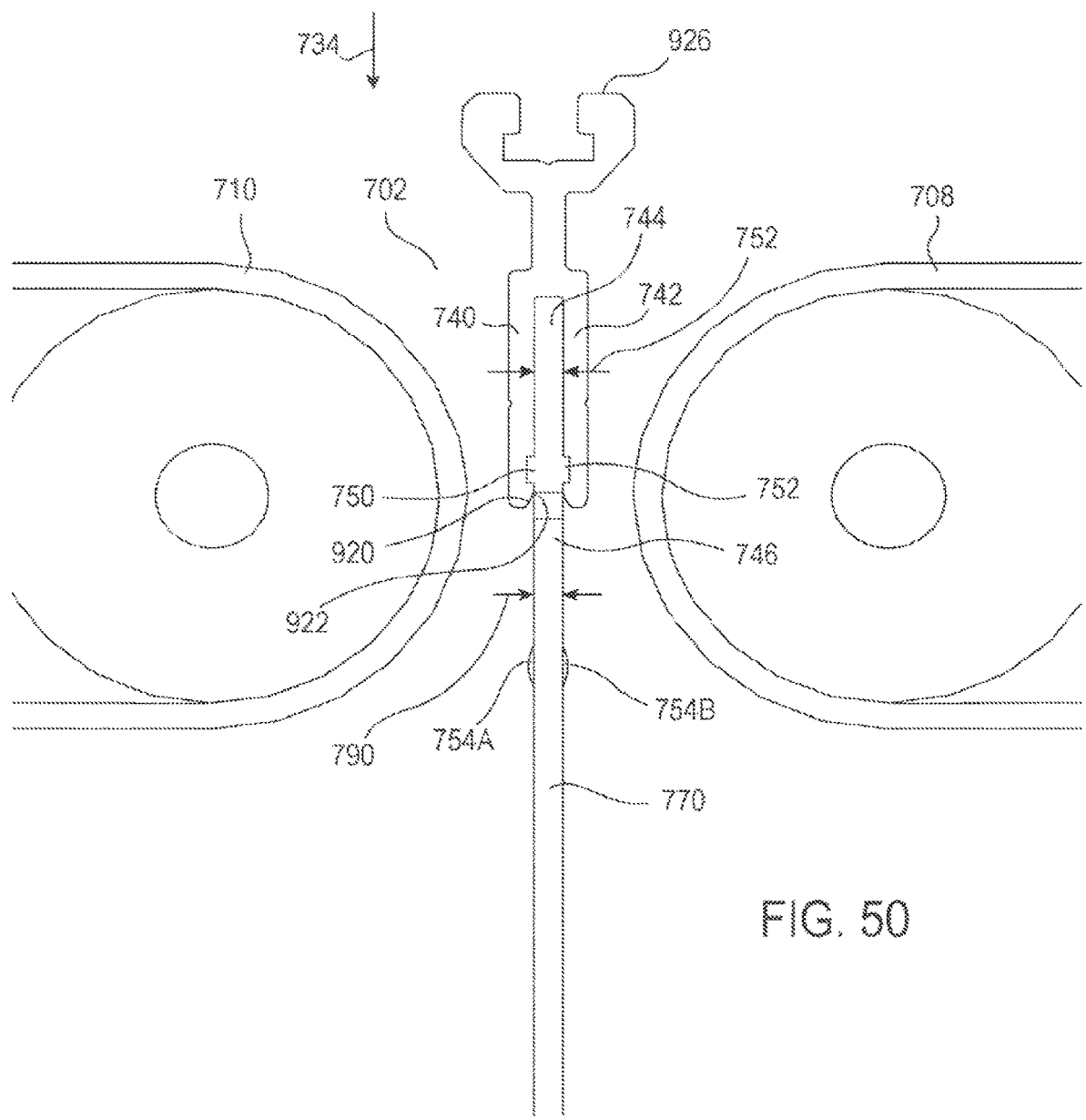
FIG. 50 is a view similar to FIG. 49 showing a lower end portion of the mounting member engaging an upper portion of the support member.

With reference to FIGS. 49 and 50, the mounting member 718 is lowered into the gap in direction 734 and onto the upper plate portion 746 of the support member 770. The upper plate portion 746 advances into the slot 744 of the mounting member 718 as the mounting member 718 is slid onto and engaged with the upper plate portion 746. In one form, the distance 752 between the arms 740, 742 is slightly larger the thickness 790 of the upper plate portion 746 so that the mounting member 718 can easily slide onto the upper plate portion 746 and be engaged therewith. The installer may lower the mounting member 718 into the gap 702 and onto the support members 770 by manually supporting an underside of the mounting member 718 between the support members 770.

In another form, the distance 752 is the same or less than the thickness 790 so that the arms 740, 742 deflect apart as the mounting member 718 is slid onto the upper plate portions 746 and engaged therewith. The arms 740, 742 include cam surfaces 920 that may engage edges 922 of the upper plate portions 746 and urge the arms 740, 742 apart. The mounting member 718 may be advanced downward in direction 734 by an installer pressing on an upper surface 926 of the mounting member 718 or impacting the upper surface 926 of the mounting member 718 with a mallet.

Figure 51:
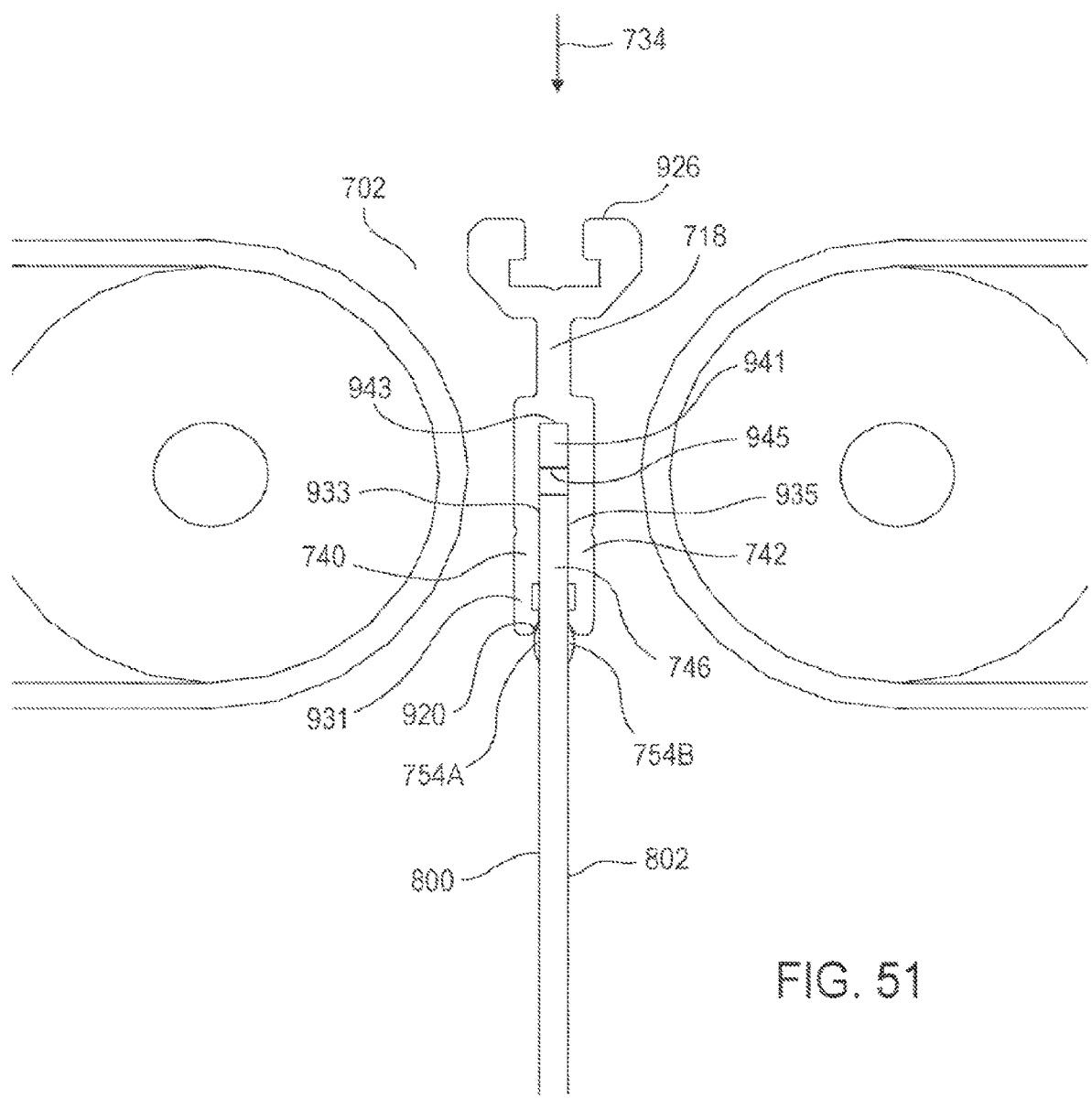
FIG. 51 is a view similar to FIG. 50 showing a lower end portion of the mounting member resting on the detents of the support member.

With reference to FIG. 51, the mounting member 718 has been advanced in direction 734 so that a lower end portion 931 of the mounting member 718 contacts the detents 754A, 754B. The arms 740, 742 have inner surfaces 933, 935 abutting the surfaces 800, 802 of the support member 770. The mounting member 718 is slidably coupled to the support member 770 with the weight of the support member 718 being supported by the detents 754A, 754B. The installer may stop downward movement of the mounting member 718, and leave the mounting member 718 resting on the support members 770 as the installer reaches for a mallet to drive the mounting member 718 to its fully seated position (see FIG. 53).

With the mounting member lower end portion 931 resting on the detents 754A, 754B as shown in FIG. 51, the mounting member 718 may be slid laterally relative to the upper plate portion 746 to adjust the lateral position of the mounting member 718 in the gap 702 if there is sufficient space between the skirts 724, 726. In other approaches, the lateral ends of the mounting member 718 abut or are sufficiently close to the skirts 724, 726 to restrict lateral sliding movement of the mounting member 718 relative to the upper plate portion 746.

The mounting member 718 is sitting proud on the support member 770 in FIG. 51. There is a gap 941 between a lower surface 943 of the transverse portion 905 of the mounting member 718 and an upper surface 945 of the upper plate portion 746. The proud location of the mounting member 718 positions the upper surface 926 above or at an upper end of the gap 702. In this manner, a user may push against the upper surface 926 with the installer's hand(s) or foot or strike the upper surface 926 with a mallet to urge the mounting member 718 in direction 734 downward from the proud position.

Figure 52:
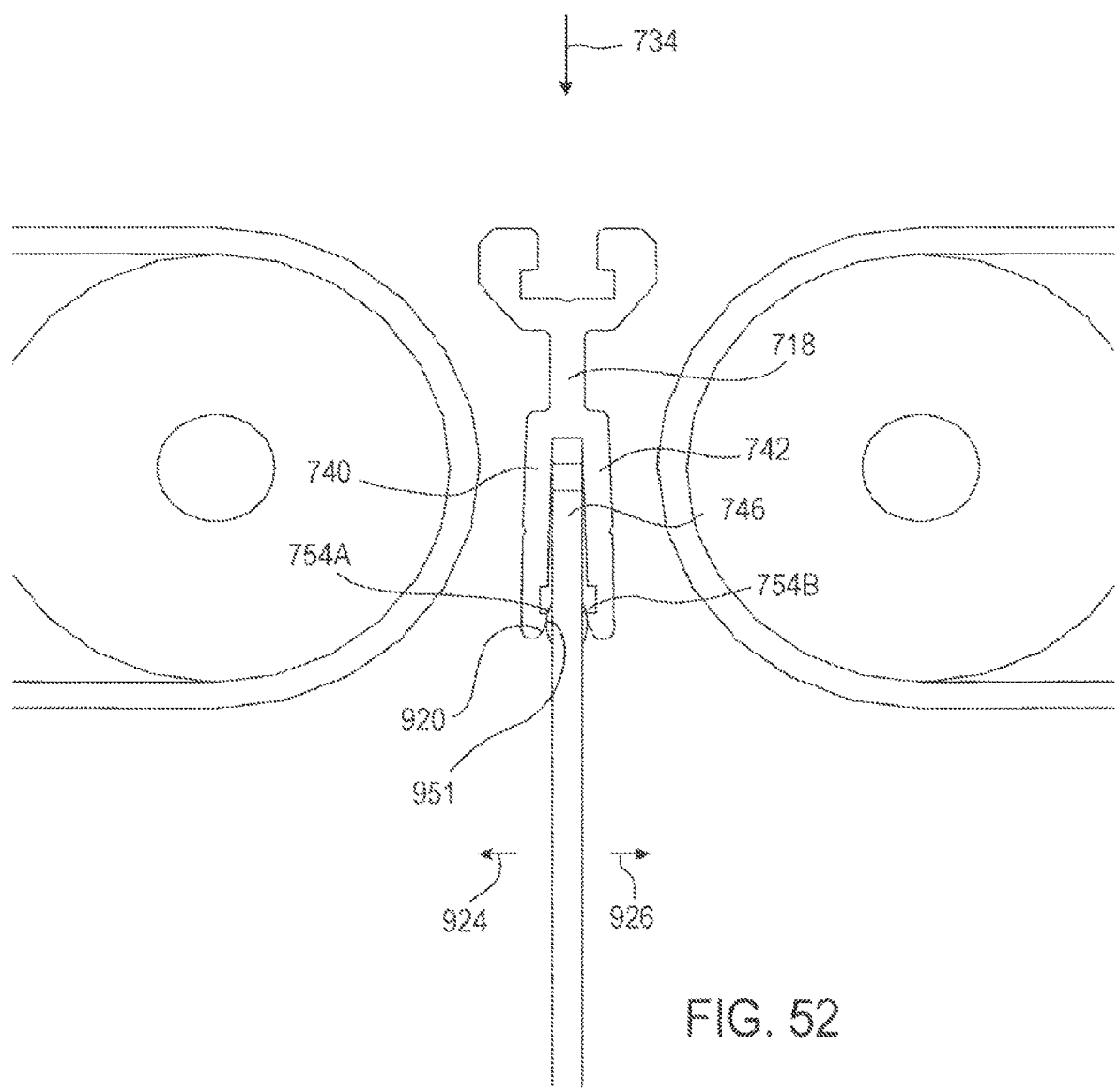
FIG. 52 is a view similar to FIG. 50 showing the detents of the support member camming arms of the mounting member apart as the mounting member is advanced downward along the support member.

With reference to FIG. 52, the installer has advanced the mounting member 718 farther downward in direction 734. The cam surfaces 920 of the arms 740, 742 are engaging and riding along outer surfaces 951 of the detents 754A, 754B. This engagement urges the arms 740, 742 apart in directions 924, 926 away from the surfaces 800, 802 of the support member 770.

Figure 53:
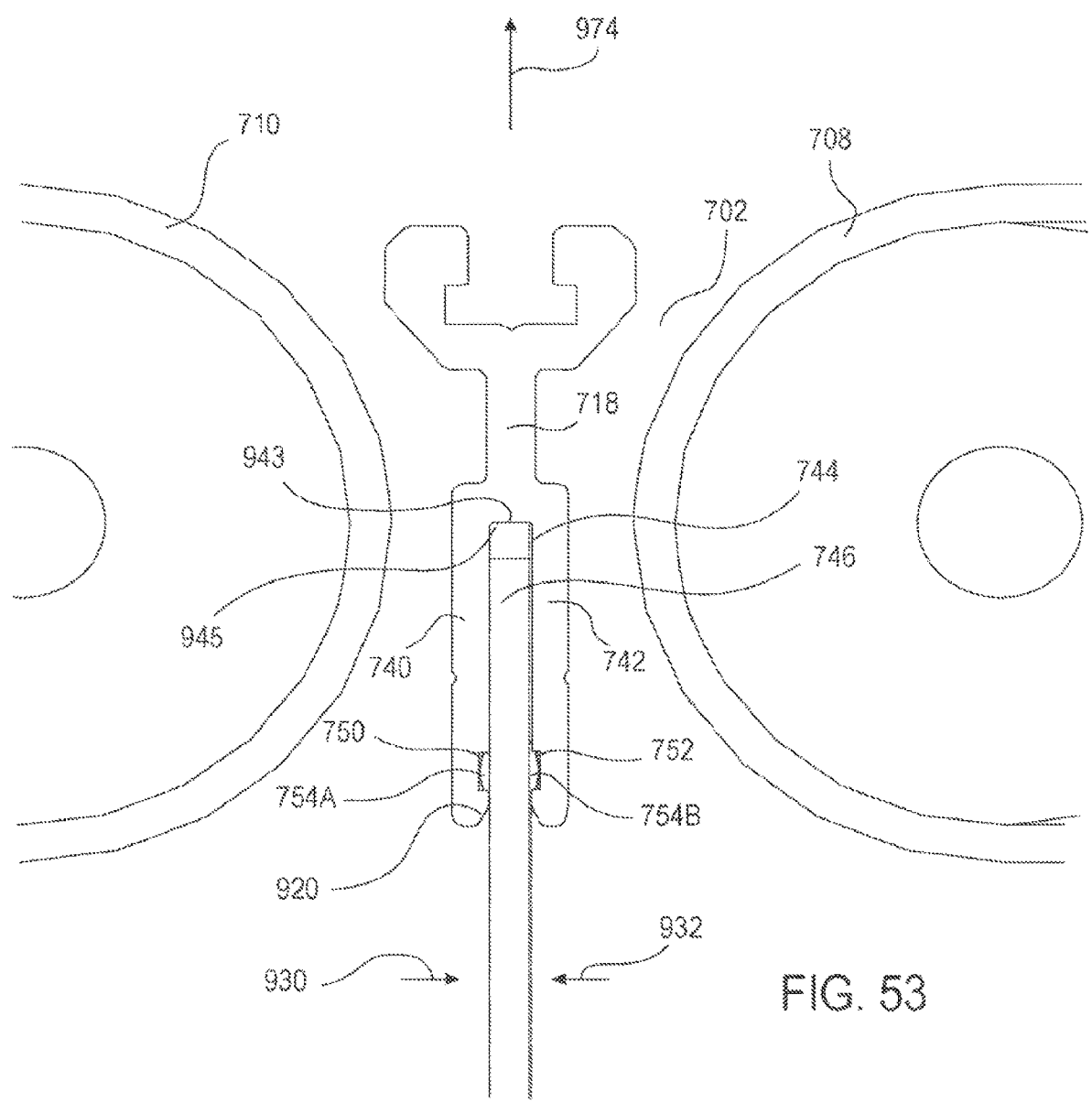
FIG. 53 is a view similar to FIG. 50 showing the detents of the mount received in channels of the mounting member arms to form the snap-fit connection between the mounting member and the support member.

Once the installer has advanced the mounting member 718 sufficiently far in direction 734, the channels 750, 752 are horizontally aligned with the detents 754A, 754B as shown in FIG. 53. The clearance provided by the channels 750, 752 permits the arms 740, 742 to resiliently return together in directions 930, 932 which engages the detents 754A, 754B in the channels 750, 752. The engagement between the detents 754A, 754B and the channels 750, 752 resists removal of the mounting member 718 from the support member 770. Further, the arms 740, 742 abut the support member surfaces 800, 802 to constrain the mounting member 718 on the support members 770. In one form, the mounting member 718 and support member 770 are configured so that the mounting member lower surface 943 seats against support member upper surface 945 when the detents 754A, 75B are received in channels 750, 752. The snug engagement of the upper plate portion 746 and the slot 744 provides a secure connection between the mounting member 718 and the support member 770 and permits the mounting member 718 to transfer loading from conveyor operations to the support member 770.

FIGS. 54-57 show the process of connecting transfer guard member 716B to the mounting member 718 after the mounting member 718 has been secured to the support member 716. The process is repeated for the remaining transfer guard members. In another approach, the transfer guard members 716 may be connected to the mounting member 718, and then the mounting member 718 with transfer guard members 716 connected thereto may be lowered into the gap 702 and snap-fit to the support members 770.

With reference to FIG. 54, the transfer guard member 716 is positioned above the mounting member 718 so that the legs 820, 822 are vertically aligned with the channel 721 of the mounting member 718. The transfer guard member 716B is then advanced in direction 734 downwardly into the channel 721.

Figure 55:
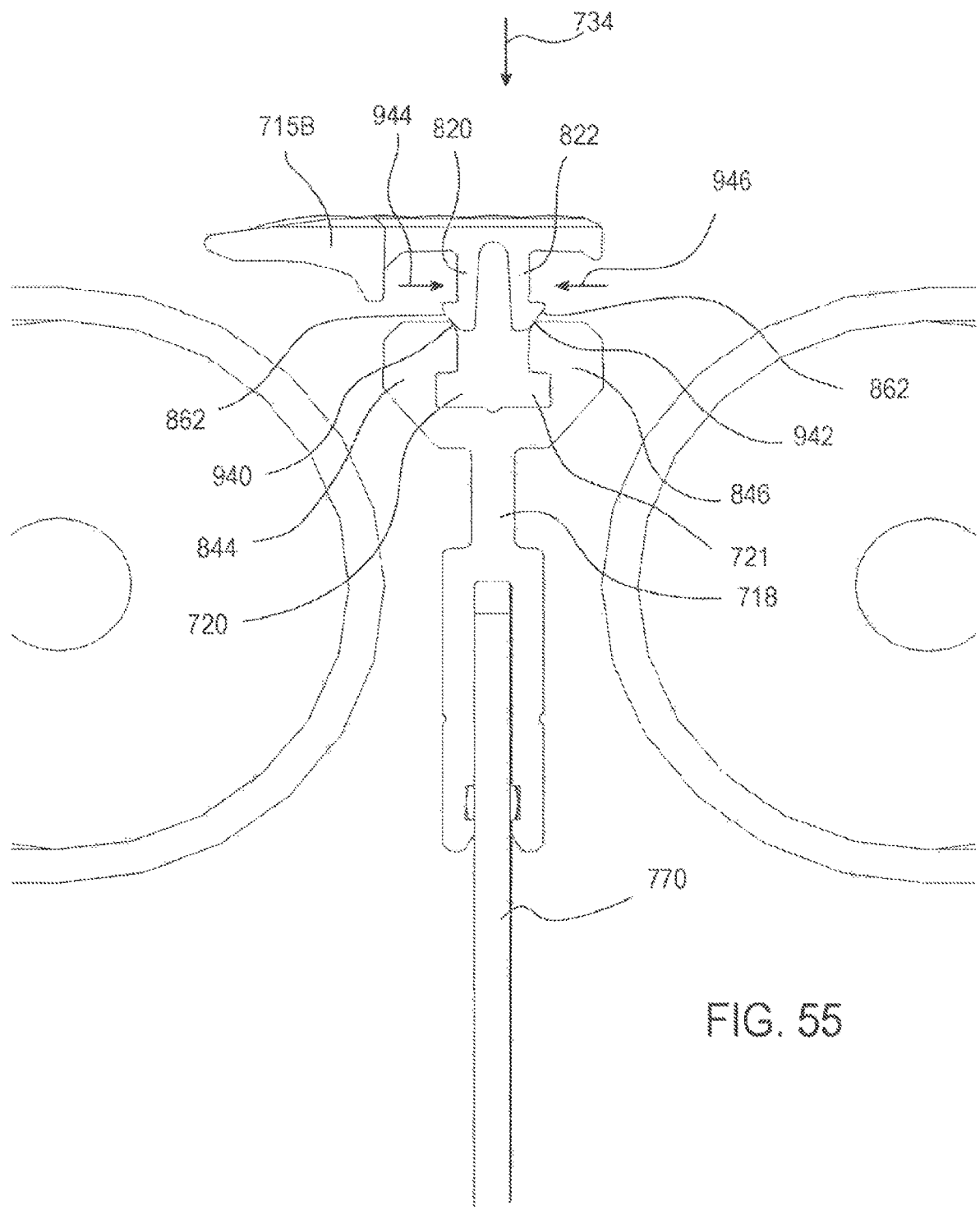
FIGS. 55 and 56 are views similar to FIG. 54 showing the legs of the transfer guard member being urged together via camming engagement of the legs against the mounting member.
Figure 56:
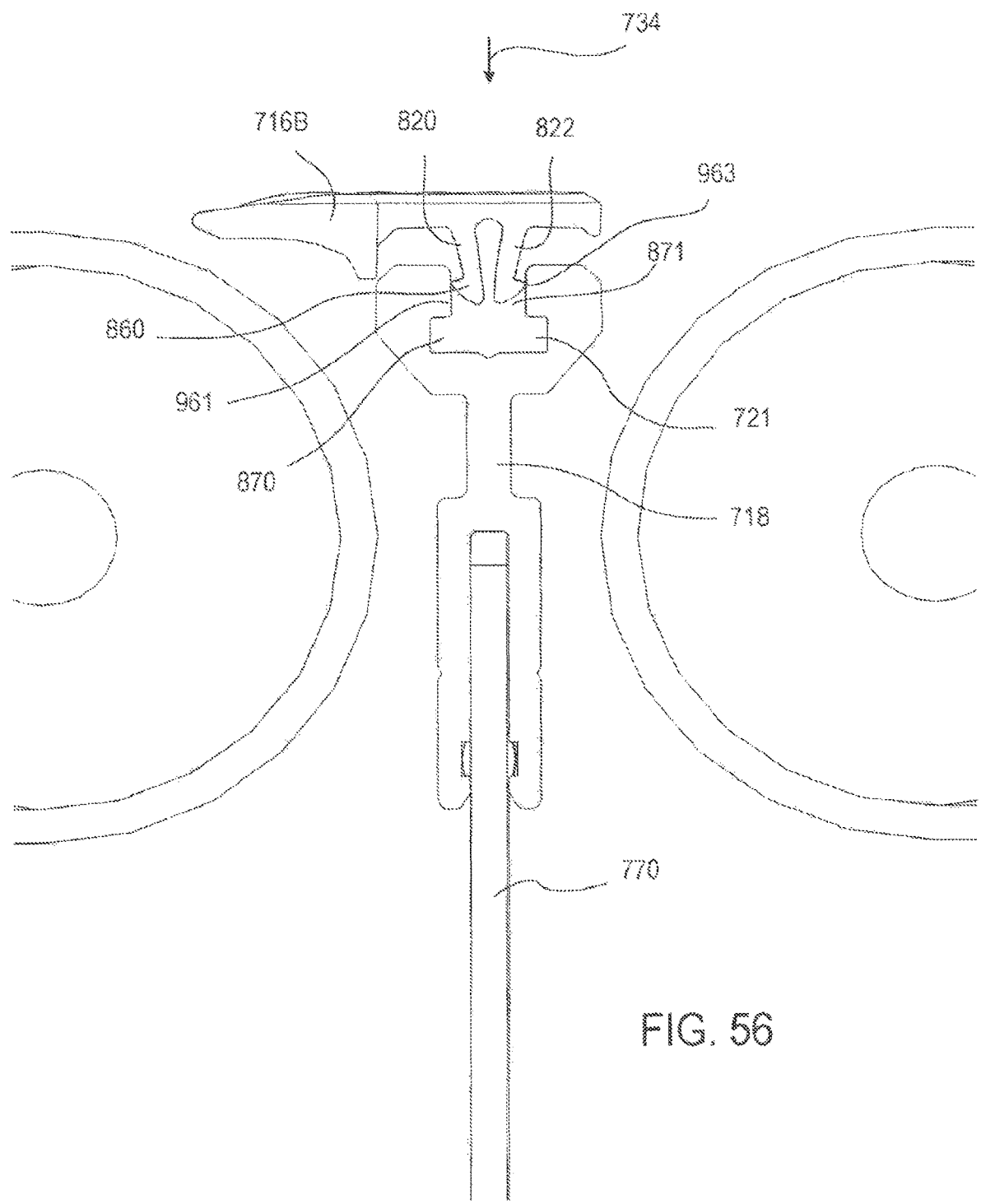

With reference to FIGS. 55 and 56, the transfer guard member 716 is advanced farther in direction 734 so that the inclined surfaces 862 of the transfer guard member feet 860 contact edges 940, 942 of the walls 844, 846. The camming engagement between the feet inclined surfaces 862 and the edges 940, 942 urges the legs 820, 822 together in directions 944, 946. The legs 820, 822 resiliently deflect together and the feet 860 fit into the narrowed upper portion 871 of the channel 721. The feet 860 slide along the opposed surfaces 961, 963 of the channel upper portion 871 as shown in FIG. 56.

With reference to FIG. 57, the transfer guard member 716 has been advanced sufficiently far in direction 734 that the feet 860 have reached the enlarged lower portion 870 of the channel 721. The legs 820, 822 resiliently return apart in directions 950, 952 and position the feet stop surfaces 864 below the wall stop surfaces 866. The legs 820, 822 are thereby detachably engaged with the walls 844, 846 in the channel 721. The process of installing the transfer guard member 716B to the mounting member 718 is repeated with the remaining transfer guard members 716. The transfer guard system 700 is thereby ready to transfer objects across the gap. Further, the support members 770 permit the mounting member 718 to resiliently shift in directions 950, 952 in the gap 702 to accommodate loading during conveyor operations.

The transfer guard system 700 may be installed using a number of different techniques. As a first example and with reference to FIGS. 44 and 48, the mounting member 718 may first be connected to the support members 770 by positioning the support members 770 laterally relative to the mounting member 718, the detents 754 aligned with the channels 750, 752, and the plate portions 746 slid into the slot 744 in direction 749. This forms a slide-fit connection between the mounting member 718 and the support members 770 without having to cam apart the arms 740, 742 using the detents 754 as discussed above. The detents 754 slide into and engage the channels 750, 752 thereby connecting the mounting member 718 to the support members 770. This procedure can be done in the area below the conveyor belts 708, 710.

With the mounting member 718 connected to the support members 770, the installer(s) may lift the mounting member 718/support member 770 assembly upward so the mounting member 718 travels upward into the gap 702 until the mounting member 770 is at the desired vertical height in the gap 702. The transfer guard members 716 may be advanced downwardly from above the gap 702 and connected to the mounting member 718. The brackets 772 are positioned on the support surfaces 731 near the support members 770 and the installer(s) can mark with a marker the position of the brackets 772 on the support surface 731 which provides the desired longitudinal positioning of the mounting member 718 in the gap 702. The installer(s) can also move the support members 770 up/down to align the support member openings 776 with the bracket openings 778 and mark the position of the support members 770 to indicate the desired vertical positioning of the mounting member 718 in the gap 702. The mounting member 718/support members 770 assembly may be moved out of the way, the brackets 772 secured to the mounting surfaces 731 such as by using welds or bolts 786, and the mounting member 718/support member 770 assembly connected to the brackets 772. In this example, the mounting member 718 is advanced upwardly into the gap 702 from below the conveyor belts 708, 710 and the transfer guard members 716 are advanced downwardly into the gap 702 to connect to the mounting member 718.

As another example of installing the transfer guard system 700, the transfer guard members 716 may be connected to the mounting member 718 and the transfer guard member 716/mounting member 718 assembly lowered into the gap 702 so that the transfer guard members 716 rest on the conveyor belts 708, 710. The support members 770 are advanced from below the conveyor belts 708, 710 upward into the gap 702 and slid upward into the slot 744 of the mounting member 718. The installer(s) then orient the support members 770 and brackets 772 so that the mounting member 718, when seated on the mounting members 770, positions the associated transfer guard members 716 at the desired fore/aft and vertical positions.

Figure 58:
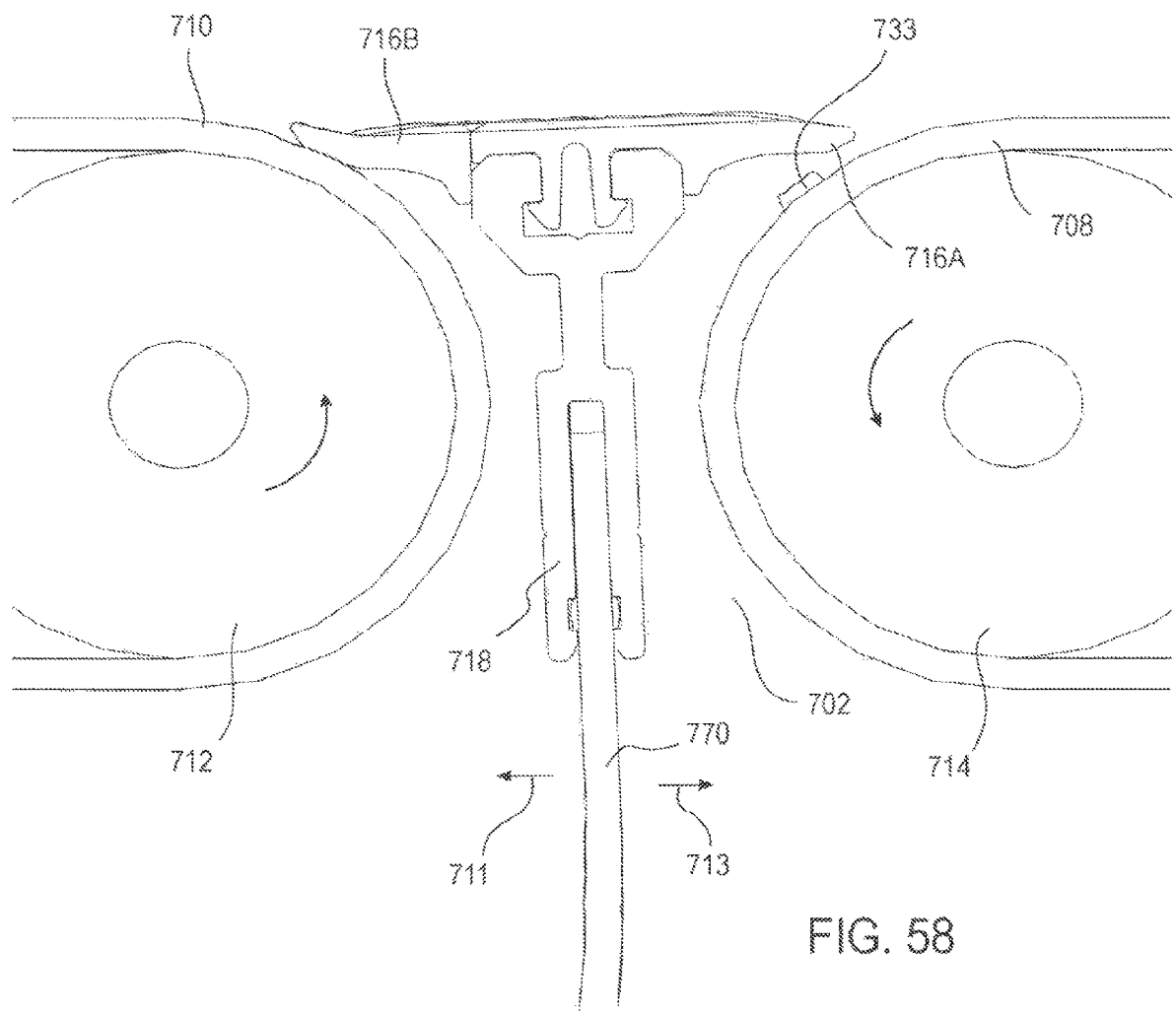
FIG. 58 is a view similar to FIG. 57 showing all of the transfer guard members connected to the mounting member and the support members deflecting in response to an imperfection in the conveyor belt striking the upstream transfer guard members.
Figure 59:
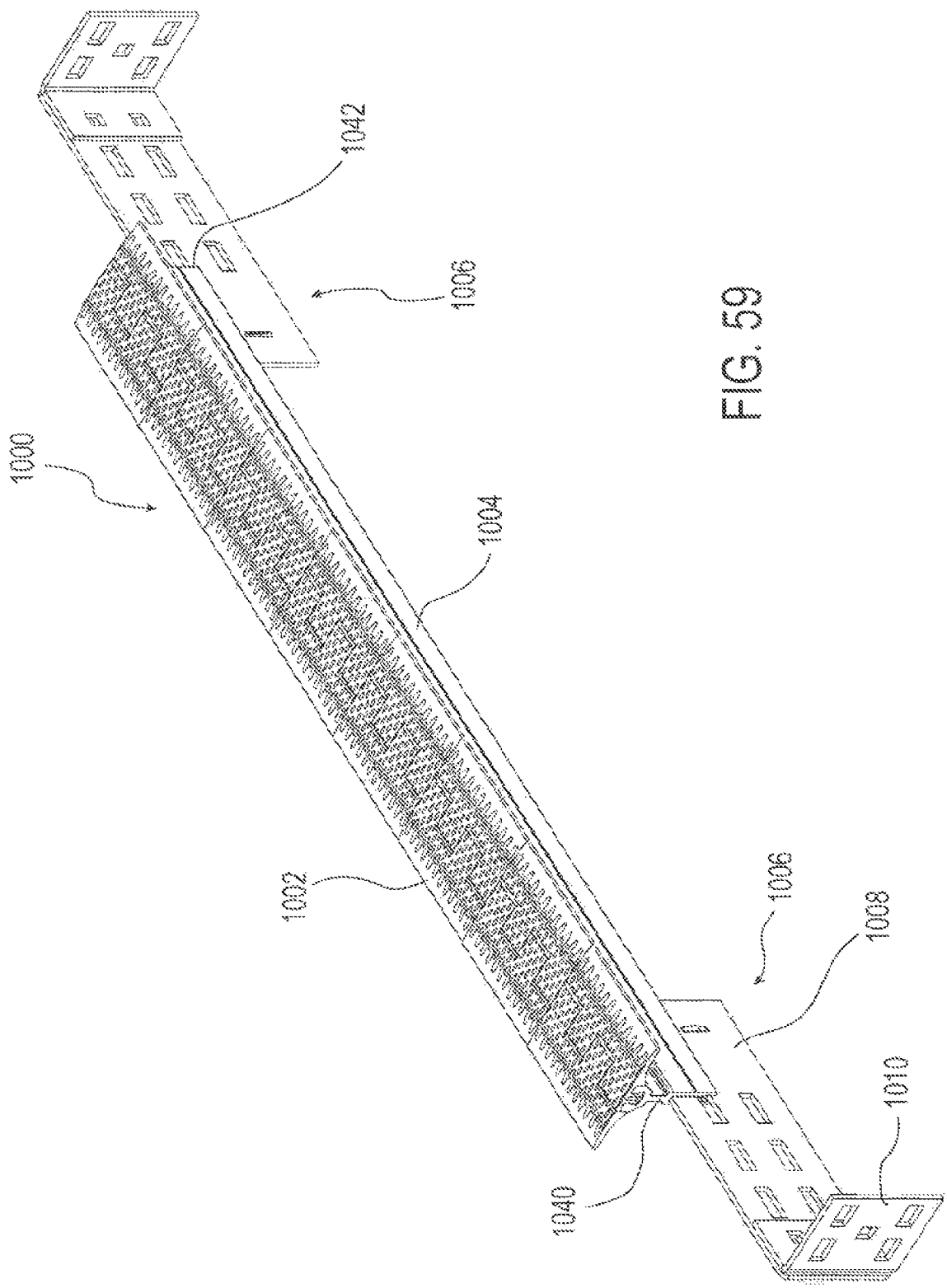
FIG. 59 is a perspective view of another transfer guard system having transfer guard members connected to a mounting member and mounts of the system in a lateral configuration.
Figure 60:
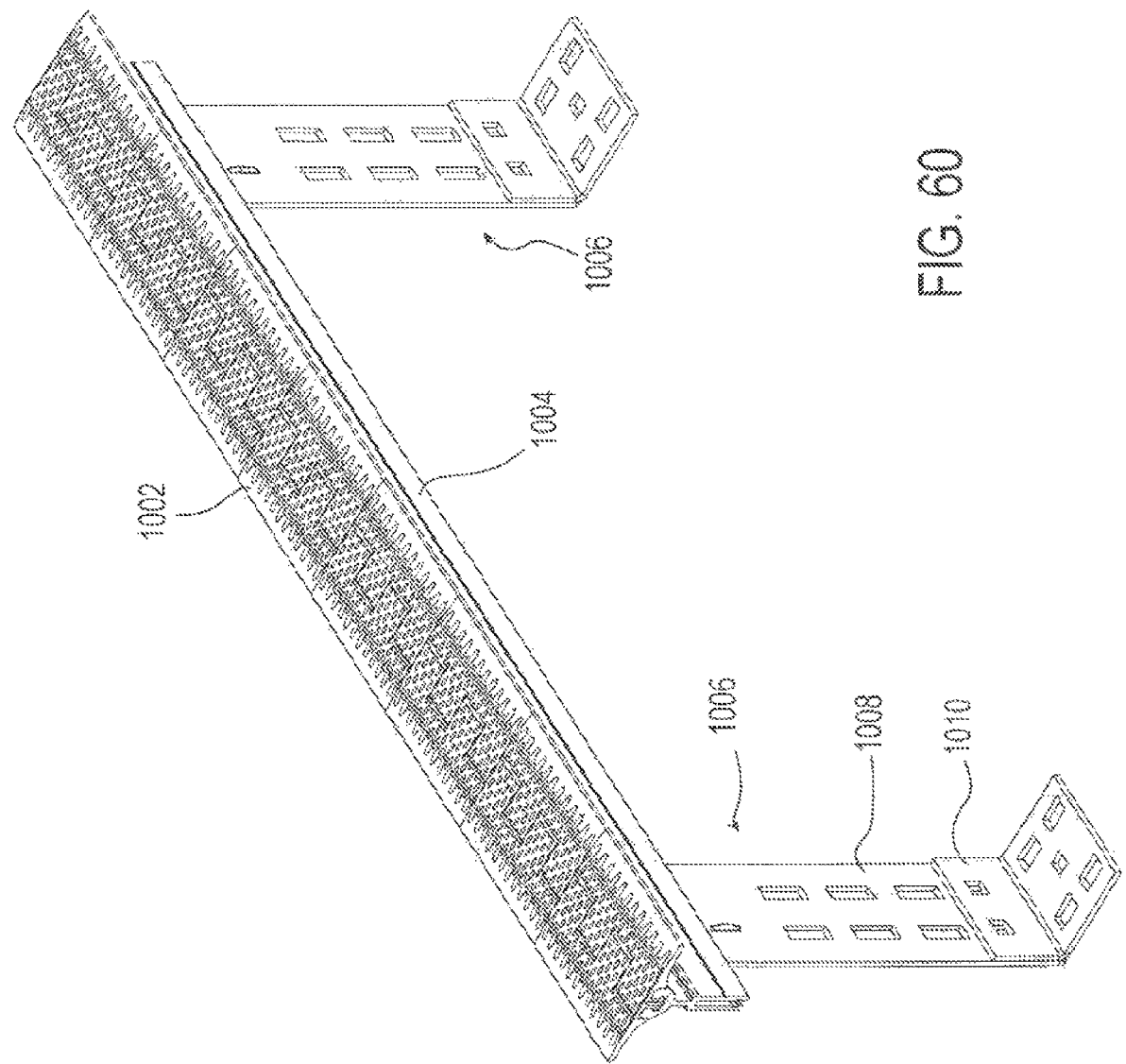
FIG. 60 is a view similar to FIG. 58 showing the mounts of the system in a vertical configuration.
Figure 61:
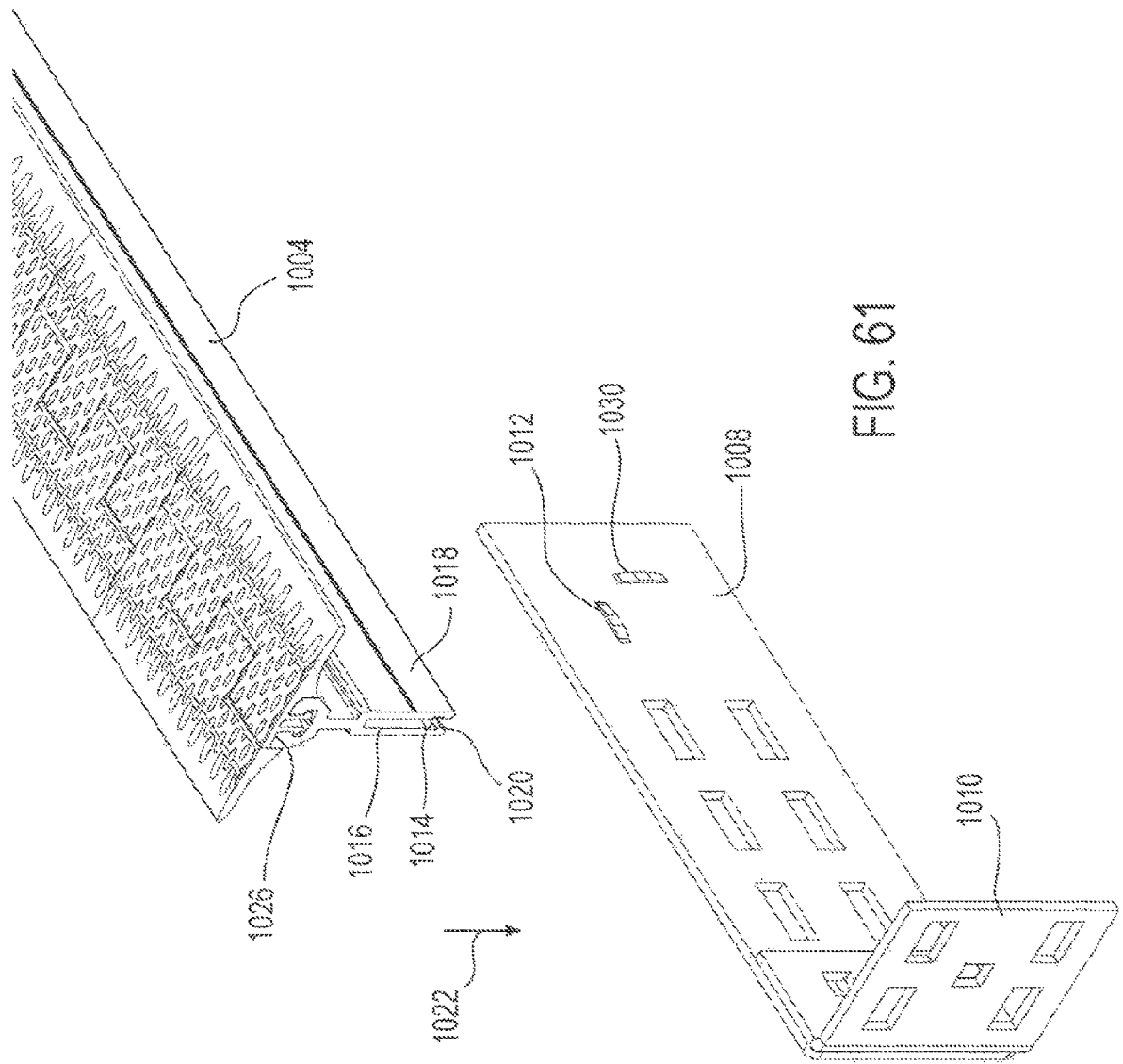
FIG. 61 is an enlarged perspective view of a portion of the transfer guard system of FIG. 58 showing the mounting member being lowered onto one of the mounts to form a snap-fit connection therebetween.

Turning to FIGS. 59-61, a transfer guard system 1000 is provided that is similar in many respects to the transfer guard system 700 discussed above. The transfer guard system 1000 includes transfer guard members 1002 detachably fixed to a mounting member 1004. The transfer guard system 1000 includes one or more mounts 1006 as shown in FIG. 58. Each mount 1006 includes a support member 1008 and a bracket 1010. The support members 1008 can be connected to the mounting member 1004 in a lateral orientation as shown in FIG. 59 wherein the length of the support members 1008 extends parallel to the length of the mounting member 1004. The support member 1008 can also be attached to the mounting member 1004 in a vertical orientation as shown in FIG. 60 wherein the support member 1008 extends transverse, such as perpendicular, to the length of the mounting member 1004. The ability of the mounts 1006 to be connected to the mounting member 1004 in different configurations provides additional flexibility in installing the transfer guard system 1000 in a gap between conveying surfaces.

In this manner, the transfer guard system 1000 may be installed with the support members 1008 in the lateral orientation (see FIG. 59) or the vertical orientation (FIG. 60) depending on the surrounding environment. For example, the lateral orientation may be desirable if the brackets 1010 are mounting to a support surface laterally outward from the gap between the conveying surfaces. As another example, the vertical orientation may be utilized if the support surface is below the gap and there are environmental structures, such as the skirts 724, 726 near the lateral ends 1040, 1042 of the mounting member 1004. By utilizing the vertical orientation of the support members 1008, the support members 1008 and the brackets 1010 are positioned out of the way of the mounting member 1004 and do not take up lateral space between the skirts 724, 726. This allows the mounting member 1004 to extend the full lateral distance between the skirt 724, 726 and the transfer guard members 1002 to bridge the gap for the full lateral distance between the skirts 724, 726.

With reference to FIG. 61, each support member 1008 includes a pair of detents 1012 that extend outward from opposite sides of the support member 1008 and are oriented to extend parallel to the length of the support member 1008. The detents 1012 engage channels 1014 of arms 1016, 1018 of the mounting member 1004 and permit the mounting member 1004 to be connected to the support members 1008 when the support members 1008 are in the lateral orientations thereof. Like the mounting member 718 discussed above, the mounting member 1004 may be advanced downward in direction 1022 onto the support members 1008 to snap-fit the mounting member 1004 to the support members 1008 in the lateral orientation. The detents 1012 engage cam surfaces 1020 of the arms 1016, 1018 and spread the arms 1016, 1018 apart as the mounting member 1004 is advanced downward in direction 1022 onto the support members 1008. The arms 1016, 1018 resiliently return back toward each other once the channels 1014 receive the detents 1012.

In another form, slide-fit connections between the support members 1008 and the mounting member 1004 may be formed by sliding each of the support members 1008 in a lateral direction into the slot between the arms 1016, 1018 so that the detents slide into the channels 1014. This approach forms the slide-fit connections without the installer having to use the detents 1012 to spread the arms 1016, 1018 apart. The installer may then connect the mounting member 1004/support members 1008 assembly to the brackets 1010, which may include advancing the mounting member 1004 upwardly into a gap to the desired position thereof before securing the support members 1008 to the brackets 1010.

Each support member 1008 also includes a pair of detents 1030 extending outwardly from opposite sides of the support member 1008. The detents 1030 are similar in shape and operation to the detents 754 discussed above. The detents 1030 are oriented to extend transverse to the length of the support members 1008. The detents 1030 allow the installer to advance the mounting member 1004 downward in direction 1022 onto the support members 1008 when the support members 1008 are in the vertical orientation to form a snap-fit connection between the mounting member 1004 and the support member 1008 in a manner similar to the method discussed above with respect to FIGS. 49-53. Alternatively, the support members 1008 may be slid in lateral directions (like direction 749, see FIG. 48) into the slot between arms 1016, 1018 so that the detents 1030 slide into and engage the channels 1020 without deflecting the arms 1016, 108. The transfer guard members 1002 are connected to the mounting member 1004 before or after the mounting member 1004 has been fit onto the support members 1008.

Figure 62:
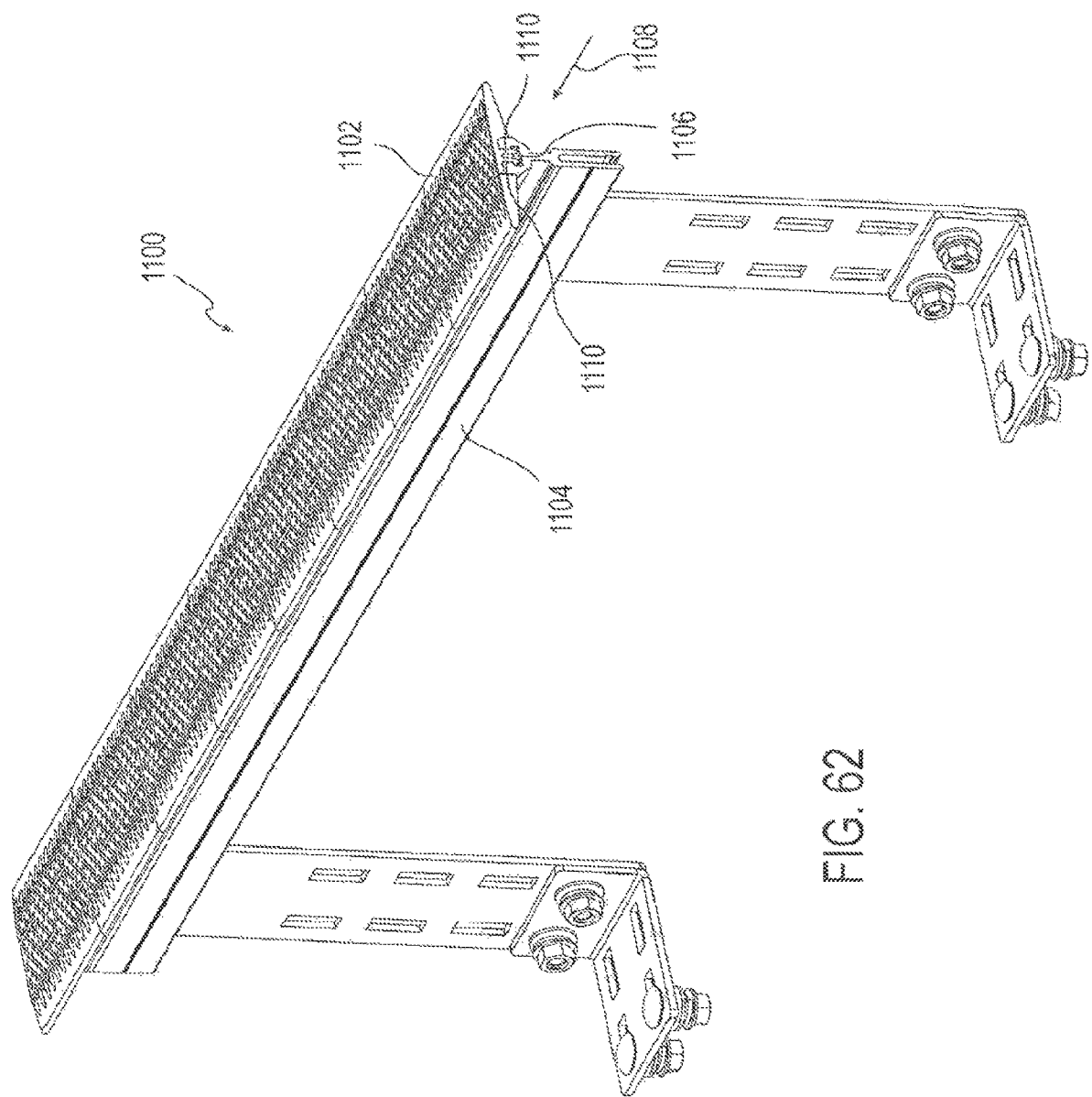
FIG. 62 is perspective view of another transfer guard system having transfer guard members, a mounting member, and a pin for fixing legs of the transfer guard members within a channel of the mounting member.
Figure 63:
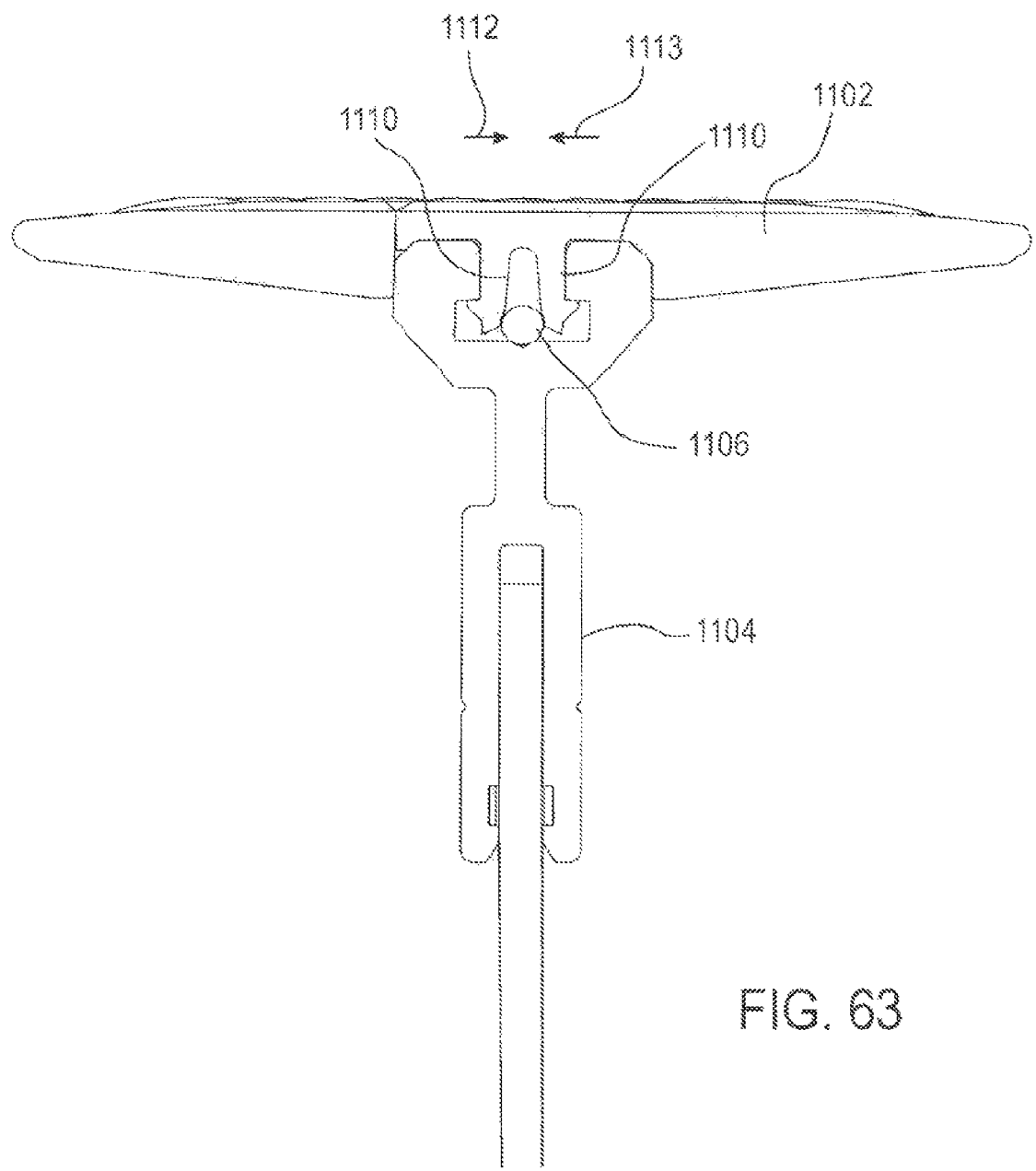
FIG. 63 is a side elevational view of a portion of the transfer guard system of FIG. 62 showing the pin keeping the legs of one of the transfer guard members engaged with the mounting member.

With reference to FIGS. 62 and 63, another transfer guard system 1100 is provided for transferring objects across a gap between conveying surfaces and is similar in many respects to the transfer guard system 700 discussed above. The transfer guard system 1100 includes transfer guard members 1102 and a mounting member 1104. One difference between the transfer guard systems 700, 1100 is that the transfer guard system 1100 includes a removable locking member, such as a pin 1106, for fixing the transfer guard members 1102 to the mounting member 1104. With the locking pin 1106 fixing the transfer guard members 1102 to the mounting member 1104, the transfer guard members 1102 may not detach from the mounting member 1104 in response to impacts or large forces applied against the transfer guard members 1102. As discussed in greater detail below, the transfer guard members 1102 are connected to the mounting member 1104 and the locking pin 1106 is slid in direction 1108 between legs 1110 of the transfer guard members 1102. With reference to FIG. 63, the presence of the locking pin 1106 between the legs 1110 keeps the legs 1110 from shifting towards each other in directions 1112, 1113 and disengaging from the mounting member 1104. This fixes the transfer guard member 1102 to the mounting member 1104

Figure 64:
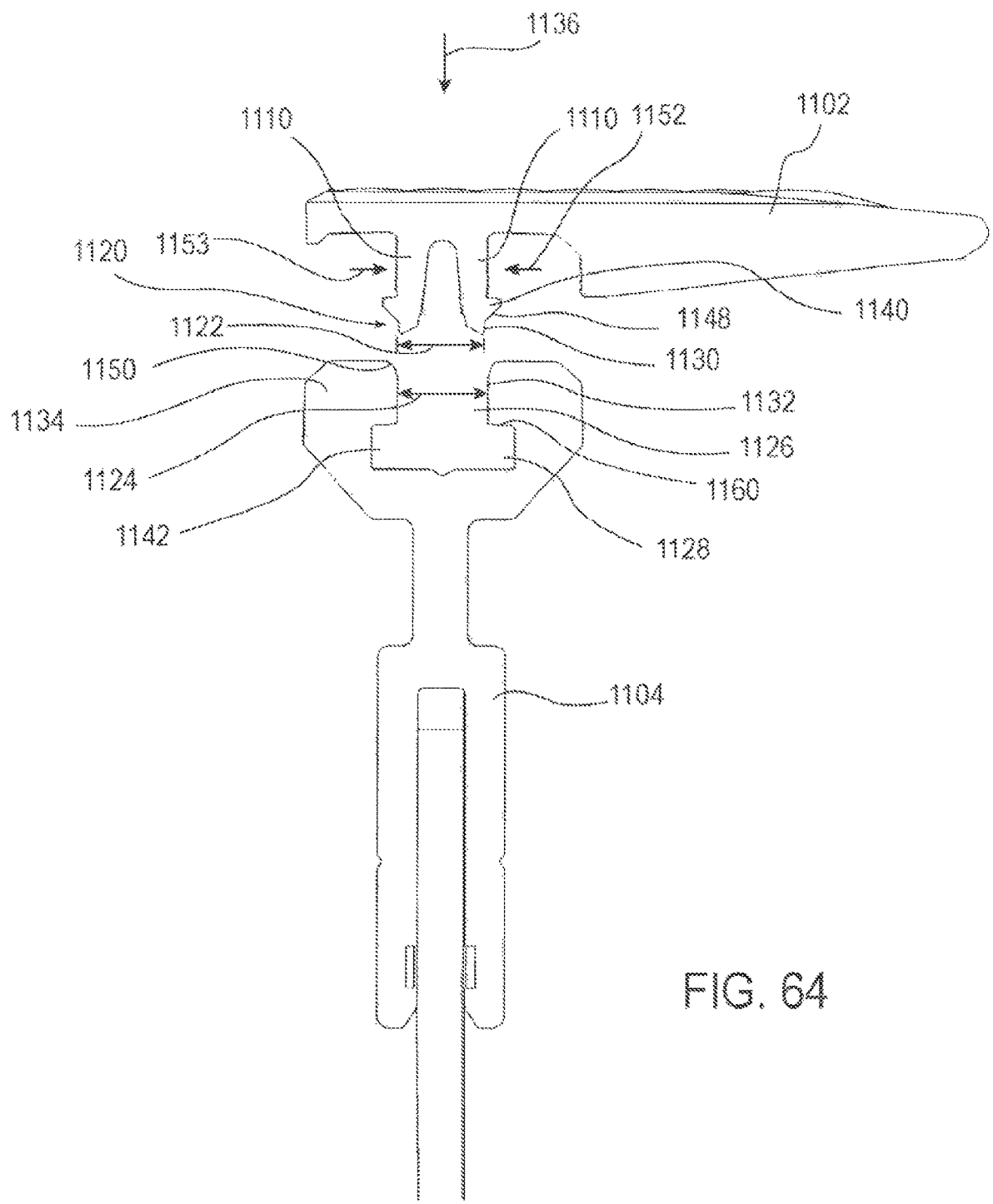
FIGS. 64, 65, and 66 are side elevational views of a method of connecting the transfer guard members to the mounting member.

Turning to FIG. 64, the transfer guard member legs 1110 include feet 1140 having features that make it easier to correctly connect the transfer guard members 1102 to the mounting member 1104 and provide space to accommodate the locking pin 1106 between the legs 1110. The feet 1140 include lead-in portions 1120 having an outer distance 1122 that is smaller than a distance 1124 between walls 1134 of the mounting member 1104. The walls 1134 define a channel 1128 of the mounting member 1104 including a narrowed upper portion 1126 and an enlarged lower portion 1142. The smaller outer distance 1122 permits the installer to easily align the lead-in portions 1120 with the channel 1128 and advance the lead-in portions 1120 into the channel 1128. Once the lead-in portions 1120 enter into the channel 1128, the lead-in portions 1120 have outward facing flat surfaces 1130 that slide against inward facing flat surfaces 1132 of the mounting member walls 1134. The confronting surfaces 1130, 1132 of the legs 1110 and the mounting member walls 1134 resist tilting of the transfer guard member 1102 and keep the transfer guard member 1102 in a generally vertical orientation (see FIG. 64) as the legs 1110 travel into the channel 1128. Keeping the transfer guard member 1102 in the straight or generally vertical orientation ensures both of the feet 1140 reach the enlarged portion 1142 of the channel 1128 and can shift apart to engage the stop surfaces 1160 of the walls 1134.

The feet 1140 also have cam surfaces 1148 configured to engage upper surfaces 1150 of the walls 1134 of the mounting member 1104 as the legs 1110 are advanced in direction 1136 into the channel 1128. This urges the feet 1140 together in directions 1152, 1153 and deflects the legs 1110. The legs 1110 resiliently return to their undeformed or nearly-undeformed positions once the feet 1140 reach the enlarged lower portion 1142 of the channel 1128.

Figure 65:
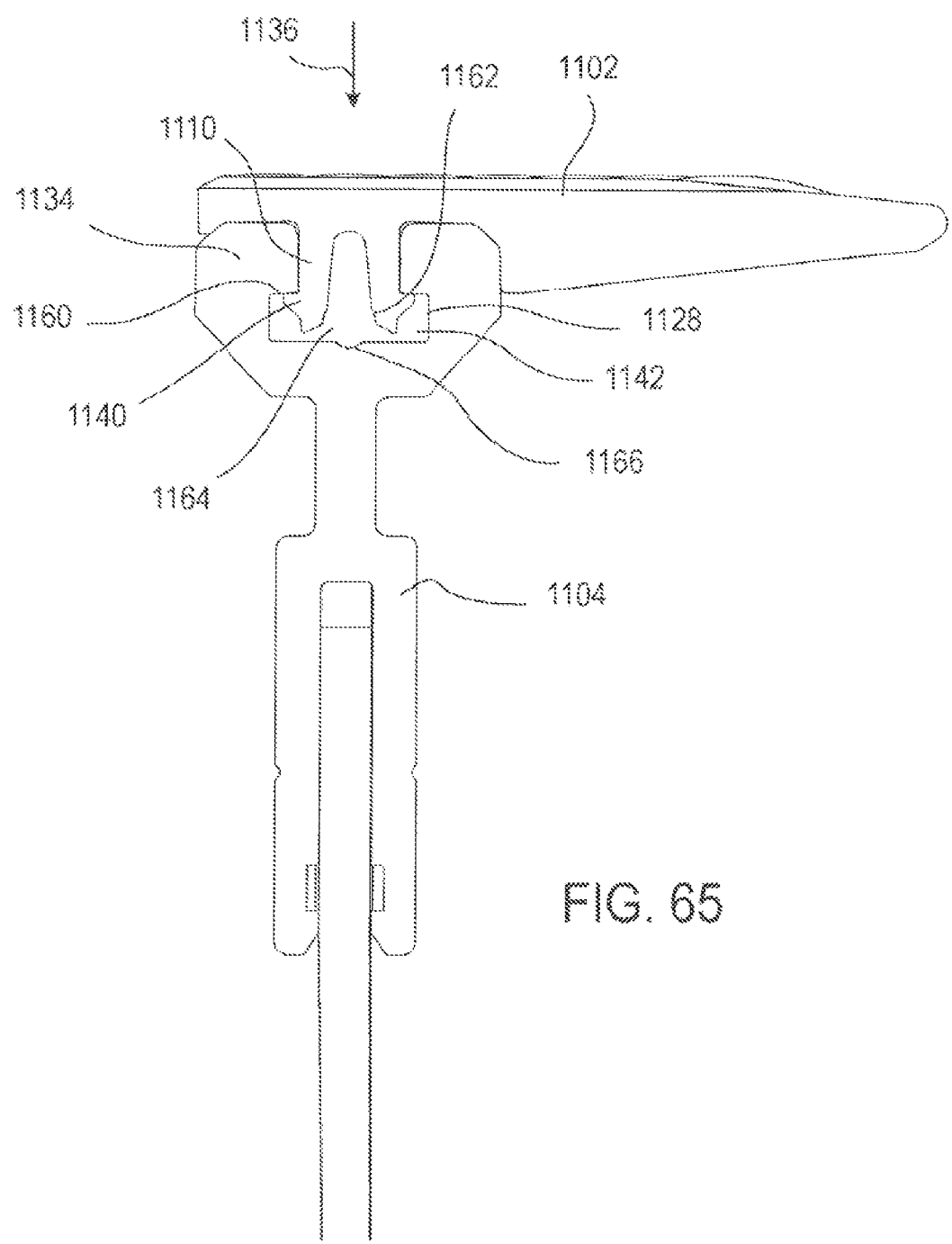

With reference to FIG. 65, the transfer guard member 1102 has been advanced in direction 1136 until the feet 1140 have reached the enlarged lower portion 1142 of the channel 1128. The feet 1140 have shifted apart and engage stop surfaces 1160 of the walls 1134. The transfer guard member 1102 is now detachably secured to the mounting member 1104. The transfer guard system 1100 may be utilized without the locking pin 1106 if it is desirable for the transfer guard members 1102 to detach, such as in response to impacts, as discussed above with respect to transfer guard system 700.

The feet 1140 of the legs 110 include recesses 1162 that are complimentary to the outer profile of the locking pin 1106. For example, the locking pin 1106 may have a circular cross section and the recesses 1162 are concave with a matching curvature. The mounting member 1104 has a groove 1166 that locates the locking pin 1106 in the channel 1128. The recesses 1162 and the groove 1166 form a pin-receiving cavity 1164 associated with each of the transfer guard members 1102.

Figure 66:
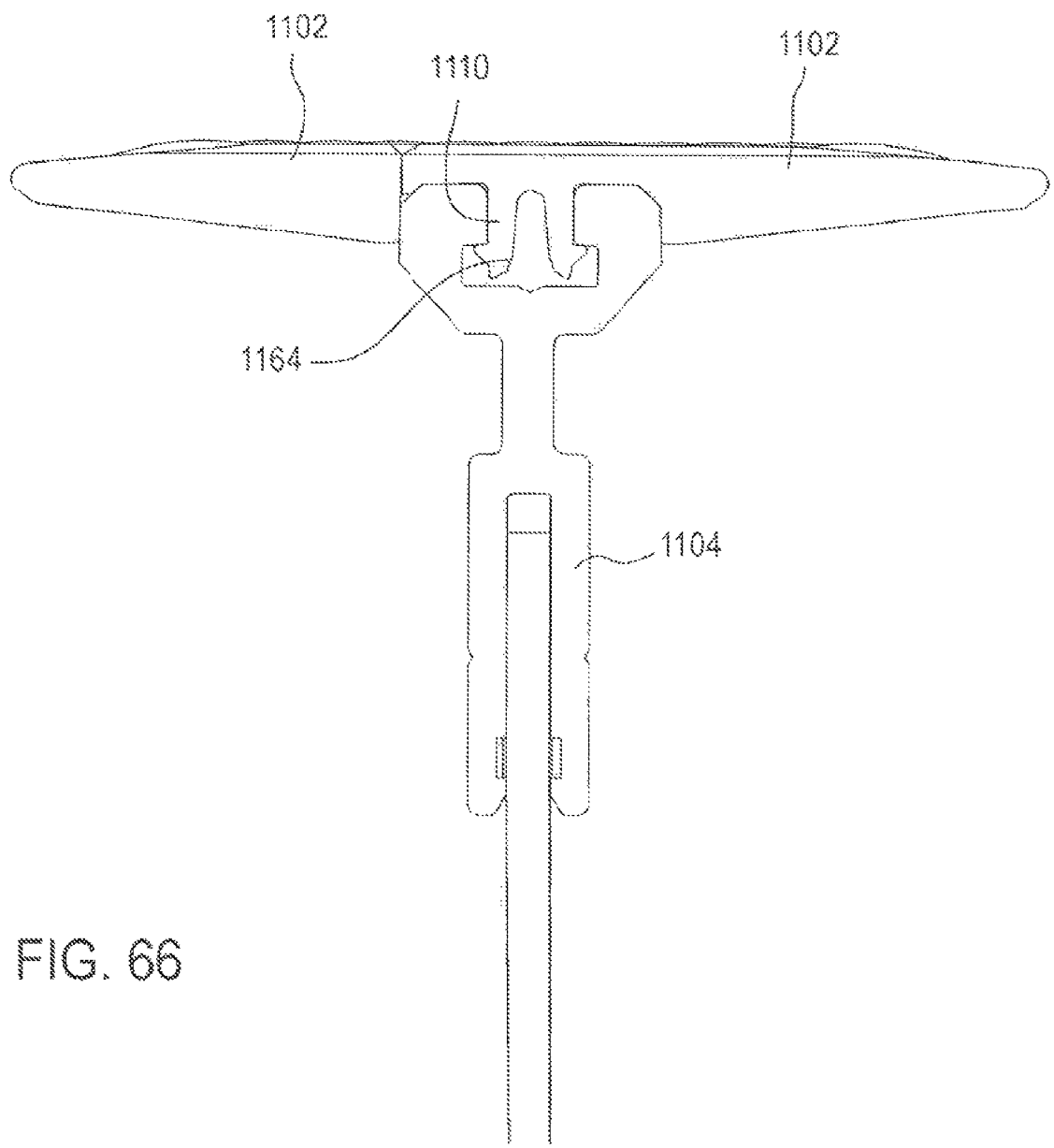

With reference to FIG. 66, the other transfer guard members 1102 have been connected to the mounting member 1104. The pin-receiving cavities 1164 of all of the transfer guard members 1102 are aligned. The locking pin 1106 may be readily slid into the pin-receiving cavity 1164 (see direction 1108 in FIG. 62) to lock the legs 1110 to the mounting member 1104.

Figure 67:
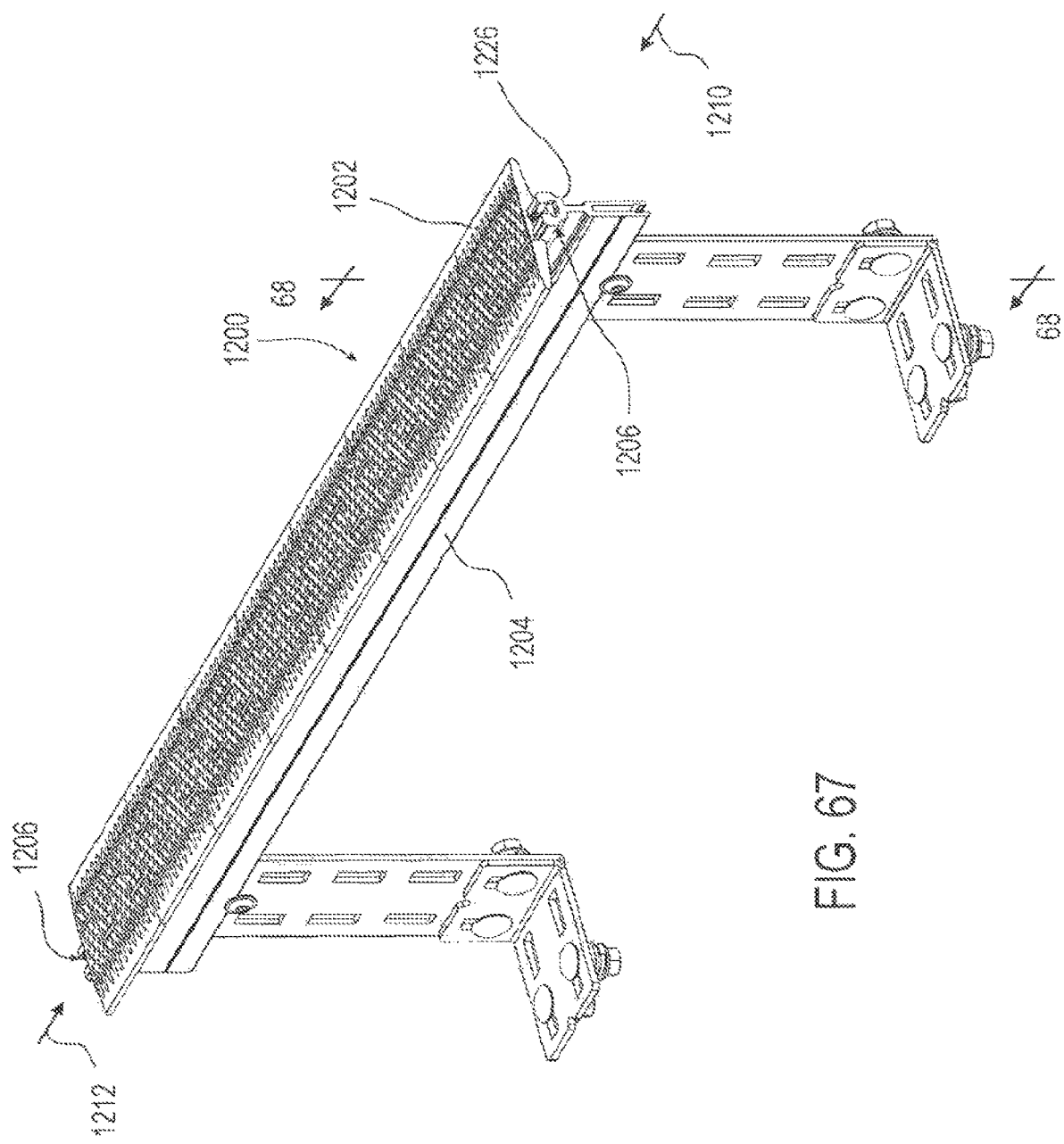
FIG. 67 is a perspective view of another transfer guard system having transfer guard members, a mounting member, a locking pin for fixing the transfer guard members to the mounting member, and locks for maintaining the position of the locking pin relative to the transfer guard members and the mounting member.

With reference to FIG. 67, another transfer guard system 1200 is provided that is similar in many respects to transfer guard system 1100 discussed above. The transfer guard system 1200 includes transfer guard members 1202, a mounting member 1204, and a retention member such as a locking pin 1206 for fixing the transfer guard members 1202 to the mounting member 1204. The transfer guard system 1200 includes locks 1206 at opposite ends of the mounting member 1204 that limit the locking pin 1206 from shifting in directions 1210, 1212 out from between legs 1232 of the transfer guard members 1202. In other words, the locks 1206 maintain the lateral position of the locking pin 1206 relative to the mounting member 1204.

Figure 68:
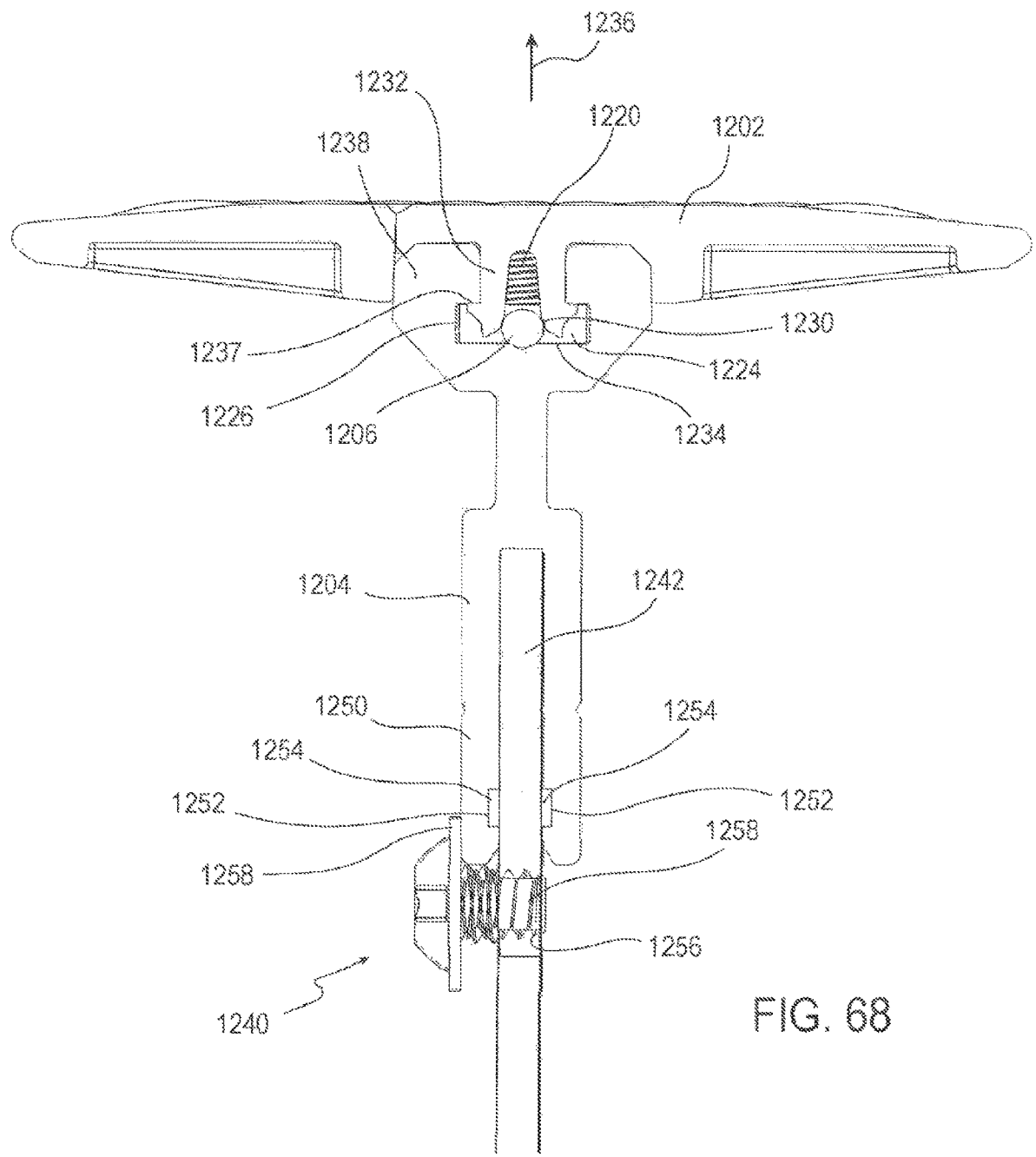
FIG. 68 is a cross-sectional view taken across line 68-68 in FIG. 67 showing a screw clamping an arm of the mounting member against a support of the transfer guard system.
Figure 69:
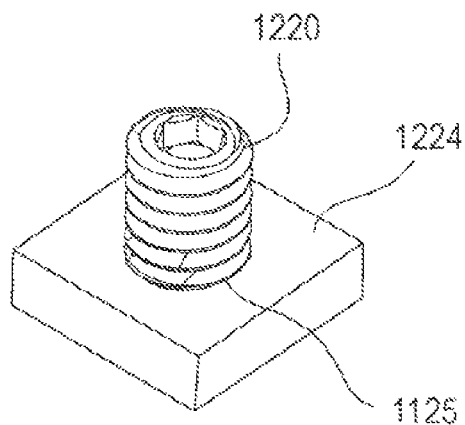
FIG. 69 is a perspective view of a set screw and a base of one of the locks of the transfer guard system of FIG. 67 that are positioned in a channel of the mounting member to maintain the position of the locking pin.

With reference to FIGS. 68 and 69, the locks 1206 each include a set screw 1220 and a base 1224. The base 1124 has a threaded throughbore 1125 and the set screw 1220 threadingly engages the throughbore 1125. The base 1224 is sized to fit within a channel 1226 of the mounting member 1204. The locks 1206 are used to secure the locking pin 1206 as follows. First, the transfer guard members 1202 are connected to the mounting member 1204. The locking pin 1206 is then advanced in the lateral direction 1210 into pin-receiving cavities 1230 formed between the legs 1232 of the transfer guard members 1202. Next, the locks 1206 are slid in directions 1210, 1212 into the channel 1226 until the bases 1124 are positioned against or in proximity to ends of the locking pin 1206.

Once the locks 1206 are in the channel 1226, the set screws 1220 are tightened down so that a distal end of the set screw 1220 extends downward from the base 1224 and engages a lower channel surface 1234 of the mounting member 1204. Continued tightening of the set screw 1220 urges the base 1224 upward in direction 1236 and engages the base 1224 with the stop surfaces 1237 of walls 1238 of the mounting member 1204. This secures the locks 1206 in position along the channel 1226 and the bases 1224 of the locks 1206 resist movement of the locking pin 1206 in directions 1210, 1212. As shown in FIG. 68, the base 1224 blocks the locking pin 1206 from sliding into the page (direction 1210 in FIG. 67) and out of the pin-receiving cavity 1230.

With reference to FIG. 68, the transfer guard system 1200 also includes a lock, such as a bolt 1240, for fixing the mounting member 1204 to a support 1242 of the transfer guard system 1200. More specifically, the mounting member 1204 has arms 1250 with channels 1252 that receive detents 1254 of the support 1242. The support 1242 has a threaded hole 1256 proximate the detents 1254. The bolt 1240 has a shank 1258 that threadingly engages with the threaded hole 1256. The bolt 1240 may be tightened down so that a flange 1258 of the bolt 1240 presses against one of the arms 1250. Tightening the bolt 1240 causes the flange 1258 to urge the arm 1250 against the support 1242. With the arm 1250 held against the support 1242 by the bolt 1240, the bolt 1240 resists the arm 1250 from being urged away from the support 1242 and releasing the associated detent 1254 from the channel 1252 of the arm 1250. Further, the frictional engagement between the bolt flange 1258 and the mounting member arm 1250 resists sliding of the mounting member 1204 relative to the support 1242 in direction 1210, 1212 and keeps the detents 1254 within the channels 1252. In this manner, the bolt 1240 fixes the mounting member 1204 to the support 1242.

Those skilled in the art will recognize that a wide variety of modifications, alterations, and combinations can be made with respect to the above-described embodiments without departing from the spirit and scope of the invention, and that such modifications, alterations, and combinations are to be viewed as being within the ambit of the inventive concept.

What is claimed is:

1. A transfer system for transferring objects in a longitudinal direction across a gap between conveying surfaces, the transfer system including:
   a mounting member;
   a plurality of transfer members adapted to be connected to the mounting member;
   at least one mount configured to be secured to a mounting surface adjacent the conveying surfaces for supporting the mounting member; and
   the mounting member and the at least one mount are configured to form a snap-fit connection therebetween when moved in a first predetermined direction relative to each other, the snap-fit connection being in vertical alignment with the gap.

2. The transfer system of claim 1 wherein one of the mounting member and the at least one mount include at least one detent adapted to engage at least one recess of the other of the mounting member and the at least one mount.

3. The transfer system of claim 1 wherein the snap-fit connection includes a pair of spaced arms and an engagement portion, the engagement portion being configured to engage and deflect the arms apart for fitting therebetween when the mounting member and the at least one mount are moved in the first predetermined direction relative to each other.

4. The transfer system of claim 1 wherein the at least one mount includes a resilient support member configured to permit the mounting member to resiliently shift in the longitudinal direction.

5. The transfer system of claim 4 wherein the at least one snap-fit connection includes a portion of the resilient support member.

6. The transfer system of claim 1 wherein the transfer members include upper transfer surfaces and attachment portions below the upper transfer surfaces configured to be detachably fixed to the mounting member.

7. The transfer system of claim 1 wherein the plurality of transfer members includes pairs of longitudinally aligned upstream and downstream transfer members.

8. The transfer system of claim 1 wherein the mounting member and the at least one mount are configured to form a slide fit connection therebetween when moved in a second direction relative to each other transverse to the first direction.

9. A method of installing a transfer system for transferring objects in a longitudinal direction across a gap between conveying surfaces, the method including:
   securing at least one mount to a mounting surface adjacent the conveying surfaces;
   engaging at least one detent and at least one recess of a mounting member and the at least one mount to connect the mounting member to the at least one mount, the mounting member being associated with a plurality of transfer members adapted to transfer an object across the gap,
   wherein the engaging the at least one detent and the at least one recess includes moving the mounting member and the at least one mount in a predetermined direction relative to each other to form a snap-fit connection therebetween with the snap-fit connection being in vertical alignment with the gap.

10. The method of claim 9 further comprising:
    lowering the mounting member in the predetermined direction downward into the gap; and
    engaging the mounting member and the at least one mount as the mounting member is lowered in the predetermined direction.

11. The method of claim 10 wherein engaging the mounting member and the at least one mount includes stopping movement of the mounting member in the predetermined direction; and
    wherein engaging the at least one detent and the at least one recess includes advancing the mounting member farther in the predetermined direction.

12. The method of claim 11 wherein securing the at least one mount to the mounting surface includes securing the at least one mount to the mounting surface so that at least a portion of the at least one mount extends in vertical alignment with the gap; and
    engaging the at least one detent and the at least one recess of the mounting member and the at least one mount includes engaging the at least one detent and the at least one recess in the gap between the conveying surfaces.

13. The method of claim 9 wherein engaging the at least one detent and the at least one recess includes engaging portions of the mounting member and at least one resilient support member of the at least one mount.

14. The method of claim 9 further comprising connecting the plurality of transfer members to the mounting member.

15. The method of claim 14 wherein connecting the plurality of transfer members to the mounting member includes detachably fixing the transfer members to the mounting member.

16. The method of claim 9 wherein engaging the at least one detent and the at least one recess includes deflecting apart arms of one of the mounting member and the at least one mount.

17. The method of claim 9 wherein the mounting member is elongated and engaging the at least one detent and the at least one recess includes moving the mounting member and the at least one mount relative to each other in a predetermined direction parallel to a length of the mounting member to form a slide fit connection therebetween.

* * * * *